US009154826B2

(12) United States Patent
Raleigh et al.

(10) Patent No.: US 9,154,826 B2
(45) Date of Patent: Oct. 6, 2015

(54) DISTRIBUTING CONTENT AND SERVICE LAUNCH OBJECTS TO MOBILE DEVICES

(75) Inventors: Gregory G. Raleigh, Woodside, CA (US); Jose Tellado, Mountain View, CA (US); Jeffrey Green, Sunnyvale, CA (US)

(73) Assignee: Headwater Partners II LLC, Redwood City, CA (US)

( * ) Notice: Subject to any disclaimer, the term of this patent is extended or adjusted under 35 U.S.C. 154(b) by 797 days.

(21) Appl. No.: 13/441,815

(22) Filed: Apr. 6, 2012

(65) Prior Publication Data

US 2012/0289147 A1 Nov. 15, 2012

Related U.S. Application Data

(60) Provisional application No. 61/472,606, filed on Apr. 6, 2011, provisional application No. 61/609,271, filed on Mar. 10, 2012, provisional application No. 61/609,272, filed on Mar. 10, 2012, provisional application No. 61/609,273, filed on Mar. 10, 2012, provisional application No. 61/609,274, filed on Mar. 10, 2012.

(51) Int. Cl.
*H04H 40/00* (2009.01)
*H04N 21/414* (2011.01)
(Continued)

(52) U.S. Cl.
CPC ...... *H04N 21/41407* (2013.01); *H04L 67/2847* (2013.01); *H04N 21/2402* (2013.01); *H04N 21/25808* (2013.01); *H04N 21/25866* (2013.01); *H04N 21/2668* (2013.01); *H04N 21/4312* (2013.01); *H04N 21/478* (2013.01); *H04N 21/6125* (2013.01); *H04N 21/6547* (2013.01);

(Continued)

(58) Field of Classification Search
USPC ............. 455/3.06, 403, 405, 414.3, 418, 419; 709/201, 202, 203, 204, 21, 221, 223, 709/224, 217, 220; 719/313, 316
See application file for complete search history.

(56) References Cited

U.S. PATENT DOCUMENTS 5,131,020 A 7/1992 Liebesny et al.
5,283,904 A 2/1994 Carson et al.
(Continued)

FOREIGN PATENT DOCUMENTS

CN 1310401 A 8/2001
CN 1508734 A 6/2004
(Continued)

OTHER PUBLICATIONS

Jul. 25, 2014 European Search Report and Opinion in European Application No. 12767814.2.
(Continued)

*Primary Examiner* — Andrew Joseph Rudy
(74) *Attorney, Agent, or Firm* — James E. Harris

(57) ABSTRACT

Embodiments of methods, systems and apparatuses for distributing content over a communication network are disclosed. One method includes managing, by at least one content distribution server, a plurality of content, assisting in preloading at least a portion of the content to a storage element associated with a wireless device, identifying a portion of a user interface of the wireless device, and sending configuration information to the wireless device, the configuration information configured to assist the wireless device in placing, in the identified portion of the user interface, a service launch object that launches the content.

20 Claims, 52 Drawing Sheets

(51) Int. Cl.
    *H04L 29/08*         (2006.01)
    *H04N 21/24*        (2011.01)
    *H04N 21/258*      (2011.01)
    *H04N 21/2668*     (2011.01)
    *H04N 21/431*      (2011.01)
    *H04N 21/478*      (2011.01)
    *H04N 21/61*       (2011.01)
    *H04N 21/6547*     (2011.01)
    *H04N 21/81*       (2011.01)
    *H04W 4/00*        (2009.01)
    *H04N 21/485*      (2011.01)
    *H04N 21/488*      (2011.01)

(52) U.S. Cl.
    CPC ............ *H04N 21/812* (2013.01); *H04W 4/001* (2013.01); *H04N 21/485* (2013.01); *H04N 21/4882* (2013.01)

(56) References Cited

U.S. PATENT DOCUMENTS

| | | | |
|---|---|---|---|
| 5,325,532 A | 6/1994 | Crosswy et al. |
| 5,577,100 A | 11/1996 | McGregor et al. |
| 5,594,777 A | 1/1997 | Makkonen et al. |
| 5,630,159 A | 5/1997 | Zancho |
| 5,633,484 A | 5/1997 | Zancho et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,983,270 A | 11/1999 | Abraham et al. |
| 6,035,281 A | 3/2000 | Crosskey et al. |
| 6,038,452 A | 3/2000 | Strawczynski et al. |
| 6,047,268 A | 4/2000 | Bartoli et al. |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,119,933 A | 9/2000 | Wong et al. |
| 6,141,686 A | 10/2000 | Jackowski et al. |
| 6,148,336 A | 11/2000 | Thomas et al. |
| 6,154,738 A | 11/2000 | Call |
| 6,185,576 B1 | 2/2001 | McIntosh |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,418,147 B1 | 7/2002 | Wiedeman |
| 6,438,575 B1 * | 8/2002 | Khan et al. ................... 709/200 |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,542,992 B1 | 4/2003 | Peirce et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama et al. |
| 6,598,034 B1 | 7/2003 | Kloth |
| 6,603,969 B1 | 8/2003 | Vuoristo et al. |
| 6,606,744 B1 * | 8/2003 | Mikurak ................... 717/174 |
| 6,631,122 B1 | 10/2003 | Arunachalam et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,814 B1 | 11/2003 | Britton et al. |
| 6,658,254 B1 | 12/2003 | Purdy et al. |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,697,821 B2 | 2/2004 | Ziff et al. |
| 6,725,031 B2 | 4/2004 | Watler et al. |
| 6,748,195 B1 | 6/2004 | Phillips |
| 6,754,470 B2 | 6/2004 | Hendrickson et al. |
| 6,757,717 B1 | 6/2004 | Goldstein |
| 6,763,000 B1 | 7/2004 | Walsh |
| 6,763,226 B1 | 7/2004 | McZeal |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,885,997 B1 | 4/2005 | Roberts |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,947,723 B1 | 9/2005 | Gurnani et al. |
| 6,952,428 B1 | 10/2005 | Necka et al. |
| 6,957,067 B1 | 10/2005 | Iyer et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,982,733 B1 | 1/2006 | McNally et al. |
| 6,983,370 B2 | 1/2006 | Eaton et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 * | 2/2006 | Rose et al. ................... 725/86 |
| 7,013,469 B2 | 3/2006 | Smith et al. |
| 7,024,200 B2 | 4/2006 | McKenna et al. |
| 7,027,408 B2 | 4/2006 | Nabkel et al. |
| 7,032,072 B1 | 4/2006 | Quinn et al. |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,226 B2 | 5/2006 | Yamauchi |
| 7,043,268 B2 | 5/2006 | Yukie et al. |
| 7,058,968 B2 | 6/2006 | Rowland et al. |
| 7,068,600 B2 | 6/2006 | Cain |
| 7,069,248 B2 | 6/2006 | Huber |
| 7,084,775 B1 | 8/2006 | Smith |
| 7,092,696 B1 | 8/2006 | Hosain et al. |
| 7,102,620 B2 | 9/2006 | Harries et al. |
| 7,113,780 B2 | 9/2006 | Mckenna et al. |
| 7,113,997 B2 | 9/2006 | Jayapalan et al. |
| 7,133,695 B2 | 11/2006 | Beyda |
| 7,139,569 B2 | 11/2006 | Kato |
| 7,142,876 B2 | 11/2006 | Trossen et al. |
| 7,149,229 B1 | 12/2006 | Leung |
| 7,158,792 B1 | 1/2007 | Cook et al. |
| 7,167,078 B2 | 1/2007 | Pourchot |
| 7,174,174 B2 | 2/2007 | Boris et al. |
| 7,180,855 B1 | 2/2007 | Lin |
| 7,181,017 B1 | 2/2007 | Nagel et al. |
| 7,197,321 B2 | 3/2007 | Erskine et al. |
| 7,203,169 B1 | 4/2007 | Okholm et al. |
| 7,212,491 B2 | 5/2007 | Koga |
| 7,222,304 B2 * | 5/2007 | Beaton et al. ................. 715/744 |
| 7,228,354 B2 | 6/2007 | Chambliss et al. |
| 7,236,780 B2 | 6/2007 | Benco et al. |
| 7,242,668 B2 | 7/2007 | Kan et al. |
| 7,242,920 B2 | 7/2007 | Morris |

(56) References Cited

U.S. PATENT DOCUMENTS

| | | | |
|---|---|---|---|
| 7,245,901 B2 | 7/2007 | McGregor et al. |
| 7,251,218 B2 | 7/2007 | Jorgensen |
| 7,260,382 B1 | 8/2007 | Lamb et al. |
| 7,271,765 B2 | 9/2007 | Stilp et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,373,136 B2 | 5/2008 | Watler et al. |
| 7,373,179 B2 | 5/2008 | Stine et al. |
| 7,388,950 B2 | 6/2008 | Elsey et al. |
| 7,401,338 B1 | 7/2008 | Bowen et al. |
| 7,403,763 B2 | 7/2008 | Maes |
| 7,409,447 B1 | 8/2008 | Assadzadeh |
| 7,418,253 B2 | 8/2008 | Kavanagh |
| 7,418,257 B2 | 8/2008 | Kim |
| 7,421,004 B2 | 9/2008 | Feher |
| 7,444,669 B1 | 10/2008 | Bahl et al. |
| 7,450,591 B2 | 11/2008 | Korling et al. |
| 7,450,927 B1 | 11/2008 | Creswell et al. |
| 7,457,265 B2 | 11/2008 | Julka et al. |
| 7,460,837 B2 | 12/2008 | Diener |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,515,608 B2 | 4/2009 | Yuan et al. |
| 7,516,219 B2 | 4/2009 | Moghaddam et al. |
| 7,529,204 B2 | 5/2009 | Bourlas et al. |
| 7,535,880 B1 | 5/2009 | Hinman et al. |
| 7,539,132 B2 | 5/2009 | Werner et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,555,757 B2 | 6/2009 | Smith et al. |
| 7,561,899 B2 * | 7/2009 | Lee ..................... 455/566 |
| 7,565,141 B2 | 7/2009 | Macaluso |
| 7,574,509 B2 | 8/2009 | Nixon et al. |
| 7,574,731 B2 | 8/2009 | Fascenda |
| 7,580,356 B1 | 8/2009 | Mishra et al. |
| 7,580,857 B2 | 8/2009 | VanFleet et al. |
| 7,583,964 B2 | 9/2009 | Wong |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,668,176 B2 | 2/2010 | Chuah |
| 7,668,612 B1 | 2/2010 | Okkonen |
| 7,668,903 B2 | 2/2010 | Edwards et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,720,464 B2 | 5/2010 | Batta |
| 7,720,505 B2 | 5/2010 | Gopi et al. |
| 7,720,960 B2 | 5/2010 | Pruss et al. |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,985 B1 | 9/2010 | Pitkow et al. |
| 7,802,724 B1 | 9/2010 | Nohr |
| 7,805,140 B2 | 9/2010 | Friday et al. |
| 7,805,606 B2 | 9/2010 | Birger et al. |
| 7,809,351 B1 | 10/2010 | Panda et al. |
| 7,822,837 B1 | 10/2010 | Urban et al. |
| 7,826,427 B2 | 11/2010 | Sood et al. |
| 7,826,607 B1 | 11/2010 | De Carvalho Resende et al. |
| 7,843,843 B1 | 11/2010 | Papp, III et al. |
| 7,844,728 B2 | 11/2010 | Anderson et al. |
| 7,848,768 B2 | 12/2010 | Omori et al. |
| 7,853,255 B2 | 12/2010 | Karaoguz et al. |
| 7,856,226 B2 | 12/2010 | Wong et al. |
| 7,865,182 B2 | 1/2011 | Macaluso |
| 7,868,778 B2 | 1/2011 | Kenwright |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,890,084 B1 | 2/2011 | Dudziak et al. |

(56) References Cited

U.S. PATENT DOCUMENTS

| | | | |
|---|---|---|---|
| 7,890,111 B2 | 2/2011 | Bugenhagen | |
| 7,899,438 B2 | 3/2011 | Baker et al. | |
| 7,903,553 B2 | 3/2011 | Liu | |
| 7,907,970 B2 | 3/2011 | Park et al. | |
| 7,911,975 B2 | 3/2011 | Droz et al. | |
| 7,912,025 B2 | 3/2011 | Pattenden et al. | |
| 7,912,056 B1 | 3/2011 | Brassem | |
| 7,920,529 B1 | 4/2011 | Mahler et al. | |
| 7,921,463 B2 | 4/2011 | Sood et al. | |
| 7,925,778 B1 | 4/2011 | Wijnands et al. | |
| 7,929,959 B2 | 4/2011 | DeAtley et al. | |
| 7,929,960 B2 | 4/2011 | Martin et al. | |
| 7,929,973 B2 | 4/2011 | Zavalkovsky et al. | |
| 7,930,327 B2 | 4/2011 | Craft et al. | |
| 7,930,446 B2 | 4/2011 | Kesselman et al. | |
| 7,936,736 B2 | 5/2011 | Proctor, Jr. et al. | |
| 7,937,069 B2 | 5/2011 | Rassam | |
| 7,937,450 B2 | 5/2011 | Janik | |
| 7,940,685 B1 | 5/2011 | Breslau et al. | |
| 7,940,751 B2 | 5/2011 | Hansen | |
| 7,941,184 B2 | 5/2011 | Prendergast et al. | |
| 7,944,948 B2 | 5/2011 | Chow et al. | |
| 7,945,238 B2 | 5/2011 | Baker et al. | |
| 7,945,240 B1 | 5/2011 | Klock et al. | |
| 7,945,945 B2 | 5/2011 | Graham et al. | |
| 7,948,952 B2 | 5/2011 | Hurtta et al. | |
| 7,948,953 B2 | 5/2011 | Melkote et al. | |
| 7,948,968 B2 | 5/2011 | Voit et al. | |
| 7,949,529 B2 | 5/2011 | Weider et al. | |
| 7,953,808 B2 | 5/2011 | Sharp et al. | |
| 7,953,877 B2 | 5/2011 | Vemula et al. | |
| 7,957,020 B2 | 6/2011 | Mine et al. | |
| 7,957,381 B2 | 6/2011 | Clermidy et al. | |
| 7,957,511 B2 | 6/2011 | Drudis et al. | |
| 7,958,029 B1 | 6/2011 | Bobich et al. | |
| 7,962,622 B2 | 6/2011 | Friend et al. | |
| 7,965,983 B1 | 6/2011 | Swan et al. | |
| 7,969,950 B2 | 6/2011 | Iyer et al. | |
| 7,970,350 B2 | 6/2011 | Sheynman et al. | |
| 7,970,426 B2 | 6/2011 | Poe et al. | |
| 7,974,624 B2 | 7/2011 | Gallagher et al. | |
| 7,975,184 B2 | 7/2011 | Goff et al. | |
| 7,978,627 B2 | 7/2011 | Taylor et al. | |
| 7,984,130 B2 | 7/2011 | Bogineni et al. | |
| 7,984,511 B2 | 7/2011 | Kocher et al. | |
| 7,986,935 B1 | 7/2011 | D'Souza et al. | |
| 7,987,510 B2 | 7/2011 | Kocher et al. | |
| 8,000,276 B2 | 8/2011 | Scherzer et al. | |
| 8,000,318 B2 | 8/2011 | Wiley et al. | |
| 8,005,009 B2 | 8/2011 | McKee et al. | |
| 8,005,459 B2 | 8/2011 | Balsillie | |
| 8,005,988 B2 | 8/2011 | Maes | |
| 8,010,080 B1 | 8/2011 | Thenthiruperai et al. | |
| 8,010,081 B1 | 8/2011 | Roskowski | |
| 8,010,082 B2 | 8/2011 | Sutaria et al. | |
| 8,015,133 B1 | 9/2011 | Wu et al. | |
| 8,015,234 B2 | 9/2011 | Lum et al. | |
| 8,019,687 B2 | 9/2011 | Wang et al. | |
| 8,019,820 B2 | 9/2011 | Son et al. | |
| 8,019,846 B2 | 9/2011 | Roelens et al. | |
| 8,019,868 B2 | 9/2011 | Rao et al. | |
| 8,019,886 B2 | 9/2011 | Harrang et al. | |
| 8,023,425 B2 | 9/2011 | Raleigh | |
| 8,024,397 B1 | 9/2011 | Erickson et al. | |
| 8,027,339 B2 | 9/2011 | Short et al. | |
| 8,031,601 B2 | 10/2011 | Feroz et al. | |
| 8,032,409 B1 * | 10/2011 | Mikurak | 705/14.39 |
| 8,032,899 B2 | 10/2011 | Archer et al. | |
| 8,036,600 B2 | 10/2011 | Garrett et al. | |
| 8,045,973 B2 | 10/2011 | Chambers | |
| 8,046,449 B2 | 10/2011 | Yoshiuchi | |
| 8,050,275 B1 | 11/2011 | Iyer | |
| 8,050,705 B2 | 11/2011 | Sicher et al. | |
| 8,059,530 B1 | 11/2011 | Cole | |
| 8,060,463 B1 | 11/2011 | Spiegel | |
| 8,064,418 B2 | 11/2011 | Maki | |
| 8,064,896 B2 | 11/2011 | Bell et al. | |
| 8,068,824 B2 | 11/2011 | Shan et al. | |
| 8,068,829 B2 | 11/2011 | Lemond et al. | |
| 8,073,721 B1 | 12/2011 | Lewis | |
| 8,078,140 B2 | 12/2011 | Baker et al. | |
| 8,078,163 B2 | 12/2011 | Lemond et al. | |
| 8,086,497 B1 | 12/2011 | Oakes, III | |
| 8,086,791 B2 | 12/2011 | Caulkins | |
| 8,090,359 B2 | 1/2012 | Proctor, Jr. et al. | |
| 8,090,616 B2 | 1/2012 | Proctor, Jr. et al. | |
| 8,094,551 B2 | 1/2012 | Huber et al. | |
| 8,095,112 B2 | 1/2012 | Chow et al. | |
| 8,095,124 B2 | 1/2012 | Balia | |
| 8,095,640 B2 | 1/2012 | Guingo et al. | |
| 8,095,666 B2 | 1/2012 | Schmidt et al. | |
| 8,098,579 B2 | 1/2012 | Ray et al. | |
| 8,099,077 B2 | 1/2012 | Chowdhury et al. | |
| 8,099,517 B2 | 1/2012 | Jia et al. | |
| 8,102,814 B2 | 1/2012 | Rahman et al. | |
| 8,103,285 B2 | 1/2012 | Kalhan | |
| 8,108,520 B2 | 1/2012 | Ruutu et al. | |
| 8,116,223 B2 | 2/2012 | Tian et al. | |
| 8,116,749 B2 | 2/2012 | Proctor, Jr. et al. | |
| 8,116,781 B2 | 2/2012 | Chen et al. | |
| 8,122,128 B2 | 2/2012 | Burke, II et al. | |
| 8,122,249 B2 | 2/2012 | Falk et al. | |
| 8,126,123 B2 | 2/2012 | Cai et al. | |
| 8,126,396 B2 | 2/2012 | Bennett | |
| 8,126,476 B2 | 2/2012 | Vardi et al. | |
| 8,126,722 B2 | 2/2012 | Robb et al. | |
| 8,130,793 B2 | 3/2012 | Edwards et al. | |
| 8,131,256 B2 | 3/2012 | Martti et al. | |
| 8,131,281 B1 | 3/2012 | Hildner et al. | |
| 8,134,954 B2 | 3/2012 | Godfrey et al. | |
| 8,135,388 B1 | 3/2012 | Gailloux et al. | |
| 8,135,392 B2 | 3/2012 | Marcellino et al. | |
| 8,135,657 B2 | 3/2012 | Kapoor et al. | |
| 8,144,591 B2 | 3/2012 | Ghai et al. | |
| 8,149,823 B2 | 4/2012 | Turcan et al. | |
| 8,150,431 B2 | 4/2012 | Wolovitz et al. | |
| 8,155,155 B1 | 4/2012 | Chow et al. | |
| 8,155,620 B2 | 4/2012 | Wang et al. | |
| 8,155,666 B2 | 4/2012 | Alizadeh-Shabdiz | |
| 8,155,670 B2 | 4/2012 | Fullam et al. | |
| 8,156,206 B2 * | 4/2012 | Kiley et al. | 709/220 |
| 8,160,015 B2 | 4/2012 | Rashid et al. | |
| 8,160,598 B2 | 4/2012 | Savoor | |
| 8,165,576 B2 | 4/2012 | Raju et al. | |
| 8,166,040 B2 | 4/2012 | Brindisi et al. | |
| 8,166,554 B2 | 4/2012 | John | |
| 8,170,553 B2 | 5/2012 | Bennett | |
| 8,174,378 B2 | 5/2012 | Richman et al. | |
| 8,174,970 B2 | 5/2012 | Adamczyk et al. | |
| 8,175,574 B1 | 5/2012 | Panda et al. | |
| 8,180,881 B2 | 5/2012 | Seo et al. | |
| 8,184,530 B1 | 5/2012 | Swan et al. | |
| 8,184,590 B2 | 5/2012 | Rosenblatt | |
| 8,185,088 B2 | 5/2012 | Klein et al. | |
| 8,185,093 B2 | 5/2012 | Jheng et al. | |
| 8,185,127 B1 | 5/2012 | Cai et al. | |
| 8,185,152 B1 | 5/2012 | Goldner | |
| 8,185,158 B2 | 5/2012 | Tamura et al. | |
| 8,190,675 B2 | 5/2012 | Tribbett | |
| 8,191,116 B1 | 5/2012 | Gazzard | |
| 8,191,124 B2 | 5/2012 | Wynn et al. | |
| 8,194,549 B2 | 6/2012 | Huber et al. | |
| 8,194,553 B2 | 6/2012 | Liang et al. | |
| 8,194,572 B2 | 6/2012 | Horvath et al. | |
| 8,195,093 B2 | 6/2012 | Garrett et al. | |
| 8,195,163 B2 | 6/2012 | Gisby et al. | |
| 8,196,199 B2 | 6/2012 | Hrastar et al. | |
| 8,200,200 B1 * | 6/2012 | Belser et al. | 455/414.1 |
| 8,200,509 B2 | 6/2012 | Kenedy et al. | |
| 8,200,775 B2 * | 6/2012 | Moore | 709/217 |
| 8,204,190 B2 | 6/2012 | Bang et al. | |
| 8,204,505 B2 | 6/2012 | Jin et al. | |
| 8,204,794 B1 | 6/2012 | Peng et al. | |
| 8,208,788 B2 * | 6/2012 | Ando et al. | 386/240 |

(56) References Cited

U.S. PATENT DOCUMENTS

| | | | |
|---|---|---|---|
| 8,208,919 B2 | 6/2012 | Kotecha | |
| 8,213,296 B2 | 7/2012 | Shannon et al. | |
| 8,213,363 B2 | 7/2012 | Ying et al. | |
| 8,214,536 B2 | 7/2012 | Zhao | |
| 8,223,741 B1 | 7/2012 | Bartlett et al. | |
| 8,224,382 B2 | 7/2012 | Bultman | |
| 8,224,773 B2 | 7/2012 | Spiegel | |
| 8,228,818 B2 | 7/2012 | Chase et al. | |
| 8,229,394 B2 | 7/2012 | Karlberg | |
| 8,229,914 B2 * | 7/2012 | Ramer et al. | 707/709 |
| 8,230,061 B2 | 7/2012 | Hassan et al. | |
| 8,233,433 B2 | 7/2012 | Kalhan | |
| 8,233,883 B2 | 7/2012 | De Froment | |
| 8,233,895 B2 | 7/2012 | Tysowski | |
| 8,238,287 B1 | 8/2012 | Gopi et al. | |
| 8,239,520 B2 | 8/2012 | Grah et al. | |
| 8,242,959 B2 | 8/2012 | Mia et al. | |
| 8,244,241 B2 | 8/2012 | Montemurro | |
| 8,249,601 B2 | 8/2012 | Emberson et al. | |
| 8,254,915 B2 | 8/2012 | Kozisek | |
| 8,255,515 B1 | 8/2012 | Melman et al. | |
| 8,255,534 B2 | 8/2012 | Assadzadeh | |
| 8,255,689 B2 | 8/2012 | Kim et al. | |
| 8,259,692 B2 | 9/2012 | Bajko | |
| 8,264,965 B2 | 9/2012 | Dolganow et al. | |
| 8,265,004 B2 | 9/2012 | Toutonghi | |
| 8,266,681 B2 | 9/2012 | Deshpande et al. | |
| 8,270,972 B2 | 9/2012 | Otting et al. | |
| 8,271,045 B2 | 9/2012 | Parolkar et al. | |
| 8,271,049 B2 | 9/2012 | Silver et al. | |
| 8,271,992 B2 | 9/2012 | Chatley et al. | |
| 8,275,415 B2 | 9/2012 | Huslak | |
| 8,275,830 B2 | 9/2012 | Raleigh | |
| 8,279,067 B2 | 10/2012 | Berger et al. | |
| 8,279,864 B2 | 10/2012 | Wood | |
| 8,280,351 B1 | 10/2012 | Ahmed et al. | |
| 8,280,354 B2 | 10/2012 | Smith et al. | |
| 8,284,740 B2 | 10/2012 | O'Connor | |
| 8,285,249 B2 | 10/2012 | Baker et al. | |
| 8,291,238 B2 | 10/2012 | Ginter et al. | |
| 8,296,404 B2 | 10/2012 | McDysan et al. | |
| 8,300,575 B2 | 10/2012 | Willars | |
| 8,301,513 B1 | 10/2012 | Peng et al. | |
| 8,306,518 B1 | 11/2012 | Gailloux | |
| 8,307,067 B2 | 11/2012 | Ryan | |
| 8,315,593 B2 | 11/2012 | Gallant et al. | |
| 8,315,594 B1 | 11/2012 | Mauser et al. | |
| 8,315,718 B2 | 11/2012 | Caffrey et al. | |
| 8,315,999 B2 | 11/2012 | Chatley et al. | |
| 8,320,244 B2 | 11/2012 | Muqattash et al. | |
| 8,320,949 B2 | 11/2012 | Matta | |
| 8,325,638 B2 | 12/2012 | Jin et al. | |
| 8,326,319 B2 | 12/2012 | Davis | |
| 8,326,359 B2 | 12/2012 | Kauffman | |
| 8,326,828 B2 * | 12/2012 | Zhou et al. | 707/725 |
| 8,331,293 B2 | 12/2012 | Sood | |
| 8,332,375 B2 | 12/2012 | Chatley et al. | |
| 8,332,517 B2 | 12/2012 | Russell | |
| 8,335,161 B2 | 12/2012 | Foottit et al. | |
| 8,340,718 B2 | 12/2012 | Colonna et al. | |
| 8,346,210 B2 | 1/2013 | Balsan et al. | |
| 8,347,104 B2 | 1/2013 | Pathiyal | |
| 8,347,362 B2 | 1/2013 | Cai et al. | |
| 8,347,378 B2 | 1/2013 | Merkin et al. | |
| 8,350,700 B2 | 1/2013 | Fast et al. | |
| 8,351,592 B2 | 1/2013 | Freeny, Jr. et al. | |
| 8,351,898 B2 | 1/2013 | Raleigh | |
| 8,352,360 B2 | 1/2013 | De Judicibus et al. | |
| 8,352,630 B2 | 1/2013 | Hart | |
| 8,352,980 B2 | 1/2013 | Howcroft | |
| 8,353,001 B2 | 1/2013 | Herrod | |
| 8,355,696 B1 | 1/2013 | Olding et al. | |
| 8,356,336 B2 | 1/2013 | Johnston et al. | |
| 8,358,638 B2 | 1/2013 | Scherzer et al. | |
| 8,363,658 B1 | 1/2013 | Delker et al. | |
| 8,364,089 B2 | 1/2013 | Phillips | |
| 8,364,806 B2 | 1/2013 | Short et al. | |
| 8,369,274 B2 | 2/2013 | Sawai | |
| 8,370,477 B2 | 2/2013 | Short et al. | |
| 8,370,483 B2 | 2/2013 | Choong et al. | |
| 8,374,090 B2 | 2/2013 | Morrill et al. | |
| 8,374,592 B2 | 2/2013 | Proctor, Jr. et al. | |
| 8,375,128 B2 | 2/2013 | Tofighbakhsh et al. | |
| 8,375,136 B2 | 2/2013 | Roman et al. | |
| 8,379,847 B2 | 2/2013 | Bell et al. | |
| 8,385,896 B2 | 2/2013 | Proctor, Jr. et al. | |
| 8,385,975 B2 | 2/2013 | Forutanpour et al. | |
| 8,386,386 B1 | 2/2013 | Zhu | |
| 8,391,262 B2 | 3/2013 | Maki et al. | |
| 8,391,834 B2 | 3/2013 | Raleigh | |
| 8,396,458 B2 | 3/2013 | Raleigh | |
| 8,396,929 B2 | 3/2013 | Helfman et al. | |
| 8,402,540 B2 | 3/2013 | Kapoor et al. | |
| 8,406,427 B2 | 3/2013 | Chand et al. | |
| 8,406,736 B2 | 3/2013 | Das et al. | |
| 8,411,587 B2 | 4/2013 | Curtis et al. | |
| 8,411,691 B2 | 4/2013 | Aggarwal | |
| 8,422,988 B1 | 4/2013 | Keshav | |
| 8,423,016 B2 | 4/2013 | Buckley et al. | |
| 8,429,403 B2 | 4/2013 | Moret et al. | |
| 8,437,734 B2 | 5/2013 | Ray et al. | |
| 8,441,955 B2 | 5/2013 | Wilkinson et al. | |
| 8,442,015 B2 | 5/2013 | Behzad et al. | |
| 8,447,324 B2 | 5/2013 | Shuman et al. | |
| 8,447,607 B2 | 5/2013 | Weider et al. | |
| 8,447,980 B2 | 5/2013 | Godfrey et al. | |
| 8,452,858 B2 | 5/2013 | Wu et al. | |
| 8,461,958 B2 | 6/2013 | Saenz et al. | |
| 8,463,232 B2 | 6/2013 | Tuli et al. | |
| 8,468,337 B2 | 6/2013 | Gaur et al. | |
| 8,472,371 B1 | 6/2013 | Bari et al. | |
| 8,477,778 B2 | 7/2013 | Lehmann, Jr. et al. | |
| 8,483,135 B2 | 7/2013 | Cai et al. | |
| 8,483,694 B2 | 7/2013 | Lewis et al. | |
| 8,484,327 B2 | 7/2013 | Werner et al. | |
| 8,488,597 B2 | 7/2013 | Nie et al. | |
| 8,489,110 B2 | 7/2013 | Frank et al. | |
| 8,489,720 B1 | 7/2013 | Morford et al. | |
| 8,495,181 B2 | 7/2013 | Venkatraman et al. | |
| 8,495,227 B2 | 7/2013 | Kaminsky et al. | |
| 8,495,360 B2 | 7/2013 | Falk et al. | |
| 8,495,700 B2 | 7/2013 | Shahbazi | |
| 8,504,729 B2 | 8/2013 | Pezzutti | |
| 8,509,082 B2 | 8/2013 | Heinz et al. | |
| 8,514,927 B2 | 8/2013 | Sundararajan et al. | |
| 8,516,552 B2 | 8/2013 | Raleigh | |
| 8,520,589 B2 | 8/2013 | Bhatt et al. | |
| 8,521,110 B2 | 8/2013 | Rofougaran | |
| 8,522,039 B2 | 8/2013 | Hyndman et al. | |
| 8,522,249 B2 * | 8/2013 | Beaule | 718/104 |
| 8,526,329 B2 | 9/2013 | Mahany et al. | |
| 8,526,350 B2 | 9/2013 | Xue et al. | |
| 8,527,410 B2 | 9/2013 | Markki et al. | |
| 8,528,068 B1 | 9/2013 | Weglein et al. | |
| 8,532,610 B2 | 9/2013 | Manning Cassett et al. | |
| 8,539,561 B2 | 9/2013 | Gupta et al. | |
| 8,543,265 B2 | 9/2013 | Ekhaguere et al. | |
| 8,544,105 B2 | 9/2013 | Mclean et al. | |
| 8,548,427 B2 | 10/2013 | Chow et al. | |
| 8,548,428 B2 | 10/2013 | Raleigh | |
| 8,554,876 B2 | 10/2013 | Winsor | |
| 8,561,138 B2 | 10/2013 | Rothman et al. | |
| 8,566,236 B2 | 10/2013 | Busch | |
| 8,571,474 B2 | 10/2013 | Chavez et al. | |
| 8,571,598 B2 | 10/2013 | Valavi | |
| 8,571,993 B2 | 10/2013 | Kocher et al. | |
| 8,572,117 B2 | 10/2013 | Rappaport | |
| 8,583,499 B2 | 11/2013 | De Judicibus et al. | |
| 8,589,541 B2 | 11/2013 | Raleigh et al. | |
| 8,589,955 B2 | 11/2013 | Roundtree et al. | |
| 8,601,125 B2 | 12/2013 | Huang et al. | |
| 8,605,691 B2 | 12/2013 | Soomro et al. | |
| 8,626,115 B2 | 1/2014 | Raleigh et al. | |
| 8,631,428 B2 | 1/2014 | Scott et al. | |

(56) References Cited

U.S. PATENT DOCUMENTS

| | | |
|---|---|---|
| 8,634,425 B2 | 1/2014 | Gorti et al. |
| 8,635,164 B2 | 1/2014 | Rosenhaft et al. |
| 8,645,518 B2 | 2/2014 | David |
| 8,655,357 B1 | 2/2014 | Gazzard et al. |
| 8,660,853 B2 | 2/2014 | Robb et al. |
| 8,666,395 B2 | 3/2014 | Silver |
| 8,670,334 B2 | 3/2014 | Keohane et al. |
| 8,676,925 B1 | 3/2014 | Liu et al. |
| 8,693,323 B1 | 4/2014 | McDysan |
| 8,694,772 B2 | 4/2014 | Kao et al. |
| 8,701,015 B2 * | 4/2014 | Bonnat .................. 715/744 |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,719,423 B2 | 5/2014 | Wyld |
| 8,725,899 B2 | 5/2014 | Short et al. |
| 8,739,035 B2 | 5/2014 | Trethewey |
| 8,761,711 B2 * | 6/2014 | Grignani et al. ........ 455/343.4 |
| 8,780,857 B2 | 7/2014 | Balasubramanian et al. |
| 8,804,517 B2 | 8/2014 | Oerton |
| 8,811,991 B2 | 8/2014 | Jain et al. |
| 8,825,109 B2 | 9/2014 | Montemurro et al. |
| 8,831,561 B2 | 9/2014 | Sutaria et al. |
| 8,880,047 B2 | 11/2014 | Konicek et al. |
| 8,930,238 B2 | 1/2015 | Coffman et al. |
| 8,949,597 B1 | 2/2015 | Reeves et al. |
| 8,977,284 B2 | 3/2015 | Reed |
| 9,014,973 B2 | 4/2015 | Ruckart |
| 9,049,010 B2 | 6/2015 | Jueneman et al. |
| 2001/0048738 A1 | 12/2001 | Baniak et al. |
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0116338 A1 | 8/2002 | Gonthier et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0088671 A1 | 5/2003 | Klinker et al. |
| 2003/0133408 A1 | 7/2003 | Cheng et al. |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0168052 A1 | 8/2004 | Clisham et al. |
| 2004/0170191 A1 | 9/2004 | Guo et al. |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225898 A1 | 11/2004 | Frost et al. |
| 2004/0236547 A1 | 11/2004 | Rappaport et al. |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | DeMello et al. |
| 2005/0075115 A1 | 4/2005 | Corneille et al. |
| 2005/0079863 A1 | 4/2005 | Macaluso |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0135264 A1 | 6/2005 | Popoff et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072646 A1 | 4/2006 | Feher |
| 2006/0085543 A1 | 4/2006 | Hrastar et al. |
| 2006/0112016 A1 | 5/2006 | Ishibashi |
| 2006/0114832 A1 | 6/2006 | Hamilton et al. |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Mikurak et al. |
| 2006/0178918 A1 | 8/2006 | Mikurak |
| 2006/0183462 A1 | 8/2006 | Kolehmainen |
| 2006/0190314 A1 | 8/2006 | Hernandez |
| 2006/0199608 A1 | 9/2006 | Dunn et al. |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |

(56) References Cited

U.S. PATENT DOCUMENTS

| | | |
|---|---|---|
| 2006/0242685 A1 | 10/2006 | Heard et al. |
| 2006/0258341 A1 | 11/2006 | Miller et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0192460 A1 | 8/2007 | Choi et al. |
| 2007/0198656 A1 | 8/2007 | Mazzaferri et al. |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley et al. |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0070550 A1 | 3/2008 | Hose |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | Deatley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0049518 A1 | 2/2009 | Roman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0163173 A1 | 6/2009 | Williams |

(56) References Cited

U.S. PATENT DOCUMENTS

| | | |
|---|---|---|
| 2009/0172077 A1 | 7/2009 | Roxburgh et al. |
| 2009/0180391 A1 | 7/2009 | Petersen et al. |
| 2009/0197585 A1 | 8/2009 | Aaron |
| 2009/0197612 A1 | 8/2009 | Kiiskinen |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0075666 A1 | 3/2010 | Garner |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0131584 A1 | 5/2010 | Johnson |
| 2010/0144310 A1 | 6/2010 | Bedingfield, Sr. et al. |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0287599 A1 | 11/2010 | He et al. |
| 2010/0311402 A1 | 12/2010 | Srinivasan et al. |
| 2010/0325420 A1 | 12/2010 | Kanekar |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0101952 A1 | 4/2012 | Raleigh et al. |
| 2012/0155296 A1 | 6/2012 | Kashanian |
| 2012/0166604 A1 | 6/2012 | Fortier et al. |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0095787 A1 | 4/2013 | Kashanian |
| 2013/0103376 A1 | 4/2013 | Gaddam et al. |
| 2013/0111572 A1 | 5/2013 | Gaddam et al. |
| 2013/0117140 A1 | 5/2013 | Kashanian |
| 2013/0117382 A1 | 5/2013 | Gaddam et al. |
| 2013/0144789 A1 | 6/2013 | Aaltonen et al. |
| 2013/0149994 A1 | 6/2013 | Gaddam et al. |
| 2013/0183937 A1 | 7/2013 | Neal et al. |
| 2013/0326356 A9 | 12/2013 | Zheng et al. |

FOREIGN PATENT DOCUMENTS

| | | |
|---|---|---|
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 A | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1463238 | 9/2004 |
| EP | 1503548 A1 | 2/2005 |
| EP | 1739518 | 1/2007 |
| EP | 1772988 | 4/2007 |
| EP | 1978772 | 10/2008 |
| EP | 2466831 A1 | 6/2012 |
| JP | 3148713 B2 | 3/2001 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| WO | 9858505 | 12/1998 |
| WO | 9927723 A1 | 6/1999 |
| WO | 9965185 | 12/1999 |
| WO | 03014891 | 2/2003 |
| WO | 03058880 | 7/2003 |
| WO | 2004028070 | 4/2004 |
| WO | 2004064306 | 7/2004 |
| WO | 2004077797 | 9/2004 |
| WO | 2004095753 | 11/2004 |
| WO | 2005008995 | 1/2005 |
| WO | 2006004467 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 A1 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007124279 | 11/2007 |
| WO | 2007126352 | 11/2007 |

(56) References Cited

FOREIGN PATENT DOCUMENTS

| WO | 2007133844 A | 11/2007 |
|---|---|---|
| WO | 2008017837 | 2/2008 |
| WO | 2008051379 | 5/2008 |
| WO | 2008066419 | 6/2008 |
| WO | 2008080139 | 7/2008 |
| WO | 2008080430 | 7/2008 |
| WO | 2008099802 | 8/2008 |
| WO | 2010088413 | 8/2010 |
| WO | 2011149532 A1 | 12/2011 |
| WO | 2012047275 A | 4/2012 |

OTHER PUBLICATIONS

"Communication Concepts for Mobile Agent Systems," by Joachim Baumann et al.; Inst. of Parallel and Distributed High-Performance Systems, Univ. of Stuttgart, Germany, pp. 123-135, 1997.
"The Construction of Intelligent Residential District in Use of Cable Television Network," Shandong Science, vol. 13, No. 2, Jun. 2000.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Dikaiakos et al., "A Distributed Middleware Infrastructure for Personalized Services," Nov. 24, 2003.
Farooq et al., "An IEEE 802.16 WiMax Module for the NS-3 Simulator," Mar. 2-6, 2009.
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Knight et al., "Layer 2 and 3 Virtual Private Networks: Taxonomy, Technology, and Standarization Efforts," IEEE Communications Magazine, Jun. 2004.
Koutsopoulou et al., "Middleware Platform for the Support of Charging Reconfiguration Actions," 2005.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Nilsson et al., "A Novel MAC Scheme for Solving the QoS Parameter Adjustment Problem in IEEE802.11e EDCA," Feb. 2006.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Steglich, Stephan, "I-Centric User Interaction," Nov. 21, 2003.
Van Eijk, et al., "GigaMobile, Agent Technology for Designing Personalized Mobile Service Brokerage," Jul. 1, 2002.
Zhu et al., "A Survey of Quality of Service in IEEE 802.11 Networks," IEEE Wireless Communications, Aug. 2004.
European Commission, "Data Roaming Tariffs—Transparency Measures," [online] retrieved from http://web.archive.org/web/20081220232754/http://ec.europa.eu/information_society/activities/roaming/data/measures/index_en.htm, Dec. 20, 2008 [retrieved May 16, 2012].
Accuris Networks, "The Business Value of Mobile Data Offload—a White Paper", 2010.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Ruckus Wireless—White Paper; "Smarter Wi-Fi for Mobile Operator Infrastructures" 2010.
Thurston, Richard, "WISPr 2.0 Boosts Roaming Between 3G and Wi-Fi"; Jun. 23, 2010; Web page from zdnet.com; Zdnet.corn/wispr-2-0-boosts-roaming-between-3g-and-wi-fi-3040089325/.
Wi-Fi Alliance Hotspot 2.0 Technical Task Group, "Wi-Fi Certified Passpoint™ (Release 1) Deployment Guidelines—Version 1.0—Oct. 2012".
Wi-Fi Alliance Technical Committee Hotspot 2.0 Technical Task Group, "Hotspot 2.0 (Release 1) Technical Specification—Version 1.0.0"; 2012.
Wireless Broadband Alliance, "WISPr 2.0, Apr. 8, 2010"; Doc. Ref. No. WBA/RM/WISPr, Version 01.00.
Search Report and Written Opinion mailed Jun. 22, 2012 from International Serial No. PCT/US2012/032640 filed Apr. 6, 2012.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"ASA/PIX: Allow Split Tunneling for VPN Clients on the ASA Configuration Example," Document ID 70917, Jan. 10, 2008.
Dixon et al., Triple Play Digital Services: Comcast and Verizon (Digital Phone, Television, and Internet), Aug. 2007.
"Prevent iCloud Documents & Data from using your data plan," Oct. 26, 2011; CNET webarchive, by Jason Cipriani.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Kassar et al., "An overview of vertical handover decision strategies in heterogeneous wireless networks," ScienceDirect, University Pierre & Marie Curie, Paris, France, Jun. 5, 2007.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.

\* cited by examiner

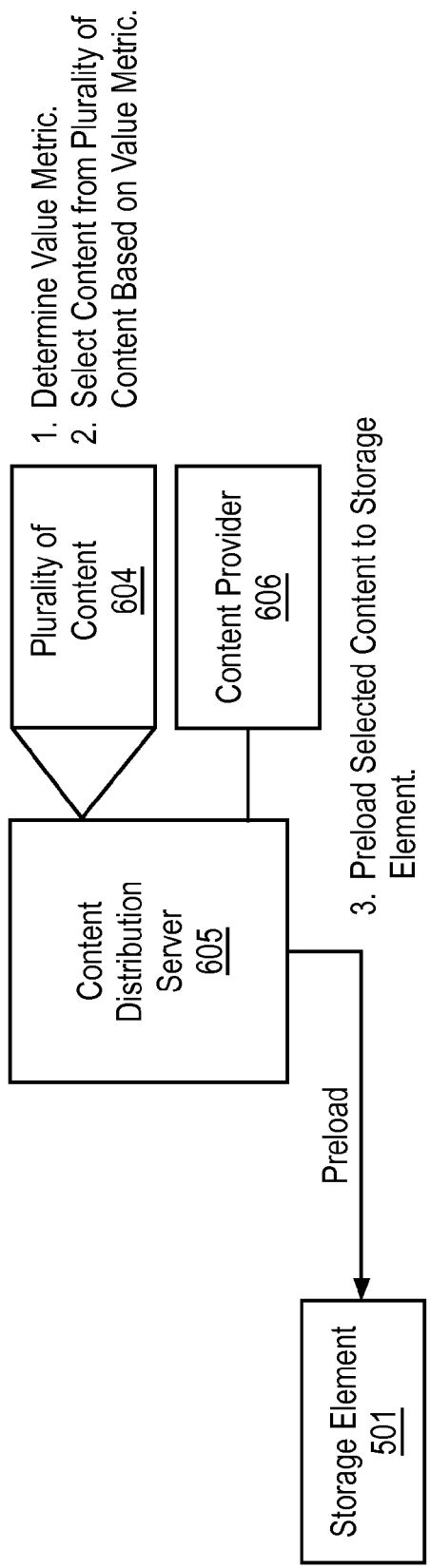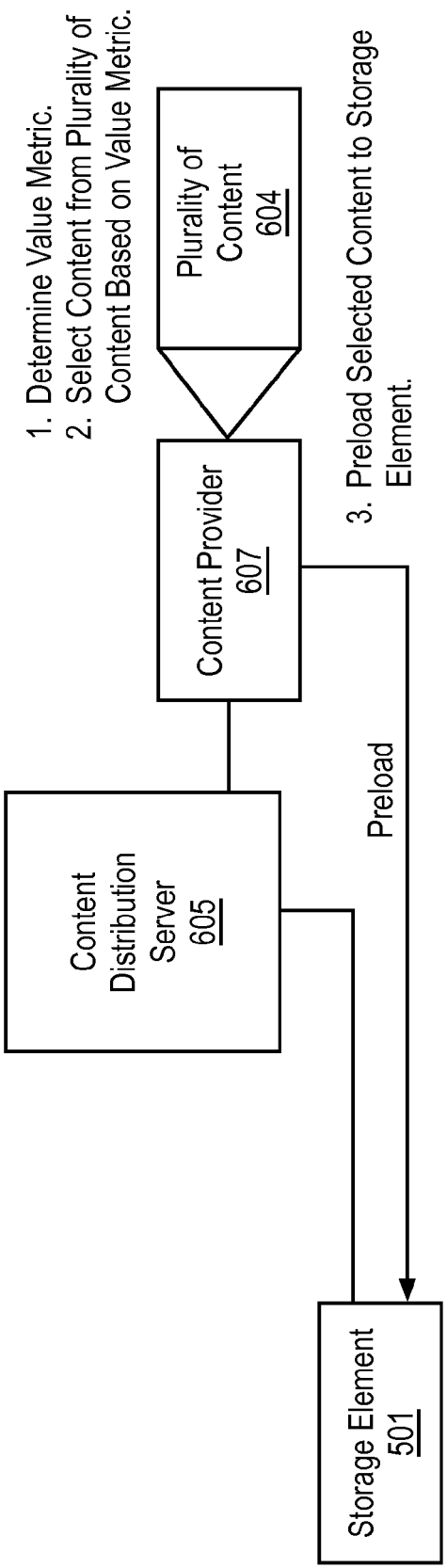

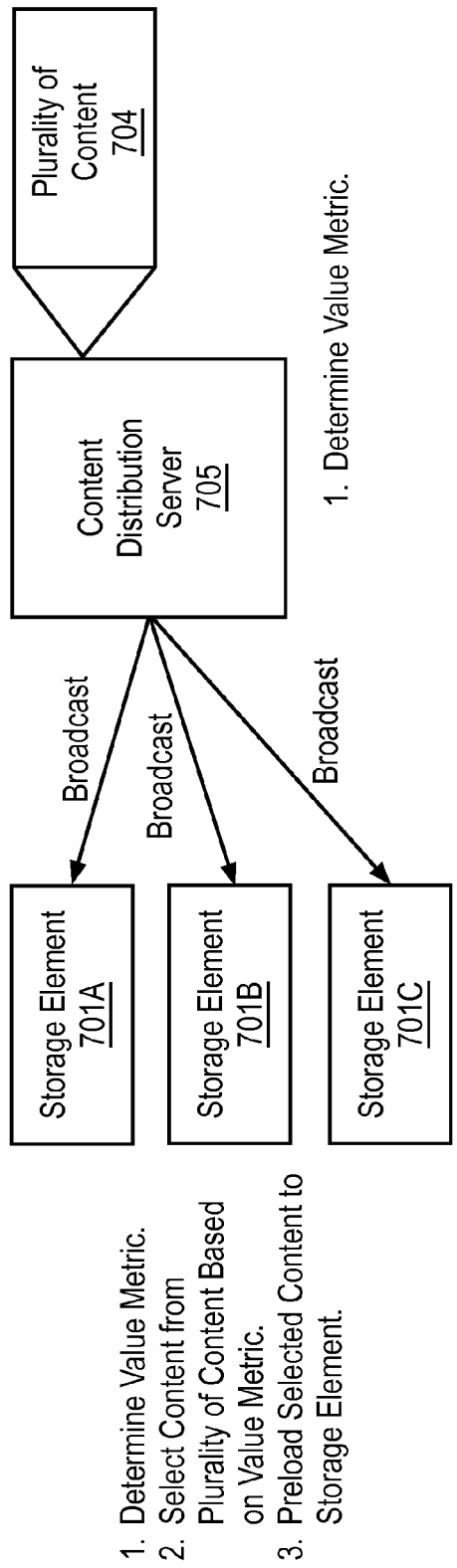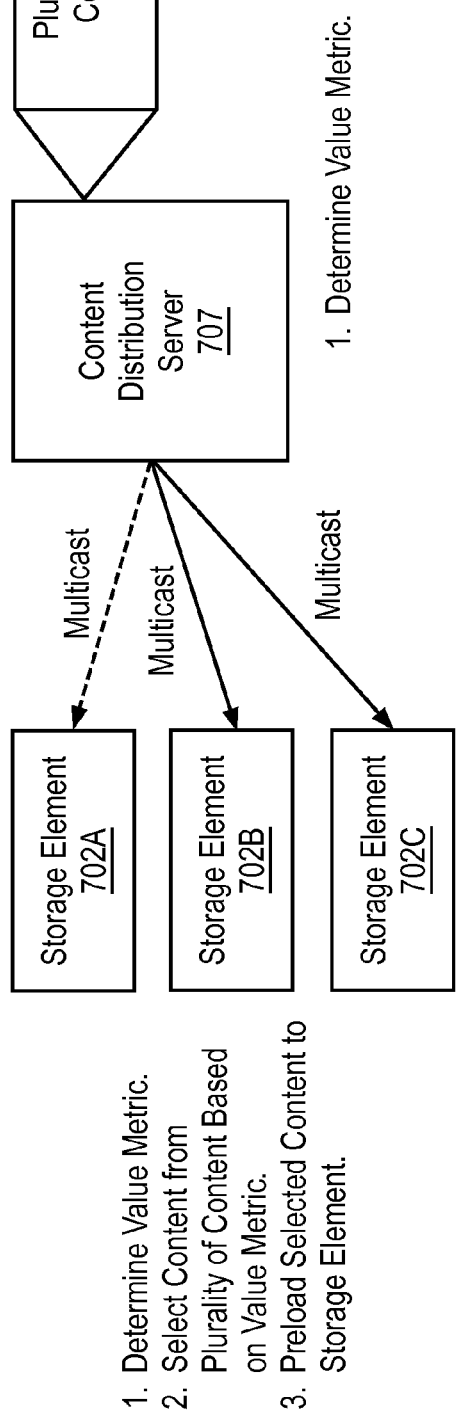

| User Device Parameters | | | | |
|---|---|---|---|---|
| | Total Storage Size (GB) | Display Size (in) | Display Resolution | Single-user Multi-user | Access Modems |
| Smartphone | 32 | 3.5 | 960 x 640 | SU | 2G,3G,4G, WiFi, USB |
| Tablet | 16 | 10 | 1024 x 768 | MU | WiFi, 3G |
| Notebook | 256 | 15 | 1920 x 1200 | SU | WiFi, Dial-Up Ethernet, USB |
| PC | 1000 | 20 | 1920 x 1200 | MU | WiFi, Dial-Up Ethernet, USB |
| TV-STB-DVR | 2000 | 50 | 1920 x 1080 | MU | Ethernet, VDSL |
| Home Gateway or Network attached storage | 2000 | N/A | N/A | MU | WiFi, Ethernet ADSL, VDSL |

FIG. 9

| Communication Networks Parameters Associated to a User Device (1010) | | | | | | | |
|---|---|---|---|---|---|---|---|
| | ID # | Speed (statistics, min, typ, max) in Mbps | Monthly Rate | Max Usage Per Month (Cap in GB) | Cost of Usage Above Cap (per GB) | Single-user Multi-user | Connectivity Details |
| Home Wireless (WiFi) | 1000 | 50 | 0 | None | N/A | MU | At Home |
| Home Wired (Ethernet) | 1001 | 1000 | 0 | None | N/A | MU | At Home |
| Access Wired (DSL) | 1002 | 2 | 20 | None | N/A | MU | At Home |
| Cellular 3G | 1003 | 0.1 | 20 | 2 | 10 | SU | Home, Work |
| Cellular 4G Roaming | 1004 | 0.5 | 5 | 0 | 50 | SU | Work |
| POI WLAN #1 | 1005 | 25 | 0 | None | N/A | MU | Coffee Shop |
| POI WLAN #2 | 1006 | 50 | 10 | None | N/A | | Airport |

FIG. 10

| Storage Element Parameters Available to a User | | | | | | | | | |
|---|---|---|---|---|---|---|---|---|---|
| | | | | | | Number of hops relative to | | | |
| Name | ID # | Total storage Size (GB) | Available storage | Storage reserved for content | Tier # (Relative to a user device) | Smart-phone A | Home Gateway A | ... | Communication Networks (could change with time) | Connected to (could change with time) |
| Flash in Smartphone A | 1011 | 32 | 50% | 25% | 1 | 0 | 1 | | Cellular, Multiple WiFi, USB | 1014, 1015, 1016 |
| Flash in Tablet A | 1012 | 16 | 50% | 25% | 1 | N/C | N/C | | WiFi | none |
| HDD in Notebook A | 1013 | 256 | 50% | 25% | 2 | 2 | 1 | | Home WiFi, Work WiFi, Ethernet, USB | 1015, 1016 |
| HDD in PC A | 1014 | 1000 | 75% | 50% | 3 | 1 | 1 | | Home WiFi Ethernet, USB | 1015, 1016 |
| HDD in Home Gateway or STB A | 1015 | 256 | 75% | 50% | 1 | 1 | 0 | | Home WiFi, xDSL | 1011, 1012, 1013, 1014, 1015, 1016 |
| HDD in Network Attached Storage A | 1016 | 2000 | 75% | 50% | 1 | 2 | 1 | | Ethernet, USB | 1015, 1016 |

FIG. 11

| | User Input Preferences for Associated User Devices | | | | | | | |
|---|---|---|---|---|---|---|---|---|
| | ID # | Preferred type | Preferred format | Memory reserved by User for content | Single-user Multi-user | Use locations | Preferred Communi-cation Network (ranked) | |
| Smartphone | 1021 | Videos, Music, Movies | SD | 25% | SU | Everywhere | Home WiFi, Work WiFi | Additional menus for movie, video, music, game, etc. preference types |
| Tablet | 1022 | Movies, Games | HD 720p | All available | MU | Home, Park | Home WiFi, Coffee POI WiFi | |
| Notebook | 1023 | Movies, Games | SD | 25% | SU | Home, work | Home WiFi, Work WiFi | |
| PC | 1024 | None | SD | 50% | MU | Home | Home Ethernet | |
| TV | 1025 | Movies, Games | HD 1080p | 50% | MU | Home | Home Ethernet | |

FIG. 12

Home Reservoir (Plurality of Content)

| Name | ID # | Type | Format | Size (GB) | Duration | List Price |
|---|---|---|---|---|---|---|
| Movie A | 1031 | Video | TV HD | 4 | 1:52:16 | 2.99 |
| Movie A | 1032 | Video | Handset SD | 0.250 | 1:52:16 | 1.99 |
| Movie A | 1032b | Video | Tablet 720p | 2 | 1:52:16 | 1.99 |
| Game A | 1033 | Game | TV HD | 30 | 20 | 19.99 |
| Game A | 1034 | Game | Tablet SD | 10 | 10 | 10.99 |

FIG. 15

POI Reservoir (Plurality of Content)

| Name | ID # | Type | Format | Size | Duration | List Price | Licensing Cost |
|---|---|---|---|---|---|---|---|
| Movie B | 1041 | Video | TV HD | 4GB | 1:52:16 | 2.99 | 1.00 |
| Movie B | 1042 | Video | Handset SD | 250MB | 1:52:16 | 1.99 | 0.50 |
| Game B | 1043 | Game | TV HD | 50GB | N/A | 19.99 | 40.00 |
| Game B | 1044 | Game | Tablet SD | 30GB | N/A | 10.99 | 15.00 |
| Music Video B | 1045 | Music Video | MP3 | 0.01 | 0:3:42 | 0.25 | 0.25 |
| ... | | | | | | | ... |

FIG. 16

Content Provider Reservoir

| Name | ID # | Type | Format | Size (GB) | Duration (hr:min:sec) | Licensing Cost | List Price |
|---|---|---|---|---|---|---|---|
| Movie C | 1051 | Video | TV HD | 4 | 1:52:16 | 1.00 | 2.99 |
| Movie C | 1052 | Video | Handset SD | 0.25 | 1:52:16 | 0.50 | 1.99 |
| Game C | 1053 | Game | TV HD | 30 | 20 | 40.00 | 49.99 |
| Game C | 1054 | Game | Tablet SD | 10 | 10 | 15.00 | 19.99 |
| Music C | 1055 | Music Video | MP3 | 0.01 | 0:3:42 | 0.25 | Free with ads |
| ... | | | | | | | ... |

FIG. 17

| 1100 | 1101 | 1102 | 1103 | 1104 | 1105 | 1106 | 1107 | 1108 | 1109 | 1110 | 1111 | 1112 |
|---|---|---|---|---|---|---|---|---|---|---|---|---|
| | | | | | | Value Metric Parameter Information Associated to a User Device (Tablet) | | | | | | |
| Name | ID # | Type | Format | Size (GB) | Duration (consumption hrs) | Price to user | Specials or Promotions | Sponsored service Ad revenue | Communication Network Cost | User Storage Cost ($/GB/day) | User Likelihood to consume (over time interval) | Value Metric (price/hr) |
| Movie A | 1032b | Video | Tablet 720p | 2 | 1.8 | 1.99 | 0 | 0 | 0 | 0.1 | 10% | 1.11 |
| Game A | 1034 | Game | Tablet SD | 10 | 20 | 10.99 | 0 | 0 | 0 | 0.1 | 8% | 0.55 |
| Game C | 1054 | Game | Tablet SD | 10 | 50 | 19.99 | 0 | 0 | 100 | 0.1 | 5% | 0.40 |

FIG. 18

| 1200 Name | 1201 ID # | 1202 Type | 1203 Format | 1204 Size (GB) | 1205 Duration | 1206 Licensing cost | 1207 List Price | 1208 Ad revenue | 1209 Communication Network Cost | 1210 User Storage Cost | 1211 User Likelihood to consume | 1212 Value Metric |
|---|---|---|---|---|---|---|---|---|---|---|---|---|
| Movie D | 1001 | Video | Tablet HD | 4 | 1:52:16 | 1.00 | 2.99 | 0.20 | 0.2 | 0.1 | 25% | 0.25 |
| Movie D | 1002 | Video | Handset SD | 0.250 | 1:52:16 | 0.50 | 1.99 | N/A | N/A | N/A | N/A | 0 |
| Game D | 1003 | Game | TV HD | 50 | 20 | 15.00 | 19.99 | N/A | N/A | N/A | N/A | 0 |
| Game D | 1004 | Game | Tablet SD | 30 | 30 | 5.00 | 10.99 | 0.50 | 1.5 | 0.75 | 15% | -1.28 |

Value Metric Information for Preloading, Content Provider Perspective. Target User with User Device 100A

FIG. 19

1200 Value Metric Information for Preloading, Content Provider Perspective. Target User with User Device 100B

| Name | 1201 ID # | 1202 Type | 1203 Format | 1204 Size (GB) | 1205 Duration | 1206 Licensing cost | 1207 List Price | 1208 Ad revenue | 1209 Communication Network Cost | 1210 User Storage Cost | 1211 User Likelihood to consume | 1212 Value Metric |
|---|---|---|---|---|---|---|---|---|---|---|---|---|
| Movie D | 1001 | Video | Tablet HD | 4 | 1:52:16 | 1.00 | 2.99 | 0.20 | 0 | 0.01 | 25% | 0.54 |
| Movie D | 1002 | Video | Handset SD | 0.250 | 1:52:16 | 0.50 | 1.99 | N/A | N/A | N/A | N/A | 0 |
| Game D | 1003 | Game | TV HD | 50 | 20 | 15.00 | 19.99 | N/A | N/A | N/A | N/A | 0 |
| Game D | 1004 | Game | Tablet SD | 30 | 30 | 5.00 | 10.99 | 0.50 | 0 | 0.075 | 15% | 0.90 |

FIG. 20

| 1200 | 1201 | 1202 | 1203 | 1204 | 1205 | 1206 | 1207 | 1208 | 1209 | 1210 | 1211 | 1212 |
|---|---|---|---|---|---|---|---|---|---|---|---|---|
| Name | ID # | Type | Format | Size (GB) | Duration | Licensing cost | List Price | Ad revenue | Communication Network Cost | User Storage Cost | User Likelihood to consume | Value Metric |
| Movie D | 1001 | Video | Tablet HD | 4 | 1:52:16 | 1.00 | 2.99 | 0.20 | N/A | 0.1 | 3% | -0.03 |
| Game D | 1004 | Game | Tablet SD | 30 | 30 | 5.00 | 10.99 | 0.50 | N/A | 0.75 | 10% | 0.22 |

Value Metric Information for Deleting, Content Provider Perspective. Target User with User Device 100A

FIG. 21

| 1200 Name | 1201 ID # | 1202 Type | 1203 Format | 1204 Size (GB) | 1205 Duration | 1206 Licensing cost | 1207 List Price | 1208 Ad revenue | 1209 Communication Network Cost | 1210 User Storage Cost | 1211 User Likelihood to consume | 1212 Value Metric |
|---|---|---|---|---|---|---|---|---|---|---|---|---|
| Movie D | 1001 | Video | Tablet HD | 4 | 1:52:16 | 1.00 | 2.99 | 0.20 | 0 | 0.001 | 15% | 0.33 |
| Game D | 1004 | Game | Tablet SD | 30 | 30 | 5.00 | 10.99 | 0.50 | 0 | 0.0075 | 15% | 0.97 |

Value Metric Information for Moving, Content Provider Perspective. Target User with User Device 100B

FIG. 22

| Storage Location | Type/Name | Format | View Now | View Now with Sponsored ADs | View at Home within 2 hrs | View Tomorrow |
|---|---|---|---|---|---|---|
| Smartphone | Movie P | HD | 5.99 | 4.99 | 1.99 | 0.99 |
| Smartphone | Movie P | SD | 2.99 | 0 | 0.99 | 0.99 |
| Home Gateway | Movie Q | HD | N/A | N/A | 1.99 | 1.99 |
| Home Set Top Box | Movie R | HD1080p | N/A | N/A | N/A | 1.99 |

Variable pricing of content available to a user device (for example user view from Smartphone)

FIG. 27

| Filter | Policy Event Notification | Promotional Notification | LCPE Notification | |
|---|---|---|---|---|
| 80% Cycle Application Plans | 80% Cycle Application Plans | x <hours or minutes> remaining — English (UK) | ${plan} — English (UK) | x <hours or mins> remaining of your (app name) plan — English (UK) | You have now x <hours or minutes> remaining of your (app name) access plan. — English (UK) | English (UK)<br>• "View Catalogue" → catalog<br>• "Dismiss" → no_action, Default |
| 80% Usage General Access | 80% Usage General Access | 80% Used — English (UK) | ${plan} — English (UK) | 20% of your plan remaining — English (UK) | You have now 20% remaining of your mobile internet access plan. — English (UK) | English (UK)<br>• "Dismiss" → no_action<br>• "View Catalogue" → catalog |
| Marketing Interceptor | Marketing Interceptor | Select a plan — English (UK) | Purchase access for ${app} — English (UK) | Select Plan to access ${app} — English (UK) | — English (UK) | English (UK)<br>• "Dismiss" → no_action<br>• "View Catalogue" → catalog, Default |
| Plan Expiration | Plan Expiration | Plan expired — English (UK) | ${plan} — English (UK) | Your plan has expired — English (UK) | Your mobile internet access (or app name) plan has now expired. — English (UK) | English (UK)<br>• "Dismiss" → |

DISTRIBUTING CONTENT AND SERVICE LAUNCH OBJECTS TO MOBILE DEVICES

CROSS REFERENCE TO RELATED APPLICATIONS

This application claims priority to provisional application Nos. 61/472,606 filed Apr. 6, 2011, entitled "Managing Service User Discovery and Service Launch Object Placement on a Device"; 61/609,271 filed Mar. 10, 2012, entitled "Content Distribution Based on a Value Metric"; 61/609,272 filed Mar. 10, 2012, entitled "Distributing Content by Generating and Preloading Queues of Content"; 61/609,273 filed Mar. 10, 2012, entitled "Content Broker That Offers Preloading Opportunities"; and 61/609,274 filed Mar. 10, 2012, entitled "Content Broker Assisting Distribution of Content"; all of which are incorporated by reference herein.

BACKGROUND

Digital user devices, communication networks and content choices are proliferating. These devices (for example, smartphones, tablet, notebooks, PCs, etc.) come in many different forms, most significantly in terms of the mobility, UI/display and storage capability. Communication network (for example, WiFi, cellular, Ethernet, etc.) parameters change by orders of magnitude in performance and cost. The content available (for example, movies, music, games, apps) is also very heterogeneous in size, formats, cost, etc. The user of a specific user device often is interested in access to a specific content over a specific communications network at a specific time/location. Often the size of the content or the speed/cost of the communication network make it impractical to access the content, resulting in lost revenue for a content provider or a content broker, and results is a dissatisfied user.

It is desirable to have methods, systems and apparatuses for preloading desired and valued content at an appropriate storage element of an appropriate user device for an appropriate user over an appropriate communication network.

SUMMARY

Disclosed herein are methods and apparatuses for distributing content over a network. Also disclosed are methods and apparatuses for providing service launch objects associated with the distributed content, wherein a service launch object launches distributed content. In some embodiments, a network system manages a plurality of content and assists in preloading at least a portion of the content to a storage element coupled to the content distribution server over a communication network. The network server obtains information to identify a particular portion of a user interface of a wireless device that is communicatively coupled to the network system over a wireless access network. The network server then sends configuration information to the wireless device, the configuration information configured to assist the wireless device in placing a service launch object in the particular portion of the user interface, wherein the service launch object launches the content.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6A shows a content distribution server and a storage element in accordance with some embodiments.

FIG. 6B shows a content distribution server and a storage element in accordance with some embodiments.

FIG. 7A shows a content distribution server and a plurality of storage elements in accordance with some embodiments.

FIG. 7B shows a content distribution server and a plurality of storage elements in accordance with some embodiments.

FIG. 9 is a table that includes an example list of relevant user device parameters in accordance with some embodiments.

FIG. 10 is a table that includes an example list of communication networks available to the user devices associated with a user in accordance with some embodiments.

FIG. 11 is a table that includes an example of relevant parameters for a number of storage elements available to a user across multiple devices associated with a user in accordance with some embodiments.

FIG. 12 is a table that includes an example of a user input table in accordance with some embodiments.

FIG. 15 is a table that includes a sample list of content at home reservoir in accordance with some embodiments.

FIG. 16 is a table that includes a sample list of content and parameters at a POI reservoir in accordance with some embodiments.

FIG. 17 is a table that includes a sample list of content and parameters at content provider reservoir in accordance with some embodiments.

FIG. 18 is a table that includes value metric information associated to a user to obtain value metric for selecting content to be preloaded onto user device in accordance with some embodiments.

FIG. 19 is a table that includes examples of additional parameters that may be used to enhance value metric analysis from a content provider perspective for selecting content to preload for a user with user device in accordance with some embodiments.

FIG. 20 is a table that includes another example for value metrics from a content provider perspective for a second user device in accordance with some embodiments.

FIG. 21 is a table that includes an example of an update to parameters and value metrics of FIG. 19 at a later time, where content are currently preloaded onto user device in accordance with some embodiments.

FIG. 22 is a table that includes an example of an update to parameters and value metrics of FIG. 20 where the content currently preloaded onto user device is considered for moving to a second storage element in accordance with some embodiments.

FIG. 27 is a table that includes a variable price of content preloaded and offered to a user in accordance with some embodiments.

FIG. 53 shows a UI location management console UI template for a network manager to define a policy event notification to notify users in accordance with some embodiments.

FIG. 58 shows a network manager UI environment for displaying notification templates (and associated device views) for defining a featured service or application in accordance with some embodiments.

FIG. 59 shows a network manager UI environment for displaying notification templates (and associated device views) for defining a featured service or application in accordance with some embodiments.

DETAILED DESCRIPTION

Figure 1A:
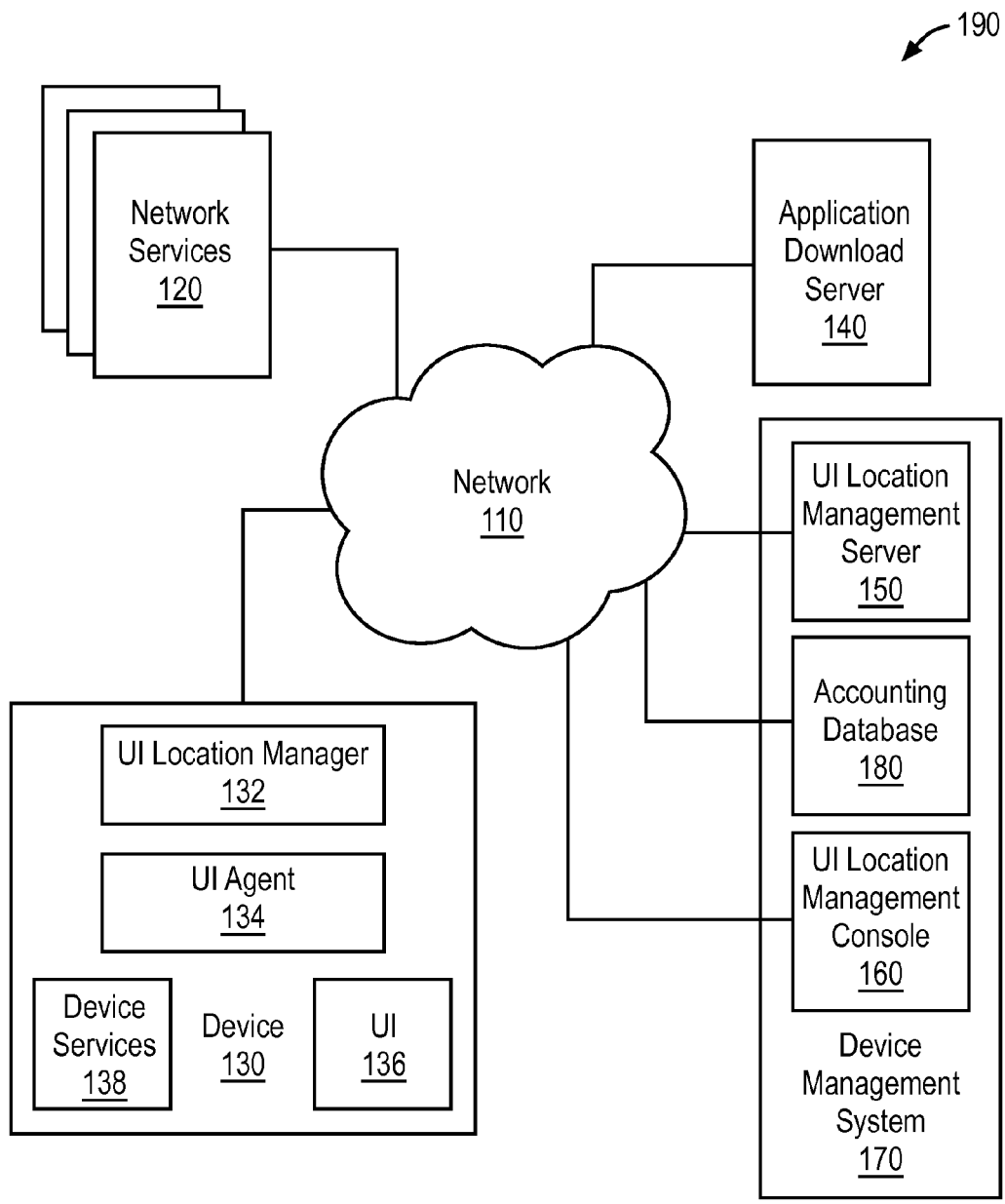
FIG. 1a shows a user interface (UI) Location Management System according to some embodiments.
Figure 1B:
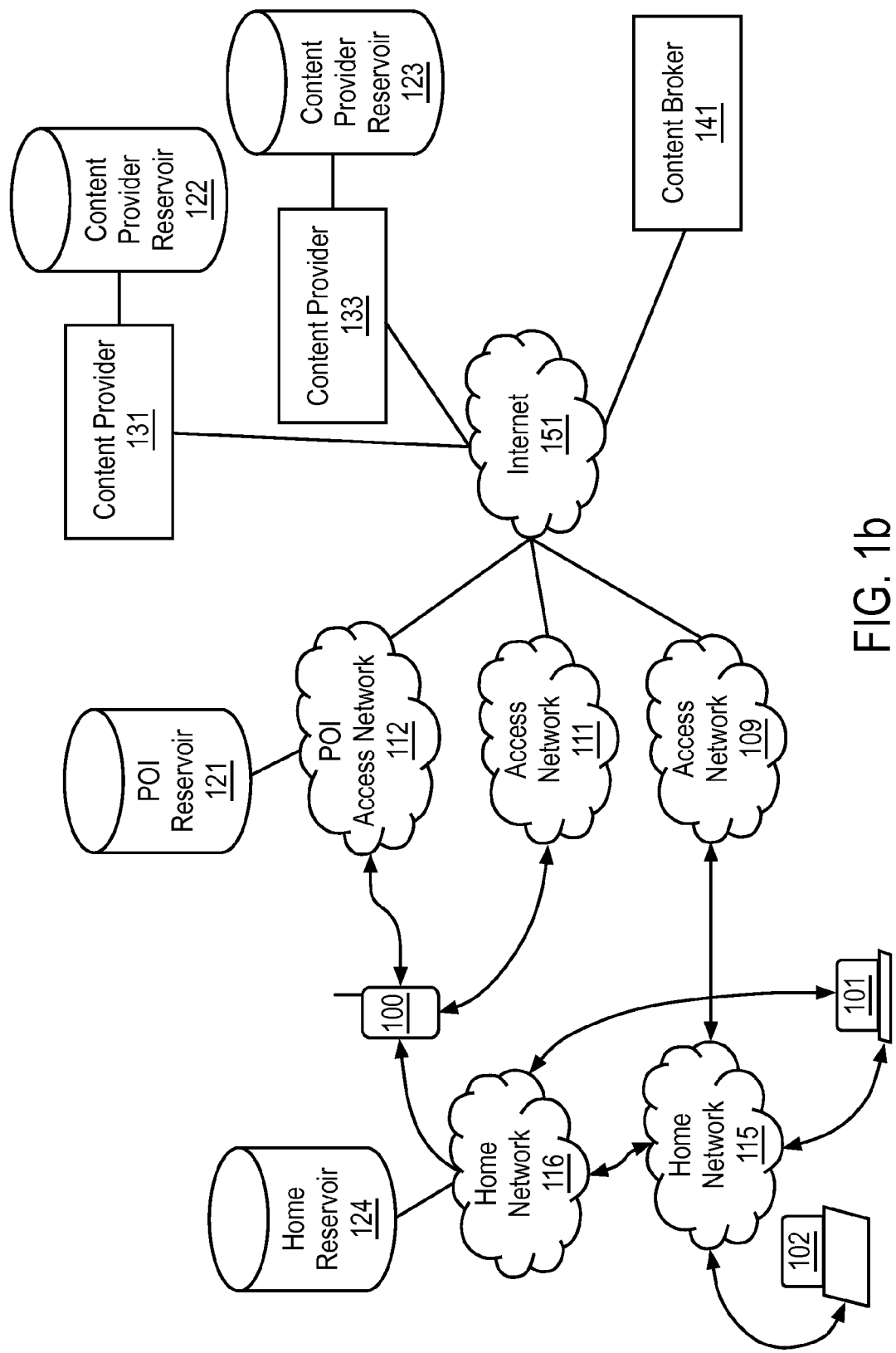
FIG. 1b shows multiple user devices for accessing content reservoirs over several communication networks.

FIG. 1b shows multiple user devices 100, 101, 102 for accessing content reservoirs 124, 121, 122, 123 over several communication networks 109, 111, 112, 115, 116, which may be improved according to embodiments. User devices could have very different properties and be utilized in different ways by users. For example, user device 100 is a phone, smartphone, personal digital assistant (PDA), tablet, etc. Examples of relevant parameters of these devices are more mobility, long battery life, connectivity to wireless access networks, smaller size, smaller display and smaller storage, etc. For example, user device 101 is a tablet, notebook, netbook, laptop, etc. Examples of relevant parameters of these devices are medium mobility, medium battery life, connectivity to both wireless and wired networks, medium size, medium storage and medium display size, etc. For example, user device 102 is a PC, a home gateway, a TV attached to a digital video recorder (DVR), a set top box (STB), etc. Examples of relevant parameters for these devices are limited or no mobility, plugged to electrical outlets, connectivity to wired or home wireless networks, bigger size, large storage, larger displays, etc.

Communication networks also have very different properties and can be utilized in different ways by users. Examples of communication networks include a home network 116 which is wireless home networks, such as personal wireless area network (for example, WPAN—Bluetooth, IR, etc.), local wireless area networks (for example, WLAN-WiFi, .11a, 11b, 11n, 11ac, etc.), etc. Typical parameters are local mobility, medium bandwidth, medium reach or coverage, medium reliability, very low cost per byte (for example, is free), etc. For example, home network 115 is a wired home network, such as an Ethernet network, a multimedia over cable alliance (MOCA) network, a HomePlug (communication over powerline) network, etc. Typical parameters are no mobility, high bandwidth, high reliability and low cost per bit. Communication networks could also be access networks. For example, access network 109 is a wired copper or cable broadband connection, such as asymmetric digital subscriber line (ADSL), very high-speed digital subscriber line (VDSL), DOCSIS or a fiber connection. Typical parameters are no mobility, medium to high bandwidth, medium to high reliability, flat fee per month of usage. For example, access network 109 could also be a fixed wireless broadband connection, such as WiMAX. Typical parameters is limited or no mobility, medium bandwidth, medium reliability, etc. For example, access network 111 could a wireless mobile network, such as 2G/3G/4G, GPRS, edge, HSPA, EVDO, LTE, etc. Typical parameters are high mobility, large coverage, low to medium bandwidth, low to medium reliability, flat monthly fee with or without limits or relatively high cost per bit, etc. For example, a communication network is a point of interest (POI) access network 112. A POI is a work office, coffee shop, restaurant, grocery store, department store, airport, school, government building, etc. Each of these POI networks could have a access network to provide valuable content to user devices. Often these POI access networks are WLAN such as WiFi networks, but they is wireless personal-area networks (WPAN), Ethernet, etc. Examples of typical parameters comprise medium bandwidth, medium reliability, local mobility, free access, one time or limited subscription, etc.

In some embodiments, user devices communicate over these communication networks to access content provided by one or more content providers, for example, content providers 131 and 133, which store their content at one or more content providers, for example, content provider reservoir 122 and 123. Content stored at these content provider reservoirs could include movies, sport events, shows, videos, photos, music, music videos, news, books, audio books, ring tones, games, software programs, software updates, apps, etc. The user devices may obtain content from one content provider or multiple content providers. Each content provider may have one type of content of multiple types of content. Additionally content may be stored at POI reservoir 121 associated with POI access network 112 to help the user device access content. For the embodiments described here, a POI reservoir 121 can be a storage element (or intermediate storage element) associated with one or more user devices. Furthermore, content may be stored at home reservoir 124 to help the user device access content. In some embodiments, a home reservoir 124 can be a storage element (or intermediate storage element) associated with one or more user devices. To help the user devices to access content, a content broker 141 (manager) may be advantageous. In some embodiments, the content broker 141 has access to relevant information from multiple users, multiple user devices, multiple storage elements, multiple communications networks, multiple content providers and multiple content for a more efficient, profitable and improved user satisfaction content consumption.

A user of a user device may want to access content at any time and at any location. At some locations the user device may only have access to content over an expensive or low performance communication network relative to the desired content parameters. For example, the user may want to view a 500 MB movie that requires a sustained 1 Mb/sec connection on a mobile user device (for example, a tablet) over a cellular wireless communication network with a 200 MB/month data plan or over a wireless communication network with a peak rate of 10 Mb/sec per channel that is shared over multiple users in a cell. The movie may start showing while it is downloading (for example, streaming), but then the movie will likely pause as other user devices share the wireless communication network, thus providing an unsatisfactory viewing experience. The problem of delayed and paused viewing is compounded when the movie is longer in length.

A user could proactively download content onto storage (in some embodiments the storage is a storage element) of the user device ahead of time, but then the user would have to plan ahead or search for content that may be desirable. Also, downloading the clips over and expensive communication network can consume significant bandwidth, which can be costly.

In some embodiments, these problems are avoided by allowing content to be preloaded to the storage on a user device.

In some embodiments, a tradeoff is made between one or more communication network resources and one or more storage resources so that content can be preloaded to the appropriate storage element for an improved user content service offering. In some embodiments, the communication network is utilized when resources are available, lower cost, or not busy (off-peak hours). In some embodiments, the storage manager or a content manager can preload the user device storage or associated storage (for example, a nearby gateway storage or intermediate storage element) with the most likely (or most valuable, etc.) content that user will end up consuming.

In some embodiments, a user will have a much better content-consuming experience if the content is available immediately or near-to-immediately.

Figure 2:
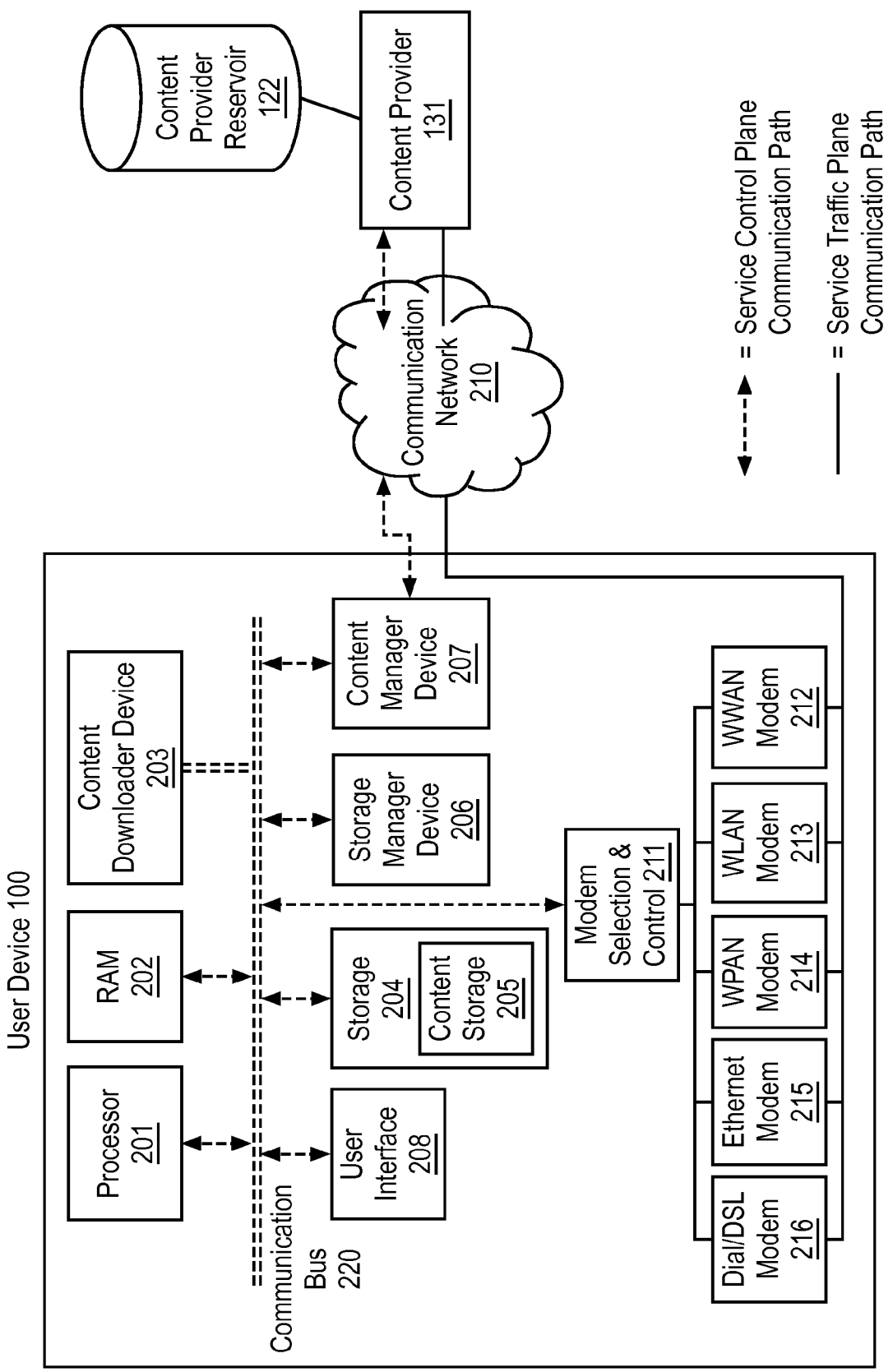
FIG. 2 shows a configuration for a user device in accordance with some embodiments.

FIG. 2 shows a configuration for a user device 100 in accordance with some embodiments. It includes a communication bus 220 connected to multiple hardware or software modules. In some embodiments, communication bus 220 is at least one of the communication networks. Many other configurations are possible, with additional modules or without some of the modules. The modules included in FIG. 2 are a processor 201, a RAM 202, a user interface 208 to exchange information and/or content with the user, a storage 204 which includes software programs, content from the user, etc. and content storage 205, which includes the content originating from the content provider reservoir 122, a storage manager device 206 for managing the storage elements of the content storage 205, a content manager device 207 for managing the content elements of the content storage 205, a content downloader 203, for downloading the content from the reservoir onto the content storage 205. The user device 100 includes one or more modems to exchange content over one or more communications networks. The one or more modems comprise one or more of a dial-up/DSL modem 216, an Ethernet modem 215, an WPAN modem 214, a wireless local-area network (WLAN) modem 213 and a wireless wide-area network (WWAN) modem 212. The user device communicates with the content provider over a service control plane to the content manager device 207 and a traffic plane over the appropriate modem for the associated communication network.

Figure 3:
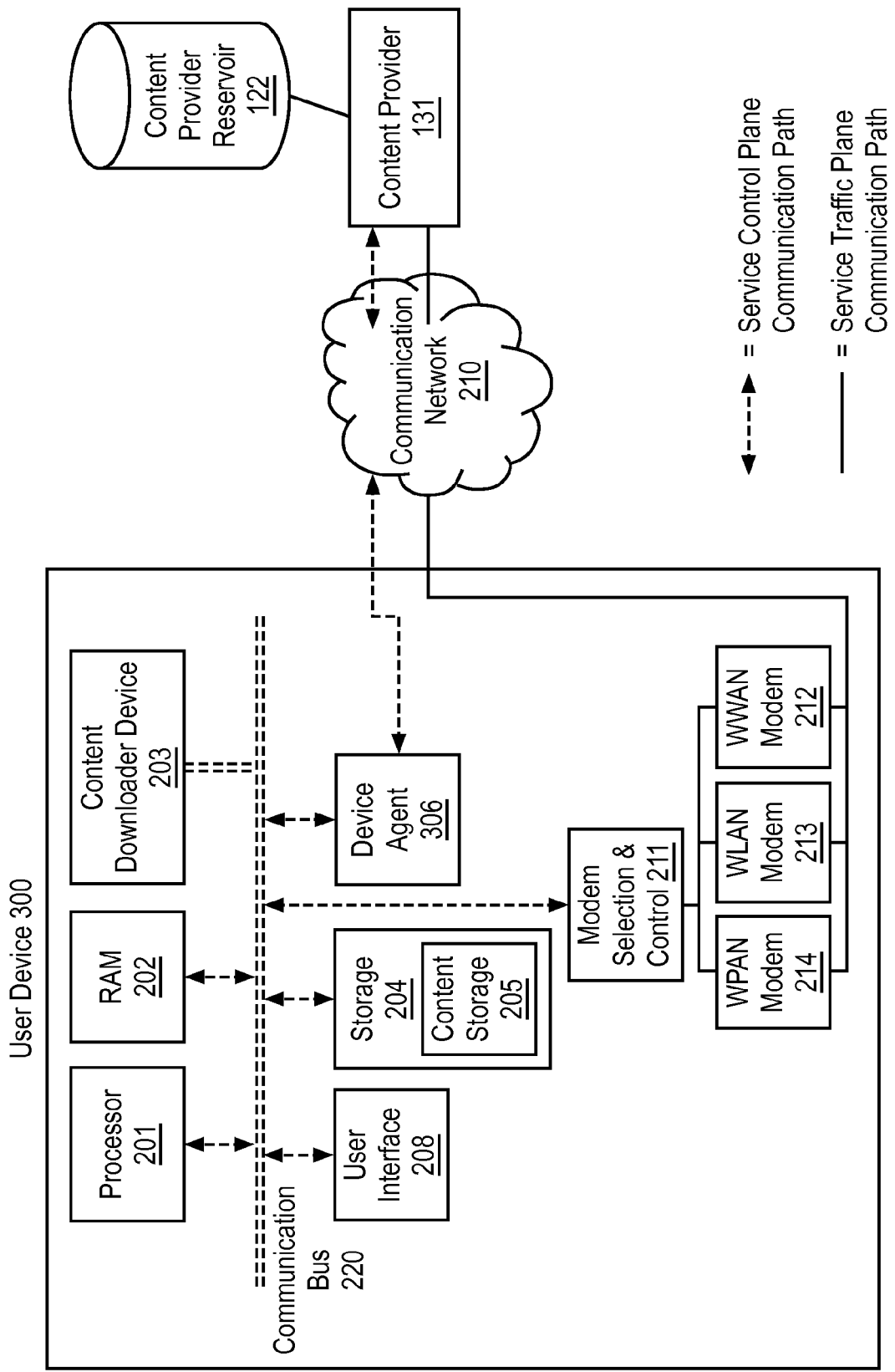
FIG. 3 shows a configuration for a user device 300 with less functionality than user device 100, in accordance with some embodiments.

FIG. 3 shows a configuration for a user device 300 with less functionality than user device 100, in accordance with some embodiments. FIG. 3 includes a communication bus 220 connected to multiple hardware or software modules. In some embodiments, communication bus 220 is at least one of the communication networks. The modules included in FIG. 3 are a processor 201, a RAM 202, a user interface 208 to exchange information and/or content with the user, a storage 204 which includes software programs, content from the user, etc., and content storage 205, which includes the content originating from the content provider reservoir 122, a device agent 306 (which may include a subset of the functionality included in content manager device 207 or storage manager device 206), a content downloader 203, for assisting preloading the content from the reservoir onto the content storage 205. The user device 300 includes one or more modems to exchange content over one or more communications networks. The one or more modems comprise one or more of a WPAN modem 214, a WLAN modem 213 and a WWAN modem 212. The user device communicates with the content provider over a service control plane to the content manager device 207 and a traffic plane over the appropriate modem for the associated communication network.

Distribution Server

Figure 4:
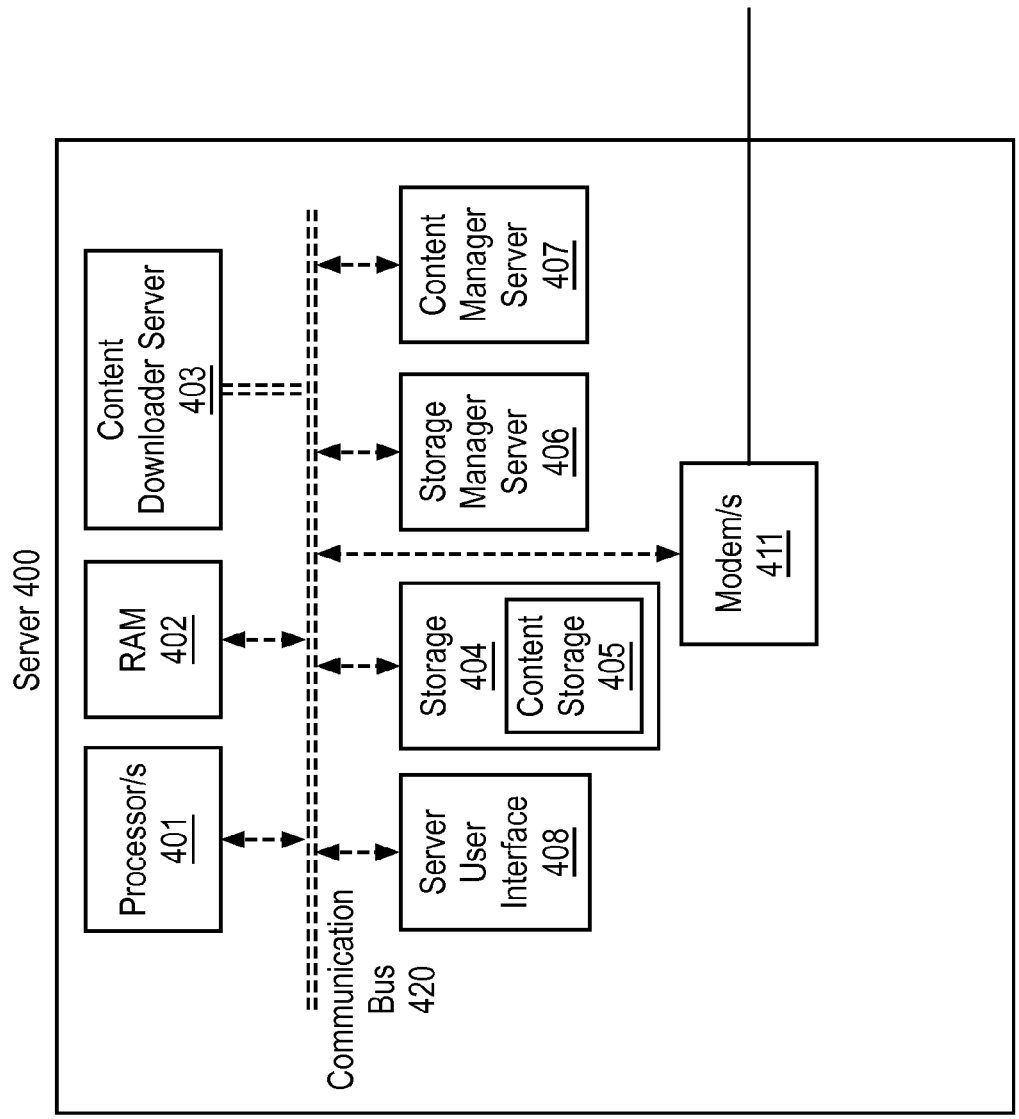
FIG. 4 shows a configuration for a distribution server in accordance with some embodiments.

FIG. 4 shows a configuration for a distribution server 400 in accordance with some embodiments. For the description here, the terms "content distribution server" and "network content server" may be used interchangeably to represent the distribution server 400. The distribution server 400 includes a communication bus 420 (it is to be understood that in some embodiments communication bus 420 is at least one of the communication networks), connected to multiple hardware and/or software modules. Many other configurations are possible, with additional modules or without some of the modules. The modules included in FIG. 4 are a processor 401, a RAM 402, a server user interface 408 to exchange information and/or content with a server administrator, manager, etc., a storage 404 which may include software programs, content, value metric information, etc., and content storage 405, which may include content originating from the content provider, ad provider, a storage manager server 406 for managing the storage elements of the content storage 405, a content manager server 407 for managing the content elements of the content storage 405, a content downloader 403, for downloading the content from a reservoir or content storage 405 or one or more storages associated with user devices. The distribution server may include one or more modems to assist in preloading content over one or more communications networks. The distribution server 400 may be part of a server provider or content provider or content broker, etc. platform. The distribution server 400 may be part of a service provider or content broker platform and communicate with the content provider over a service control and the content manager device 407 over the appropriate modem for the associated communication network.

Embodiments of Content Distribution

Figure 5:
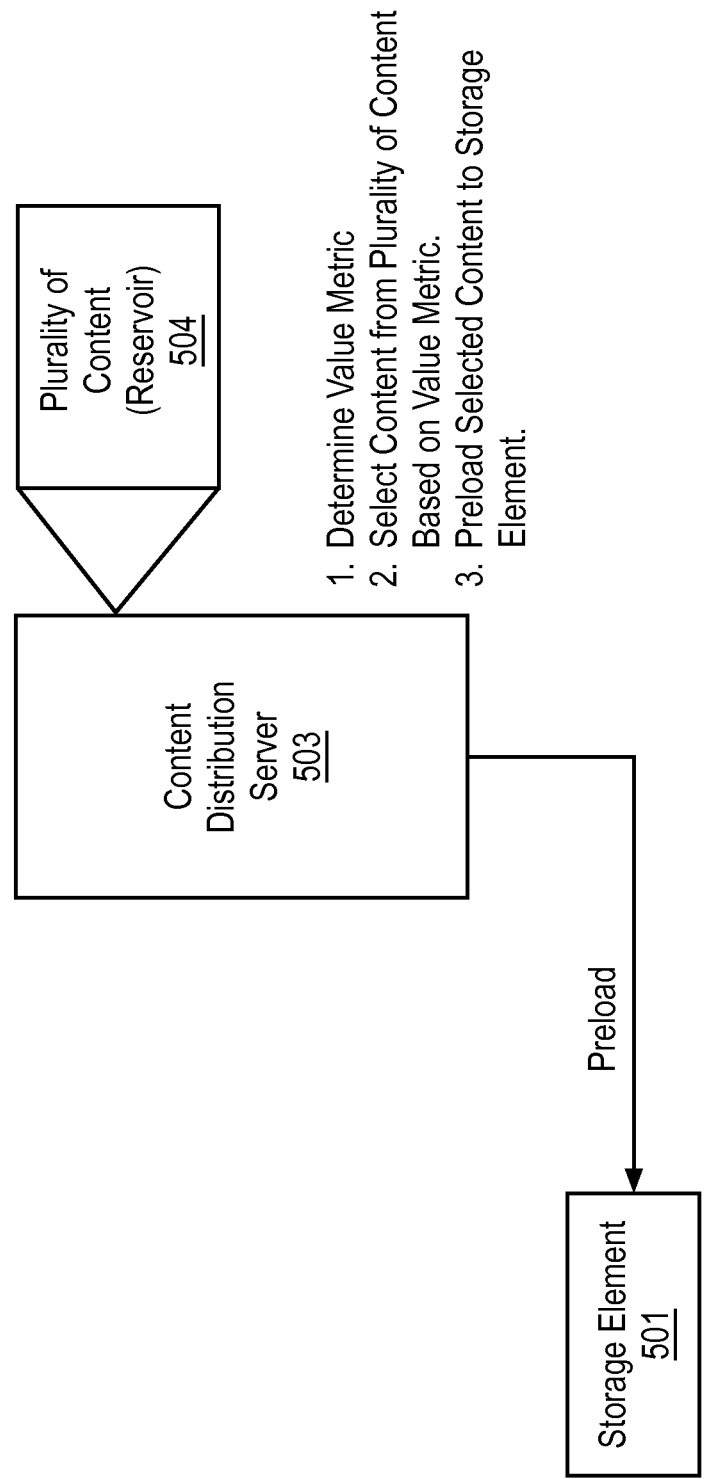
FIG. 5 shows a content distribution server and a storage element in accordance with some embodiments.

FIG. 5 shows a content distribution server 503 and a storage element 501 in accordance with some embodiments. The content distribution server 503 manages a plurality of content 504. The content distribution server 503 determines a value metric based on a function or model of one or more value metric parameters or cost parameters. The value metrics parameters are based on, for example, parameters of the plurality of content, parameters associated with the storage element 501, and/or parameters associated with a communications network between the content distribution server 503, the storage element 501 and a user device associated with the storage element 501.

FIG. 5 further includes the content distribution server 503 selecting a content from the plurality of content 504 based on the value metric. Once selected, the content distribution server 503 preloads at least a portion of the content to the storage element 501 as directed by a service provider over the communications network.

In some embodiments, the service provider is a content broker that provides distribution of content for a content provider. In some embodiments, the service provider is the content provider as well as the content distributor. In some embodiments, the service provider selects the content, and assists preload of the at least the portion of the content by directly pushing the at least a portion of the content to the storage element 501 over the communication network.

In some embodiments, once the content is preloaded to the storage element 501, any number of user devices can assess and consume the preloaded content. In some embodiments, the storage element 501 is included within a user device.

FIG. 6A shows a content distribution server 605 and a storage element 501 in accordance with some embodiments. In some embodiments, the content distribution server 605 manages a plurality of content 604. The content distribution server 605 determines a value metric based on a function or model of one or more value metric parameters or cost parameters.

In some embodiments, the service provider is a content broker that provides distribution of content for a content provider 606. In some embodiments, the service provider selects the content, and assists preload of the at least the portion of the content by assisting the content provider 606 to push the at least a portion of the content to the storage element 501 over the communication network.

FIG. 6B shows a content distribution server 605 and a storage element 501 in accordance with some embodiments. In some embodiments, the content provider 605 manages a plurality of content 604. The content distribution server 605 determines a value metric based on a function or model of one or more value metric parameters or cost parameters.

In some embodiments, the service provider is a content broker that provides value metric information or content selection services (lists, queues, pointers, etc.) to a content provider 607. In some embodiments, the service provider assists preload of content and the content provider 606 pushes the at least a portion of the content to the storage element 501 over the communication network.

FIG. 7A shows a content distribution server 705 and a plurality of storage elements 701A, 701B, 701C in accordance with some embodiments. In some embodiments, the content distribution server 705 broadcasts at least a subset of the plurality of content. The storage elements 701A, 701B, 701C receive the broadcast content over the communications network. In FIG. 7A, each of the storage elements 701A, 701B, 701C has one or more associated processors (either directly, or indirectly through an associated user device). At least one of the associated processors includes software (in at least some embodiments, the software is provided by the service provider) that is operative to select a content from the plurality of broadcast content based on the value metric. In some embodiments the value metric is determined at the storage elements. In some embodiments, the value metric is provided to the storage elements. In some embodiments, the value metric is determined jointly by the storage elements and a processor associated with a distribution server. Once the content has been selected, one or more of the storage elements 701A, 701B, 701C, preloads at least a portion of the selected content as received from the content distribution server 705 broadcasts. The content distribution server 705 may also determine a value metric to select a subset of the plurality of content 704 to be broadcast. The value metric may be based on one or more of the storage elements 701A, 701B, 701C, the content, user devices associated to the storage elements, users associated to the user devices associated to the storage elements, the communication network, etc.

FIG. 7B shows a content distribution server 707 and a plurality of storage elements 702A, 702B, 702C in accordance with some embodiments. In some embodiments, the content distribution server 707 multicasts at least a subset of the plurality of content. The storage elements 702A, 702B, 702C can receive the multicast content over the communications network. In some embodiments, the multicasts are only received by storage elements 702A, 702B that have been approved to receive the multicasts. In some embodiments, the storage elements 701A, 701B, 701C each receive the multicasts, but only storage elements 701A, 701B that have an encryption key are able to load the content of the multicasts. The content distribution server 707 may also determine a value metric to select a subset of the plurality of content 704 to be multicast. The content distribution server 707 may also determine a value metric to select a subset of the storage elements 702B, 702C to target to receive a multicast. The value metric may be based on one or more of the storage elements 701A, 701B, 701C, the content, user devices associated to the storage elements, users associated to the user devices associated to the storage elements, the communication network, etc.

In some embodiments, each of the storage elements 701A, 701B, 701C (or 702A, 702B, 702C) has one or more associated processors (either directly, or indirectly through an associated user device). In some embodiments, at least one of the associated processors includes software (in some embodiments, the software is provided by the service provider) that is operative to select a content from the plurality of broadcast content based on the value metric. In some embodiments, the value metric is determined at the storage elements. In some embodiments, the value metric is provided to the storage elements. In some embodiments, the value metric is determined jointly by the storage elements and a processor associated with a distribution server. Once the content has been selected, one or more of the storage elements 701A, 701B, 701C, preloads at least a portion of the selected content as received from the content distribution server 705 multicasts.

Figure 8:
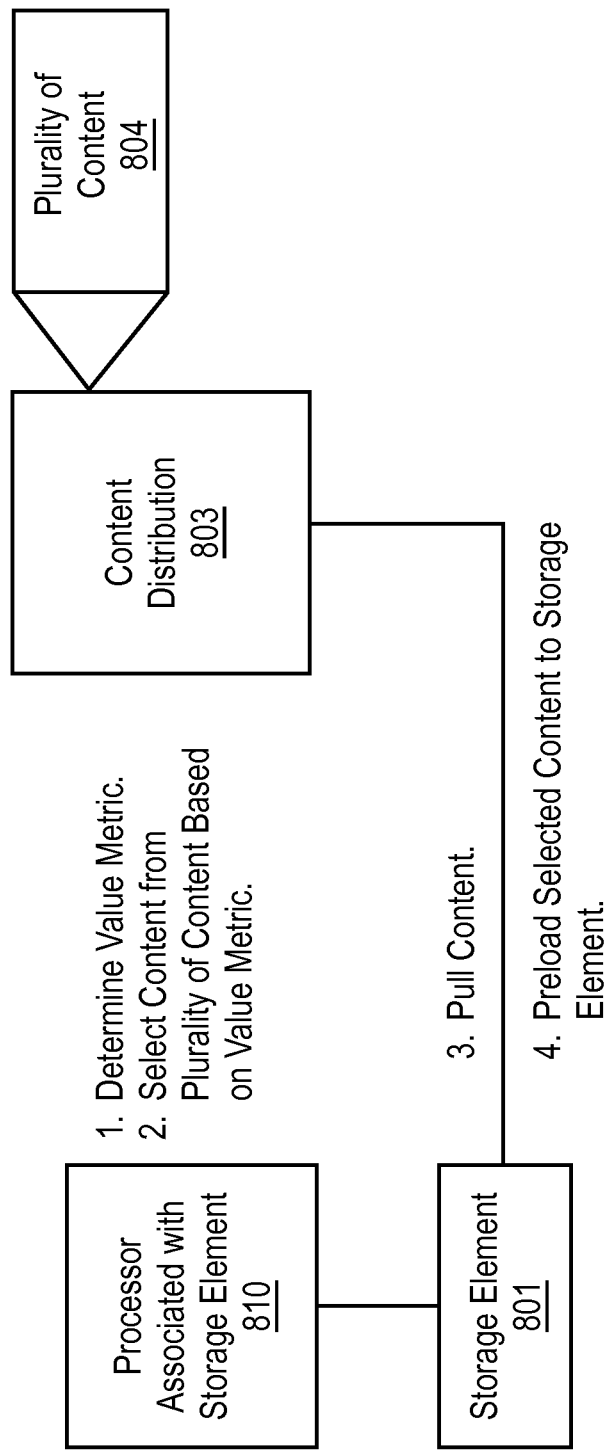
FIG. 8 shows a content distribution server, a storage element and a processor associated with the storage element in accordance with some embodiments.

FIG. 8 shows a content distribution server 803, a storage element 801 and a processor 810 associated with the storage element 801 in accordance with some embodiments. In some embodiments, the processor includes software that is operative when executed to select a content from the plurality of content based on the value metric. Once selected, at least a portion of the selected content is pulled by the storage element 801 from the content distribution server 803 over the communication network, and loaded onto the storage element 801. In some embodiments, the user device receives over the communication network information associated with the plurality of content. In some embodiments, the user device receives over the communication network information associated with the plurality of content from the content distribution server 803.

Distribution of Queues of Content

Some embodiments include a content distribution system. In some embodiments, the content distribution system includes at least one network content server coupled over one or more communication networks to a plurality of user devices, and one or more storage elements associated with the plurality of user devices, wherein each of the plurality of user devices is associated with at least one of the one or more storage elements. The at least one network content server includes at least one processor configured to generate a queue of content for each of the plurality of user devices based on parameters of a plurality of available content, and based on storage capabilities of the at least one of the one or more storage elements associated with each of the plurality of user devices, and assist preloading at of least a portion of the queue of content of each of the plurality of user devices to the at least one of the one or more storage elements associated with the user device.

Some embodiments include the network content server receiving selections of the queue of content from at least one of the plurality of user devices, and the network content server completing a transaction with a user of the at least one of the plurality of user devices.

Some embodiments include the network content server operative to compile analytics of at least one user of at least one of the plurality of user devices, and wherein generating the queue of content for the at least one of the plurality of user devices is additionally based on the compiled analytics.

In some embodiments, generating the queue of content for each of the plurality of user devices is further based on information associated with other content available on the at least one of the one or more storage elements associated the user device. In some embodiments, generating the queue of content for each of the plurality of user devices is further based on information associated with at least one communication network assisting in the preloading the at least the portion of the queue of content, or the information of at least one of the one or more storage elements associated with the user device. In some embodiments, the information associated with the at least one communication network comprises a communication network cost of preloading the at least the portion of the queue of content. In some embodiments, the information of at least one of the one or more storage elements comprises a storage element cost of storing the preloaded queue of content.

In some embodiments, generating the queue of content for each of the plurality of user devices is further based on information associated with at least one of the one or more communication networks assisting in presenting at least a portion of the queue of content at one or more of the plurality of user devices. In some embodiments, the information associated with at least one of the one or more communication networks comprises a communication network cost of presenting at least a portion of the queue of content.

Some embodiments include the at least one network content server determining an association of the one of the one or more storage elements with a second plurality of user devices, and wherein generating the queue of content for each of the plurality of user devices is further based on the plurality of user devices or a plurality of users associated with the second plurality of user devices. Some embodiments include the at least one network content server determining an association of one of the one or more storage elements with two or more of the plurality of user devices, and wherein generating the queue of content for each of the two or more user devices is further based on the two or more user devices or a plurality of users associated with the two or more user devices.

Some embodiments include the at least one network content server or a processor associated with at least one of the one or more storage elements assisting in deleting of at least a portion of a second content available on the at least one storage element. Some embodiments include the at least one network content server or a processor associated with a first or a second storage element of the one or more storage elements associated with the user device, assisting in moving at least a portion of a second content available on the first of the one or more storage elements associated the user device to the second or the one or more storage elements associated with the user device.

Some embodiments include the at least one network content server or a processor associated with at least one of the one or more storage elements preloading the at least the portion of the content to the at least one of the one or more storage elements. The preloading the at least the portion of the content to the at least one of the one or more storage elements includes classifying each of the one or more storage elements based on parameters of the plurality of available content, based on the storage capabilities, and based on a plurality of user parameters, and generating the queue based on the classifications.

Some embodiments include the at least one network content server or a processor associated with at least one of the one or more storage elements assisting in presentation of information related to the queue of content to a user device of the plurality of user devices associated with the at least one of the one or more storage elements.

Some embodiments include the at least one network content server or a processor associated with at least one of the one or more storage elements obtaining information associated with a value metric for at least one of the plurality of available content based on prior preloading of the content, and evaluating interaction with the preloaded content, wherein generating the queue of content for each of the plurality of user devices is further based on the value metric.

Some embodiments include the at least one network content server or a processor associated with at least one of the one or more storage elements operative select a first plurality of storage elements, preload at least a portion of the queue of content onto the first plurality of storage elements, wherein the first plurality of storage elements are associated with a first plurality of user devices, and obtain information associated with a value metric from the at least a portion of the queue of content preloaded onto the first plurality of storage elements, wherein generating the queue of content for each of the plurality of user devices is further based on the value metric.

In some embodiments, the queue of content includes an advertisement. Further, the at least one network content server or a processor associated with at least one of the one or more storage elements is operative to select the advertisement, and assist in presentation of the advertisement to at least one of the plurality of user devices.

In some embodiments, a cost for consuming at least a portion of the queue of content is based on a cost parameter associated with at least one of the one or more storage elements or a communication network.

Some embodiments include allowing a user to access an additional portion of the content, wherein the additional portion of the content in conjunction with the at least a portion of the content allows the user to consume the content. In some embodiments, the additional portion comprises a security element, wherein the security element allows the user to consume the content.

Some embodiments include associating business rules to the content, wherein the business rules of the content influence the content consumption.

User Device Parameters

FIG. 9 is a table that includes an example list of relevant user device parameters with example values of total storage size in gigabytes, display size in inches, display resolution, available modems and weather the device is use by a single user or shared by several members of a group (for example, family, work, etc.) in accordance with some embodiments. For this example, the total amount of storage available is about 100× higher for the home gateway or network attached storage than for the smartphone. For this example, the display of the TV has about one hundred times more area and about four times more pixels than the smartphone. The smartphone network access speed could vary between peak rates of 100s of Kbps when connected to a 2G access network to 10s of Mbps when connected to a low end WLAN modems and 100s of Mbps when connected to high end (for example, MIMO and/or channel bonding) WLAN modems. The cost of the communication access could vary between $20/GB and completely free. This is a heterogeneous set of devices that a user may consume valuable content with.

Communication Networks Available to User Devices

User devices may access content over a plurality of communication networks based on the available modems in the user device, the available networks at a given time and the parameters (wherein parameters may be information) of the communication network (for example, speed, cost, quality-of-experience (QoE), etc.). FIG. 10 is a table that includes an example list of communication networks available to the user devices associated with a user in accordance with some embodiments. FIG. 10 also includes an example list of relevant parameters associated with the communication networks. A list of relevant parameters may include: an identification (ID) number, speed or bandwidth of the communication network (for example, minimum speed, typical speed, maximum speed, statistics of the speed, quality-of-service (QoS), QoE, etc.), monthly rate for access to the communication network service, a maximum usage per month, a cost of usage above the maximum usage, if the network is associated to a single user or a multiuser, and connectivity or coverage details, etc. For example, user 1010 has access to a communication network such as home wireless 1000 within nominal speed of 50 Mbps, no monthly rate, no limit on maximum usage, no cost above the maximum usage, it is multiuser, its coverage area is the home, etc. For example, user 1010 also has access to a communication network such as cellular 4G roaming network 1004, with nominal speed of 0.5 Mbps, a monthly rate of $5 which does not include any free usage per month, a cost of $50 per gigabyte, associated to a single user typically used at work, etc. For example, user 1010 also has access to a communication network such as a POI WLAN #1, with ID 1005, with a nominal speed of 25 Mbps, no monthly rate, no max usage per month, 0 cost per byte, intended for multiple users, is located at a coffee shop, etc. Other examples can be derived from the FIG. 10, and many other combinations are possible.

Based on this example table, for example, home wireless network (for example, WiFi) provides a fast and low cost method to obtain content while at home. This may be the preferred method for delivering moderately large content to portable devices at home. For example, cellular 4G roaming provides a moderately slow and very expensive method to obtain content while on the road, for example, traveling abroad. This may be the preferred method to obtain time critical, small content while travelling.

In addition, a user device may have no communication network available at a given time. For example, a mobile user device with WiFi-only connectivity away from a home network or a WiFi hotspot, or a mobile user device in an airplane without WiFi may have no communication network available.

Moreover the communication network available may not have the bandwidth or reliability to support content desired by the user. In some embodiments, content may be preloaded that cannot reliably be consumed over the communication network. For example, high-definition (HD) video content for a large screen TV may require 4 Mbps for a reliable streaming (for example, real-time). The communication network such as home broadband access network 109 may not be able to sustain 4 Mbps over the duration of the video. For example, HD video content for smart phone may require 0.5 Mbps for a reliable streaming (for example, real-time). The 4G access network 111 may not be able to sustain 0.5 Mbps over the duration of the video.

This is a heterogeneous set of communication networks that a user may access content with and active management of the content over the communication networks could result in improved value.

Storage Elements Associated to User Devices

FIG. 11 is a table that includes a list of example relevant parameters (wherein parameters provide a representation of the capabilities of the storage elements) for a number of storage elements available to a user across multiple devices associated with a user in accordance with some embodiments. A user may own one or more storage elements included in devices, such as of a smartphone, a tablet, a notebook, a PC, a Home Gateway, etc. An example user in FIG. 11 may include flash in smart phone A, flash in tablet A, a hard disk drive (HDD) in notebook A, HDD in PC A, HDD in home gateway or set top box (STB) A, HDD in network attached storage (NAS) A, which are listed under the column "Name" in FIG. 11. An example of typical relevant information or value parameters for storage elements are total storage size, available storage, storage reserved for content (for example, the latter is a parameter set by a user) and available storage reserved for content. In addition, list of modems available to each storage element, lists of what storage elements are connected to each other and the communication network is very valuable to share the storage across user devices for users consumption. In addition statistical parameters of each connection, such as number of hops, end-to-end bandwidth, QoS, QoE, reliability vs. time may be valuable. In some embodiments, based on a subset of these parameters or other parameters, the storage elements are classified (for example, into tiers or levels) to better manage the storage element and the flow of content between the storage element and the user. In some embodiments, classification comprises one or more of placing into tiers, ranking, identifying, clustering, characterizing, categorizing.

For example, the Home Gateway may include several modems and networking capabilities (communication network parameters), such as a xDSL broadband access network connection, a WLAN modem to connect to mobile/portable devices (for example, smartphone, tablet, notebook) and a SOHO Ethernet switch with several ports to connect to wired devices (for example, Network-Attached Storage, PC, STB, notebook).

For example, the HDD in the home Gateway currently has an ID number 1015, 256 GB of total storage, of which 75 percent is available, 50 percent of the storage has been reserved for content, has been assigned tier #1 relative to a user device, is one communication network hop from smart phone A, is zero communication network hops from home Gateway A, is currently connected to a home WiFi and a broadband xDSL connection. The HDD in the home Gateway is currently associated with device IDs 1011, 1012, 1013, 1014, 1015, 1016 over one or more communication networks. Many of these value parameters may change over time.

Content and Plurality of Content

A content (it is to be understood that a reference to "content" may represent a selectable element of a plurality of content) includes any data a user may want to consume (for example, install or play a video game content, watch a movie or video content, view a photo content, read a book content, listen to a song content, install or execute a software program, app or update, open a file content, browse or read a web page content, read an email content, etc.) or share with other users. Examples are movies, sport events, shows, videos, photos, music, music videos, news, web pages, books, audio books, ring tones, games, software programs, software updates, apps, etc. Available content is heterogeneous in many different parameters. In some embodiments, it is visual (for example, photos), audio (for example, music) or visual and audio (for example, movies, sporting event, musical videos, games). In some embodiments, it is streamed during consumption (for example, live TV) or it may need to be fully or partially preloaded prior to use (for example, games, photos, software). It may be short or long, it may come in different formats (for example, an audio stream is compressed using an audio codec such as MP3, Vorbis or AAC or a video stream is compressed using a video codec such as H.264 or VP8) for different user devices (for example, HD TV vs. smartphone) and or in different formats for the same device (for example, SD vs. HD). It may have very different sizes relative to the communication network bandwidth (for example, large, medium or small). It may require different QoS parameters for a satisfied user QoE consumption. Relative to the content provider, it may be free, or have a per use licensing fee or a content group licensing fee or a per time period fee. Relative to the user, it may be free, free with sponsoring ads, or have a per use fee or a per time period fee. FIG. 17 is a table that shows some examples of tabulated content available at a content provider with some example content parameters listed.

Many of this large heterogeneous set of content elements (or plurality of content) available is preloaded onto the storage associated with a user device and consumed at a convenient time for the user at the appropriate user device.

Storage Manager

In some embodiments, storage elements associated with user devices is a precious resource just like bandwidth, computing and battery power and may be managed to provide enhanced value to the user. The table in FIG. 11 includes an example of storage elements and an example of parameters that may be helpful to a storage manager (or a content manager, etc.).

The storage manager may include several functionalities to help manage the storage resources (for example, storage elements) associated with user devices from a user or a group of users.

Figure 13:
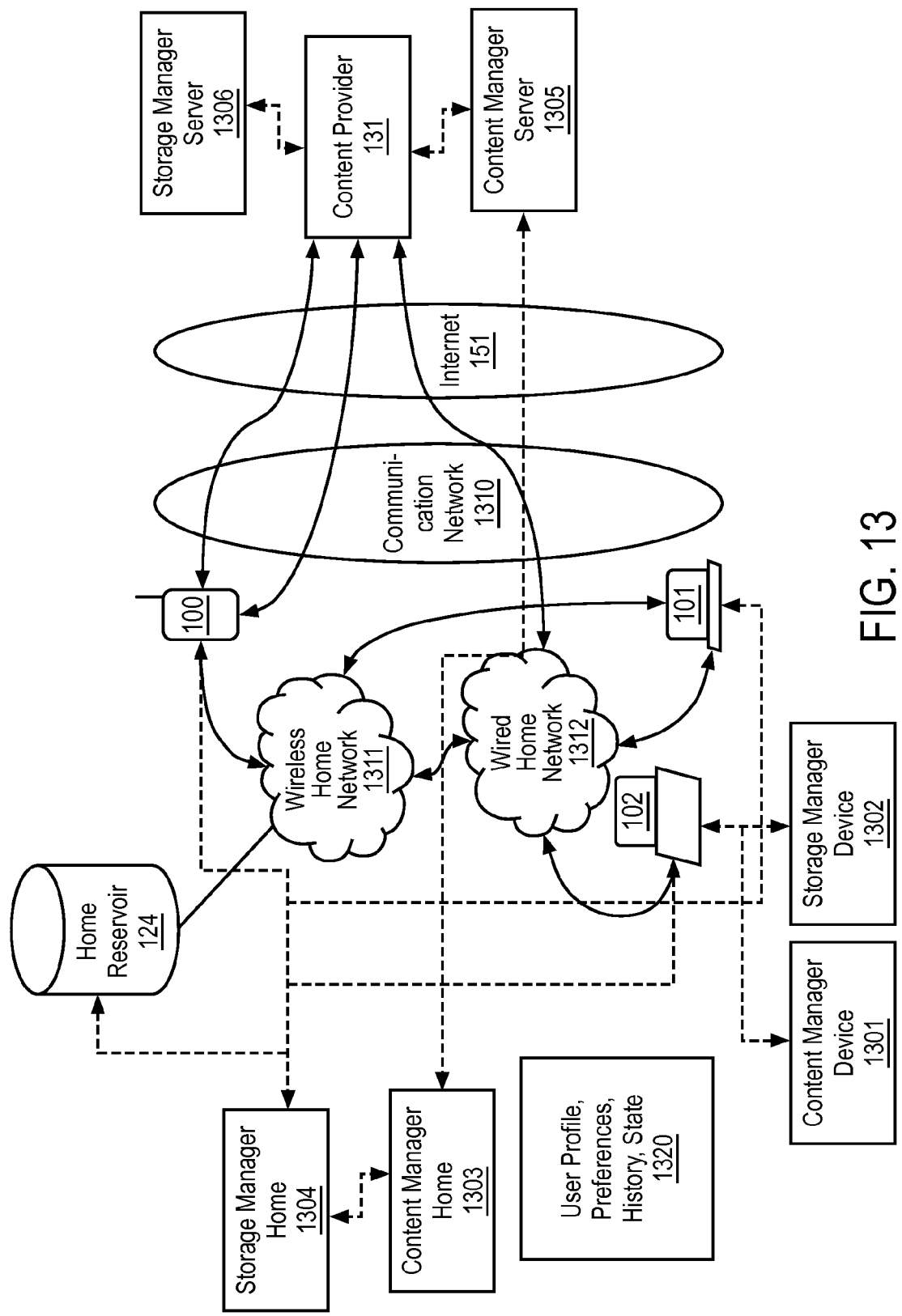
FIG. 13 includes an example of a home network with storage manager and content manager functionality in accordance with some embodiments.

The storage manager may reside at one or more locations. FIG. 13 includes an example of a home network with storage manager and content manager functionality in accordance with some embodiments. In some embodiments, the storage manager is included at the user device 102 as a storage manager device 1302 (in an embodiment a storage manager is included within a device agent and operable on a processor in a user device), or resides at a centralized location associated with the user and manage several user devices, such as a home gateway as a storage manager home 1304, or resides at the content provider 131 as a storage manager server 1306. Alternatively or in addition, the storage manager server may also reside at a content broker that manages content of a plurality of content providers for a plurality of users. In some embodiments, the storage manager resides at a content distribution server. The storage manager may have a master(s)lave, server/client, centralized or distributed configurations to manage storage of the plurality of user devices. In some embodiments, a storage manager is a software program or an application program ("app"). The storage manager is implemented in hardware or software or both hardware and software. Storage Managers 1302, 1304, 1306, may have access to information 1320, comprising one or more of user profile, user preferences, user history, user state (location, leisure mode, time, etc.). The content manager may have a master(s) lave, server/client, centralized or distributed configurations to manage content of the plurality of user devices.

Storage Manager Discovery Function

In some embodiments, a storage manager server, storage manager home or storage manager client, etc. is installed at one or more of the user devices. During power-up or first time initialization the storage manager discovery function may identify available storage elements associated to the user devices that the user may access for content. In some embodiments, the storage manager discovery function includes initializing a table such as FIG. 11. In some embodiments, the storage manager discovery function includes one or more of searching for a list of storage elements, assigning them a name or an ID, fetching the storage location, storage size, storage type (for example, HDD, Flash, etc.), storage access time, storage available or free storage, and how this storage is connected to a user device. A storage element may be located inside a user device, for example, through a communication network such as a data communication bus, or may be connected through one or more modems over one or more communications network to other user devices. A storage element may require multiple communication network hops to be connected to a user device. Communication network connectivity parameters of interest to the storage manager between the one or more storage elements and the one or more user devices could include one or more of: modem type (for example, WiFi, Ethernet, etc.), statistical parameters of the connection (for example, max, min, typical bandwidth, etc.), QoS parameters, other applications using the connection, users sharing the connection, reliability of the connection, latency, number of hops, etc. For the example embodiment in FIG. 11, the storage manager discovery function could identify a flash of Smartphone A has an ID of 1011, a total storage capacity of 32, of which 50 percent is currently available. The flash storage element is coupled to modems that enable connectivity to cellular and WiFi networks. In some embodiments, at the time of discovery the flash storage element could communicate with storage elements 1014 (for example, the smartphone is connected to the PC through a fast and low cost USB port) and 1015 (for example, connected to home gateway through the WiFi) and 1016 (for example, connected to home gateway through the WiFi and the home gateway is connected to Network-Attached Storage through Ethernet).

In some embodiments, the storage manager discovery function determines that the user device Smartphone A is 0 communication hops away from the relatively small Flash in Smartphone A, one communication hops from the larger storage in PC A, and two communication (link) hops away the largest storage in Network-Attached Storage. In some embodiments, the smartphone A is connected to the Network-Attached Storage over two sequential communication network hops. In some embodiments, the communication network connectivity performance will be determined by the aggregate of these two sequential, serial or cascaded links. In some embodiments with two sequential communication network hops, the overall latency will be larger than or equal to the sum of each link latency and the overall bandwidth will be less than or equal to the lower bandwidth communication network link bandwidth and the QoS, QoE, will be limited by the worse of the two links.

In some embodiments, there may be two or more communication networks or one or more communication networks with more than one path between a user device and a storage element. In some embodiments, each of the communication paths is managed (for example, monitored, logged, etc.) independently with associated parameters for each of the communication network paths. In some embodiments each of the communication network paths is used to transfer content more efficiently based on content parameters, user parameters, etc. and is used effectively as one or more of the communication paths becomes unreliable or is disconnected or disabled or powered down.

Storage Manager Update Function

In some embodiments, storage element parameters (including connectivity parameters) change over time. In some embodiments, a user device may be carried outside the home WiFi coverage area (for example, carried to work), or a storage element (for example, a the Network-Attached Storage) attached to a home gateway may be powered down, or a mobile device (for example, a smartphone) connected to a portable device (for example, a notebook) through a personal-area network (PAN) (for example, a USB cable) for a big content transfer may be disconnected later. In some embodiments, it is advantageous to update (for example, periodically or dynamically) the storage manager status information. The storage manager update function is located at a subset of the user devices (for example, as a storage manager update function device), or at a central location for a plurality of user devices associated with a user (for example, as a storage manager update function home or work) or at the content provider (for example, distribution server) or reservoir (for example, as a storage manager update function server). The storage manager information is distributed or centralized across one or more storage manager update function sites. The storage manager update functions could use keep-alive signals to maintain storage manager status, or polling signals or interrupt signals from devices or some other method. In some embodiments, this information is used to maintain a current status of the storage network (for embodiments a storage network includes a plurality of storage elements) available to the user or a user device. In some embodiments, this function monitors status/changes in storage on/off status, connectivity on/off, list of active modems, modem link performance, connectivity bandwidth, QoS, QoE, available storage, available content, location, number of hops, etc. In some embodiments, this function determines if new storage is added to the network, problems with the storage (for example, reliability, corruption, etc.). The storage manager update function could also delete storage elements from the storage network if necessary.

In some embodiments, the storage manager update function monitors storage element parameters and compute statistics vs. time or vs. location or vs. user. In some embodiments, the storage manager update function is useful for preloading content or providing content to the end user. In some embodiments, if a storage element is usually powered down at night, it may not be helpful for storing off peak broadband data downloaded at night. If a user device is carried to work during the day, it is helpful to preload a coupled or attached storage element with content at night. If the user of a user device takes the user device to the park without cellular data coverage for lunch break to read financial news, it may be helpful to preload relevant content during the morning over the users work communication network.

User Parameters for Storage Manager

To enhance the storage manager operation, it may be advantageous to provide it with storage parameter information relative to the user(s). In some embodiments, during enrollment the user may input a list of preferences (for example, partially and/or updating over time). FIG. 12 is a table that includes an example of a user input table in accordance with some embodiments. In some embodiments, the user(s) may input for each storage element preferences related to the content type (for example, ranked or graded/scaled, could include blocked content, parental control), content format, how much storage to reserve for content, if the storage element is used by a single or a list or a group of users. In some embodiments, the user may specify preferred locations where the storage element will be used and preferred communication network (for example, is ranked list, could have a exclusive list, preferred list, blocked list, etc.). The user may input information related to the various communication network data plans available. The user(s) may update the information over time.

In some embodiments, a user entity may be a user device, storage element, etc. In addition to the direct input from the user, the user entity may collect user and/or user device and/or storage history instead of user input or in addition to user input to further assist the storage manager. This information could include user utilization of user entities (for example, times or locations), content type/format/etc. vs. time/location consumed at the user devices, content type/format/etc. purchased vs. time/location at the user devices. This information could further include updated usage or predicted usage of communication network data plans relative to cost/limits/etc. This information could further include responses from the user to storage manager notifications. In some embodiments, the storage manager may notice that a specific storage element has not been used for an amount of time larger than a threshold and notify the user and request a yes/no answer to whether this storage element is no longer available (for example, damaged or deleted from home network).

Storage Manager Allocation Function

In some embodiments, the storage manager includes a storage manager allocation function that provides storage for an improved user's content value. The storage manager can run its own allocation function based on several attributes including content size, user's preferences, user's historical content consumption (for example, type, quality), user's need of content based on its location, the likelihood of the content being consumed by the user, the content life expectancy (for example, amount of days/hours it will be stored), etc.

In some embodiments, storage elements inform the one or more storage managers of storage availability while being cognizant of storage needs of the application that are in place in the user device. In some embodiments, storage resources are managed across a communication network over various user entities in order to provide a better user experience as far as content consumption (storage consumers). This means that by aggregating all the available storage elements in a common pool, the storage manager is able to provide a larger and more valuable storage per user for immediate and/or near-to-immediate consuming.

In some embodiments, based on a storage request from a content distribution server (for example, a content manager operable on the content distribution server), a storage manager allocates a fixed storage size to a given user (not necessary cognizant to content itself) or variable size storage. The storage can be based on min and peak value as identified to the content manager.

Some embodiments can also strive to provide content that is closer to the user device, if not necessarily on the device. In this manner, the user can then download the content faster, and will more likely download content, than if had to go through a congested or expensive communication network from a content source.

Storage Manager: Classifying Storage

Some embodiments include preloading content to at least one of a plurality of storage elements, wherein the plurality of storage elements includes the storage element. In some embodiments, preloading includes classifying each of the plurality of storage elements based on a plurality of content parameters, and preloading based on the classifications. In some embodiments, the multiple storage elements are associated with a single user device. In some embodiments, the multiple storage elements are associated with more than a single user device.

In some embodiments, classifying each of the plurality of storage elements influences the value metric, wherein the value metric influences which of the plurality of content is selected. In some embodiments, the classifying of each of the plurality of storage elements includes evaluating a communication network between at least one associated user device and one or more of the plurality of storage elements.

In some embodiments, given the plurality of storage elements with differences in storage size, connectivity, mobility, etc. associated with a plurality of user devices located at {physical, time, connectivity, etc.} locations relative to the user it may be advantageous to classify the storage elements to help simplify the storage management and content management. In some embodiments, classifying comprises one or more of organizing, sorting, ranking, classifying into tiers. In some embodiments, the classifying is based on one or more of the following storage element or communication network parameters: access time/latency, access bandwidth, QoS, QoE, storage (available) size, number of communication hops to the user device or consuming user. In some embodiments, the classifying is based on the storage locations: for example, home storage, work storage, POI storage, cloud storage, content provider storage or content broker storage network. In some embodiments, the classifying is based on location, connectivity or speed relative to a particular user device or a particular user. The classification is static, quasi-static or dynamic. An example of static storage classification is a fully wired network that does not add or delete any elements. A quasi-static storage classification is a fully wired network that does allow to adding or deleting elements or power up/down some elements (for example, to save power dynamically when less storage is necessary). An example of dynamic storage classification is a mix of wired and wireless user devices, where a subset of user devices enter and exit a WLAN coverage area.

An example of a storage classification into tiers is as follows:

Tier zero storage element: Storage within the communication bus of the user device. This is the most valuable storage element for this user device, but may not have sufficient available (allocated or free) capacity for additional content storage.

Tier one storage element: Storage element within a local network (faster access time) such as home gateway/server. The content resides in a short and fast communication network distance away from the user device.

Tier two storage element: Storage element not attached directly to the local network but it is in close proximity, for example, two communication network hops away from the device. For example, a Network-Attached Storage connected by Ethernet to a Home Gateway with WLAN capability communicating to mobile/portable user devices.

Tier three storage element: Storage having a limited access time scattered within network (for example, auxiliary PCs, disconnected auxiliary/backup HDD). Storage element used when tier one and tier two storage elements are either being consumed and/or dedicated for contents used for high paying users.

Storage Management: Subscription Plans

Given the set of heterogeneous users, user devices, storage elements, communications networks, content, content providers, and content brokers, it may be advantageous to have a service provided offering at least one of a plurality of storage management subscription plans offers. The storage management subscription plans could offer free, sponsored, entry level, consumer, business, premium or preferential content services based on one or more of obtained user, user entity, communication network parameters. The storage manager could manage storage for one or more users, one or more storage elements, one or more user devices, one or more home networks, one or more content provider and/or optionally one or more content brokers, one or more POI locations, one or more work locations, etc. The plan is prepay or postpay or both prepay and postpay. It is partially/fully subsidized, sponsored, ads sponsored, content provider sponsored or could include a free trial, etc.

Storage Allocation to Content Providers

At least some embodiments monetize storage elements associated to user devices as a commodity, which content providers can bid for or buy. A content provider may offer to pay (or provide discounts/coupons/subsidies/etc.) the user(s) to have access to a partition of the storage elements managed by the storage manager. This way the content provider has a channel to preload content onto the storage elements that is likely to be purchased or consumed. This way the content provider storage manager or content manager decides what to market to the user(s) onto one or more storage elements associated with one or more user devices over one or more communication networks.

In some embodiments, multiple content providers offer to pay the user(s) to have access to partitions of the user distributed storage elements. In some embodiments, having a content broker may be advantageous to avoid the user(s) the hassle of managing multiple storage managers associated with multiple content providers, multiple bills, multiple service plans/offers, from the content providers. In some embodiments, the storage manager dynamically supports one or more content providers. In some embodiments, the storage manager allocation is managed and marketed to the content provider as a service. In some embodiments, the storage manager allocates storage element partitions of fixed size (for content managers to manage the storage element partition) or be based on request grant mechanism in which content manager can request for a given storage space depending on its needs.

Content Manager: Preloading Selected Content on to Storage Associated with User Devices In some embodiments, the content manager is operable on a processor of a user device. In some embodiments, the content manager functionality may comprise improving the value of content available to a user so that desirable content is readily accessible when the user is ready to consume it on a user device likely to be chosen for consuming (for example, viewing, using, displaying, listening, playing, etc.) the content. Storage elements associated to one or more user devices may be accessible through a storage manager. Once the preloaded content is accessible to a user device, the content manager takes one or more parameters related to the user, the user devices, the storage element, the communication networks, the content providers and/or the content brokers. In some embodiments, the content manager maintains the content, for example, decides what content (for example, by deleting, moving, preloading content) should reside at storage elements near (for example, one or more of accessed over a communication network with bandwidth greater than the content requirements, latency lower than content requirements, cost below a user preference, and/or availability above a user parameter requested by a user) the user device to improve the value for one or more of the user, the communication network, the one or more content providers or one or more service providers.

Content available on storage elements associated with user devices is a precious resource just like storage, bandwidth, computing power and battery power and may be managed to provide enhanced value to the user(s), etc. In some embodiments, the content manager includes several functionalities. The content manager may reside at one or more locations. FIG. 13 includes an example of a home network with storage manager and content manager functionality in accordance with some embodiments. The content manager is included at the user device 102 as a content manager device 1301, or reside at a centralized location associated with the user and manage content on several user devices, such as a home gateway as a content manager home 1303, or may reside at the content provider as a content manager server 1305. Alternatively or in addition, the content manager server may also reside at a content broker that manages content of a plurality of content providers for a plurality of users. One or more of the Content Managers 1301, 1303, 1305 may have access to information 1320, comprising one or more of user parameters (for example, user profile, user preferences, user history, user state—location, leisure mode, time, etc.). The content manager may have a master(s)lave, server/client, centralized or distributed configurations to manage content of the plurality of user devices.

Preloading or Assisting Preloading a Content

In some embodiments, preloading a content comprises delivering (or loading or downloading or uploading, etc.) a portion of the content item onto a storage element unsolicited by a potential user or consumer or prior to a potential user or consumer selecting the content item. In some embodiments, preloading comprises an additional step of selecting a content from a plurality of content without the potential user or consumer requesting the content.

In some embodiments, preloading a content comprises pushing the content from a content source (network entity, content distribution server, cloud, service provider, content provider, content broker, etc.) to a content destination (user entity, storage element, user device with storage, etc.). In some embodiments, the content source typically selects the content and the target storage element and initiates the preloading.

In some embodiments, preloading a content comprises pushing the content from a source (network entity, cloud, service provider, content provider, content broker, etc.) to a plurality of destinations (user entity, storage element, user device with storage, etc.) through multicasting. In some embodiments, the source element typically selects the content and the plurality of target storage element and initiates the preloading.

In some embodiments, preloading a content comprises pulling the content from a content source (network entity, cloud, service provider, content provider, content broker, etc.) to a content destination (user entity, storage element, user device with storage, etc.). In some embodiments, the content destination element typically selects the content and the target storage element and initiates the request for preloading.

In some embodiments, the source may be a user entity (for example, user generated content located at a user device, storage element, etc.) and the destination may be a network entity (service provider, storage provider, content broker, content provider, cloud, etc.). In some embodiments, the source may be a first user entity (user device, storage element, etc.) and the destination may be a second entity (user device, storage element, etc.). In some embodiments, the destination storage entity of a first preload (for example, POI storage) may be a source for a second preload to a second destination storage element. In some embodiments preloading a content may comprise an intermediate storage element. For example, a content targeted to a mobile user device may be preloaded to the user's home set top box or gateway over a wide area broadband communication network, and subsequently preloaded from the set top box to the mobile user device local storage over a home WiFi network.

In some embodiments the preloaded content destination may be a storage element of a first user device and a user may select the content to be presented at a second user device. In some embodiments, the first user device may not have the appropriate presentation hardware (for example, display resolution) for the preloaded content or may not have the appropriate software (for example, an image decoder) for the preloaded content. In some embodiments, the preloaded content may not be preloaded onto storage element of the second user device. In some embodiments, a video or movie may be preloaded onto a smart phone flash storage and presented or displayed on a TV over WiFi. The choice between presenting the content from the first user device included storage element over a communication network to a second user device UI, or preloading onto the second user device storage prior to presentation may be based on a value metric. The value metric may be a function of one or more of communication network parameters (performance, cost, etc.), storage element parameters (performance, availability, cost, etc.), etc.

In some embodiments, a content preloading may be initiated based on a value metric, but may be paused, interrupted, stopped, etc. based on changes in value parameters over time. For example, a movie content may initiate preloading when a mobile user device is in the home WiFi network, but pause as the mobile user device is no longer in the coverage area of the home WiFi in switching to a 3G data network. In some embodiments, a content preloading may be restarted based on changes in value metric parameters over time.

In some embodiments, a preloaded content may comprise preloaded business rules, content rules, policies, etc. (collectively denoted business rules) associated with the preloaded content. These business rules may include information associated with the consumption of the content. In some embodiments, business rules comprise one or more of a single use or multiuse or unlimited use, single-user or multiuser, a cost, a restriction on the time or dates of content consumption, a restriction on subsequent preloading onto other user devices, a security element, a protection feature, an authorization restriction, authentication rules, etc.

In some embodiments, several storage elements share a communication network. In some embodiments list of content for preloading associated to each storage element (for example, several users sharing a DOCSIS channel or a satellite channel) are aggregated and content that is targeted to more than one storage element is multicast or broadcast over the communication network. This embodiment has the benefit of sharing communication network cost over more than one storage element. This may improve a value metric resulting in greater preloads or more profit. This embodiment is especially valuable for lossless communication networks. If the communication network is lossy, one or more storage elements preloading the multicast (or broadcast) content may be missing some of the information necessary for presenting the content. For the majority of communication networks the packet error rate (loss) is typically a small percentage of the packets transmitted (the largest values are typically for NLOS wireless, where targets are typically 1 percent). The packet error rate is reduced by a second multicast (or broadcast) of the content. In some embodiments, a content is multicast a second time based on a packet error rate of the communication network. If the first and second transmissions are independent, the aggregate packet error rate after two multicasts would reduce the packet error rate by the second power of the packet error rate (for example, 1 percent would become 0.01 percent). In some embodiments, if the packet error rate is low, the erroneous packets are downloaded during content consumption. In some embodiments one of more a storage element could pull or request the missing or erroneous packets. For example, if a content is preloaded by multicast onto 10 storage elements with a packet error rate of 1 percent, typically a second multicast would double the communication network resources and result in a packet error rate of 0.01 percent. If each of the storage elements requests the missing or erroneous 1 percent of packets, this would add 10 percent of packets being retransmitted (plus some overhead). If the probability of consumption is 20 percent, on the average only 2 percent of the packets would be retransmitted/downloaded (plus overhead). The relative benefits of each embodiment depend on one or more of the packet error rate, the number of storage elements being multicast, the packet error rate, likelihood of consumption, etc.

Preloading Assisted by Content Broker

In some embodiments, the service provider includes a content broker, wherein the content broker assists in the distribution of content. In some embodiments, the broker assisting in the distribution of the content includes obtaining, by the at least one content distribution server, storage element value metric information of a plurality of storage elements, associated with a plurality of user devices, and assisting, by the one or more content distribution servers, a content provider in preloading at least a portion of a content onto one or more of the plurality of storage elements associated with the plurality of user devices based on the storage element value metric information.

In some embodiments, the service provider includes a content broker, wherein the content broker assists in the distribution of content. In some embodiments, the content broker assisting in the distribution of the content includes obtaining, by the at least one content distribution server, user device value metric information of a plurality of user devices, associated with a plurality of user devices, and assisting, by the one or more content distribution servers, a content provider in preloading at least a portion of a content onto one or more of the plurality of storage elements associated with the plurality of user devices based on the user device value metric information.

In some embodiments, the service provider includes a content broker, wherein the content broker assists in the distribution of content. In some embodiments, the broker assisting in the distribution of the content includes obtaining, by the at least one content distribution server, a communication network value metric information used for preloading the content onto a plurality of storage elements, associated with a plurality of user devices, and assisting, by the one or more content distribution servers, a content provider in preloading at least a portion of a content onto one or more of the plurality of storage elements associated with the plurality of user devices based on the communication network value metric information.

In some embodiments, the service provider includes a content broker, wherein the content broker assists in the distribution of content. In some embodiments, the broker assisting in the distribution of the content includes obtaining, by the at least one content distribution server, a communication network value metric information used for presenting the preloaded content from a plurality of storage elements, onto an associated plurality of user devices, and assisting, by the one or more content distribution servers, a content provider in preloading at least a portion of a content onto one or more of the plurality of storage elements associated with the plurality of user devices based on the communication network value metric information.

Some embodiments include a content broker system. The content broker system includes at least one content distribution server coupled through one or more communications networks to a plurality of user devices and one or more content providers. The at least one content distribution server is operative to obtain at least one of a user device parameter or a user parameter, wherein the user parameter is associated with at least one user associated with one or more of the plurality of user devices, classify a plurality of storage elements associated with the plurality of user devices based on the at least one of the user device parameter or the user parameter, offer preloading opportunities to at least one of the one or more content providers, select a content from a plurality of content available from the one or more content providers based on the classified plurality of storage elements and responses to the offered preloading opportunities, and assist preloading of at least a portion of the selected content to at least one of the plurality of storage elements.

In some embodiments, the offered preloading opportunities are based at least in part on the classified plurality of storage elements. In some embodiments, the classification of the plurality of storage elements is based at least in part on responses of the one or more content providers to the offered preloading opportunities. In some embodiments, the at least one content distribution server is further operative to allow the one or more content providers to assist in defining the preloading opportunities offers.

In some embodiments, the at least one content distribution server is further operative to provide the one of more content providers with the at least one of user device parameters or user parameters, and allow the one of more content providers to assist in defining the preloading opportunities offers. In some embodiments, the at least one content distribution server is further operative to provide the one of more content providers with the at least one of user device parameter or the user parameter, and allow the one of more content providers to assist in selecting the content from the plurality of content.

In some embodiments, obtaining at least one of a user device parameter or a user parameter is updated over time. In some embodiments, the user device parameter or user parameter are updated based on one or more time events, wherein the one or more time event includes at least one of periodic updates, polling based updates or event interrupt based updates.

Some embodiments include classifying the plurality of storage elements based on a storage element parameter.

In some embodiments, the user device parameter comprises a storage element availability of one or more of the plurality of storage elements. In some embodiments, the storage element parameter includes a communication network parameter associated with one or more of the plurality of the storage elements. In some embodiments, the user parameter includes one or more of a user preference, user history, user location, or user state.

In some embodiments, the classification of the plurality of storage elements based on the user parameter includes a user population parametrized by one or more of a user preference or user demographic or a user history or a user state.

In some embodiments, at least one user device includes a device agent, wherein the device agent at least assists the obtaining user parameters. In some embodiments, at least one user device includes a device agent, wherein the device agent at least assists the selecting of the content. In some embodiments, at least one user device includes a device agent, wherein the device agent assists consumption of the selected content. In some embodiments, the device agent comprises software. In some embodiments, the device agent comprises hardware. In some embodiments, the device agent comprises software and hardware.

In some embodiments, the at least the portion of the content is encrypted, and further comprising providing a selected user device with an ability to decrypt the preloaded at least the portion of the selected content.

In some embodiments, the at least one content distribution server is further operative to receive bids from at least one of the one or more content providers based on the preloading opportunity offers, select at least one bid, and further select the content based on the at least one selected bid. In some embodiments, the at least one content distribution server is further operative to receive bids from at least one of the one or more content providers based on the preloading opportunity offers, select at least one bid, and further classify the plurality of storage elements based on the at least one selected bid. In some embodiments, the at least one content distribution server is further operative to facilitate billing of the selected content.

In some embodiments, the at least one content distribution server is further operative to provide the one of more content providers with a user interface. In some embodiments, the user interface allows the one or more content providers to manage preloading opportunities offers. For at least some embodiments, the user interface allows the one or more content providers to manage preloading opportunities offers includes allowing at least one content provider to at least one of pay, bid, modify, specify, design, define preloading opportunities. For at least some embodiments, the user interface allows the one or more content providers assist in selecting the content from the plurality of content. For at least some embodiments, the user interface allows the one or more content providers to manage the preloaded at least the portion of the selected content. At least some embodiments further include allowing one or more content provider to manage the preloaded at least the portion of the selected content includes allowing at least one content provider to at least one of monitor, generate statistics, track or post-process information associated with the preloaded at least the portion of the selected content.

In some embodiments, classifying the plurality of storage elements or selecting the content is additionally based on at least information associated with other content available on the plurality of storage elements. In some embodiments, classifying the plurality of storage elements or selecting the content is additionally based on at least information associated with one or more communications networks that couple the at least one content distribution server to one or more of the plurality of storage elements. In some embodiments, the plurality of storage elements or selecting the content is additionally based on at least information associated with the one or more communication network that couples the one or more of the plurality of user devices to one or more of the plurality of storage elements.

Some embodiments include the at least one content distribution server or a processor associated with one or more of the storage elements determining an association of the one or more of the plurality of storage elements storage elements with one or more of the plurality of user devices, and wherein classifying the one or more of the plurality of storage elements or selecting the content is additionally based on at least the one or more of the plurality of user devices or a plurality of users associated with the one or more the plurality of storage elements.

Some embodiments include the at least one content distribution server or a processor associated with one or more of the plurality of storage elements assisting in deleting of at least a portion of a second content available on one or more of the plurality of storage elements. Some embodiments include the at least one content distribution server or a processor associated with one or more of the plurality of storage elements assisting in moving at least a portion of a second content available on one or more of the plurality of storage elements to a second storage element associated with a user or user device.

Some embodiments include the at least one content distribution server or a processor associated with one or more of the plurality of storage elements operative to classifying each of the plurality of storage elements based on a plurality of content parameters, and select the content based on the classifications. Some embodiments include the at least one content distribution server or a processor associated with one or more of the plurality of storage elements assisting in presentation of information related to the selected content to at least one of the plurality of user devices associated with the one or more of the plurality of storage elements.

Some embodiments include the at least one content distribution server or a processor associated with one or more of the plurality of storage elements obtaining information associated with the preloaded at least the portion of selected content based on prior preloading, and evaluating interaction with the preloaded at least the portion of selected content. Some embodiments include the at least one content distribution server or a processor associated with one or more of the plurality of storage elements, operative to select a first plurality of storage elements, preload at least a portion of a first content onto the first plurality of storage elements, wherein the first plurality of storage elements are associated with a first plurality of user devices, and obtain information associated with user interaction of the at least one user with the first content preloaded onto the first plurality of storage elements.

In some embodiments, the selected content comprises an advertisement, and further includes the at least one content distribution server or a processor associated with one or more of the plurality of storage elements, operative to select the advertisement, assist in presentation of the advertisement at one or more of the plurality of user devices.

In some embodiments, a cost for consuming the selected content is based on a cost parameter associated with one or more of the plurality of storage elements or at least one of the one or more communication networks.

Some embodiments include a method of a content broker assisting distribution of content. The method includes obtaining, by one or more content distribution servers, at least one of user device parameter information or storage element parameter information of a plurality of user devices and a plurality of storage elements associated with the plurality of user devices, and assisting, by the one or more content distribution servers, at least one content provider in preloading a content onto one or more of the plurality of storage elements associated with the plurality of user devices based on the at least one of the user device parameters information or the storage element parameter information. In some embodiments, the storage element parameter information includes communication network parameter information associated with the storage element.

Some embodiments include obtaining, by the one or more content distribution servers, user parameter information of the plurality of user devices, wherein the assisting the at least one content provider in preloading the content onto the one or more of the plurality of storage elements associated with the plurality of user devices is further based on the user parameter information.

In some embodiments, a value metric includes at least one of the user device parameters information or storage element parameter information, and wherein the method further comprises the one or more content distribution servers selecting at least a portion of the content of a plurality of available content based upon the value metric. In some embodiments, the value metric comprises information associated with other content available on one or more of the plurality of storage elements.

In some embodiments, the value metric is based on at least information associated with a communication network that couples the one or more content distribution servers to one or more of the plurality of storage elements. In some embodiments, the value metric is based on at least information associated with a communication network that couples the one or more of the plurality of user devices to one or more of the plurality of storage elements. In some embodiments, the at least one content distribution server or a processor associated with one or more of the plurality of storage elements determining an association of the one or more of the plurality of storage elements storage elements with a plurality of user devices, and wherein the value metric is based on at least the plurality of user devices or a plurality of users associated with the plurality of user devices. In some embodiments, the value metric is based on at least a parameter associated with one or more of the plurality of storage elements. In some embodiments, the value metric is based on at least a parameter associated with a communication network that couples the one or more content distribution servers with the plurality of storage elements.

In some embodiments, the at least one content distribution server or a processor associated with one or more of the plurality of storage elements assisting in deleting of at least a portion of a second content available on one or more of the plurality of storage elements. In some embodiments, the at least one content distribution server or a processor associated with one or more of the plurality of storage elements assisting in moving at least a portion of a second content available on one or more of the plurality of storage elements to a second storage element associated with a user or user device.

Some embodiments include the at least one content distribution server or a processor associated with one or more of the plurality of storage elements preloading content to at least one of the plurality of storage elements, classifying each of the plurality of storage elements based on a plurality of content parameters, and preloading based on the classifications. Some embodiments include the at least one content distribution server or a processor associated with one or more of the plurality of storage elements assisting in presentation of information related to the content to a user device associated with the one or more of the plurality of storage elements.

Some embodiments include the at least one content distribution server or a processor associated with one or more of the plurality of storage elements obtaining information associated with the content based on prior preloading of the content, and evaluating interaction with the preloaded content.

Some embodiments include the at least one content distribution server or a processor associated with one or more of the plurality of storage elements, operative to select a first plurality of storage elements, preload at least a portion of the content onto the first plurality of storage elements, wherein the first plurality of storage elements are associated with a first plurality of user devices, and obtain information associated with the value metric from the content preloaded onto the first plurality of storage elements.

In some embodiments, the content includes an advertisement, and further includes the at least one content distribution server or a processor associated with one or more of the plurality of storage elements, operative to select the advertisement, and assist in presentation of the advertisement at one or more of the plurality of user devices.

In some embodiments, a cost for consuming the content is based on a value metric cost parameter associated with one or more of the plurality of storage elements or a communication network.

Figure 23A:
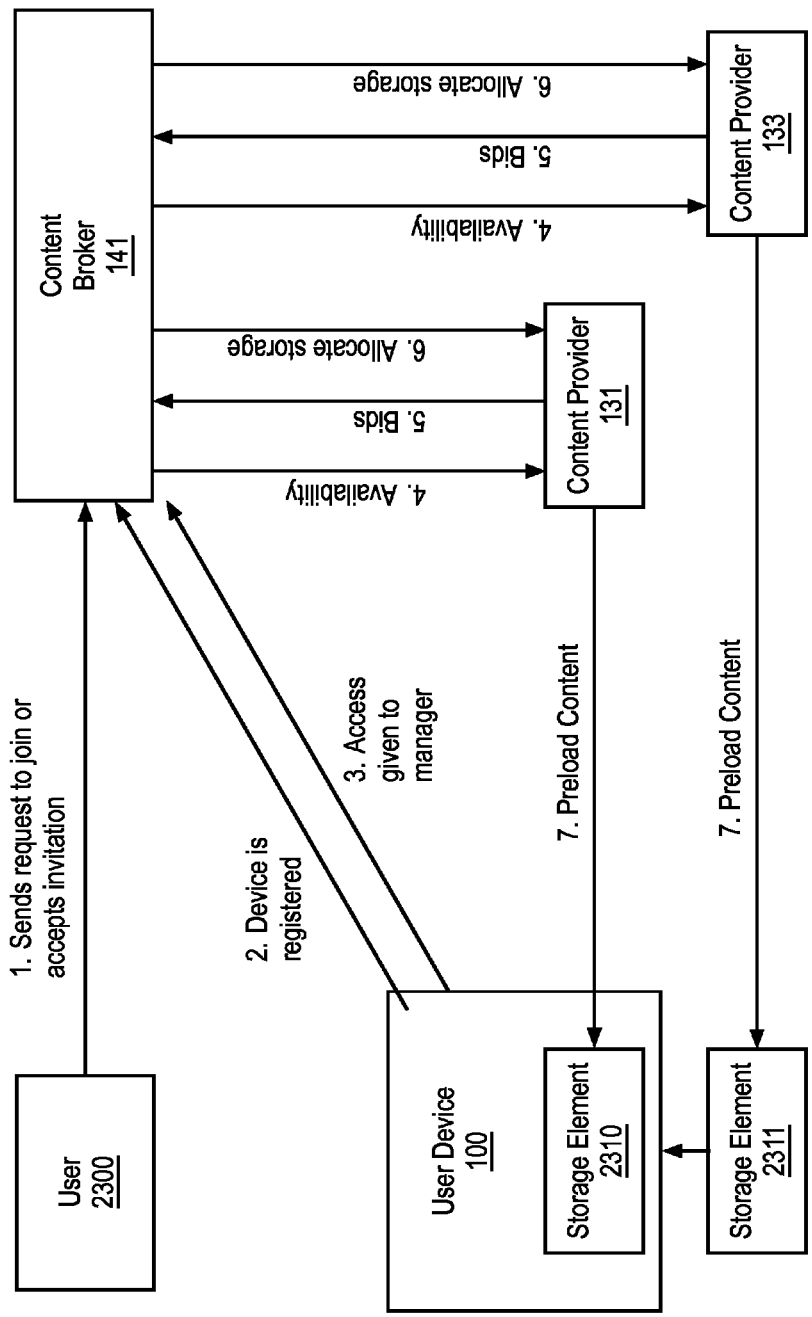
FIG. 23A includes a list of steps for assisting preloading of content in accordance with some embodiments.

FIG. 23A includes a list of steps for assisting preloading of content in accordance with some embodiments. A first step may include sending a request to join the content distribution system from a user 2300 to a content broker 141. A prior step may include the content broker 141 inviting the user 2300 to join the content distribution system. A second step may include registering one or more user devices 100 or one or more storage elements 2310 and 2311 associated with user 2300 with the content broker 141. A third step may include giving access to the content broker 141 to the user devices and storage elements (devices) 100, 2310, 2311. An additional optional step may include installing software or apps on one or more of devices 100, 2310, 2311. A content broker 141 may be in communication with one or more content providers 131 and 133. A fourth step may include the content broker 141 providing availability of user 2300, user device 100, storage element 2310, storage element 2311 to the content provider 131 or 133. The availability information may include one or more parameters that may be relevant for value metric preloading decisions. A fifth step may include the one or more content providers 131, 133 bidding for storage element allocation to content broker 141. A 6th step may include content broker 141 allocating storage within storage elements 2310 and 2311 to content provider 131 and content provider 133. In some embodiments, content provider 131 may have bid a larger amount or offer more valuable content to the user, resulting on allocation to preload content onto the storage element 2310 internal to the device (for example, and content provider 131 being allocated external storage element 2311 associated with user device 100). Many other valuable embodiments related to FIG. 23A may be derived. In some embodiments, some steps may be eliminated, some steps may be combined, some steps may be performed in a different order, or additional steps may be added. In some embodiments, some or all of content broker 141 functionality may be included within the content provider 131. There may be a single content provider 131. The fifth step may be eliminated if the content broker 141 functionality is included within content provider 131. External storage element 2311 may be internal to a second user device associated with the user 2300 (for example, a home gateway or home PC). In addition a content provider or content broker may give instructions to storage element to delete or move previously preloaded content.

Figure 23B:
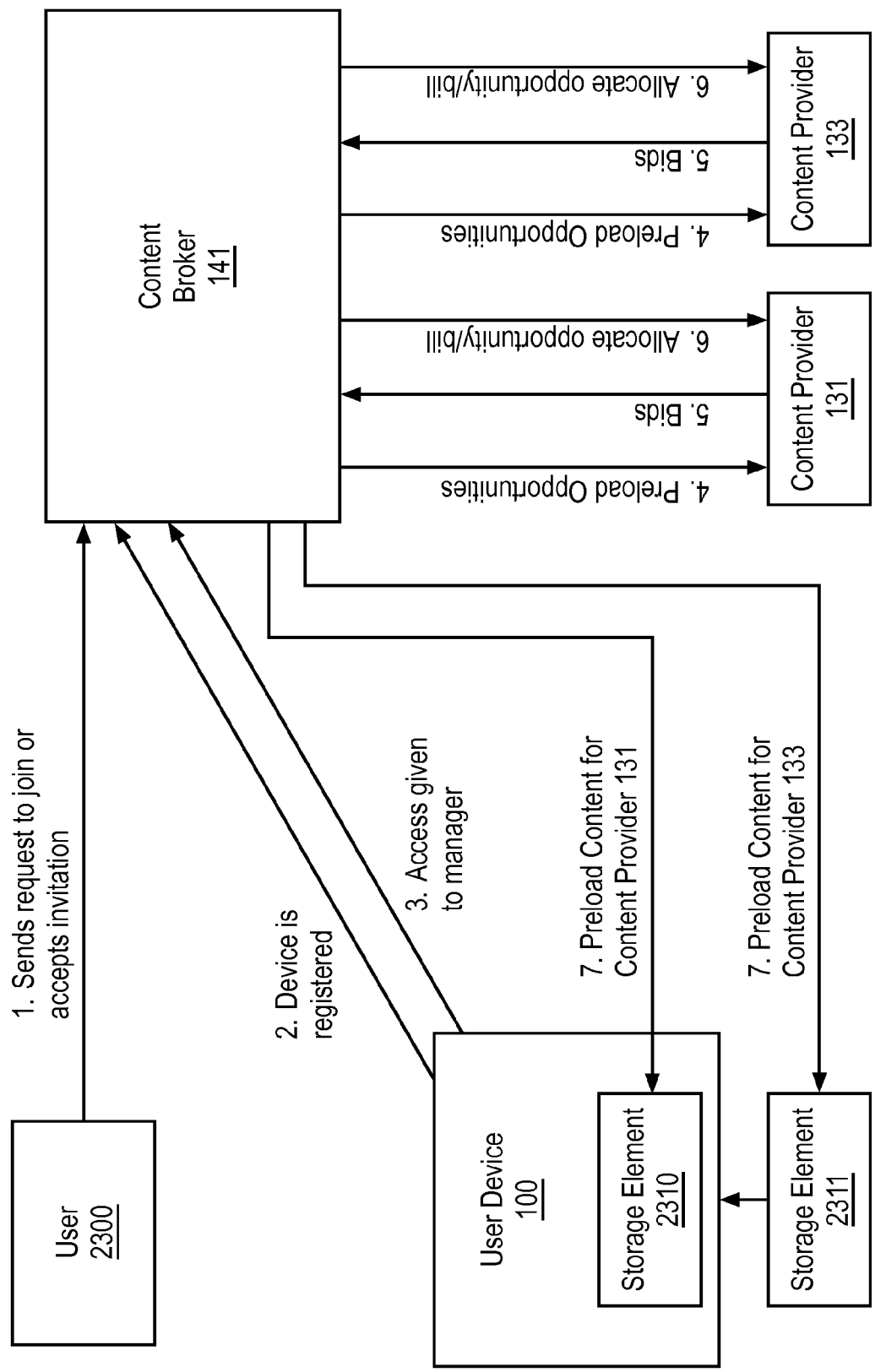
FIG. 23B includes a list of steps for assisting preloading of content in accordance with some embodiments.

FIG. 23B includes a list of steps for assisting preloading of content in accordance with some embodiments. A first step may include sending a request to join the content distribution system from a user 2300 to a content broker 141. A prior step may include the content broker 141 inviting the user 2300 to join the content distribution system. A second step may include registering one or more user devices 100 associated with user 2300 or one or more storage elements 2310 and 2311 associated with user 2300 with the content broker 141. A third step may include giving access to the content broker 141 to the devices user device 100, storage element 2310, storage element 2311. An additional optional step may include installing software or apps on one or more of user devices and storage elements 100, 2310, 2311. In some embodiments, a content broker 141 may classify a plurality of users 2300, or a plurality of user devices 100, or a plurality storage elements 2310, 2311, etc., based on information or parameters associated to the population of users, user devices, storage elements, communication networks, etc., into preloading opportunities. In some embodiments, a content broker 141 may classify, wherein classifying comprises characterizing a plurality of users 2300, or a plurality of user devices 100, or a plurality storage elements 2310, 2311, etc., based on information or parameters associated to the population of users, user devices, storage elements, communication networks, etc., into preloading opportunities. In some embodiments, a content broker 141 may classify, wherein classifying comprises identifying a plurality of users 2300, or a plurality of user devices 100, or a plurality storage elements 2310, 2311, etc., based on information or parameters associated to the population of users, user devices, storage elements, communication networks, etc., into preloading opportunities. In some embodiments, a content broker 141 may classify, wherein classifying comprises ranking a plurality of users 2300, or a plurality of user devices 100, or a plurality storage elements 2310, 2311, etc., based on information or parameters associated to the population of users, user devices, storage elements, communication networks, etc., into preloading opportunities. In some embodiments, a content broker 141 may classify, wherein classifying comprises prioritizing a plurality of users 2300, or a plurality of user devices 100, or a plurality storage elements 2310, 2311, etc., based on information or parameters associated to the population of users, user devices, storage elements, communication networks, etc., into preloading opportunities. In some embodiments, a content broker 141 may classify, wherein classifying comprises organizing a plurality of users 2300, or a plurality of user devices 100, or a plurality storage elements 2310, 2311, etc., based on information or parameters associated to the population of users, user devices, storage elements, communication networks, etc., into preloading opportunities. In some embodiments, a content broker 141 may classify, wherein classifying comprises clustering a plurality of users 2300, or a plurality of user devices 100, or a plurality storage elements 2310, 2311, etc., based on information or parameters associated to the population of users, user devices, storage elements, communication networks, etc., into preloading opportunities.

The preloading opportunities may be one or more of subset of users, a subset of user devices, a subset of storage elements, a subset of communication networks, or a subset of a combination. For example, the preloading opportunity is a subset of smartphones with a specific set of software, or a subset of storage elements with more than X GB of available flash, or a subset of users with a specific demographic or state, or the preloading opportunity is a combination subset, such as females in a specific age group in a specific location with a specific phone model with a specific app installed, etc. An item in this system (for example, a specific user or a specific user device or a specific storage element, etch) is part of one of more storage preloading opportunities. When an item is part of one or more storage preloading opportunities it is offered at a variable price (wherein the term price may be used interchangeable with cost, for example, a cost to a buyer may be a price from a seller) to one or more content providers (or ad providers, etc.) depending on the preloading opportunity. For example, a particular user is a male, age group 25-45, is a soccer enthusiast, annual income 50,000-100,000, has a smartphone and a STB/DVR. If the target user is walking down an auto-mall street with his smartphone, a preloading opportunity is: the smartphone storage, 3G cellular network, the user is near car dealers, a user that could afford a car >20,000, etc. A second preloading opportunity is the STB/DVR, broadband network to his home, a soccer match and some soccer gear ads, etc. These two storage preloading opportunities associated with the target user is offered to one or more content providers (or ad providers, etc.) for bidding or at a set price. It may be beneficial to the content broker 141 to classify a plurality of users 2300, or a plurality of user devices 100, or a plurality storage elements 2310, 2311, etc., into storage preloading opportunities that are more valuable to content providers 131, 133.

The content broker is in communication with one or more content providers 131 and 133. A fourth step may include the content broker 141 providing preload opportunities for a subset of users 2300, user devices 100, storage elements 2310, 2311 to content provider 131 or 133. The preload opportunity information may include one or more parameters that may be relevant for preloading decisions. A fifth step may include the one or more content providers 131, 133 bidding for storage element preloading opportunities to content broker 141. A 6th step may include content broker 141 initiating preloading storage within storage elements 2310 and 2311 on behalf of content provider 131 or content provider 131. In some embodiments, content provider 131 may have bid a larger amount or offer more valuable content to the user, resulting on allocation to preload content onto the storage 2310 internal to the device (for example, and content provider 131 being allocated external storage element 2311 associated with user device 100). Many other valuable embodiments related to FIG. 23B may be derived. In some embodiments, some steps may be eliminated, some steps may be combined, some steps may be performed in a different order, and/or steps may be added. In some embodiments, some or all of content broker 141 functionality may be included within the content provider 131. There may be a single content provider 131. The fifth step may be eliminated if the content broker 141 functionality is included within content provider 131. External storage element 2311 may be internal to a second user device associated with the user 2300 (for example, a home gateway or home PC). In addition a content provider or content broker may give instructions to storage element to delete or move previously preloaded content.

In some embodiments, the content is split into portions during preloading. For security, a large portion may be preloaded (for example, scrambled/distorted/encrypted) onto a storage element to increase value metric, but a small portion may be streamed or downloaded only after purchase. The second portion may be downloaded real time (for example, streamed) as the content is consumed or the second portion may be a key to authorize content consumption, maybe after a payment or after authentication from the user or user device.

The content preloading may be split and stored into more than one storage element (for example, multi-resolution content with lower resolution on mobile device and higher resolution on gateway and combine).

The content preloading may be split over more than one communication network.

In some embodiments, over time and location as storage element moves over Communication Network or cost of Communication Network changes. In some embodiments, a larger portion is preloaded over a low cost Communication Network and a smaller portion is preloaded over higher cost mobile Communication Network.

In some embodiments, the content distribution system (which could, for example, be part of the storage manager) obtains Communication Network parameters (for example, speed/performance/QoS) and Communication Network service plans (for example, unlimited/capped/free/changes in rate vs. time/day) and Communication Network usage vs. service plan (for example, to date communication network data plan usage vs. caps vs. days remaining in billing cycle) and Communication Network usage prediction information (for example, likely to go over data cap or not).

In some embodiments, the elements carrying out the preloading are aware of other Communication Network usage by other applications to avoid slowing down other tasks.

Content Broker Embodiments at User Entity

In some embodiments, user entities comprises devices local to a user or controlled or owned by a user, such as user devices (for example, PC, TV, smartphone, tables, etc.) or storage elements (for example, set top boxes, home gateways, network or direct attached storage, or user devices with storage, etc.

In some embodiments the user entity classifies available storage. In some embodiments the user entity obtains user input for preferences relative to allocating storage to dedicate for preloading content service. In some embodiments a user may connect to a network entity to specify user preferences relative to allocating storage (or alternatively content preferences, communication network preferences, service plans, etc.). In some embodiments a user entity obtains user content preloading preferences and uses this information to allocate available storage on device to content types and/or content providers. In some embodiments a user entity receives one or more of user preferences, user selections relative to a plurality of content providers or a plurality of content types, or a plurality of content offers for one or more content type or source, a percentage of content offers for one or more content type or for one or more content source. In some embodiments a user entity presents information associated with one or more of the percentage for one or more of content types, with the percentage for one or more content providers, with the percentage of one or more content offers. In some embodiments a user entity offers a user at least partial control over the allocation and percentages of content type or content source preloaded. In some embodiments a network entity has at least partial control over the allocation and percentages of content type or content source preloaded. In some embodiments a user entity received users preferences for initial content preloading and are further refined or modified based on analyzing user actions, states, location, purchase patterns or behavior, other behaviors. In some embodiments user interactions with the content at the user entity are also used, such as rental vs. purchase, selecting vs. previewing vs. consuming, etc. In some embodiments, a user entity receives preferences from a user about methods to present (for example, display) preloaded content information (for example, preloaded content offers, or availability, or priority, or type of content, or content provider to display in highest content offer discovery locations in UI, or type of content or content provider to display in a multitude of content offer areas, or type of content or content provider to display in a percentage of content offer positions). In some embodiments, a user entity classifies (for example, partitions, identifies, clusters, categorizes, ranks, sorts) content memory into a classified preloading opportunity based on one or more of candidate storage types (for example, based on content type or content provider), an amount of storage for each candidate storage element type (may be based on a number of items that can be stored), a user preference or demographic indication for each storage element type, a user likelihood to purchase indication or a user likelihood to view or act indication. In some embodiments a user entity gathers additional information about a user (for example, location, app preferences, time of day vs. activity, etc.). In some embodiments, a user entity sends classified preloading opportunity information to a network entity. In some embodiments, a user entity sends classified content opportunity information to a network entity. In some embodiments, a user entity stores preloaded content. In some embodiments, a user entity receives content indexed by location in content discovery UI (wherein content discovery enables or facilitates a user finding or locating preloaded content) that content preloading information or advertisements are to be placed in content discovery UI. In some embodiments, a user entity places advertisements in content discovery UI according to UI content partitions. In some embodiments, a user entity comprises one or more of: accepts user purchase inputs, conducts purchase transactions, gets unlock keys from network entity, unlocks content or makes available for consumption.

In some embodiments, a user entity classifies discovery or maintenance information, for example, user preference attribute discovery or changes based on ongoing activities.

In some embodiments, a user entity shares classification information to a content discovery function that classifies content display discovery priority (for example, placement of preloaded content information on UI, advertising for preloaded content) based on one or more of: how long content has been on device, how many times the content has been viewed, user preference, user preference changes, user activity characterization, changes in promotional value or promotional priority of content items. For at least embodiments, classify includes one or more of identify, rank, prioritize, select.

In some embodiments, a user entity assists on a content discovery classification that occurs on device, or assist on process updates to discovery information presentation priority to optimize presentation of discovery priority for preloaded content inventory on the device.

Content Broker Embodiments at Network Entity

In some embodiments, network entities comprise hardware or software in the network (or cloud), which are typically not local to a user and are controlled or owned by content providers, content brokers, Server Providers, Storage Providers, ad providers, etc. In some embodiments, these entities include servers, switches, routers, gateways, proxies, storage reservoirs, etc.

In some embodiments, a network entity obtains classified preloading opportunities. In some embodiments, a network entity transforms classified preloading opportunities into one or more preloading content inventory entries that characterize an aspect of a user or user entity for a content provider preloading opportunity value for one or more target preloaded content types or content items. In some embodiments, a network entity places preloading content inventory entries into an aggregate preloading content inventory. In some embodiments, a network entity classifies the aggregate preloading content inventory into content inventory partitions (wherein partition may comprise one o more of classification, clusters, subsets) that characterize a multitude of preloading content inventory entries associated with a preloading opportunity value metric. In some embodiments, a value metric may include one or more of demographic characterization for users, device type characterization, likelihood of purchasing content or content type or content item, user preference characterization, user activity characterization (for example, traveling, movie watcher, lots of spare time, frequents a location or area, etc.), characterization based on pre-determined content storage opportunity categories. In some embodiments, characterization comprises one or more of parametrization (for example, obtain parameters), clustering, partition, creating subsets, classifying, modeling, analyzing. In some embodiments, a value metric may comprise a bidder input (for example, limits, requirements, restrictions, demographics, compensation, content rules, promotions, etc.), for example, from a content provider or service provider or ad provider.

In some embodiments, a network entity offers content inventory partition commitments to content provider preloading opportunity commitment bidders, the commitment comprising a commitment to preload a content bundle on a certain number of user entities (for example, storage elements or user devices) that satisfy the preloading opportunity value metric for the content inventory partition.

In some embodiments, a network entity accepts one or more bidder content bundles comprising content items for one or more content inventory partitions.

In some embodiments, a network entity considers constraints on user entities (for example, content already stored on device that is not ready to be rolled, other content to be stored on device, storage available on device, storage available in intermediate reservoir, communication network parameters to device, communication network parameters to intermediate reservoir) and aggregates of one or more content bundles that have been committed to distribute, and determines a device population to match up to satisfy agreement to fulfill content inventory partition commitment.

In some embodiments, a content distribution system selects one or more of multiple classified preloading opportunities, preloading content inventory entries, aggregate preloading content inventories, discovery or presentation or advertisement of preloaded content, preloading content bundles commitments, device storage constraints is based on a value metric.

In some embodiments, a network entity assists in preloading the content bundle to device population.

In some embodiments, a network entity assists in one or more of discovery of preloaded content, presentation of information associated with preloaded content, process updates for preloaded content discovery optimization information to optimize display discovery priority for inventory on device, passes optimized discovery information to a user device so the user device can implement.

In some embodiments, a network entity collects updates from users or user entities on one or more of user parameters, preloaded content interactions (for example, views, purchases, etc.), user or user entity parameters (for example, a user can change storage allocations or required synchronization between user entity stored parameters and network entity stored parameters).

In some embodiments, a network entity may assist in processing purchase transactions or distribution of keys.

In some embodiments, in addition to bidding or alternatively to bidding, a content broker assists a content provider on selecting content and preloading content based on a revenue sharing between the content broker and content provider.

In some embodiments, inventory partition commitments are sorted, ranked, classified based on a value metric evaluated to benefit one or more of a user, a content provider, a content broker.

In some embodiments, inventory partition commitments are sorted, ranked, classified based on bid responses or offer responses. In some embodiments, the device population is optimized, grouped, classified, clustered, etc., based on available storage and user demographics to determine most lucrative content inventory partition commitments. In some embodiments, organizing (for example, optimizing or ranking or displaying) content discovery placement in a device population is based on both user priorities or preferences or restrictions and bidder value of placement.

In some embodiments, content advertising on a user device is organized according to both user priorities and bidder value of placement. In some embodiments, the content advertisements are organized (for example, optimizing) to satisfy advertising commitments (or simply charge for ads). In some embodiments, a future activity of user is determined and information of the future activity is used to classify the preloading opportunity for the user (for example, knowledge of the user going on vacation, going on trip, holiday coming up, weekend coming up, characterizing a time user typically views/purchases, etc.). In some embodiments, the user specifies a future location of the user and the user device. In some embodiments, the future location is based on location trace or side information. In some embodiments, user analytics are used to predict or estimate a future state/location of the user.

Preloaded Content

If content is preloaded onto a storage element associated with a user device, a number of processing operations is performed that isnefit the storage element, or a processor associated with the storage element or a user device.

In some embodiments, preloaded content is de-compressed for faster access (for example, a game or a software program/app) or to assist real time play back (for example, reduce processor workload or save battery power). In some embodiments, preloaded content is transcoded to a different format. In some embodiments, preloaded content is compressed if storage resources are at a premium. In some embodiments, a reservoir (home gateway, home set top box, POI storage, etc.) could receive a high quality version of a movie (for example, HD1080p) and generate lower quality versions in multiple formats (for example, tablets, notebooks, smartphones, etc.). Preloaded content may be deleted or moved. Preloaded content may be deleted or moved based on value metrics or value metric information associated with one or more entities.

Content Parameters

In some embodiments, a content may include a number of content parameters that could help select content to increase the value of the content preloaded onto storage elements associated to user devices. Content includes movies, sport events, shows, videos, photos, music, music videos, news, books, audio books, ring tones, games, software programs, software upgrade, software updates, apps, etc. In some embodiments, for movies, important content parameters are format, which could include multiple resolutions targeting multiple user devices of different size and quality, size of file, which determines how much communication network bandwidth will be consumed and time elapsed to download, playback duration, which determines how long the user may take to consume the movie, maximum downloading rate, which is related to size of file and duration, which could determine the communication network parameters for viewing in real time over an communication network, licensing cost, or cost to the content provider to an original source of the content, list price to end user, or any other parameters. For example, for a game content, important content parameters are format, which could include multiple resolutions targeting multiple user devices of different size and quality, size of file, which determines how much communication network bandwidth will be consumed and time elapsed to download, play-time statistics, which could help determine how much time the user may consume in the game, licensing cost, or cost to the content provider to an original source of the game, list price to end user, or any other parameters. For example, for a software program (or upgrade), important content parameters is format, which could include multiple user device hardware and software systems (for example, such as different versions of Windows or Mac IOS, processor type/speed, minimum RAM requirements, etc.) and resolutions targeting multiple user devices of different size and quality, size of file, which determines how much communication network bandwidth will be consumed and time elapsed to download, use-time statistics, which could help determine how much time the user may utilize the software, licensing cost, or cost to the content provider to an original source of the game, list price to end user, or any other parameters. In some embodiments, the content manager may have to trade off a tablet, 1GB, 2 hr, HD movie for $2.99 (25 percent margin) vs. a smartphone, 10 MB, SD game for $0.99 (50 percent margin) vs. a notebook, 100 MB, $50 (10 percent) software feature upgrade. Depending on these parameters and parameters described below the content manager could preload one or more of these content items.

Content Provider Information and Content Broker Information

In some embodiments, the content distribution system includes one or more content providers and one or more content brokers. In some embodiments, one or more content providers include one or more of means to access content (for example, websites, servers, etc.), software and hardware recommended for service, user devices supported (for example, mobile, portable, fixed, etc.), users supported (for example, business, consumer, etc.), communication networks supported (for example, mobile, broadband, etc.), information about service plans or subscription plans (for example, flat fees, pay per use, pre pay, post pay, specials, promotions, sponsored content), library of content, search engines for content, information about content, history of content, statistics of content, methods of distribution of content (for example, broadcast, multicast, unicast, on demand, pay-per-view (PPV), etc.), content manager business rules, for example, priority service offering or any other content provider information. In some embodiments, the content distribution system includes two or more content providers, and the user devices and POI devices may require replication of one or more storage manager or content manager functionality. In some embodiments, the content providers may agree to provide content with the help of a content broker. In some embodiments, the content providers agreeing to provide content with the help of a content broker results in a simplification for one or more users or the content providers as the one or more storage manager, content managers, user devices, POI devices and content is shared and avoid cumbersome or expensive or inefficient replications.

User Parameters

In some embodiments, user parameters assist in selecting preloaded content. Some examples of relevant user parameters for selection of preloaded content include user demographics, user preferences, user inputs, user history, etc.

To enhance the content manager operation, it may be advantageous to provide it with information relative to the user(s). In some embodiments, during service enrolment a user may input a portion of a list of preferences. In some embodiments, the user may input a portion of the list of preferences and update additional preferences at a later time. In some embodiments, one or more of the user preferences are updated (for example, refreshed) over time. In some embodiments, more than one user has access to the user device more than one input list of preferences may be helpful. FIG. 12 has an example of a user input table in accordance with some embodiments. In some embodiments, the user(s) may input for each user device preferences related to the content type (for example, ranked or graded/scaled, could include blocked content, parental control), content format, how much storage to reserve for content, if the device is used by a single or a list or a group of users. Also preferred locations where the device will be used and preferred communication network (for example, is ranked list, user device could have a exclusive list, preferred list, blocked list, etc.). The user may input information related to the various communication network data plans available. The user(s) may select to disable/enable storage manager or content manager features based on events or thresholds. In some embodiments, the user may choose to disable content preload if the battery power is below a threshold or not connected to an AC charging source or when the user is streaming movies. The user(s) may update the information over time.

In some embodiments, a content manager collects user content consumption history user parameters (for example, vs. time, location, device, Communication Network, etc.) in exchange of user input or in addition to user input to further assist the content manager. If there is more than one user, the content manager may collect consumption history separately for each user or classify the one or more users into groups for consumption history input collection. This may be more valuable at a POI access network (for example, coffee shop, grocery, etc.) where the target content consumer population is usually larger. In some embodiments, this information includes user content consumption/purchase vs. type/format/etc. vs. time/location consumed at the user devices. In some embodiments, this information includes updated usage or predicted usage of communication network data plans relative to cost/limits/etc. In some embodiments, this information includes responses from the user to content manager notifications. In some embodiments, the content manager may notice that a specific content has not been used for an amount of time larger than a threshold and notify the user and request a yes/no answer to whether this content may be deleted.

In some embodiments, the content manager obtains user current location user parameter or collect/estimate/predict future location (for example, work, home, business travel, airport, coffee shop) to determine what content to preload on the storage elements available to the user currently or in the future. The user may consume or purchase different content at different locations. In some embodiments, the content is preloaded on storage associated with the user device (for example, at the POI storage) associated with the location. If storage is limited at a user device internal storage, the storage and content managers may require to swap the content available as the user changes location.

In some embodiments, the user parameters include information about the past (for example, user content consumption history or location history/trace) or information about the present (for example, a user current location, a current list of preloaded content, a current list of storage elements available to a user device, etc.) or information about the future (for example, predicting future location based on location trace or location history, for example, predicting future location based on a calendar(s)chedule, etc.).

In addition to increasing value of content to the content distribution system, the content manager may preload content a user may require at the location (for example, pre-stored maps, traffic profiles or directions from the airport, POI information (for example, hotels, restaurants, taxis) in case there is no access network available. In addition, preloaded (rich) targeted advertisements is preloaded.

In some embodiments, the content manager collects user parameters such as current or collect/estimate/predict future leisure mode (for example, working, walking, eating, business or pleasure traveling, business meeting, etc.) to determine what content to preload on the storage elements available to the user.

In some embodiments, a user's parameters are collected without or independently of any user input or preferences. In some embodiments, a content manager preloads the content without any user individual selection of the content elements.

In some embodiments, the content manager collects user parameters such as content consumption or purchase behavior vs. time of day, day of week (for example, is coupled with location or leisure mode). A user may prefer to install software weekdays during the morning or watch movies at night or install apps on Sundays.

User Device Parameters

FIG. 2 shows an example of a user device, and FIG. 9 is a table that includes some information that could help the content manager in selecting valuable preloaded content in accordance with some embodiments. In some embodiments, information associated with processor 201 parameters is helpful deciding the format or version of a game to preload, the operating system installed on the storage 204 and/or RAM 202 may determine the software or software upgrade or software patch to preload, the one or more available modems (216, 215, 214, 113, 212) could help determine how or when or where to preload the content. In some embodiments, the parameters of the user interface (for example, display resolution and size) help determine what formats of content to preload. In some embodiments, the processor performance or video decoder software installed determine the compression format to preload for a movie. In addition, the list of users associated with the user device vs. time or location could help improve the value of the preloaded content.

Examples of user device parameters relevant to the content manager are device type (for example, mobile, portable, fixed), device usage location (for example, work, home, POI, etc.), shared or single user.

In some embodiments, the user device state is used as a user device parameter. Examples of device state include: current user(s) or future predicted user(s) associated with the device, device powered-up state, device connected to AC or battery powered, remaining battery power, current and predicted communication networks, congestion of the available networks, distributed storage status (for example, tiered storage currently associated with the user device), location of the device, etc. In some embodiments, the user device parameters are updated over time, wherein parameters is updated periodically, or based on interrupts, or based on event, etc.

POI Devices

In some embodiments, POI devices include storage elements and access devices that reside at POI to help provide content to users of user devices or storage elements associated to user devices. These include WLAN access points, gateways, reservoirs, etc. that could preload or download selected valuable content to be preloaded or downloaded to intended storage associated to user devices or directly to user devices. Example of POI are coffee shops, restaurants, airports, grocery stores, department stores, libraries, public buildings, parks, sporting venues, etc., where a plurality of users could congregate or associate with. POI devices typically serve multiple users or multiple user devices. In some embodiments, users have a group parameter (or characteristic) that helps predict what content to preload at the POI reservoir to avoid straining the shared access network connection from the POI devices to the content providers. In some embodiments, if an access point of a coffee shop has a single T1 backhaul (1.5 Mbps) it may not be able to support more than a couple of users streaming mobile device (for example, smartphone or tablet) quality video. The streaming content may be frequently stalling and buffering for all if more users join the POI access network. To help a POI content manager, relevant information could include POI access network parameters to user devices (for example, WiFi modem air interface supported—11a/b/g/n/ac), coverage area, statistics of data rates with user devices, current user parameters in coverage area, historical users parameters (for example, profile, history) in coverage area vs. time of day (for example, a coffee shop may have more business customers during the day, but more students at night), historical content consumed and purchased from the POI reservoir. Moreover communication network parameters from the POI device to the content provider could also be relevant (for example, bandwidth, cost structure, QoS, QoE, wired vs. wireless vs. mesh backhaul, etc.). In some embodiments, the POI device parameters are updated over time, wherein parameters is updated periodically, or based on interrupts, or based on event, etc.

Based on POI parameters above, a POI content manager, at a POI device (maybe vs time) can preload targeted/selected valuable content, as the plurality of users changes at the POI coverage area. In some embodiments, a POI content manager jointly controls several POI devices and select content accordingly as users may consume and purchase different content when at different POI device.

Communication Network Parameters

A user device or storage element could have access to many types of communication networks (home networks, access networks, broadband networks, cellular networks, POI networks, device bus, etc.), and each may include a number of communication network parameters or other information (for example, weights, functions, models, relationship between one of the previously described parameters, etc.) that could help increase the value of the content preloaded onto the storage elements. Communication network parameters could include customer satisfaction or QoE, value metric information could include content consumed or purchased relative to content cost or any content sponsoring/ads revenue and/or relative to connectivity or storage cost. The plurality of communication networks could have significantly different performance (for example, bandwidth, latency, jitter) and significantly different cost structure. Therefore knowledge of communication network parameters is a key element of a content or storage manager(s) content preloading algorithm/s. FIG. 10 lists some example communication/connectivity network parameters a user device or storage may have access to. Parameters may include speed or bandwidth or latency or jitter statistics (for example, typical/max/min/histograms/cumulative distribution functions (CDFs)). Communication network parameters may include cost structure. Cost structure could include set-up costs, cost per time period, unlimited usage or max usage or cap per time period, cost of usage above a threshold or cap. Cost structure could include whom pays for the usage, a user(s), a user device, one or more content providers, one or more sponsor, one or more ad provider, a content broker, ad broker, etc. A cost structure could include a storage manager from a content or ad provider sponsoring the communication network cost in exchange for storage allocation of content or ads. The user may pay for usage not related to content preloading or the content provider or content broker may pay for communication network usage related to the content preloaded. In some embodiments, the communication network information is updated over time, wherein parameters is updated periodically, or based on interrupts, or based on event, etc.

In some embodiments, the content manager notifies the user device if the desired content could not be delivered with adequate QoE given the communication network parameters or notifies about related preloaded content available or other content that is delivered with adequate QoE over the network. In some embodiments, the content manager notifies the user device if the desired content is not allowed by the communication network or if the user preferences indicate that the user has selected not to allowed the target communication network (for example, the user may be invited to overwrite the profile or make an exception). The content manager may also monitor the communication network data plan usage and alert of usage overruns or predicted overruns.

In some embodiments, the content manager notifies the user device if the desired content could not be delivered with adequate QoE given the communication network parameters or status and notifies the user can also purchase the desired content for pick up at a particular location or a future time (for example, home, or at the office).

Test Group Information

Some embodiments include obtaining information associated with the value metric for the content based on prior preloading of the content, and evaluating interaction with the preloaded content. For at least some embodiments, the evaluated interaction includes at least one of a purchase, a consumption, a selection, a clicking, a browsing, a searching, a placing in a cart.

Some embodiments include selecting a first plurality of storage elements, preloading at least a portion of the content onto the first plurality of storage elements, wherein the first plurality of storage elements are associated with a first plurality of user devices, and obtaining information associated with the value metric from the content preloaded onto the first plurality of storage elements. In some embodiments, the information associated with the value metric includes one or more of likelihood of consumption of the content preloaded onto the first plurality of storage elements, a cost associated with the of the content, a cost associated with the communication network. Further, some embodiments include selecting a second plurality of storage elements based on the information associated with the value metrics obtained from the content preloaded onto the first plurality of storage elements and the second plurality of storage elements, and preloading the content onto the second plurality of storage elements.

Communication networks, storage elements, user devices, user time/attention/money, etc. are valuable resources. Prior to preloading one or more content onto a large number of storage elements, it may be useful to obtain value information (parameters, metrics, functions, models, relationships) over a smaller population of storage elements or POI devices or users, etc. to avoid wasting system resources.

In some embodiments, to improve the value of the content distribution system, value metrics are derived for selecting preloaded content based on information about the users, information about the user devices, information about the storage elements, information about the communication networks, information about the content, information about the content providers, etc. The value of the content distribution system may improve if the appropriate content is preloaded onto storage elements near the appropriate users, associated to the appropriate user devices, utilizing the appropriate communication network, at the appropriate time, at the appropriate location, etc., so that the user could consume it. In some embodiments, the value metric is a function (is a model/table/ etc.) of one or more parameters. Each of the variables or parameters is tested independently, as a subset, or jointly, or any other combination, etc. In some embodiments, a test group is selected, and value metrics derived from the test group are obtained. In some embodiments, the test group is a content, a storage element type, a user device type and a set of users. The content could have multiple parameters, such as price, format, size, QoS parameters, etc. the content is preloaded onto a subset of storage elements associated with user devices associated to a user. In addition, the content could have content rules associated with the content that may enable or prevent the content from being preloaded to some users, etc. In some embodiments, the content selection, viewing, purchasing, interaction, etc., by the target users is monitored, processed, etc., to obtain or measure or estimate, etc., the value of the preloaded content. If the value of the content is desirable it is used to further preload the content onto other users with similar storage type or similar device type. In some embodiments, the set of users is selected randomly, based on demographic parameters, based on location, based on prior content consumption, etc. In some embodiments, the test group is a type of content, a storage type, a user device type and a set of users. Several content elements of the same type is preloaded targeting several user devices of the same type or a set of multiple users. The multiple users is selected randomly, or targeted based on special parameters, etc. The viewing, purchasing, consumption of the several content elements of the same type is jointly statistically processed to evaluate the value of multiple content elements of the same type when preloaded as a group. In some embodiments, the test group is several content elements, of different types (for example, movies, games, videos, etc.,) jointly preloaded onto multiple storage elements associated to multiple user devices associated to multiple users. The multiple users is the same users from a prior embodiment or a different set of users. The viewing, purchasing, consumption of the several content elements of different types is jointly statistically processed to evaluate the value of multiple diverse content elements. In some embodiments, the test group is a content, several storage elements classified by type, associated to user devices of a single type, associated to multiple users. The several storage elements classified by type is flash, SSD, HDD, etc., or is fixed (for example, PC, STB, etc.) versus mobile (for example, tablet, smart phone, etc.), etc. The viewing, purchasing, consumption of content preloaded onto the several storage types is evaluated. In some embodiments, the relative value metrics of fixed versus mobile storage is quantified. In some embodiments, the sensitivity to price is evaluated. The test group is a content or a family of content, a storage element type associated to user devices of a single type, and a subset of users. The subset of users be further divided into smaller subsets and content preloaded onto their associated storage at a different price for each subset of users. The viewing, purchasing, consumption of the same content at different prices is collected. Based on the profit, revenue, user uptake, etc. of each subset of users, value metric information for each different price is compared. The price may be tested at the few discrete points, so the value may be obtained only at these discrete points. In some embodiments the value of the content is extrapolated or interpolated at other price points based on the data collected from the tested price points. The preferred price point may be in between tested price points (for example, interpolation) or outside the set of tested price points (for example, extrapolation, etc.). In some embodiments, the value is evaluated over demographic categories (for example, age group, sex, occupation, education level, location, political affiliation, single/married, with/without children, participants of a specific social network, etc.). In some embodiments, a content or group of content, is preloaded onto a storage type associated to a user device type to a demographic category price of married women with children between 30 and 40. The value of the content is evaluated over a time span, which could assist on the decision whether to preload to a larger population of this demographic. In some embodiments, the value metric information is evaluated over time. In some embodiments, a test group may include a set of content, storage elements, user devices, target users, etc. and The value metric information generated by the test group is monitored at specific time intervals (for example, every hour, every day, every week, or any other time interval, etc.). In this manner, the value metric information generated by each time interval is evaluated or estimated, and the time the content is exposed to a set of users is selected. If the value metric information of a content after a time period drops below a threshold, it may be beneficial to delete the content, or exchange it for a different content with value metric above the threshold. Alternatively, instead of deleting the content it is placed on a lower priority menu, or a less visible ranking, display menu, etc. In some embodiments, the value metric information is evaluated over time of day. In some embodiments, a test group may include one or more of a set of content, storage, devices, target users, etc. The value metric information is evaluated over time intervals related to target user activities. In some embodiments, 6 AM to 8 AM for morning commute, 8 AM to 12 PM for morning work, 12 PM to 1 PM for lunch break, 1 PM to 6 PM for afternoon work and 6 PM to 11 PM for home/evening activities. The value metric information of the target content on the target storage on the target devices associated to the target users is evaluated for each of these time intervals. Based on the value metric information of the target content relative to other available content for each of these time intervals a decision to store, display, rank, delete, swap, the target content relative to other content is made to improve the value metric.

In some embodiments, value metric information of joint relationships between content are evaluated/obtained/estimated/etc. The joint relationships is correlations between content, sequences of content consumption, relative value between content, cannibalization between content, etc. In some embodiments, consumption of a specific content increases the likelihood of consumption of a second content, and therefore the value metric of the joint set of content may be higher than the value metric of each separately. In some embodiments, consuming a music video from a specific singer may increase the likelihood of consuming a second music video from the same singer. In some embodiments, consumption of a specific content may delay the likelihood of consumption of a second content. The value of the first content stand-alone may be high, but its effects on subsequent consumption of content may reduce the value metric of the combined content. In some embodiments, consuming an addictive videogame may delay the consumption of other videogames, or any other content.

In some embodiments, the information of the value metric of the presentation/display of information related to a content to a set of users is evaluated. The presentation is a pop-up, a banner, a bubble, a relative ranking, a special font, a special background, a preview, a sample, etc. or any other method to highlight the target content relative to other content.

In some embodiments, information about the value metric is estimated relative to repeat consumption. In some embodiments, information about the value metric of several subscription plans is evaluated. In some embodiments, information about the value metric is estimated based on user intent, viewing, zooming, selection, previewing, etc.

In some embodiments, the value metric information measured from the test group is refined (for example, normalized, reduced, increased, scaled, etc.) to correct for test group/market errors or biases. The refinement may be based on prior test experiments.

In some embodiments, value metric information of content business rules are tested/obtained/etc. The content business rules may include coupons, specials, temporary promotions, discounts, free trials, free with ads, etc.

In some embodiments, the content business rules are modified or refined based on the value metric information from the original business rules.

In some embodiments, the value metric information is evaluated relative to a location. The location is a POI. The location is a POI type. The location is a home network. The location is a work network.

In some embodiments, the value metric information is measured relative to content format (for example, mobile, HD, SD, 1080p, 720p, etc.).

In some embodiments, the value metric information is evaluated by testing several previously described parameters simultaneously. The information collected from testing several parameters simultaneously is used to generate a multidimensional model of the value relative to the several parameters. The multidimensional model of the value could reveal combinations of parameters that result in increased value that may not be apparent by evaluating each parameter independently. In some embodiments, the model is a Bayesian belief network model, Bayesian statistics, Bayesian analysis, hidden Markov models, etc.

In some embodiments, obtaining the value metric information associated with a test group includes one or more of the following steps: designing the test, executing the test to generate data, preparing the data, importing the data, preparing the data for modeling, specifying factors manually or discovering factors automatically, creating factors, interpreting the model, applying the model for prediction, etc.

In some embodiments, the measured/estimated/modeled/etc. value metric information is shared with the storage manager, content manager, content provider, content broker, etc. to further evaluating the value metric for future content preload selection or content business rules or storage element or user device, users, etc. to be targeted.

In some embodiments, a subset of the value metric information relative to the user consumption of the content is shared. A subset may result in less chatter over the communication network, improved privacy to the user, etc. the subset of the information may be different depending on the destination. In some embodiments, a content manager located at the user device may have more information than a content manager at a content broker server, which may have more information than a content manager at a content provider server, etc.

In some embodiments, the value metric information is estimated based on monitoring user interaction with content, for example, browsing, search, viewing, zooming, selecting, choosing, purchasing, ordering, cart insert, experiencing, repetitions over time, etc.

In some embodiments, the value metric information is obtained for content preloaded may be (rich) ads or include ads.

In some embodiments, the test group is user centric (where centric is based on, focused on, biased towards or from the perspective of, etc.), or user device centric, or storage element centric, or home network centric, or POI centric, or product/content centric, or content provider, or content broker centric, or service provider centric, etc.

In some embodiments, the test group is changed adaptively or iteratively.

In some embodiments, alarms or notifications are generated based on the value metric information observed during the test group evaluation.

In some embodiments, the efficiency of a content distribution system is improved by selecting one or more subsets of users or user devices or POI locations, etc., and providing associated storage elements with preloaded content. In some embodiments, the content manager(s) monitor the statistical consumption and purchase behavior (for example, uptake rate) of the one or more subsets and decide what content to preload to larger populations of users or user devices or POI locations, etc. This reduces preloading content that may consume/waste storage space or communication network bandwidth with content that is not valuable. In some embodiments, from a population of 10,000 coffee shops in a system, the POI of the reservoir of 100 (or one percent) of these is preloaded with a specific content at a specific price. Based on the user consumption or purchase a decision to preload to the remaining 99 percent coffee shops is determined. In some embodiments, price elasticity is determined. In some embodiments, three percent of the POI reservoirs is preloaded with a specific content with each of three subgroups of one percent priced at low, medium, high levels. The statistical value metric of these three subgroups (for example, "uptake times (price–cost)") is used to price the remaining 97 percent of the POI. In a different embodiment, user devices are classified by type (for example, smartphone, table, notebook) and a target content is preloaded onto 100 instances of each type. Consumption or purchase statistics or other value metric information are collected per group and used by the content manager for future content preloading. In a different embodiment, users are classified by income (for example, <$30K, >=$30K) and a target content is preloaded onto 100 users of each type. Consumption or purchase statistics are collected per group and used by the content manager for future content preloading. Test market/group value metric information is further collected per user demographics (for example, age group, sex, occupation, leisure status), per time of day, per day of week, per communication network, per POI, per content provider, per content type, per content format or any other parameter of the user, user device, storage element, location, time, content, communication network, etc. and folded back into content manager value metric or profitability analysis for future content preloading.

In some embodiments, the statistical information is managed by a content broker. In some embodiments, the statistical information from the test market is shared with the content providers. In some embodiments, the statistical demographic, price elasticity, etc. data is used by the content provider for improved pricing or improved uptake, or improved targeted content or targeted ads to the appropriate demographics, etc.

User Device Associated Storage

At a given location and time the user device could have one or more associated storage elements. In some embodiments, the storage manager discovers and/or updates the available associated storage automatically or with help from the user device or user, etc. The storage elements available to the user device could include local storage on the user device, or storage that is accessed over communication networks, such as home gateways, POI reservoirs, etc. In some embodiments, these storage elements are classified into tiers, based on the communication distance (for example, latency, bandwidth) and storage parameters (for example, size, available space, access type—HDD, SSD, flash) to the user device. In some embodiments, the content manager assigns different content amounts or types or sizes into different tiers automatically. The user may have a better content QoE by streaming from a POI reservoir from a nearby gateway with preloaded content over a faster local communication network without having to access a slower and more costly cellular mobile access network. The user may not need to pre-select content and could have instant availability without any planning needed. Content can be sent directly to each tier.

In some embodiments, content for a gateway is chosen based on multiple user devices that may be near gateway. Stored content at the tier that is easiest for the user to get to (for example, based on location, time, user device consumption) can be designated as nearest to the gateway. Typically lower storage tiers have more storage capacity and are less portable than mobile devices.

Notifications

In some embodiments, notifications are presented to the user at a user device interface by one or more storage managers or content managers or device software or device agents or device applications at the user device, or at storage element, or home network device, or POI device, or content provider server, or content broker server, etc. In some embodiments, notification includes content information (for example, content lists, types, format, price, availability, rules, etc.), updated content information, new content, stale content, specials, communication network status, communication network updates, associated storage, tier storage, etc. Notification can be presented based on when content file has been stored. A notification can also be presented based on location or time of day when a particular content has been preloaded. In some embodiments, a notification is: "I noticed you are at the airport, here is some content that is available at your device." Notification messages may be informative (for example, a list of content and price) or may require user responses or actions (for example: "content A has not been consumed in 7 days, do you want to delete?"). Notifications may include new preloading services or features, upgrades in service, status of service plan, etc. Notifications may include information to improve the preloading service (for example, update preferences, permission to share parameters associated with the user, survey responses, etc.). Notification messages may include updates on communication network state (for example, available/marginal/out-of-coverage, entering new network, exiting network, etc.) that may influence content preloading services (for example, preloading service availability, cost of preloading new content or consuming existing or future content, content availability, etc.). Notification requests may include inquiries for future state of a user of the service (for example, future location, future activities, future leisure mode, etc.)

Value Metric

In some embodiments, a value metric is defined as a value of a function or model or state machine, etc., that comprises one or more of a user parameter, a user device parameter (hardware, software, etc.), associated storage element parameters, a communication network that may be used in selecting valuable content to be preloaded. The value metric may include a cost or price parameter. In some embodiments, a value metric function for a Content_A, may be: (if available storage>X GB)*(user device processor performance>Y)*(user likelihood consumption)*(price of Content_A), where '*' is the multiplication operation.

In some embodiments, the value metric includes information associated with other content available on the storage element. In some embodiments, the cost parameter of the value metric includes information associated with at least one of a communication network assisting in the preloading of the content, the storage element. In some embodiments, the cost parameter includes information associated with at least one of a communication network assisting in presenting the content at a user device.

Some embodiments include determining an association of the storage element with a plurality of user devices, and wherein the value metric is based on the plurality of user devices or a plurality of users associated with the plurality of user devices.

In some embodiments, the value metric comprises at least one parameter, wherein at least one of the parameters provides an estimate of a likelihood that one or more users associated with the storage element will consume the content.

In some embodiments, the value metric includes a function or model of one or more value metric parameters, wherein a selection of the function or model or selection of the one or more value metric parameters is based on the service provider's perspective, wherein the service provider comprises at least one of a content broker or a content provider. In some embodiments, the selection of the function or model or selection of the one or more value metric parameters is based on a user's perspective.

In some embodiments, the value metric further includes a parameter associated with one or more of the plurality of content. In some embodiments, the parameter can be related to projected profit associated with each of the plurality of content. In some embodiments, the parameter associated with one of more of a plurality of content includes at least one of a content cost, a content size, a content type, a content format, and/or content software or hardware requirements for content playback.

In some embodiments, the value metric includes a parameter associated with the storage element. In some embodiments, the parameter associated with the storage element comprises at least one of a storage element cost, a storage element opportunity cost, a storage element size, an available storage element size, a storage element type, a storage element access speed, a storage element latency, a storage element throughput, a communication network parameter of the storage.

In some embodiments, the value metric includes a parameter associated with the communication network. The value metric includes a parameter associated with the communication network and are described under value metric sections, and may include availability, performance, cost, quotas, caps, etc.

Embodiments further include actions taken based on the value metric. For example, some embodiments include assisting in deleting of at least a portion of a second content available on the storage element. In some embodiments, the at least a portion of the second content to delete is selected based on a second value metric. In some embodiments, at least a portion of a second content available on the storage element is moved to a second storage element associated with a user or user device.

Value metric information (for example, parameters, weights, etc.) may be obtained from virtual or real world sources. In some embodiments, value metric information is obtained from a user's user device activity (for browsing history, content interaction history, etc.) or information of the user available on the internet (public or private sources, etc.) or information of the virtual or real world social networks associated with a user (for example, value metric information of siblings, value metrics of coworkers/classmates, or value metric information of virtual friends, etc.)

In some embodiments, value metric information is gathered locally at a user device, or remotely at a POI device or network entity server, etc. The value metric information may be gathered at a single location or gathered at multiple locations. Value metrics may be obtained at a single location or obtained at multiple locations. Multiple value metrics may be combined at a single location. A content selection for preloading may involve computing more than one value metric by one or more entities. In some embodiments a network element—for example, a content broker server—may compute a value metric based on value metric information from a user device and a content provider for selecting a content to be preloaded to the user device. The user device may compute a second value metric based on a user parameter. The joint or combined value metric may be utilized for a decision to preload or not a content. The first value metric may be used to preload the content, and the second value metric may be used to make decisions to delete or move the content from the user device, etc.

It may be beneficial to select content to preload based on value metrics. Value metrics may be obtained from a value metric function or model and may include one or more value metric parameters, one or more weights or one or more relationships between the value metric parameters, resulting in different interpretation/goals/priorities/etc. of the value metric. Value metric is in one or more units of $, $/user, $/time, user satisfaction, $/GB, $/POI, (number of users)>($Threshold),$/(Communication Network), etc. where $ is any currency or monetary or financial unit.

In some embodiments, a value metric is a single value or a vector (multiple values). In some embodiments, a value metric is associated to a single content or a group/plurality of content.

In a content distribution system that includes one or more of users, user devices, storage elements, communication networks, content, content providers, content brokers, the user devices, the storage elements, the content or the communication networks may be valuable resources that the users, content brokers and content providers may like to exploit, by preloading appropriate content on appropriate storage elements over appropriate communication networks. To improve the value of the content distribution system, one or more parties may assign value to the elements of the content distribution system with value metrics. In some embodiments, a value metric is based on a single parameter or is derived as a combination of parameters.

A content manager may include improving the value metric of the content that is preloaded onto one or more storage elements associated to one or more user devices that one or more users may consume or purchase or selection of content based on value metric. The content manager may use one or more parameters associated with a user, a user devices, a storage, a communication network, a content providers, a content brokers, etc. as described above. In some embodiments, a value metric is one or more of the current value, future value, expected value, minimum value, maximum value, threshold value, percentile value, etc. In some embodiments, the value metric comprises one or more of increasing/improving/enhancing: user satisfaction, user QoE, user experience, user mobility, user attach rate, user feedback, user purchase rate, user uptake, user loyalty, number of users, user growth, user referrals, etc. The value metric could comprise one or more of reduce cost, reduce user device cost, reduce communication network cost, reduce content cost, reducing storage usage, etc. The value metric could comprise increase revenue, increase content revenue, increase user revenue, increase profit, increase profit margin, increase revenue growth, increase battery life, increase number of patrons into a POI establishment, increase number of ads consumed, increase number of ads clicked, etc. The value metric may apply to one or more users, one or more user devices, one or more communication network providers, one or more POI, one or more content providers, one or more ad content providers, one or more content brokers, etc. The value metric may apply to one or more elements of an entity or one or more elements of multiple entities simultaneously. The value metric target is different for each entity or element of an entity (for example, the value metric is user satisfaction for user A, cost/month for user B, number of patrons for POI A, number of users for content provider A, total revenue for content provider B and profit/user for content broker A, etc.).

In some embodiments, the value metric comprises a computation based on a single content or a group of content or on all the content on one or more storage elements associated to the user device. A group of content is a several content of a given type (for example, movies or games, standard definition (SD) or HD, etc.), or several content of a given price, or several content on the same storage element, etc. The value metric of a group could change over time or over location. In some embodiments the value metric of a group is HD movies on home reservoir 124 when user device is within coverage area of home network 116, but is HD movies in POI reservoir 121 when user device 100 is within coverage area of a coffee shop with POI access network 112. Similarly all the content associated to the user device could change over time and location.

In some embodiments the value metric of a group of content 1 through N is represented as: VM_for_Content_1:N=VM(Content_1, ..., Content_N, UP, UDP, SEP, CNP, ...); where UP, UDP, SEP, CNP represent user parameters, user device parameters, storage parameters, communication network parameters. In this notation the value metric of a single content_N+1 would be VM_for_Content_N+1=VM (Content_N+1, UP, UDP, SEP, CNP, ...).

The effects of adding the content N+1 to an existing storage element with content 1 to N would be represented as: Incremental_VM_for_adding_Content_N+1=VM_for_Content_1:N+1−VM_for_Content_1:N.

The effects of deleting the content N to an existing storage element with content 1 to N would be represented as: Incremental_VM_for_deleting_Content_N=VM_for_Content_1:N−1−VM_for_Content_1:N.

In some embodiments, these incremental value metrics for adding or deleting content are used to increase the value of preloaded content when storage space is available or for deleting preloaded content when storage space is low or for swapping low value content for new content that may be more valuable. In some embodiments, the expressions for adding and deleting are used simultaneously for swapping content. In some embodiments, these expressions are extended for adding (or deleting or swapping) groups of content. In some embodiments, these expressions are used for sorting content to be preloaded (or deleted or swapped).

In some embodiments, the value metric for additional content considered for preload is computed relative to one or more content previously preloaded on the storage associated to the user device. An associated storage element may be full, in which case deleting/moving/swapping of previously preloaded content may be required to preload new content, or may have available storage. In both cases the new content may affect the value metrics parameters (for example, likelihood to consume) of previously preloaded content. The previously preloaded content may be moved to a different storage element associated to the user device. In some embodiments user device 100 may be at within home network 116 and about to leave to go to work network 112, if a content resulting in higher valuable metric is identified to be preloaded onto the local storage for user device 100 over home network 116, a content with lower valuable metric may be moved to home reservoir 124 over home network 116 for a later consumption. This may save communication network cost.

In some embodiments, the value metric for a additional group of content may be considered for preload and is computed relative/jointly to one or more content previously preloaded on the storage associated to the user device. An associated storage element may be full, in which case deleting/moving/swapping of previously preloaded content may be required to preload new group of content, or may have available storage. In both cases the new group of content may affect the value metrics parameters (for example, likelihood to consume) of previously preloaded content. A subset of the previously preloaded content may be moved to a different storage element associated to the user device. In some embodiments user device 100 may be at within home network 116 and about to leave to go to work network 112, if a group of content resulting in higher valuable metric is identified to be preloaded onto the local storage for user device 100 over home network 116, a content with lower valuable metric may be moved to home reservoir 124 over home network 116 for a later consumption. This may save communication network cost.

Previously preloaded content may be re-distributed over storage elements associated with user device 100 to improve value metrics. In some embodiments content in the local storage of user device 100 is moved to home reservoir 124 or content on home reservoir 124 is moved to the local storage of user device 100 when user device 100 is within the coverage area of home network 116. In some embodiments content that may be more valuable at work may be moved to the home gateway when user device gets home in the evening in exchange for content that may be more valuable when the user device 100 is at home. The reverse operation is performed the following morning prior to user device 100 going to work.

In some embodiments, previously preloaded content is deleted to improve value metrics associated to the remaining previously preloaded content. In some embodiments low value metric content may be deleted from user device 100 to increase the likelihood of consuming more rewarding higher value metric content.

The value metric function used to compute value metrics may change over time, or location, or communication network, etc. In some embodiments the value metric function that assigns more weight to likelihood of consumption of a user associated to user device 100 prior to a long flight will encourage preloading content with higher likelihood of consumption so that the user is not disappointed without any entertainment when out of communication network connection. In some embodiments the value metric function assigns more weight to cost reduction when the user associated to user device 100 is at home during the weekend when other entertainment choices may be available.

The value metric function may be different for each user or each user device, or each storage element associated to each user device. In some embodiments a user associated with user device 100 with an unlimited content flat fee monthly plan may prefer a value metric function that assigns more weight to hours of content consumption per month. In some embodiments a storage element associated with a user device 100 with very large available storage may have a very small weight for storage cost value metric parameter, but the local storage in user device 100 may be limited and require a large weight to storage usage in the value metric function.

Improving a value metric could include one or more of optimization, maximization, minimization, maxmin (maximizing the minimum value), minmax (minimizing the maximum value), maximizing a percentile, maximizing or optimizing an expected value, etc.

A value metric may apply to one or more of a user, a plurality of users, a content provider, an ad provider, an ad service provider, ad broker, a content broker, an communication network provider, etc.

The value metric is associated with storage elements, content elements, user devices, POI storage elements, etc.

Value Metrics Associated to a User Device

Value metrics associated to a user device are those that include one or more of value metric parameters, value metric parameter relationships, value metric parameter weights, value metric functions of models that are intended to benefit a user device, or from the point of view or perspective of a user device, etc.

Figure 14:
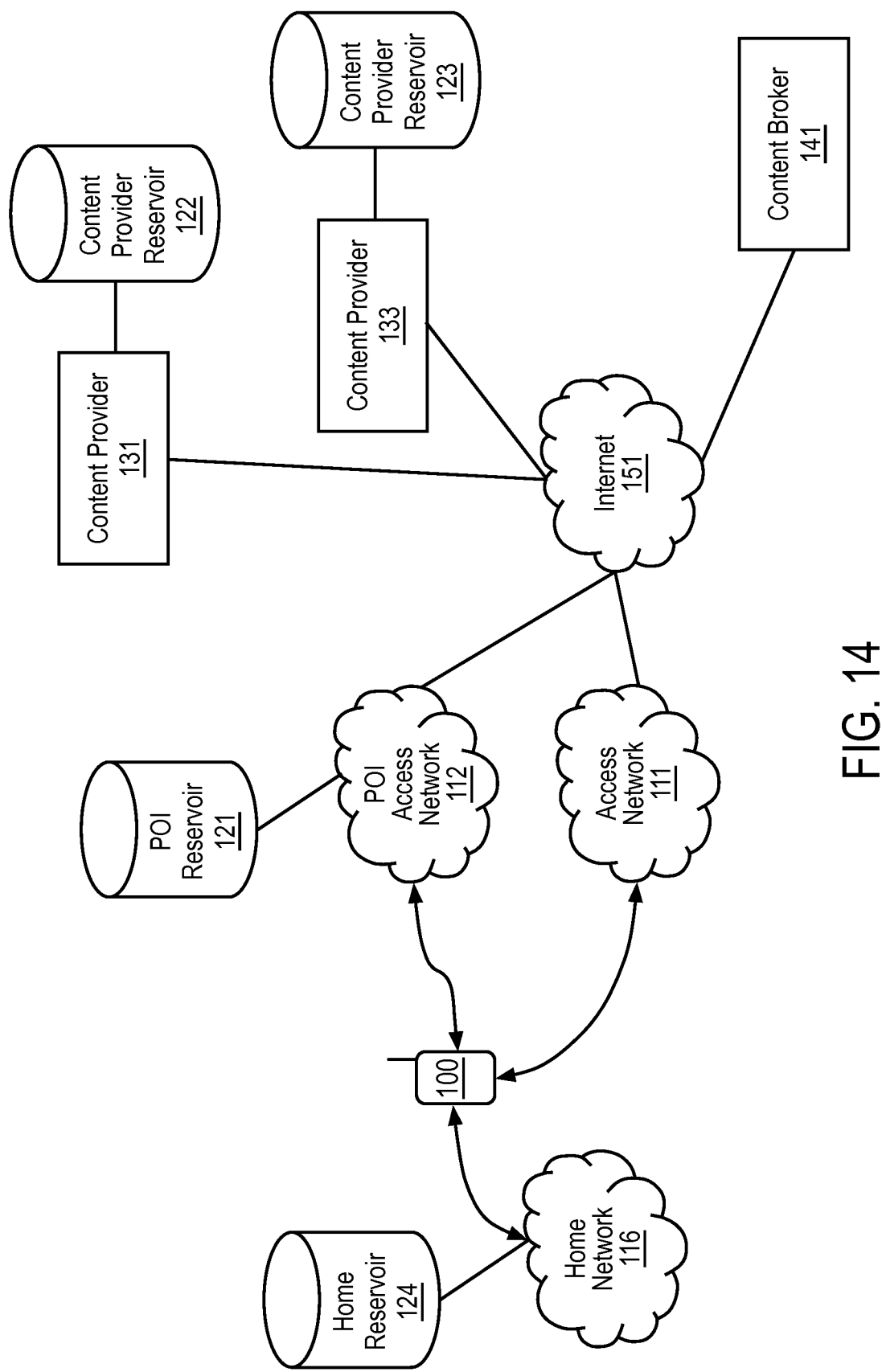
FIG. 14 shows a preloading system in accordance with some embodiments.

FIG. 14 shows a preloading system in accordance with some embodiments. In some embodiments, the value metric is associated with a user device 100 in FIG. 14 associated to a single user. User device 100, is connected to home network 116 (for example, a WiFi) or is connected to network 111 (for example, 2G/3G/4G) or is connected to network 112 (for example, a work WiFi or coffee shop WiFi). User device 100, when at home could access home reservoir 124 or content provider reservoirs 123 or 122, when at work could access POI reservoir 121 or content provider reservoir 122 or 123. When connected to access network 111, the user device could access content provider reservoirs 122 or 123. FIG. 15 is a table that includes a sample list of content at home reservoir 124 in accordance with some embodiments. In some embodiments, the content includes the following parameters: name, ID number, type, format, size, duration, list price, etc. the content included in the home reservoir could have more or less content or additional parameters or less parameters. FIG. 16 is a table that includes a sample list of content and parameters at POI reservoir 121 in accordance with some embodiments. FIG. 17 includes a sample list of content and parameters at content provider reservoir 122 in accordance with some embodiments. FIG. 18 is a table that includes value metric information associated to a user to obtain value metric for selecting content to be preloaded onto user device 100 in accordance with some embodiments. The value metric parameters included are: type, format, size, duration, price to user, specials or promotions, sponsor service ad revenue, communication network cost, user storage costs, user likelihood to consume, value metric. In some embodiments, a subset of the value metric parameters may be used, or additional value metric parameters may be used. The type parameter may be used to match with a user input profile selection or a user history profile or a parental control, etc. The format parameter may be used to match the content with the user device hardware or software capability (for example, processor speed, video decoder software installed, etc.) or it may be used to match a user desire (for example, SD versus HD, etc.). The size parameter may be used to estimate the communication network costs or to compare relative to the available storage or to compare relative to the user storage cost, etc. the duration parameter may be used to estimate a time a user may spend to consume the content or the communication network speed or bandwidth requirements (when normalized by size, etc.), etc. The price to user parameter may be used for billing, to estimate the likelihood the user will consume the content, to estimate the total cost of the content of the user, etc. The specials or promotions parameter may be used to entice the user or to reduce the cost, etc. The sponsored service or ad revenue parameter may be used to subsidize or reduce the cost of the content to the user, etc. The communication network cost includes and estimate of the cost of preloading the content to the user device over a given communication network, etc. the user storage cost parameter is used to estimate the total cost of the content or is used as a tax to the content provider for preloading content or is an opportunity cost of the storage element, etc. the user likelihood to consume parameter estimates the likelihood a user will consume the content. The likelihood of consuming a content is affected by other content present at the device, the user location, time of day, leisure status of user, aging of content, previous consumption of content, etc. A value metric can be computed from a weighted combination of one or more of the value metric parameters. Additional value metric parameters may be included.

Value metric parameters may change as the user device changes location or over time, etc. In some embodiments the communication network cost of Movie A in FIG. 18 is 0 when the user device is in the coverage area of its home network, but is really costly when the communication network is a roaming network. In some embodiments the user likelihood of watching a movie during business hours is low, but could increase during lunch hour or on the way home on public transportation. Alternatively, price to user, specials, promotions, sponsored services, could vary over time as the content providers or content brokers changed the business rules of the content.

In some embodiments the value metric is associated with the cost of the content consumption per unit of time. This value metric is obtained by adding the cost columns (for example, 1106, 1109, 1110, etc.), and subtracting the subsidies (for example, 1107, 1108) and normalizing by the amount of time the user could enjoy the content (for example: 1105). In some embodiments, the user is only responsible for paying the price to use if the content consumption is initiated or completed, but typically the communication network cost may be incurred if the content is preloaded whether the content is consumed or not. In this case it may be advantageous to penalize the communication network cost accordingly. In some embodiments the communication network cost may be normalized (for example, divided by) by the likelihood that the user will consume the content. In some embodiments if a content has a 20 percent chance of being consumed, the communication network cost is multiplied by 5 (=1/20 percent), since on the average a content with these parameters would require 5 preloads before being consumed. The user likelihood to consume parameter is a function of how long of a time window is computed over. For this case it may be advantageous to consider the time interval before the content will be deleted or swapped for a different content. In many instances normalizing the communication network cost by the user likelihood to consume will penalize preloading large content over expensive networks, which is not economically advantageous to the user. In some embodiments, the user of the user device, prepays for the storage associated to the user device as a one-time cost item and does not incur any costs per gigabyte per day. But if the user device preloads a large single item that fills up the storage the value of this content to the user may be low (for example, a single 16 GB game may fill up the flash of a tablet). Therefore methods to assign a cost to storage used by content may be advantageous. In some embodiments, the storage required by the content is normalized (for example, divided) by the available storage. In some embodiments, the storage required is normalized (for example, divided) by the likelihood to consume. In some embodiments the storage required by the content is normalized by both the available storage and the likelihood to consume the content. For example, if a user device has 10 GB of available storage, a 1 GB movie preloaded into this device will occupy 10 percent of the available storage. If this 1 GB movie has a 5 percent chance of being consumed on the average it will take approximately 20 content items with this profile for the user to consume one of them. The available storage will not support 20 content items with this profile, therefore this is may not be a valuable content. Therefore normalizing the storage required for a content by the available storage and the likelihood to consume is a valuable metric to select content to be preloaded. This value metric quantifies the effective footprint of this content relative to the available storage. Therefore content with a lower value would be preferred, and typically a value significantly lower than 1 would be advantageous. This value metric is compared to a threshold prior to preloading, or may be used to rank a plurality of content prior to preloading, or may be used as an opportunity cost relative to the previously preloaded content currently available at the storage element before making a decision to swap content, for example, if the storage is full.

In some embodiments, a content provider or a content broker or some other entity is willing to pay for access to the available storage at the user device. In some embodiments this entity may be willing to pay in units of dollar per gigabyte per day utilized or a flat fee for a predetermined number of gigabytes per month. This amount is used as a reference or an opportunity cost when making decisions to preload alternative content.

In some embodiments user device 100 may be a tablet with WiFi and cellular capability located within the coverage of both home network 116 and access network 111. Therefore the user device 100 could access to the content listed in FIG. 15 for home reservoir 124 or the content listed in FIG. 17 for content provider reservoir 122 or 123. In some embodiments the user of user device 100 may have selected the profile in FIG. 12, indicating preference for movies and games in HD 720p format in-home WiFi network for communication network.

In some embodiments, a user device value metric for a content under consideration is: (if "type" and "format" included in user preferences)*(if comm network active) *price/min For this example, if the content type does not match or the communication network is not active, the value of the "if" statement is zero; otherwise it is one.

After taking into account the user preferences and the content available at the reservoirs of FIG. 15 and FIG. 17 the user device (for example, a tablet) is currently connected to, the three content items listed in FIG. 18, Movie A, Game A, Game C currently have value metric greater than zero. In this example, a lower value metric would be advantageous to a user of the user device, since the price per hour of content consumption is something the user will typical want to minimize (as long as the content is enjoyable). For this example the relatively large and most expensive item provides the better value. If the value metric included a restriction or a cost penalty on the available storage size on the table, the value metric could have resulted in a different value. In some embodiments, if the table only had 8 GB of available space, only the Movie A would have a value metric greater than zero for this the storage element.

Value Metrics Associated to a Content Provider

In some embodiments value metrics associated to a content provider include one or more of value metric parameters, value metric parameter relationships, value metric parameter weights, value metric functions of models that are intended to benefit a content provider, or from the point of view or perspective of a content provider, etc.

In some embodiments, a content provider has a content provider reservoir (for example, FIG. 17). The content provider may have access or permission to preload content onto storage elements associated to user devices associated to a user, multiple users, groups of users (for example, POI devices) or any other devices. In some embodiments, the content provider assists in preloading selected content from the content provider reservoir over a selected communication network on to selected storage elements associated to the selected user devices targeting the selected users based on value metrics associated to a content provider.

Example parameters associated with the content elements that may be useful to compute value metrics associated to a content provider are listed in FIG. 17. For example, a name, and ID number, a type, a format, a size, a duration, a licensing cost, a list price, or any other parameters. The parameter type may be used to classify the content and to match a user or group of users or user device profile preferences or profile history. The parameter format may be used to match the content to a device capable of presenting it (for example, processor power, display resolution, etc.). The size parameter may be used to compare relative to the available space at the target storage element or the cost of the storage or as an opportunity cost relative to other content or to rank content, etc. The duration parameter may be used to estimate the time a user may spend consuming the content or to normalize relative to the size to compare versus streaming, etc. The licensing cost is the cost the content provider may need to pay the author of the content after it is consumed by a user. The list price parameter may be the price a user may pay for consuming it. In some embodiments, in addition to parameters associated to the content, the content provider may require additional parameters associated with the user, the user device, the user device associated storage, the communication network, or any other parameters. FIG. 19 is a table that includes examples of additional parameters that may be used to enhance value metric analysis from a content provider perspective or point of view for selecting content to preload for a user with user device 100A in accordance with some embodiments. The additional parameters include ad revenue 1208 that an ad provider may be willing to pay the content provider when an ad is viewed in connection with the target content, and communication network cost 1209 that the content provider may be willing to subsidize or sponsor for preloading the content, a user storage cost 1210 the content provider may be willing to pay the user for preloading content onto the users storage, the user likelihood to consume the content 1211, etc. For example, the user storage cost 1210 is in units of $/GB/day. In some embodiments, the user likelihood to consume the content 1211 is normalized to a time period (for example, user likelihood to consume over 1 day). In some embodiments one or more of the parameter values is different for a user or group of users. In some embodiments, a user or group of users or user devices or storage elements may get a discount from the list price. In some embodiments, a user or group of users may have declined inclusion of ads for a premium service. In some embodiments, the likelihood of consumption is refined for specific target users or user devices or storage elements, etc. In some embodiments, the communication network cost 1209 or user storage cost 1210 may vary between users. In some embodiments, the ad revenue 1208 for ad may vary between users, especially if the ads are targeted to a user.

In some embodiments one or more of the parameters listed in FIG. 19 are used to compute a value metric prior to preloading onto a target storage element associated to a user device associated to a user). In some embodiments, content that is compatible with the user device is considered for preloading. In some embodiments, content type or format that matches user profile is considered for preloading. In some embodiments, the list price and the licensing cost are used to select preloaded content. The difference between list price and licensing cost is the profit to the content provider. The previous embodiment does not take into account the likelihood a user will consume this content. In some embodiments, the difference between list price and licensing cost are further weighted (for example, multiplied by) by the likelihood the user will consume it over a time interval. In some embodiments, the list price minus the licensing cost jointly multiplied by the likelihood of user consumption over a period of time is a metric of the estimated profit for this user over this period of time. In some embodiments an ad provider pays the content provider when the user consumes the content and the associated ads. This ad revenue is added to the value metric. This ad revenue may be weighted by the user likelihood to consume the content associated to the ad. In some embodiments, the content provider is responsible for paying, sponsoring or subsidizing, etc. the communication network cost associated with the content preload onto the storage element. In some embodiments the content provider is responsible for paying, sponsoring or subsidizing, etc. the communication network cost associated with the content transfer from the storage element to the user device. In either of the latter two cases it may be advantageous to subtract a communication network cost in the value metric. Likely the communication network cost will be incurred regardless of the content consumption and may be weighted by their user likelihood to consume the content. In some embodiments, in FIG. 19, the value metric 1212 is based on the following function: (if correct type)*(if correct format)*((list price–licensing cost+ad_revenue)*(user likelihood to consume)−(storage cost)−(communication network cost)).

In this example content ID#1002 and content ID#1003 do not meet the value metric "type" and "format" and the corresponding value is assigned not valid, not applicable, not available or 0, etc. Content ID#1001 has a positive value metric of 0.25 and content ID#1004 has a negative value metric of −1.28. The main reason for a negative value metric for content ID#1004 is that the user likelihood to consume is rather low and the content size is rather large, and the storage cost and communication network cost is included as a content provider preloading cost regardless if the content is consumed or not (since it's not weighted by the user likelihood to consume). Based on FIG. 19, content ID#1001 may be preloaded onto user device 100A (for example, a tablet), but contentID#1004 may not be preloaded onto user device 100A.

FIG. 20 is a table that summarizes a second example for evaluating value metrics from a content provider perspective for a second user device 100B (for example, a tablet) in accordance with some embodiments. In some embodiments, user device 100B is located within the coverage area of a home gateway with a large attached storage with 10× lower cost, and WiFi communication network, which does not incur communication network cost. For this embodiment the value metric is based on the function: (if correct type)*(if correct format)*((list price–licensing cost+ad_revenue)*(user likelihood to consume)−(storage cost)−(communication network cost)). For this case the value metric of content ID#1004 is positive and higher than the value metric of content ID#1001, mainly because the communication network cost and user storage cost are relatively low.

In some embodiments the value metric of a content includes a divide by a time to consume the content. In some embodiments, the value metrics in column 1212 of FIG. 19 is further normalized by the duration column 1205 to obtain a value in units of expected profit per time period.

In some embodiments, value metrics are evaluated to make decisions regarding deleting content. FIG. 21 is a table that includes an example of an update to FIG. 19 at a later time, where content ID#1001 and 1004 are currently preloaded onto user device 100A in accordance with some embodiments. In this example, at a later time, content ID#1001 likelihood to be consumed has dropped from 25 percent to 3 percent and content ID#1004 likelihood to be consumed has dropped from 15 percent to 10 percent. The communication cost is not applicable, because the content is already preloaded. If the value metric for deletion is based on: (if correct type)*(if correct format)*((list price–licensing cost+ad_revenue)*(user likelihood to consume)−(storage cost)). Based on this value metric, content ID#1001 currently has a negative value metric since the expected benefits no longer offset the storage cost based on the reduced likelihood of consumption. Content ID#1004 has a positive value metric but may still be considered for deleting in exchange for new content if the value metric of the new content is more valuable.

In some embodiments, value metrics are evaluated to make decisions regarding moving content. Moving content may incur and additional communication network cost or may change the user storage cost or user likelihood to consume. FIG. 22 is a table that includes an example of an update to FIG. 20 where the content currently preloaded onto user device 100B is considered for moving to a second storage element in accordance with some embodiments. In this example, content ID#1001 likelihood to be consumed is estimated to drop from 25 percent to 15 percent after moving and content ID#1004 likelihood to be consumed has not changed. In this example the additional communication cost is set to zero, because the content will be moved over a free home WiFi. If the value metric for deletion in FIG. 22 is based on: (if correct type)*(if correct format)*((list price–licensing cost+ad_revenue)*(second user likelihood to consume)−(secondstorage cost)−(moving cost)). Based on this value metric, content ID#1001 value metric has dropped because the lower cost of storage does not offset the reduced likelihood or consumption. Content ID#1004 value metric has improved because of reduced storage cost while user likelihood of consumption has remained the same. Based on these value metrics content ID#1001 may remain at the current storage location and content ID#1004 may be moved to the second storage element for best value.

In some embodiments value metrics for moving are evaluated for a user perspective or a user device perspective or a storage element perspective or a content broker perspective or a service provider perspective, etc.

In some embodiments, a user likelihood to consume a content parameter is further based on one or more content currently preloaded at storage elements associated with the user device.

In some embodiments, the user likelihood to consume a content parameter is based on one or more content previously consumed by the user.

In some embodiments, the user likelihood to consume a specific content parameter is based on a particular time interval. In some embodiments, the time interval is an hour, 24 hours, 7 days, etc. One or more likelihoods for a given content is evaluated simultaneously when selecting content to preload, remove, swap, etc. Managing content based on shorter time intervals likelihoods may increase the value metrics but may also result in more content swapping which may increase communication network costs or reduced battery life for portable or mobile devices. In some embodiments, list price minus licensing costs weighted by user likelihood to or consume over a period of time is an indication of expected profit over a period of time for that user or user device. In some embodiments the ad revenue may be added or the communication network costs may be subtracted.

In some embodiments, the value metric is normalized or scaled by the duration of the content consumption. In some embodiments, all other parameters being comparable, a $0.50 profit for a 5 min video may be more desirable than a $3 profit for a 2 hour movie or a $5 profit for a game that a user may play for 20 hours.

In some embodiments, the value metric is normalized by the content size. This may be used in addition to storage cost (which is proportional to content size) or alternatively to storage costs. In some embodiments, all other parameters being comparable a 1 GB game may be preferred over a 10 GB game. In some embodiments, the content size normalization is relative to the available storage size. In some embodiments, the value metric difference between a 10 GB game in a 1 GB is more significant for a device with 16 GB of free storage than a device with 512 GB of free storage.

In some embodiments the content provider or content broker pays a storage owner/manager for access to a subset/partition of storage available to a user. In this case it may be advantageous to compare the value metric relative to the storage cost prior to preloading/moving/deleting. This is especially the case if the content provider is paying per storage utilized. This may not be the case if this content provider has paid for a fixed amount of storage that is currently idling.

In some embodiments, the user likelihood to consume one or more content is updated based on user history. The history is based on prior sequences of content consumptions. In some embodiments, the user likelihood to consume a content is based on other users history (for example, test groups described earlier). In some embodiments, the user likelihood to consume a content is updated based on the other content preloaded on the device (for example, in some cases a first content may increase the likelihood a second content may be consumed, in other cases a first content may decrease the likelihood a second content may be consumed).

In some embodiments, one of more of the value metric parameters included in the value metric may change over time. This may result in a change of the value metric or may result in a change in the relative value of a content currently preloaded or to be preloaded on a target storage. Examples of parameters that may change over time our list price, specials, promotions, rebates, user likelihood to consume, etc. or any other parameters. In some embodiments, the user likelihood to consume a particular content may change between the early morning, morning, lunch break, afternoon, evening, etc. In some embodiments, one or more of the value metric parameters included in the value metric may change with the user location or user device location, etc. In some embodiments, one or more of the value parameters included in the value metric may change with the user leisure mode. For example, the user may be at work, at a coffee shop having coffee, in a park walking, at an airport, or on vacation, etc. In some embodiments, the ad revenue, the communication network cost, or likelihood to consume may change with user leisure mode.

In some embodiments the list of value metric parameters included in the value metric may change over time. This may result in a change of the value metric or may result in a change in the relative value of individual content currently preloaded or to be preloaded/deleted on a target storage element. In some embodiments a relationship or weight between value metric parameters included in the value metric function may change over time. This may result in a change of the value metric or may result in a change in the relative value of individual content currently preloaded or to be preloaded/deleted on a target device associated to a user.

Value Metrics Associated to a POI

In some embodiments, the content distribution system includes a POI with a POI device. The POI device is owned by the POI, or a content provider, or a CP Broker, POI service provider, etc. The POI device is an access point, or a gateway, or a router, or a set top box, etc. The POI device may include storage. The storage associated to the POI device may be located within the POI device or attached to the POI device, for example, wired (for example, Ethernet) or wirelessly (for example, WiFi).

In some embodiments, value metrics associated to a POI are those that include one or more of value metric parameters, value metric parameter relationships, value metric parameter weights, value metric functions of models that are intended to benefit a POI, or from the point of view or perspective of a POI, etc.

In this case the content preloaded onto the storage elements associated with the POI device may be of interest to a group of users within the coverage area of the POI (the group of users is current or future or past users). In some embodiments, the user likelihood to consume parameter may be exchanged for an expected number of users to consume value metric parameter. In some embodiments, the communication network costs of preloading content onto the storage associated with the POI device may be shared by several users. In some embodiments, the expected number of users to consume value parameter is modified based on a plurality of user (for example, number of users, plurality of user profile, plurality of user history, plurality of likelihood to consume for a user, plurality of subscription plans of a user, etc.) within the coverage area of the POI (currently or at a later time). In some embodiments, the expected number of users to consume parameter is modified based on the historical population of users frequenting this POI versus time. In some embodiments, the value metric or value metric parameters are adapted more frequently for a POI. This may be advantageous because parameter values will likely be more dynamic for a group of users that a single user on a single user device. Moreover, the communication network cost of frequent content changes may be amortized over more users.

In some embodiments, the POI business owner/manager modifies the value metric parameters or value metric relationships or weights included in the value metric function or model. In some embodiments the POI business owner/manager modifies the content value metric functions to increase the POI business value metrics. In some embodiments a POI that is currently full (for example, a coffee shop with no available tables) modifies the value metric function to reduce the value of content that takes a long time to consume or discontinue specials or increase price, etc. In some embodiments, a POI that is almost empty increases the likelihood that current patrons remain at the POI by reducing price of content, offering content specials, biasing the value metric functions to increase the quantity of sticky content that takes longer to consume (for example, streaming shows or movies), etc.

In some embodiments, the presentation at the user device of content preloaded at storage elements associated to a POI device may be customized to the user device or the user of the user device. For example, the POI content may include sports and business news content. In some embodiments a user associated to a user device with interest in business news may have a different menu of preloaded content than a user with interest in sports. In some embodiments the presentation of content may include price, specials, etc. that may be customized to one of more of the users or user devices at the POI.

In some embodiments one or more parameters associated with a content consumed (could include ads), one or more users or one or more user devices located within the coverage area of POI access network 112 in FIG. 1b are shared with a POI business owner/manager. In some embodiments these parameters may be used to enhance POI business value metrics. These business value metrics may be inventory quantity or mix of product offered at the POI, specials, etc.

In some embodiments one or more parameters associated with a content consumed, or one or more users or one or more user devices located within the coverage area of POI access network 112 are shared with a content provider (or a POI service provider). This may be used by content provider to refine value metric parameters or value parameters weights/relationships or value parameters included in a value metric for subsequent value metric evaluation for deleting existing content or preloading of new content, etc. In some embodiments the content provider may use this information for refining business rules associated to a content.

In some embodiments one or more parameters associated with a content consumed, one or more users or one or more user devices located within the coverage area of POI access network 112 are shared with the content broker. This may be used by content broker to refine value parameters quantities or value parameters weights or value parameters included in value metric functions for subsequent value metric computation for deleting existing content or preloading of new content, etc. In some embodiments this information may be used by content broker to assist content provider.

Value Metric for Multiple Communication Networks

In some embodiments a communication network cost (or some other parameter) is a significant component of a value metric associated to preloading content onto storage or from storage to user devices. This cost to the value metric may be paid by one or more of a user, communication network provider, content provider, content broker, POI owner, etc. This is more pronounced if the likelihood of consumption is low (for example, the communication network cost is wasted with very large probability) or if the communication cost per byte is high, for example, over a cellular or cellular roaming access network. In some embodiments more than one communication network may be involved. In some embodiments a first communication network assists in preloading a first portion of the content from a source onto a storage element. In some embodiments a second communication network assists in preloading a second portion of the content from a source onto a storage element. In some embodiments the first portion is significantly larger than the second portion. In some embodiments the second portion is a security element that when merged or combined with the first portion enables consumption of the content at a user device. In some embodiments the first portion is significantly larger than the second portion and is preloaded onto the storage element over a less costly communication network. In some embodiments the first portion is significantly larger than the second portion and is preloaded onto the storage element over a faster communication network. In some embodiments a second communication network assists in preloading the content from a first storage element to a second storage element associated to a user device. The second storage element may be located within the enclosure of the user device. In some embodiments the communication network cost for assisting in preloading the content from a content source to a storage element associated with a user device is paid by a first party (for example, content provider) and the cost of preloading from the storage element to a user device presentation element (for example, UI) is paid by a second party (for example, user of user device). In some embodiments one or more of the cost of the communication networks described above are included in one or more of value metrics associated to a user, a user device, a content provider, content broker, POI, etc.

In some embodiments a storage element device has access to a modem that could assist in preloading content that could connect to multiple communication networks of the same type (for example, WiFi), but may have a different cost structure (for example, home WiFi vs. airport pre-pay WiFi). In some embodiments the storage element has access to a multimode modem (for example, a multiband 2G/3G with different cost structure (for example, home vs. roaming). In some embodiments the storage element has multiple modems (for example, cellular, WiFi, etc.) with different cost structure (for example, home vs. roaming).

In some embodiments, a storage element may choose to preloaded content over 2 communication networks each with a cost structure that may change over time or location. It may be advantageous to update the communication network cost parameter as the storage element enters/exits the 2 communication networks. A content of large size may not have a desirable value metric for preloading over a first network, but may be selected for preloading on a second network.

In some embodiments a user device has a modem that could assist in presenting content that could connect to multiple communication networks of the same type (for example, WiFi), each with an associated cost structure (for example, home WiFi vs. airport pre-pay WiFi). In some embodiments the user device has a multimode modem (for example, a multiband 2G/3G) each with a specified value metric cost structure (for example, home vs. roaming). In some embodiments the user device has a multiple modem (for example, cellular, WiFi, etc.) with multiple cost structure (for example, home vs. roaming).

In some embodiments, a user device may have access to preloaded content from associated storage over 2 communication networks with different cost structure at different times or different locations. It may be advantageous to update the communication network cost parameter as the user device enters/exits each of the communication networks. A large size content that may not have a desirable value metric for consuming over a first network may be desirable for consuming on a second network.

A Storage Element Associated to Two or More User Devices

In some embodiments, the content distribution system includes a storage element associated with two or more user devices or two or more users. The storage element is associated with an access point, or a gateway, or a router, or a set top box, etc. that is communicating with two or more user devices or two or more users. The storage element may be located within or attached to the devices, for example, wired (for example, Ethernet) or wireless (for example, WiFi).

Value metrics for preloading (or deleting or moving) content at a storage element associated with two or more user devices or users may include one or more of value metric parameters, value metric parameter relationships, value metric parameter weights, value metric functions of models that are based on one or more of the user devices or one or more users.

The value metrics may be based on the perspective (or benefit) of the storage element (owner/manager), or the one or more users or from the point of view or perspective of the service provider, etc.

In some embodiments, the content preloaded onto the storage elements may be of interest to a group of users within the communication network neighborhood of the storage (the group of users is current or future or past users). In some embodiments, the user likelihood to consume parameter may be exchanged for an expected number of users to consume value metric parameter. In some embodiments, the communication network costs of preloading content onto the storage element are shared by several user devices or users. In some embodiments, the expected number of users to consume value parameter is modified based on a plurality of users (for example, number of users, plurality of user profile, plurality of user history, plurality of likelihood to consume for a user, plurality of subscription plans of a user, etc.) within the communication network coverage area of the storage element (currently or at a later time). In some embodiments, the expected number of users to consume parameter is modified based on the historical population of users frequenting the storage communication network footprint versus time. In some embodiments, the value metric or value metric parameters are adapted more frequently for a storage associated to multiple users or user devices. This may be advantageous because parameter values will likely be more dynamic for a group of users that a single user on a single user device. Moreover, the communication network cost of frequent content changes may be amortized over more users.

In some embodiments, the storage owner/manager modifies the value metric parameters or value metric relationships or weights included in the value metric function or model.

In some embodiments, the presentation at the user device of content preloaded at storage elements associated to a plurality of user devices or users may be customized to the user device or the user of the user device. For example, the preloaded content may include sports and business news content. In some embodiments a user associated to a user device with interest in business news may have a different menu of preloaded content than a user with interest in sports. In some embodiments the presentation of content may include price, specials, etc. that may be customized to one of more of the users or user devices associated with the storage.

In some embodiments one or more parameters associated with a content consumed (could include ads), one or more users, or one or more user devices located within the coverage area of storage element communication network are shared with a storage owner/manager.

In some embodiments one or more parameters associated with a content consumed, or one or more users or one or more user devices located within the coverage area of the storage element are shared with a service provider or a content provider or a content broker. This may be used by a service provider or a content provider or a content broker to refine value metric parameters or value parameters weights/relationships/models/functions or value parameters included in a value metric for subsequent value metric evaluation for deleting or moving existing content or preloading of new content, etc. In some embodiments a service provider or a content provider or a content broker may use this information for refining business rules associated to a content.

In some embodiments one or more parameters associated with a content consumed, one or more users or one or more user devices located within the coverage area of a storage element are shared with the content broker. This may be used by content broker to refine value parameters quantities or value parameters weights or value parameters included in value metric functions for subsequent value metric computation for deleting existing content or preloading of new content, etc. In some embodiments this information may be used by a content broker to assist a content provider.

Two or More Storage Elements Associated to a User Device

In some embodiments, a user device may have access to two or more storage elements. In some embodiments, the first storage element is located within the user device, and a second storage element is communications network hop away. In some embodiments, a mobile user device has local storage and access to a secondary storage at the home Gateway when at home. The secondary storage at the Gateway may be larger, with more available storage, lower cost per gigabyte of storage, and likely a fast connection when in coverage area of gateway. In some embodiments a value metric of a content may be computed for each of the two storage elements associated to a user device. Based on the value metrics, the content may be stored at neither of the storage devices, one of the storage devices or both storage elements. In one example based on a value metric evaluation, a content may not have a desirable value metric for preloading to the mobile user device local storage, but may have a desirable value metric for preloading onto the Gateway. In some embodiments the value metric is re-evaluated over time and the content may be moved between the two storage elements, copied from one storage element to the other storage element, or deleted from one or both storage elements.

In further embodiment, a user device has access to three or more storage elements and a value metric for a content is evaluated for a subset (including the full set) of the three or more available storage elements. In some embodiments extensions of principles described for the two storage case are applied.

Two Storage Elements Associated to a User

In some embodiments, a user has access to content available at two storage elements, for example, a smartphone storage and a set-top-box storage (for example, to display onto a HD TV), or for example, a tablet storage and a home Gateway storage (for example, to stream from the Gateway onto the tablet), etc. For example, a mobile user device may have local storage and access to a secondary storage at a home reservoir (for example, home gateway or set top box) when at home. The secondary storage at the home reservoir may be larger, with more available storage, lower cost per gigabyte of storage, and likely a fast connection when in coverage area of gateway. In some embodiments a value metric of a content is computed for each of the two storage elements associated to a user. Based on the value metrics, the content may be stored at neither of the storage devices, one of the storage devices or both storage elements. In one example based on a value metric evaluation, a content may not have a desirable value metric for preloading to the mobile user device local storage, but may have a desirable value metric for preloading onto the home reservoir. In some embodiments the value metric is re-evaluated over time and the content may be moved between the two storage elements, copied from one storage element to the other storage element, or deleted from one or both storage elements. As the user changes state (location, leisure mode, time of day, etc.) the value metric associated with each of the storage elements may change.

In further embodiment, a user has access to three or more storage elements and a value metric for a content is evaluated for a subset (including the full set) of the three or more available storage elements. In some embodiments extensions of principles described for the two storage case are applied.

A User Associated to a Plurality of User Devices

In some embodiments, a user operates one or more of a plurality user devices associated to the user. The one or more user devices operated by the user may change over the time of the day or over locations or vs. leisure modes, etc. In this case it may be advantageous for a content provider (or content broker, etc.) to assign value metric parameter associated to value metrics to a subset of the devices associated to the user. User profile inputs or user history of content consumption at each device may be used (vs. time/location/leisure mode/etc.). User interaction with a device at a given time may be also used. A content may be preloaded onto the storage of one, or a subset or all of the plurality of user devices. Different content may be preloaded onto each of the devices or related content. Content may be swapped/moved between the storage of the plurality of user devices. A value metric for a content preloaded onto a plurality of devices associated to a user may be evaluated independently for each device or jointly for the set of devices. A content may be preloaded onto one device associated to a user, but maybe not the other based on value metrics.

Value Metrics Associated to a Content Broker

In some embodiments, value metric parameters, parameter values, weights, relationships, functions, models, state machines, etc., associated to a content broker may vary depending on the content broker embodiment. It is to be understood while several embodiments for value metric associated with a content broker are described, this is not an exhaustive list. Alternative value metrics associated to a content broker may be easily derived based on the embodiments below.

In some embodiments, the content broker is compensated by one or more content providers for assistance in the content distribution system. The assistance may include obtaining value metric information, assistance in classifying storage elements for preloading, assistance in selecting valuable content to be preloaded, assistance in preloading valuable content.

In some embodiments, the content broker is compensated by a content provider or user based on the number of content units preloaded. In some embodiments, the content broker is compensated based on the preloaded content presentation duration. In some embodiments, the content broker is compensated based on the preloaded content consumption duration.

In some embodiments, the content broker assists a content provider in selecting a content to be preloaded to a storage element. For this embodiment the content broker may receive compensation based on a fraction of a value metric, a percentage of a value metric, a fee, a preloaded content consumption, a user interaction with a preloaded content, etc. for providing this service. In some embodiments the value metric is a value metric designed to benefit a content provider. In some embodiments a content broker may assist a content provider in selecting content to be preloaded as summarized in FIG. 19 based on a value metric and receive a fraction of the value metrics generated.

In some embodiments, the content broker assists a content provider in preloading a content to a storage element. For this embodiment the content broker may receive a compensation based on a fraction of a value metric, a percentage of a value metric, a fee, a preloaded content consumption, a user interaction with a preloaded content, etc. for providing this service. In some embodiments the value metric is a value metric designed to benefit a content provider. In some embodiments a content broker may assist a content provider in preloading content summarized in FIG. 19 based on a value metric and receive a fraction of the value metrics generated.

In some embodiments, the content broker assists a content provider in preloading a content to a storage element by obtaining value metric information. For this embodiment the content broker may receive a compensation based on a fraction of a value metric, a percentage of a value metric, a fee, a preloaded content consumption, a user interaction with a preloaded content, etc. for providing this service. In some embodiments the value metric is a value metric designed to benefit a content provider. In some embodiments, a content broker may assist a content provider in preloading content summarized in FIG. 19 by obtaining value metric information about the storage, the user devices, the users, the likelihood to consume, etc., for evaluating a value metric and receive a fraction of the value metrics generated.

In some embodiments, the content broker assists a content provider in deleting a preloaded content from a storage element by obtaining value metric information. For this embodiment the content broker may receive a compensation based on a fraction of a value metric improvement from deleting the content, a percentage of a value metric, a fee, a preloaded content consumption, a user interaction with a preloaded content, etc. for providing this service. In some embodiments the value metric is a value metric designed to benefit a content provider. In some embodiments, a content broker may is a content provider in deleting preloading content summarized in FIG. 21 by obtaining value metric information about the storage, the user devices, the users, the likelihood to consume, etc., for evaluating a value metric and receive a fraction of the value metrics improvements generated.

In some embodiments, the content broker assists a content provider in moving a preloaded content from a storage element by obtaining value metric information. For this embodiment the content broker may receive a compensation based on a fraction of a value metric improvement from moving the content, a percentage of a value metric, a fee, a preloaded content consumption, a user interaction with a preloaded content, etc. for providing this service. In some embodiments the value metric is a value metric designed to benefit a content provider. In some embodiments, a content broker may assist a content provider in moving preloading content summarized in FIG. 22 by obtaining value metric information about the first and second storage, communication network, the user devices, the users, the likelihood to consume, etc., for evaluating a value metric for a source and destination storage and receive a fraction of the value metrics improvements generated.

In some embodiments, a content broker obtains value metric information from a plurality of storage elements, one or more content providers, content associated with the one or more content providers and one or more of a population of users devices, a population of users, communication networks. Based on this information the content broker may evaluate value metrics for preloading content that benefits the content broker.

In some embodiments, a content broker identifies a storage element associated to a user device and user and obtains value metric information of the storage (for example, available storage, storage cost, etc.), of the user device (for example, hardware and software available, etc.), of the user (for example, preference, history, state, etc.). Based on these parameters the content broker may search the content databases of the one or more content providers and select a list of content for preloading onto the storage element. The content broker value metric may take into account specials or rebates from one or more of the content providers for preloading content. The content broker value metric may take into account ad supported or sponsored the content. The content broker value metric may take into account a communication network cost for preloading or consuming the content. The content broker value metric may not take into account a communication network cost for preloading or consuming the content if the user is responsible for communication network cost or if the communication network usage is free. The content broker value metric may take into account storage element cost. The content broker value metric may not take into account a storage element cost if the user is responsible for storage element cost or if the storage element usage is free. The content broker value metric may take into account a user likelihood to consume a content. The user likelihood to consume a content may be based on the interactions (for example, consumption, presentation, selection, etc.) of other users with the content. The user likelihood to consume a content may change over time. The user likelihood to consume a content may change based on user state parameters. The content broker value metric information may change over time. In some embodiments, the content broker value metric information may change over time based on changes of content provider offerings, specials, etc. or changes in the user state, or changes in the connectivity between the storage elements in the user devices, etc.

In some embodiments, a content broker obtains value metric information from a plurality of storage elements and one or more of a population of users devices, a population of users, communication networks associated with the plurality of storage elements. Based on this information the content broker may evaluate value metrics for preloading content. In some embodiments, based on this information the content broker may classify a subgroup of storage within the plurality of storage associated to a subgroup of one or more user devices, users, communication networks and offer to one or more Content providers. In some embodiments classifying may comprise one of more of identifying, segmenting, selecting, clustering, ranking, characterizing. In some embodiments, the classified subgroup or preloading opportunity is a population satisfying the following {flash storage up to 1 GB, flash storage on a portable device, associated user age group between 20-40 yrs, associate user is soccer fan, communication network cost free 12 hrs/day}. In some embodiments the content broker could offer a preloading opportunity to one or more content providers. In some embodiments the content providers may bid for the preloading opportunity. In some embodiments the content broker accepts the bid if its above a threshold. In some embodiments the content broker accepts the largest bid from the one or more content providers. In some embodiments the threshold is based on a value metric that benefits the content broker. In some embodiments the content broker may set a minimum value for the preloading opportunity. In some embodiments the content broker may set a minimum value based on a value metric that benefits the content broker. In some embodiments a storage element may be classified into two or more preloading opportunities. In some embodiments a storage element may be classified into two or more preloading opportunities simultaneously. For example, a storage element may have 2 GB of available storage and 1 GB is assigned to a first preloading opportunity (for example, {flash storage up to 1 GB, flash storage on a portable device, associated user age group between 20-40 yrs, associate user is soccer fan, communication network cost free 12 hrs/day}) and the 1 GB is assigned to a second preloading opportunity (for example, {flash storage up to 1 GB, flash storage on a portable device, associate user likes comedy shows after 8 pm, communication network cost free between 6 pm-8 am}). In some embodiments a storage element available storage may be classified into one of a plurality of preloading opportunities. In some embodiments the available storage is offered to more than one preloading opportunity population for bidding. In some embodiments a preloading opportunity is assigned based on a value metric of a content broker or content provider or a bid from a content provider. For example, a storage element with 1 GB of available storage is offered as {flash storage up to 1 GB, flash storage on a portable device, associated user age group between 20-40 years, associate user is soccer fan, communication network cost free 12 hrs/day} or {flash storage up to 1 GB, flash storage on a portable device, associate user likes comedy shows after 8 pm, communication network cost free between 6 pm-8 am}. In some embodiments the content broker could obtain the value metric for each of these preloading opportunities. In some embodiments the content broker could offer both of these content opportunities to one or more content providers. In some embodiments the content broker assigns the content opportunity to the content provider or content with most favorable value metric or the most favorable bid.

In some embodiments, a content provider may select an offer for a preloading opportunity. In some embodiments, a content provider may select value metric information requirements (or restrictions, or criteria, or recommendations, etc.) that may be used by a content broker for selecting preloading opportunities. In some embodiments, a content broker offers preloading opportunities by allowing a content provider to specify desirable properties of the preloading opportunities. In some embodiments, a content broker offers preloading opportunities to a content provider assisted by a UI. In some embodiments, the content provider may provide restrictions to one or more of user parameters, user device parameters, communication network parameters, associated to the storage element for inclusion in the preloading opportunity offer. In some embodiments, a content broker may offer content preloading opportunities through a website or a UI where the content provider may select one or more users parameters (for example, demographics, state, history, etc.) associated with the storage element. In some embodiments, a content broker may offer content preloading opportunities through a website or a UI where the content provider may select one or more user device parameters (for example, hardware or software requirement, display capabilities, etc.) associated with the storage element. In some embodiments, a content broker may offer content preloading opportunities through a website or a UI where the content provider may select one or more communication network parameters (for example, performance, availability, cost, etc.) associated with the communication network. In some embodiments, a content broker obtains value metric information for selecting preloading opportunities prior to the content provider selections. In some embodiments, a content broker searches for preloading opportunities based on content provider responses to preloading opportunity offers.

In some embodiments, a content broker identifies a storage element associated to a user device and a user and obtains value metric information of the storage (for example, available storage, storage cost, etc.), of the user device (for example, hardware and software available, etc.), and of the user (for example, preference, history, state, etc.). For a further embodiment, the content broker offers the storage element to one or more content providers for bidding. For a further embodiment, based on the received bids from one or more content providers and the value metric information, the content broker searches the content reservoirs of the one or more content providers and selects a list (or alternatively a queue or rank) of content for each of the one or more content providers for preloading onto the storage element.

In some embodiments, based on the parameters the content broker searches the content reservoirs of the one or more content providers and selects a list (or alternatively a queue or rank) of content for each of the one or more content providers for preloading onto the storage element and requests a bid.

Value Metrics Jointly Associated to a Plurality of Entities

In addition to value metrics associated to, based on, from the perspective of or favoring a user, a set of users, a POI, a content provider, a content broker, etc., (of which several embodiments have been described above), in some embodiments value metrics are derived by combining desirable value metrics or value metric parameters into new or joint or multi-valued or vectored value metrics that apply to two or more user or network entities in the content distribution system simultaneously. In some embodiments, a value metric includes two components. The first component of the value metric vector may be evaluated by a content broker from the perspective of a content provider and the second component of the value metric includes a vector that is evaluated by the user device from the perspective of a user of the user device. In some embodiments, a Content_A may be preloaded when VM(Content_A)={VM_1,VM_2} wherein the first component of the value metric VM_1>Threshold1 and the second component of the value metric VM_2>Threshold2. In some embodiments a list of content is generated based on VM_1> (VM_1 of median of content of content provider), that is content that is in the top 50 percent of value metric based on content provider information. Furthermore a list of content is generated based on VM_2>(VM_2 of 10 percentile or user), that is the content that is in the top 10 percent from the user perspective. In some embodiments only the content that satisfies both criteria above (top 50 percent from content provider point of view and top 10 percent from the user point of view) is preloaded. In some embodiments content that satisfies VM_1>Threshold1 is preloaded to a user device, but content that satisfies VM_2<Threshold2 is deleted by the user device. In some embodiments content that satisfies VM_1>Threshold1 is preloaded to a user device, but content that satisfies Threshold2<VM_2<Threshold3 is moved as directed by the user device to a second storage element associated to the user.

Many other embodiments or extensions of example above are possible. In other embodiments any other relationship between VM_1 and VM_2 may be used. The value metric vector may have more than two elements or components. In some embodiments a value metric includes an element associated to a content provider, a content broker and a user. In some embodiments a value metric includes an element associated to a content provider, a first user and a second user, both associated to the same storage element (for example, husband and wife sharing a set top box). In some embodiments, a target preloaded content list may include all content such that VM(content)={VM1, VM2, VM3}, where VM1 is associated to content provider and VM2 and VM3 are associated to two users of a storage element and VM1>Threshold_A and (VM2+VM3)>Threshold_B. That is the combined value metric for both users should be larger than a threshold. In some embodiments with vectored value metrics, the vector elements are combined into a single joint or combined value for preloading content selections. In some embodiments the individual value metric elements are added. In some embodiments a norm of the value metric vector is evaluated (for example, norm 1, norm 2, norm infinity, etc.).

Alternatively different entities could evaluate value metrics independently and content is preloaded (or deleted or moved, etc.) based on each of the value metrics in a sequential or serial or parallel fashion. In some embodiments a content broker obtains or computes one or more of the value metric information, parameters, vector elements, etc. from more than one entity and combines or jointly processes the value metric information. In some embodiments a content broker obtains a value metric from one entity and shares with a second entity for combines or joint value metric evaluation. In some embodiments a content broker obtains a value metric parameter or a value metric for a content (or value metric for a list of content) from a user and shares the value metric's with a content provider. In some embodiments a network entity (for example, content broker or content provider or service provider or Cloud server) selects a first content for preloading based on a the network entity value metric and preloads (for example, pushes) the content to a storage element while a processor associated with the storage element selects a second content for preloading based on a user value metric and preloads (for example, pulls) the second content.

Notification and Discovery of Preloaded Content

Some embodiments include assisting in presentation of information related to the content to a user device associated with the storage element. In some embodiments, the information is based on communication network parameters between the user device and the storage element, In some embodiments, the presented information is based on user device parameters. The user device parameters can include hardware and/or software capabilities of the user device. In some embodiments, the presented information includes content parameters of the content, such as, for example, cost, format, and/or size of the content.

Some embodiments include notifying a user associated with the storage element that the content has been preloaded.

In some embodiments, information presented at a user device is based on parameters of a user associated with the user device. The user parameters can include user profile, user preferences, user history, user consumption history, user demographics, user state leisure state, user location, user analytics, user real or virtual network, etc. In some embodiments, the presented information is based on parameters of a service provider, content provider, content broker, ad broker, ad provider, etc. In some embodiments the presented information is based on value metric information. In some embodiments preloaded content information includes value metric information. In some embodiments content is sorted based on value metric information, one or more value metric parameters. In some embodiments content presentation is sorted based value metric from a user point of view or a content provider point of view or a content broker point of view.

Figure 29:
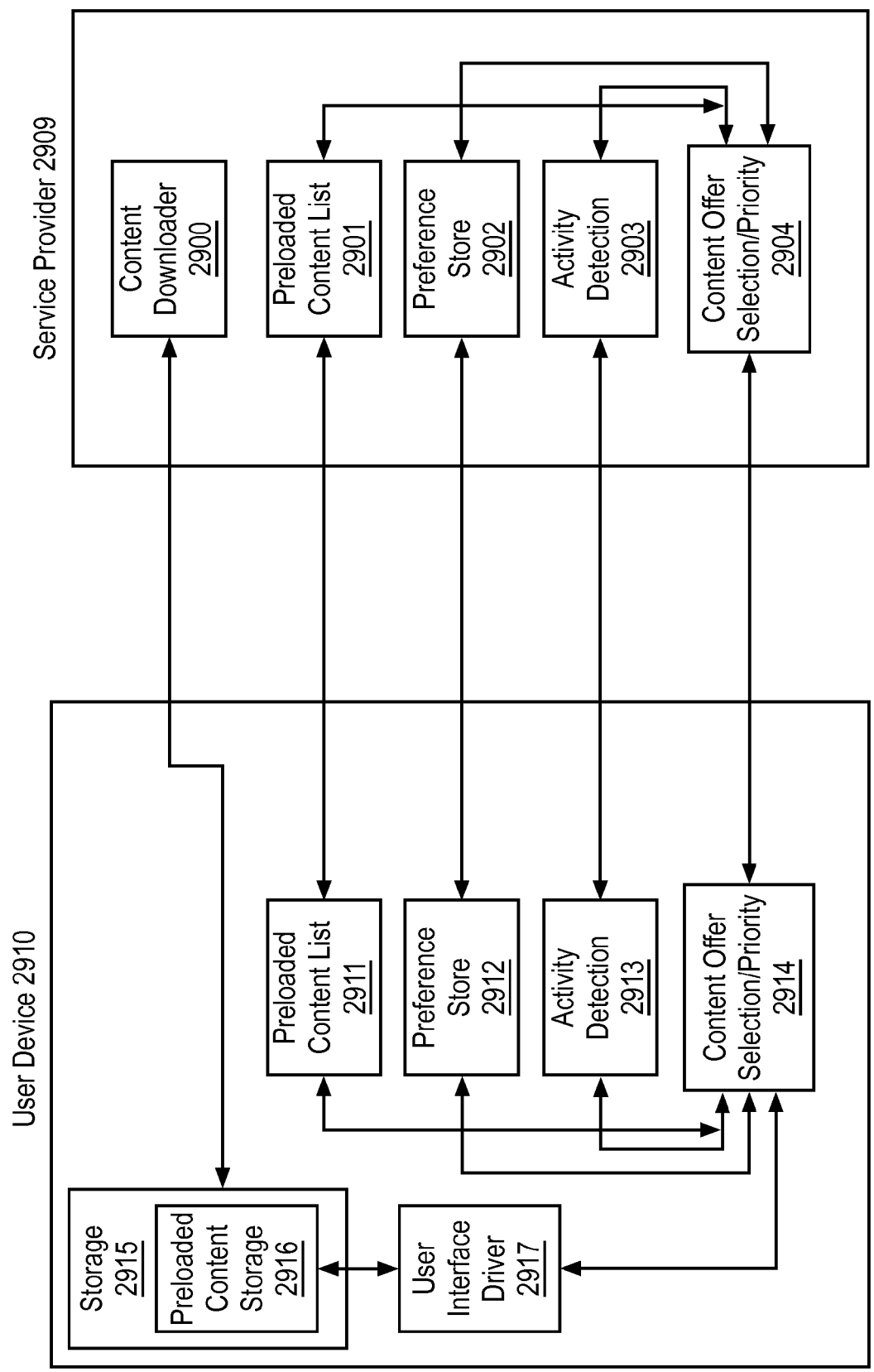
FIG. 29 shows a user device and a service provider to assist in notifying of preloaded content in accordance with some embodiments.

FIG. 29 shows a user device 2910 and a service provider 2909 to assist in notifying of preloaded content in accordance with some embodiments. User device 2910 includes storage 2915 comprising preloaded content storage 2916, a preloaded content list 2911, a preference store 2912, a activity detection 2913, a content offer selection/priority 2914 and user interface driver 2917. User device 2910 may include additional functions or less functions then included in the example embodiment in FIG. 29. Service provider 2909 includes a content downloader 4000, a preloaded content lists 2901, a preference store 2902, a activity detection 2903, a content offer selection/priority 2904. Service provider 2909 may include additional functions or less functions then included in the example embodiment in FIG. 29. In FIG. 29 several functionalities are included in the user device 2910 and the service provider 2909. For each function, the functionality may be present only at user device 2910 or only or service provider 2909 or may operate jointly or maybe replicated at user device 2910 and service provider 2909. In some embodiments, preloaded content list on the user device 2910 may be managed by preloaded content list 2911 or may be managed by preloaded content lists 2901 or may be managed jointly. The preloaded content list 2911 and preloaded content list 2901 functions may exchange information to keep the lists up to date. In some embodiments, information associated with content preloaded into preloaded content storage 2916 is presented to one of more users associated with user device 2910 or one or more users associated with storage 2915. Targeted information of preloaded content that is selected/prioritized/ranked correctly may result in increased value to the system. In some embodiments, preloaded content list 2911 monitors the content available at preloaded content storage 2916. In some embodiments, preloaded content list 2911 may include name, ID, value parameters such us type, format, size, duration, price, cost, communication network or storage cost, etc. In some embodiments, preference store 2912 may include value parameters associated to one or more users associated user device 2910. In some embodiments, value parameters may include a user profile, a user preference, a user history, a user analytics, etc. In some embodiments, activity detection 2913 may include the state of the user device 2910 or one or more users associated with user device 2910. The state of the user device 2910 may include powered down, hibernated, sleep mode, active, stationary, moving, location, etc. The state of a user associated to use the device 2910 may include working, shopping, watching TV at night, eating dinner, etc. In some embodiments based on information from one or more of preloaded content list 2911 or preloaded content list 2901, preference store 2912 or preference store 2902, activity detection 2913 or activity detection 2903, the function content offer selection/priority 2914 may select a subset of the content items preloaded content storage 2916 to present information to a user of user device 2910. The selected subset of content items to present information of, may be prioritized (or ranked or presented in different formats, etc.) to encourage consumption of more valuable content. In some embodiments the priority is based on value metric. In some embodiments the information of the selected subset of content items includes a variable cost from one or more of storage cost, communication network cost, content cost, etc. In some embodiments, the information of the selected subset of content items includes communication network parameters (speed, latency, QOS, etc.) or storage element parameters. In some embodiments the selection/priority is performed by content offer selection/priority 2904 or shared between content offer selection/priority 2914 in content offer selection/priority 2904.

Figure 30:
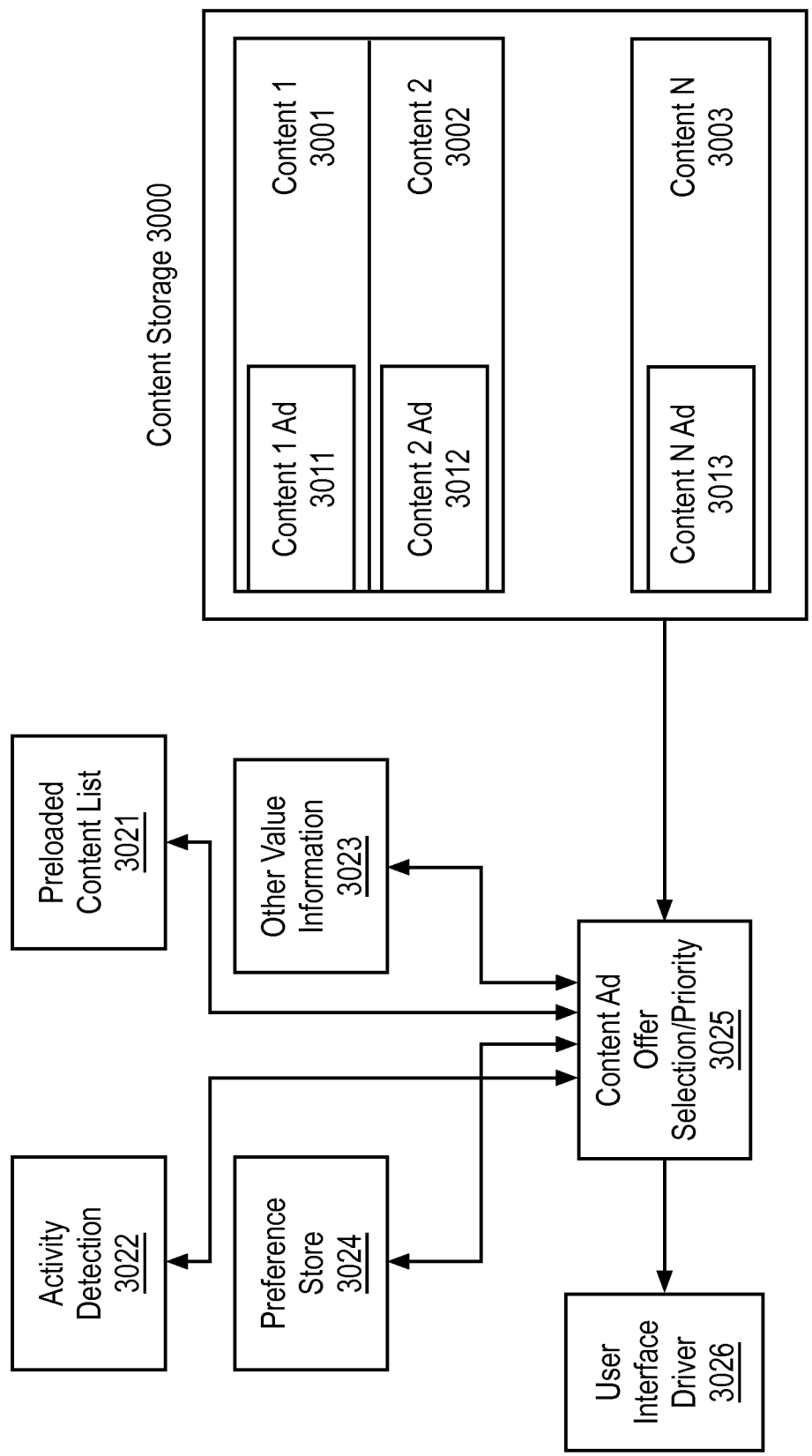
FIG. 30 shows a content storage and content ad offer selection/priority to assist in presenting ads associated with preloaded content in accordance with some embodiments.

FIG. 30 shows a content storage 3000 and content ad offer selection/priority 3025 to assist in presenting ads associated with preloaded content in accordance with some embodiments. Content storage 3000 comprises a plurality of content, including content 1 3001, content 2 3002 and content N 3003. Each content element may have an associated ad to help promote or encourage the consumption of the content. In some embodiments, content 1, 3001 may be associated to content 1 ad, 3011. The function content ad offer selection/priority 3025 may select a subset of content ads to be presented at a user device assisted by user interface driver 3026. The selected subset of content ads to be presented may be prioritized (or ranked, or formatted, etc.). The selection of the subset or the priority may be based on a value metric. The selection of the subset of the priority may be based on one or more of preloaded content list 3021, activity detection 3022, preference store 3024, etc. Preloaded content list 3021, activity detection 3022, preference store 3024 functionality may be included on a device associated to a user (for example, a user device or associated storage element) or may be included on a device associated to the network (for example, a server associated to a content provider, content broker, service provider, etc.) or the functionality may be shared or jointly processed between one or more devices associated to a user and one or more devices associated to a network.

Access Control

Figure 31:
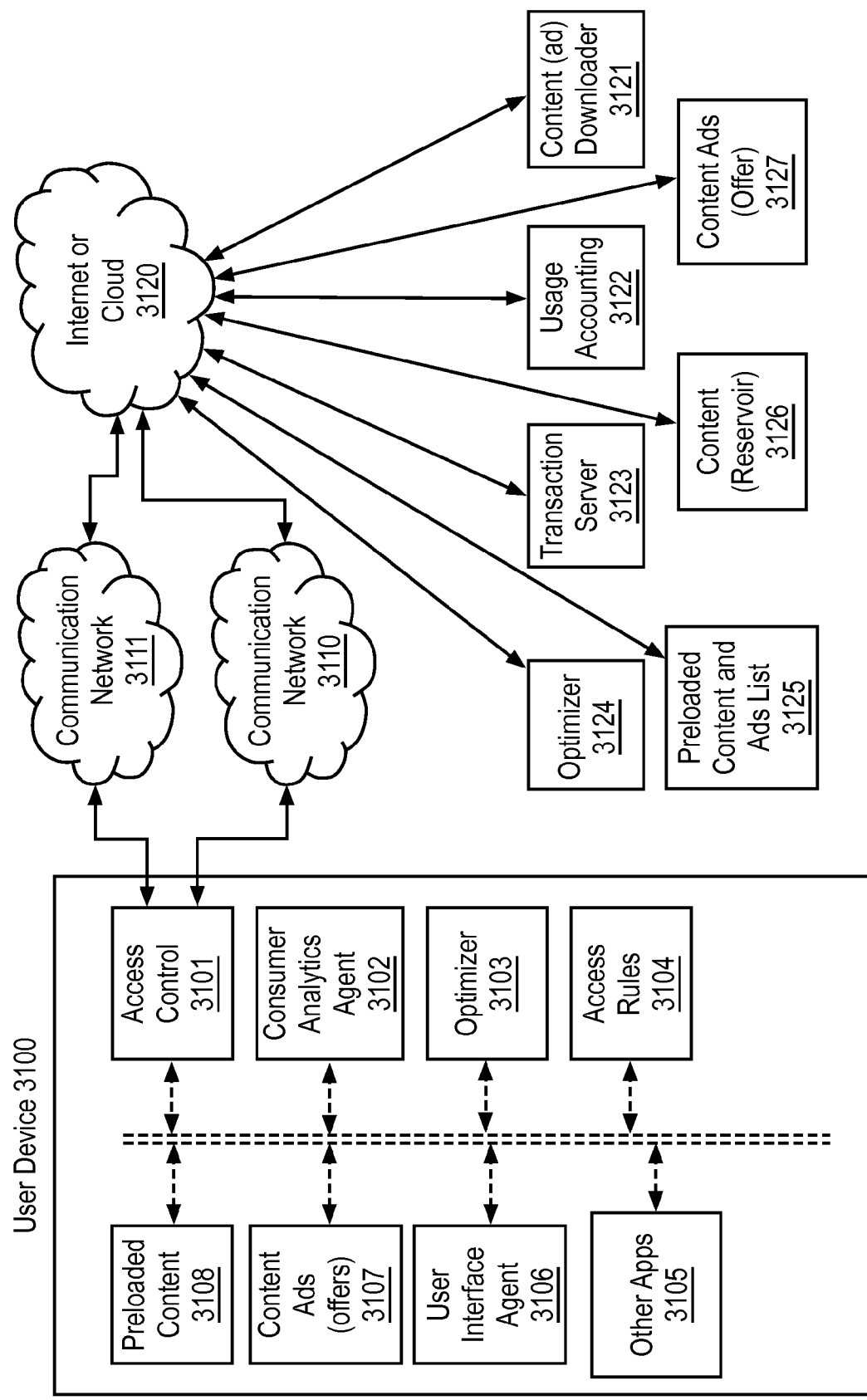
FIG. 31 shows a user device coupled to a content distribution system over two communication networks in accordance with some embodiments.

FIG. 31 shows a user device 3100 coupled to a content distribution system over two communication networks in accordance with some embodiments. While two communication networks 3111, 3110 are shown, it is to be understood that any number of two or more communication networks can be utilized for the described embodiments. In some embodiments, user device 3100 includes one or more of the following functionalities: access control 3101, consumer analytics agent 3102, optimizer 3103, access rules 3104, preloaded content 3108, content ads (or offers) 3107, user interface agent 3106, or other apps 3105. In some embodiments, access control 3101 monitors or maintains the status of the communication networks 3111 or 3110, wherein status includes one or more of connectivity, coverage, performance, cost, usage vs. communication network service plan, etc. In some embodiments, access control 3101 determines if one or more of the communication network 3111 or communication network 3110 may be utilized. In some embodiments, access control 3101 selects one of the communication networks 3111 or 3110 for content distribution system data usage. In some embodiments, access control 3101 is included in user device 3100 to offload computational complexity from other entities of the content distribution system. In some embodiments, access control 3101 is included in user device 3100 to offload computational complexity from other entities of the content distribution system, such as one or more of content distribution servers, network entities, communication network entities, cloud entities, etc. In some embodiments, access control 3101 is included in user device 3100 to improve the privacy to user device 3100 or a user of user device 3100. In some embodiments, access control 3101 is included in user device 3100 to improve the privacy to user device 3100 or a user of user device 3100 by reducing the amount of information about the user device 3100 or a user of the user device 3100 with a network entity. In some embodiments, access control 3101 is included in user device 3100 to reduce communication overhead of sharing information available at user device 3100 used for selecting a communication network 3111 or 3110 with a network entity. In some embodiments, access control 3101 denies data usage of one or more functions of the content distribution system over one or more communication networks. In some embodiments, consumer analytics agent 3102 monitors or maintains parameters associated with one or more users of the user device 3100 (for example, preferences, usage history or predictions, demographics, etc.), parameters associated with the user device 3100 (for example, type, hardware/software, etc.). In some embodiments, access rules 3104 comprises one or more of maintain or enforce content preloading rules (for example, examining content type or content restrictions), maintain or enforce rules associated to the content consumption, maintain or enforce rules associated to the content ads, or maintain or enforce rules associated with the communication network 3111 or communication network 3110. In some embodiments, preloaded content 3108 is the content preloaded by the content distribution system available at a storage element coupled to the user device 3100. In some embodiments, content ads 3107 includes ads associated to the preloaded content 3108 preloaded by the content distribution system available at a storage element coupled to the user device 3100. In some embodiments, content ads 3107 are utilized to entice a user to consume preloaded content 3108. In some embodiments, user interface 3106 is used for one or more of presenting content or content ads or content lists at a UI. In some embodiments, the UI facilitates consumption of preloaded content. In some embodiments, other apps 3105 are included at user device 3100. In some embodiments, other apps 3105 support the content distribution system, and include one or more of content compressors, decompressors, encryption, decryption, transcoding, etc.

In some embodiments, user device 3100 is connected over communication network 3111 or 3110 to network entity functionality. While the previously described one or more content provider servers are not shown, it is to be understood that that at least some of the embodiments of the one or more content distribution servers include at least a portion of the network entity functionality shown. In some embodiments, the network entity functionality comprises one or more of content (ad) downloader 3121, usage accounting 3122, transaction server 3123, optimizer 3124, preloaded content and ads list 3125, content (reservoir) 3126 or content ads (offers) 3127. In some embodiments, one or more of the network entity functionality is performed by a service provider. In some embodiments, a service provider is responsible for content downloading. In some embodiments, one or more of the network entity functionality is performed by a content provider. In some embodiments, a content provider is responsible for maintaining or managing content 3126 or content ads 3127. In some embodiments, one or more of the network entity functionality is performed by a content broker. In some embodiments, a content broker is responsible for maintaining or managing preloaded content and ads list 3125. In some embodiments, a content broker is responsible for optimizer 3124. In some embodiments, the network entity functionality is split or shared between two or more of content provider, content broker, service provider or cloud service. In some embodiments, content (ad) downloader 3121 assists in downloading content or content ads selected by optimizer 3124 for preloading onto preloaded content 3108 or content ads 3107 of user device 3100. In some embodiments, usage accounting 3122 monitors (wherein monitors may be exchanged for updating or maintaining or billing) one or more of a communication network usage by one or more content distribution functionalities. In some embodiments, usage accounting 3122 monitors communication network data usage of content (ad) downloader 3121 over communication network 3111 or 3110. In some embodiments, usage accounting 3122 monitors communication network data usage by optimizer 3124.

In some embodiments, usage accounting 3122 is performed or assisted by user device 3100. In some embodiments, usage accounting 3122 is performed by a content provider or content broker or service provider or cloud service. In some embodiments, usage accounting 3122 is assisted or classified or accounted by a user credential or a user device credential. In some embodiments, usage accounting 3122 is performed on a user device 3100 by identifying data flows associated with a content distribution system. In some embodiments, usage accounting 3122 is performed on a user device 3100 by identifying applications associated with a content distribution system. In some embodiments, usage accounting 3122 is performed on a user device 3100 by identifying network end points associated with a content distribution system. In some embodiments, usage accounting 3122 is performed at the communication network (for example, communication networks 3110, 3111) (for example, WWAN) by identifying a data flow associated with a content distribution system and a client credential or user device 3100 credential or user credential. In some embodiments, usage accounting 3122 is performed at the communication network (for example, WWAN) by identifying an application associated with a content distribution system and a client credential or user device 3100 credential or user credential. In some embodiments, usage accounting 3122 is performed at the communication network (for example, WWAN) by identifying a network end point associated with a content distribution system and a client credential user device 3100 credential or user credential. In some embodiments, usage accounting 3122 is performed at a content distribution system network entity by identifying a device or user or client credential associated with data flows.

In some embodiments, transaction server 3123 assists a user to consume a preloaded content item in preloaded content 3108. In some embodiments, transaction server 3123 includes one or more of receiving a request for consumption of a preloaded content item in preloaded content 3108, requesting or receiving an authorization for consumption, requesting or receiving a payment for consumption from user device 3100, requesting or receiving a security certificate, delivering a security key, requesting or receiving a confirmation of payment requesting or receiving an authentication element. In some embodiments, content 3126 is a plurality of content (wherein plurality of content is, for example, a reservoir) available for preloading. In some embodiments, content ads (wherein content ads, are for example, offers) 3127 comprise a plurality of content ads that may be preloaded onto storage elements associated with user devices (including user device 3100). In some embodiments, content ads 3127 encourage (wherein encourage may be substituted for entice or promote) consumption of preloaded content. In some embodiments, preloaded content and ads list 3125 includes list of preloaded content or preloaded ads available at storage elements associated with one or more user devices 3100.

In some embodiments, optimizer 3124 selects content or content ads from content 3126 or content ads 3127 for preloading onto user device 3100 over one or more communication networks 3110, 3111. In some embodiments, optimizer 3124, selects content for preloading onto user device 3100 from content 3126 based on consumer analytics 3102. In some embodiments, optimizer 3124, selects content for preloading onto user device 3100 from content 3126 based on a value metric associated with one or more of a user of user device 3100 parameters, user device 3100 parameters, communication network 3111 or 3110 parameters. In some embodiments, optimizer 3124 selects content for preloading onto user device 3100 from content 3126 based on content available on preloaded content 3108. In some embodiments, optimizer 3124 selects content ads for preloading onto user device 3100 from content ads 3127 based on content available on preloaded content 3108. In some embodiments, optimizer 3124 selects content ads for preloading onto user device 3100 from content ads 3127 based on content ads available on preloaded content ads 3107. In some embodiments, optimizer 3124 selects content for preloading onto user device 3100 from content 3126 based on preloaded content and ads list 3125. In some embodiments, optimizer 3124 selects content for preloading onto user device 3100 from content 3126 based on access rules 3104. In some embodiments, optimizer 3124 prioritizes presentation of information associated to preloaded content 3108. In some embodiments, optimizer 3124 prioritizing presentation of information associated to preloaded content 3108 includes one or more of ranking, sorting, highlighting, formatting, notifying, placement, discovery of preloaded content element information to facilitate a selection of a preloaded content element by a user of user device 3100. In some embodiments, optimizer 3124 prioritizing presentation of information associated to preloaded content 3108 includes updating or adapting or modifying the one or more of ranking, sorting, highlighting, formatting, notifying, placement, discovery of preloaded content information to facilitate a selection of a preloaded content ad element by a user of user device 3100. In some embodiments, optimizer 3124 prioritizing presentation of information associated to preloaded content 3108 includes updating or adapting or modifying the one or more of ranking, sorting, highlighting, formatting, notifying, placement, discovery of preloaded content element information to facilitate a selection of a preloaded content element by a user of user device 3100 based on changes in value metric information (for example, changes in parameters associated with a user, user device, or communication networks, etc.).

In some embodiments, optimizer 3124 prioritizing presentation of information associated to preloaded content 3108 includes presentation of information associated to preloaded content ads 3107. In some embodiments, optimizer 3124 prioritizing presentation of information associated to preloaded content 3108 includes presentation of preloaded content ads 3107. In some embodiments, optimizer 3124 prioritizing presentation of information associated to preloaded content 3108 includes one or more of ranking, sorting, highlighting, formatting, notifying, placement, discovery of preloaded content ad element information to facilitate a selection of a preloaded content ad element by a user of user device 3100. In some embodiments, optimizer 3124 prioritizing presentation of information associated to preloaded content 3108 includes updating or adapting or modifying the one or more of ranking, sorting, highlighting, formatting, notifying, placement, discovery of preloaded content ad element information to facilitate a selection of a preloaded content ad element by a user of user device 3100. In some embodiments, optimizer 3124 prioritizing presentation of information associated to preloaded content 3108 includes updating or adapting or modifying the one or more of ranking, sorting, highlighting, formatting, notifying, placement, discovery of preloaded content ad element information to facilitate a selection of a preloaded content ad element by a user of user device 3100 based on changes in value metric information (for example, changes in parameters associated with a user, user device, communication networks, etc.).

In some embodiments, optimizer 3103 selects content or content ads from content 3126 or content ads 3127 for preloading onto user device 3100 over one or more communication networks 3110, 3111. In some embodiments, optimizer 3103, selects content for preloading onto user device 3100 from content 3126 based on consumer analytics 3102. In some embodiments, optimizer 3103, selects content for preloading onto user device 3100 from content 3126 based on a value metric associated with one or more of a user of user device 3100 parameters, user device 3100 parameters, communication network 3111 or 3110 parameters. In some embodiments, optimizer 3103 selects content for preloading onto user device 3100 from content 3126 based on content available on preloaded content 3108. In some embodiments, optimizer 3103 selects content ads for preloading onto user device 3100 from content ads 3127 based on content available on preloaded content 3108. In some embodiments, optimizer 3103 selects content ads for preloading onto user device 3100 from content ads 3127 based on content ads available on preloaded content ads 3107. In some embodiments, optimizer 3103 selects content for preloading onto user device 3100 from content 3126 based on preloaded content and ads list 3125. In some embodiments, optimizer 3103 selects content for preloading onto user device 3100 from content 3126 based on access rules 3104. In some embodiments, optimizer 3103 prioritizes presentation of information associated to preloaded content 3108. In some embodiments, optimizer 3103 prioritizing presentation of information associated to preloaded content 3108 includes one or more of ranking, sorting, highlighting, formatting, notifying, placement, discovery of preloaded content element information to facilitate a selection of a preloaded content element by a user of user device 3100. In some embodiments, optimizer 3103 prioritizing presentation of information associated to preloaded content 3108 includes presentation of information associated to preloaded content ads 3107. In some embodiments, optimizer 3103 prioritizing presentation of information associated to preloaded content 3108 includes presentation of preloaded content ads 3107. In some embodiments, optimizer 3103 prioritizing presentation of information associated to preloaded content 3108 includes one or more of ranking, sorting, highlighting, formatting, notifying, placement, discovery of preloaded content ad element information to facilitate a selection of a preloaded content ad element by a user of user device 3100.

In some embodiments, optimizer 3124 functionality described above may be performed at optimizer 3103. In some embodiments, optimizer 3124 and optimizer 3103 functionality described above is shared or performed jointly between optimizer 3124 and optimizer 3103.

In some embodiments, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link. In some embodiments, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 credential. In some embodiments, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 credential associated with a data flow. In some embodiments, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 user credential. In some embodiments, one or more of content (ad) downloader 3121, usage accounting 3122, transaction server 3123, optimizer 3124, preloaded content and ads list 3125, content 3126, content ads 3127 communication or session data exchanges with user device 3100 over the one or more communication networks 3111 or 3110 are over a secure link based on a user device 3100 client credential.

In some embodiments, communication network 3111 is a WWAN (wireless wide area network). In and embodiment the WWAN communication network is one or more of a cellular, 2G, 3G, 4G, WiMax, etc. access network. In some embodiments, communication network 3110 is a LAN or PAN. In some embodiments, the LAN or PAN communication network 3110 is one or more of Ethernet, WLAN, WiFi, Bluetooth, etc. In some embodiments, LAN or PAN communication network 3110 is a home WiFi or POI WiFi or work WiFi. In some embodiments, LAN or PAN communication network and is further connected to the content distribution system network entities over a broadband communication network. In some embodiments, the broadband communication network is one of more of xDSL, Cable Modem, T1/E1, Fiber, etc.

In some embodiments, WWAN communication network 3111 data usage cost parameter is higher than LAN or PAN communication network 3110 data usage cost parameter. In some embodiments, access control 3101 controls one or more content distribution functionality data usage based on network type or network capacity or network changes or network cost. In some embodiments, a subset of content distribution functionality communication network usage is restricted to a subset of the available communication networks 3110, 3111. In some embodiments, preloading content with data size above a threshold is permitted over a LAN or PAN communication network 3110 and are not permitted over a WWAN communication network 3111. In some embodiments, preloading content ads (or offers) with data size below a threshold is permitted over WWAN communication network 3111. In some embodiments, preloading content ads (or offers) with value matric exceeding a threshold is permitted over WWAN communication network 3111. In some embodiments, data session usage exchanges between a user device 3100 and one or more of usage accounting 3122, optimizer 3124, preloaded content or ads list 3125 are permitted over WWAN communication network 3111. In some embodiments, transaction server 3123 data session usage exchanges with a user device 3100 are permitted or prioritized over other transactions to facilitate preloaded content purchase or consumption. In some embodiments, access control 3101 specifically prevents or specifically allows each content distribution system communication session functionality over one or more communication network 3110, 3111 based on network type, capacity or cost. In some embodiments, content distribution system control information data usage (consumption transactions, usage accounting, user account info, user preferences, authentication, authorization, billing) is allowed over all available communication networks 3110, 3111. In some embodiments, content distribution system content preloading is allowed over a subset of available communication networks 3110, 3111. In some embodiments, the subset of communication networks 3110, 3111 for preloading are free (or free per use—for example, a flat monthly fee without a cost per usage) communication networks 3110, 3111.

Figure 32:
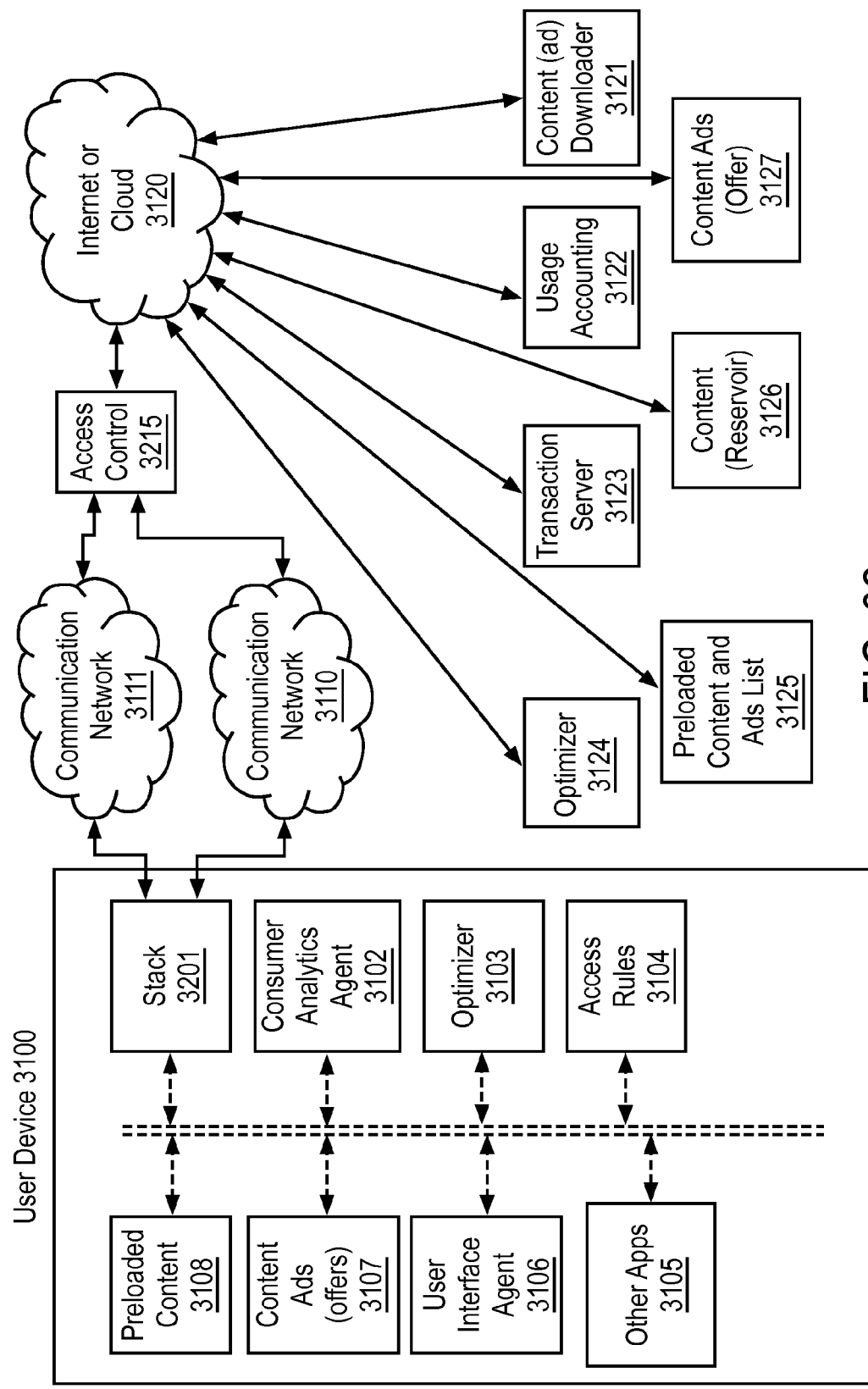
FIG. 32 shows a user device coupled to a content distribution system over two communication networks in accordance with some embodiments.

FIG. 32 shows a user device 3100 coupled to a content distribution system over two communication networks in accordance with some embodiments. In some embodiments, the user device 3100 comprises stack 3201. In some embodiments, stack 3201 exchanges data with a content distribution system over one or more communication networks 3111 or 3110 without selecting or restricting data usage over the one or more communication networks 3111 or 3110.

In the embodiment of FIG. 32, access control 3215 is in-line with the content distribution system data exchanges, but is not included within user device 3100 functionality.

In some embodiments, access control 3215 functionality is included at a network entity. In some embodiments, access control 3215 is included in a network entity to offload computational complexity from a user device 3100. In some embodiments, access control 3215 is included in a network entity to offload computational complexity from other entities of the content distribution system. In some embodiments, access control 3215 is included in a network entity in-line with the content distribution system data transmission to offload computational complexity from a plurality of entities of the content distribution system. In some embodiments, access control 3215 is included in a network entity to improve the privacy or security of information available at one or more network entities from a user device 3100 or a user of user device 3100. In some embodiments, access control 3215 is included in a network entity to reduce communication overhead of sharing information available at one or more network entities used for selecting a communication network 3111 or 3110, with user device 3100.

In some embodiments, access control 3215 functionality is included at one or more of content broker, content provider, service provider, cloud service. In some embodiments, access control 3215 is included in a content broker or cloud service to offload computational complexity from one of more of a user device 3100, content provider or service provider. In some embodiments, access control 3215 is included in a content broker or cloud service to improve the privacy or security of information related to user device 3100 or a user associated with user device 3100. In some embodiments, access control 3215 is included in a content broker or cloud service to improve the privacy or security of information related to user device 3100 or a user associated with user device 3100 by not sharing sensitive information with a plurality of content providers or service providers.

In some embodiments, access control 3215 includes one or more of the functionality in embodiments described for access control 3101.

Figure 33:
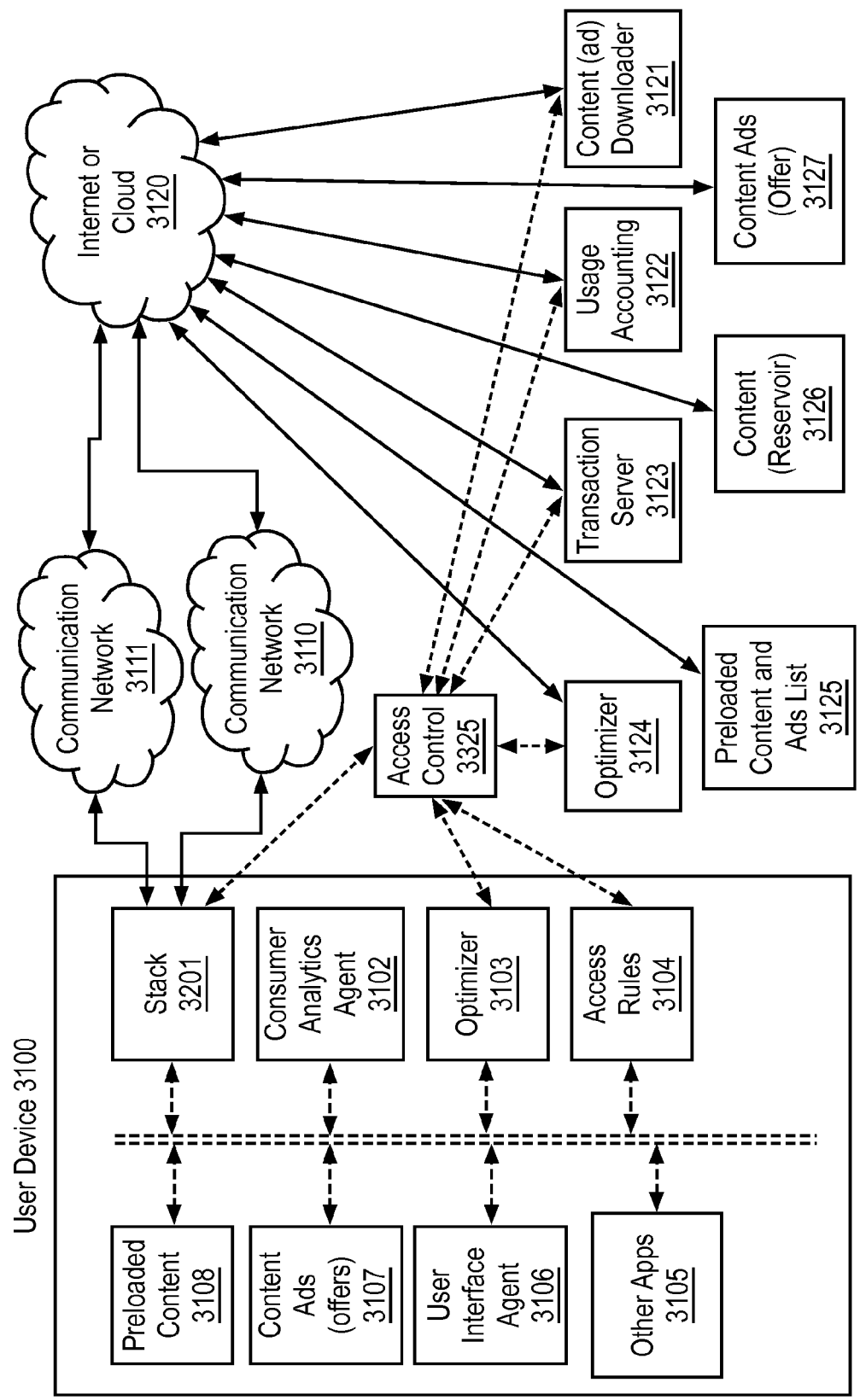
FIG. 33 shows a user device coupled to a content distribution system over two communication networks in accordance with some embodiments.

FIG. 33 shows a user device 3100 coupled to a content distribution system over two communication networks in accordance with some embodiments. In some embodiments, the user device 3100 comprises stack 3201. In some embodiments, stack 3201 exchanges data with a content distribution system over one or more communication networks 3111 or 3110 without selecting or restricting data usage over the one or more communication networks 3111 or 3110.

In the embodiment of FIG. 33, access control 3325 is off-line with the content distribution system data exchanges. In some embodiments, access control 3325 obtains information associated with the content distribution system from one or more user entities or network entities to select usage of communication network 3111 or 3110 for content distribution system data exchanges. In some embodiments, access control 3325 grants or allows or recommends or restricts content distribution system data usage between one or more user entities and one or more network entities to select usage of communication network 3111 or 3110 for content distribution system data exchanges. In some embodiments, access control 3325 grants or allows or recommends or restricts content distribution system data usage by one or more user entities to select usage of communication network 3111 or 3110 for content distribution system data exchanges. In some embodiments, access control 3325 grants or allows or recommends or restricts content distribution system data usage by one or more network entities to select usage of communication network 3111 or 3110 for content distribution system data exchanges.

In some embodiments, access control 3325 enables secure data exchanges between or more content distribution system user entities (for example, user device 3100 stack 3201) and one or more content distribution system network entities (for example, content (ad) downloader or transaction server 3123). In some embodiments, access control 3325 enables secure data exchanges between or more content distribution system user entities (for example, user device 3100 stack 3201) and one or more content distribution system network entities (for example, content (ad) downloader or transaction server 3123) since access control 3325 does not need to identify one or more content distribution data exchanges. In some embodiments, access control 3325 enables secure data exchanges between or more content distribution system user entities (for example, user device 3100 stack 3201) and one or more content distribution system network entities (for example, content (ad) downloader or transaction server 3123) since access control 3325 does not need to perform deep packet inspection (DPI) or identify flows of one or more content distribution data exchanges. In some embodiments, access control 3325 is off-line with content distribution system data exchanges to offload computational complexity from other entities of the content distribution system (for example, by avoiding data flow identification, DPI, etc.). In some embodiments, access control 3325 is off-line with the content distribution system data transmission to offload computational complexity from a plurality of entities of the content distribution system. In some embodiments, access control 3325 is off-line to improve the privacy or security of information available at one or more network entities from a user device 3100 or a user of user device 3100. In some embodiments, access control 3325 is off-line to reduce communication overhead of sharing information available at one or more network entities used for selecting a communication network 3111 or 3110, with user device 3100.

In some embodiments, at least part of access control 3325 functionality is included in user device 3100. In some embodiments, at least part of access control 3325 functionality is included at a network entity. In some embodiments, access control 3325 functionality is included at one or more of content broker, content provider, service provider, cloud service. In some embodiments, access control 3325 includes one or more of the functionality in embodiments described for access control 3101. In some embodiments, access control 3325 obtains information associated to communication network 3111 or 3110 status. In some embodiments, access control 3325 obtains information associated to communication network 3111 or 3110 status comprising one or more of communication network availability, coverage, performance, cost, etc. In some embodiments, access control 3325 obtains information associated to communication network 3111 or 3110 status from stack 3201. In some embodiments, access control 3325 obtains information associated to access rules 3104. In some embodiments, access control 3325 obtains information associated to access rules from a network entity. In some embodiments, access control 3325 obtains information from optimizer 3103 or optimizer 3124. In some embodiments, access control 3325 obtains information from optimizer 3103 or optimizer 3124 comprising one or more of classified, prioritized, ranked or sorted content queues or content ad queues for preloading onto user device 3100. In some embodiments, access control 3325 grants or restricts access to communication networks 3111 or 3110 to one or more of content (ad) downloader 3121, optimizer 3124, transaction server 3123, usage accounting 3122, preloaded content and content ads list 3125. In some embodiments, access control 3325 grants or restricts access to communication networks 3111 or 3110 based on one or more of user parameters, user device 3100 parameters, communication network parameters 3111 or 3110, content parameters, network entity parameters, network entity sponsoring services, network entity sponsoring services associated to a user or user device account. In some embodiments, access control 3325 grants or restricts access to communication networks 3111 or 3110 based on value metric.

Service Plans

Some embodiments include obtaining, by the service provider, a permission before preloading the at least a portion of the content, and compensating, by the service provider, an entity with financial ownership of the storage element.

Another embodiment includes receiving, by the service provider, a permission before preloading the at least a portion of the content, and receiving compensation, from a user of the content, for consumption of the content preloaded on the storage element or the service of preloading content to the storage element.

In some embodiments, a user device is a mobile device and is capable of connecting to a wireless wide area communication network (for example, cellular, 2G, 3G, 4G, etc.) and a local area communication network (for example, a home WiFi, POI WiFi, or Bluetooth, etc.).

In some embodiments, a network entity preloading management service (for example, a cloud preloading service by a content broker or content provider, etc.) determines a refreshed user preference information, wherein refreshed user preference information includes obtaining user preference information and updating the user preference information. In some embodiments, the updating may performed periodically (for example, at a predetermined time intervals) or may be performed by a polling function from the management service (for example, when hardware or software resources of the management service are available) or may be performed based on interrupts generated by an triggering event (for example, a user device being powered up, a user logging into the user device, the user device entering the coverage area of a communication network, etc.). In some embodiments, user preference information comprises user parameters (for example, desired content type, demographics, location, users' device type, likelihoods, association with other users, etc.).

In some embodiments, the preloading management service determines refreshed content preloading priority information, wherein refreshed content preloading priority information includes obtaining content preloading priority information and updating the content preloading priority information. In some embodiments, the content preloading priority information includes one or more of content parameters (for example, type, format, etc.), content business rules (for example, metadata for inserting ads, number of views, limited consumption period, etc.), information associated with a content provider managing the content (for example, bidding or offer parameters between preloading management service and content provider, etc.). In some embodiments, the refreshed user preference information or the refreshed content preloading priority information are user do create a preloading refresh list of content (wherein the list may comprise a queue or a sort or a rank or a group, etc.). In some embodiments, the refresh list is generated. In some embodiments, the refresh list is updated. In some embodiments, the refresh list is updated based on refreshed user information or refreshed content priority information until the refreshed list of content is preloaded. In some embodiments, the refreshed list of content comprises preloaded content to be added to other content available at a storage device. In some embodiments, the refreshed list of content comprises preloaded content to be deleted from content available at a storage device. In some embodiments, the refreshed user preference information or refreshed content priority information is used for a user device content discovery priority function (for example, a device agent or app, or content information presentation function, etc.) for defining an aspect of how content is to be prioritized in on-device content usage/purchase offers.

In some embodiments, an intermediate storage element (for example, a storage reservoir at a home gateway, set top box, POI storage, etc.) is connected to a local area communication network (WLAN, LAN, PAN, etc.) and wide area communication network (for example, a broadband DSL, Cable Modem, fiber to the home, T1/E1, backhaul, etc.). In some embodiments, the intermediate storage element trickle charges valuable user content as determined by the network entity preloading management service. In some embodiments, valuable content includes one or more of content likely to be consumed or purchased by one or more users or high profit margin, or low cost.

In some embodiments, the intermediate storage element is configured to receive refreshed prioritization of device preloaded content from the network entity preloading service that determines lists of content to remove and lists of content to add.

In some embodiments, the intermediate storage element preloads (or deletes) content onto one or more user devices based on refreshed prioritization content. In some embodiments, the intermediate storage element refreshes (for example, preloads or deletes) content onto the one or more storage associated to user devices (for example, the storage coupled to the user device) when the one or more user devices are connected to a shared local area communication network.

In some embodiments, user preference information is collected from the mobile user device and sent to a networking entity service (for example, a cloud service) while the mobile device is connected to a wide area communication network. In some embodiments, the mobile user device is not connected to the local area communication network but is connected to the mobile network when the user preference information is obtained and sent to the network entity (for example, cloud cache management service).

In some embodiments, a networking entity service determines the refreshed content preloading priority (for example, ranks or sorts the list or queue of content). In some embodiments, the networking entity starts the trickle charge process for refreshing the intermediate storage element before the device connects to the local area communication network. In some embodiments, a portion of the refreshed preloaded content is available when the mobile user device connects to the local area communication network. In some embodiments, the portion of the refreshed preloaded content or discovery priorities are available for fast presentation or consumption at the mobile user device. In some embodiments, the local area communication network has higher performance than the wide area communication network couple to the intermediate storage element and enables presentation or consumption or preloading onto mobile device couple storage of one of more of the preloaded content. In some embodiments, the content consumption from the intermediate storage element or preloading from the intermediate storage element onto storage closer or coupled to the user device is not limited by intermediate storage reservoir wide area communication network performance (for example, bandwidth).

In some embodiments, a user device is a mobile device and is capable of connecting to a wireless wide area communication network (for example, cellular, 2G, 3G, 4G, etc.) and a local area communication network (for example, a home WiFi, POI WiFi, or Bluetooth, etc.).

In some embodiments, a network entity preloading management service (for example, a cloud preloading management service) determines an initial preload content list comprising content to be preloaded onto storage associated (for example, near or coupled or attached or included) to the mobile device. In some embodiments, the preloading management service assists (for example, initiates or causes or pushes) content on the preload content list to be preloaded onto storage associated the device.

In some embodiments, the network entity preloading management system determines a user device discovery content offer priority list. In some embodiments, the offer priority list may include one or more of a value metric based sorting or ranking or a user preference based sorting or ranking. In some embodiments, the offer priority is based on constraints on one or more of one or more users, the user device, the content parameters, business rules on the content. In some embodiments, the priority list highlights on the mobile device (for example, on UI) offers to consume. In some embodiments, the priority list highlights preloaded content for consumption or use or purchase that is determined to be high priority content. In some embodiments, high priority content is based on a value metric associated to one or more of a content provider, content broker, or user. In some embodiments, the high priority content is a subset of the available preloaded content on the device and is the content determined by one or more of user preferences, expected consumption statistics, expected economic return or content consumption/advertising incentives. In some embodiments, an initial on-device discovery content offer priority list is sent to the to the user device for presentation (for example, display on UI) of offers to a user. In some embodiments, the preloaded content presentation (for example, location, font, format, order of presentation of content list on UI) is in accordance with priority list.

In some embodiments, the network entity preloading management service collects additional user preference information (for example, periodically, or based on events triggers) from the user device. In some embodiments, the user preference information is obtained while connected to the wide area communication network and is used to determine refreshed or updated high priority content. In some embodiments, the refreshed priority content is a subset of the available preloaded content on the user device. In some embodiments, the refreshed priority content is determined by a refresh of one or more of user preferences, expected consumption statistics, expected economic return or content consumption/advertising incentives.

In some embodiments, the network entity communicates refreshed user device discovery UI content offer priority list to the device to re-arrange the priority of UI display offers to user in accordance with priority list.

Security

In some embodiments, a preloaded content is stored at a storage element in a protected format. In some embodiments, a preloaded content comprises a portion of a content. In some embodiments, a preloaded content is protected to prevent a user from consuming the content. In some embodiments, a preloaded content is protected to prevent a user from sharing the content. In some embodiments, a protected preloaded content may be consumed or shared following an approval or authorization. In some embodiments the approval or authorization is obtained from a network entity (for example, content provider, content broker, etc.). In some embodiments the preloaded content is encrypted. In some embodiments the preloaded content comprises a digital watermark. In some embodiments, the preloaded content comprises a signature associated to a storage element or a user device or a user. In some embodiments, the preloaded content signature may be used to identify an unauthorized copy of the content. In some embodiments, the user entity requires a certificate from a network entity prior to consumption of the content. In some embodiments, a first portion of the content is preloaded in a second portion of the content is preloaded or downloaded after the approval or authorization or payment. In some embodiments, the second portion is a small portion of the preloaded content data usage. In some embodiments, the storage manager or content manager at a network entity or user entity manages security functionality. In some embodiments, a device agent at a user entity authenticates and authorizes the user entity to consume a content. In some embodiments, a network entity monitors user entity security agents to ensure they have not been tampered.

Variable Pricing

In some embodiments, a cost for consuming the content is based on a value metric cost parameter associated with the storage element or a communication network.

In some embodiments, the cost to the user (or price offered by service provider) or consumer for a preloaded content includes storage or communication network costs. In some embodiments the cost or price of a content offered to a user or consumer will vary depending on the storage element or communication network resources utilized.

Carrying content from a content source to a user device for presentation may utilize one or more communication networks. Each of these one or more communication networks may incur a cost for carrying the content. Moreover, a communication network may be busy or idle at a given time and the cost of carrying the content may depend on how busy the communication network is. In some embodiments carrying content from a content source to a user device may have more than one choice of communication networks to reach the user device. In some embodiments, the cost or price or value, etc. of the content comprises a cost associated with one or more communication networks utilized for carrying the content from a content source to a user device for consumption.

Figure 24:
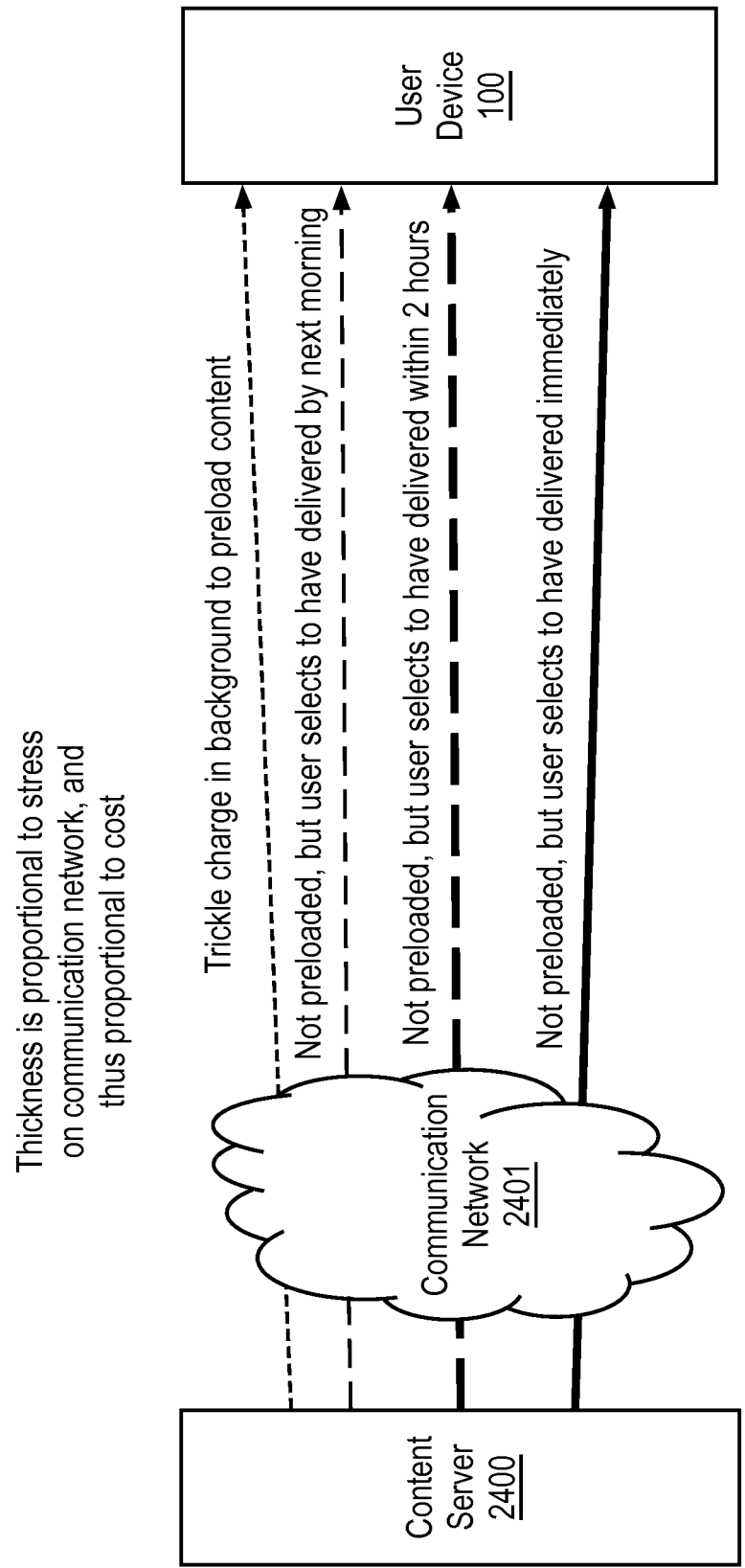
FIG. 24 illustrates four options to utilize a given communication network that may result in variable cost of content presented to a user device in accordance with some embodiments.

FIG. 24 illustrates 4 different options to utilize a given communication network that may result on variable cost (wherein cost may be substituted for price, value, etc.) of content presented to a user device in accordance with some embodiments. In some embodiments a content may be carried from content server 2400 to user device 100 over the same communication network over different timelines or delay, etc. In some embodiments, the topmost option preloads the content in the background without a time limit restriction. This may result in efficient use of the communication network (for example, utilizing the communication network during off peak hours). In some embodiments, the second option, does not preload the content, but the user selects to have the content delivered by the next morning. This option, may allow the communication network to preload the content in a more efficient way, for example, utilizing bandwidth during intervals of lower utilization. This option may also allow the content to be preloaded with a lower class of QoS (for example, best effort). In some embodiments, the third option does not preload the content but the user selects to have the content delivered within 2 hours. This option has a shorter time line for content loading but still allows the communication network to load the content even if the speed of the connection is fluctuating, or lower rate than required for a real-time content presentation. In some embodiments, the fourth option the content is delivered immediately. This option will be the most stressful on the communication network. In some embodiments the price offered to a user for consuming a content is associated with communication network utilization options.

Figure 25:
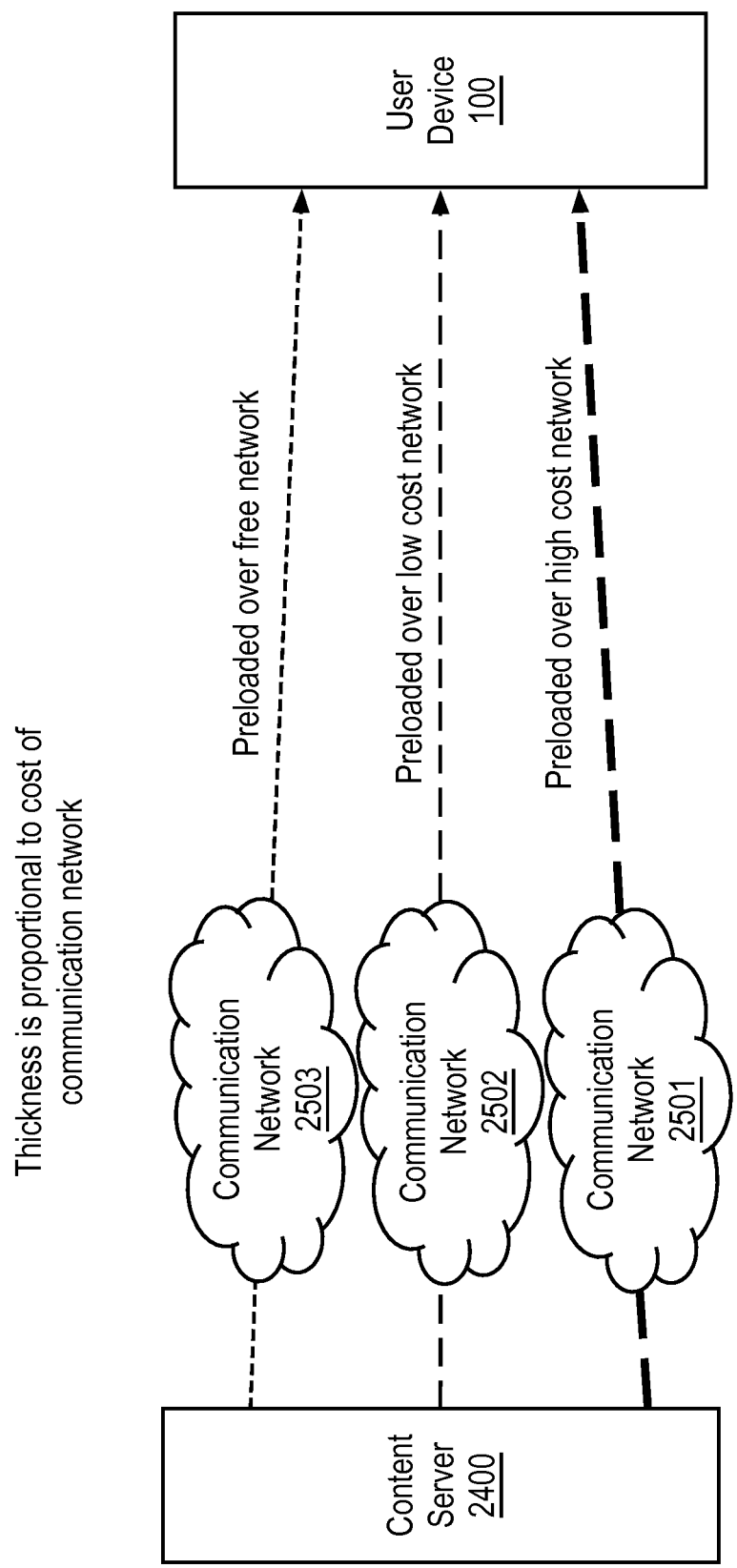
FIG. 25 illustrates three options to preload the content from a content server to a user device over three different communication networks in accordance with some embodiments.

FIG. 25 illustrates 3 different options to preload the content from a content server 2400 to a user device 100 over three different communication networks in accordance with some embodiments. In some embodiments, communication network 2503 is a free network (for example, home WiFi). In some embodiments, communication network 2502 is a low-cost network, such as a wired broadband connection to a home. In some embodiments, communication network 2501 is a high cost network, such as a home or roaming cellular network. In some embodiments, the cost or price or value, etc. of the content comprises a cost associated with communication network utilized for carrying the content from a content source to a user device for consumption.

Carrying content from a content source to a user device for presentation may utilize one or more storage elements. Each of these one or more storage elements may incur a cost for storing the content. Moreover, a storage element may be empty or full at a given time and the cost of storing the content may depend on the free or available storage in the storage element. In some embodiments carrying content from a content source to a user device may have more than one choice of storage elements to reach the user device.

Figure 26:
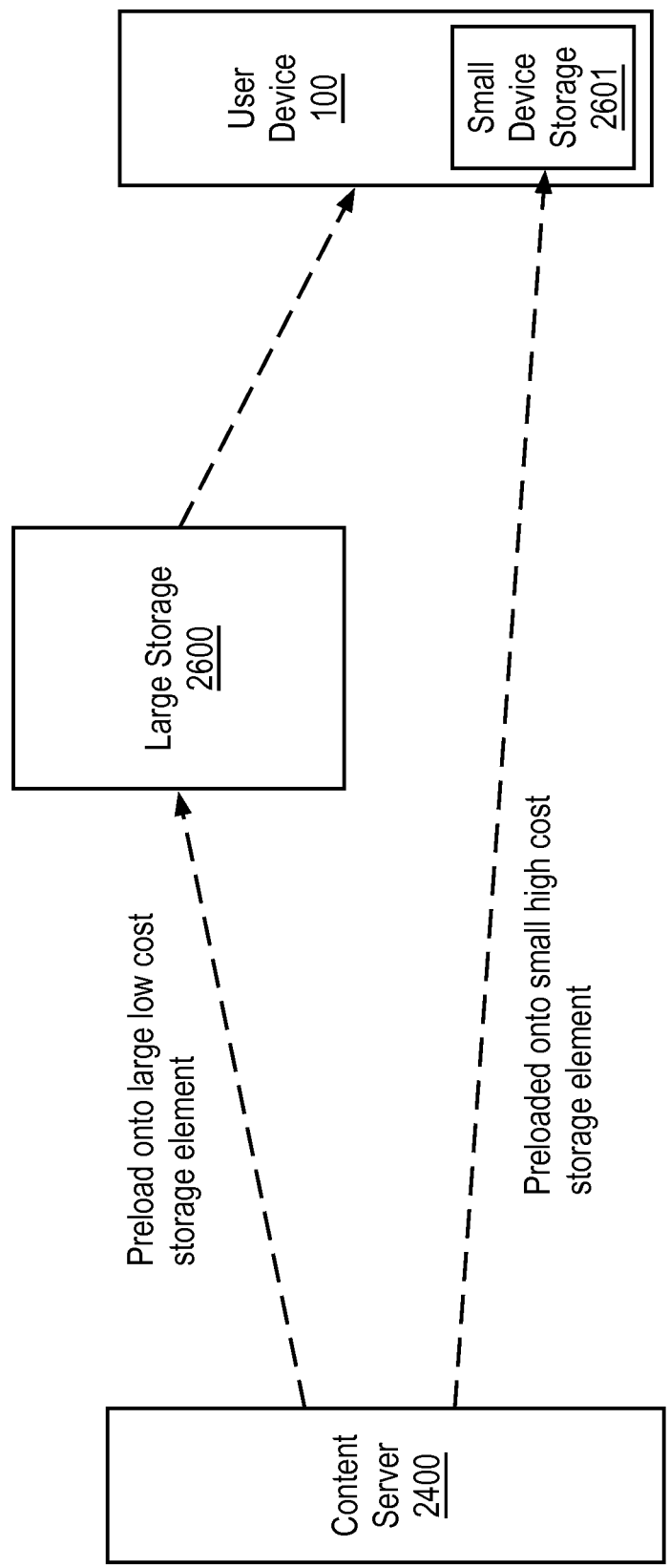
FIG. 26 shows a Content Server and a user device associated with a large storage and a small storage in accordance with some embodiments.

FIG. 26 shows a Content Server 2400 and a user device 100 associated with a large storage 2600 and a small storage 2601 in accordance with some embodiments. In FIG. 26, the small storage 2601 is included in user device 100, so that if user device 100 is portable or mobile, the contents of storage 2601 will be available as the user device 100 is moving. In some embodiments, the large storage 2600 is not included within user device 100 and may be associated with user device 100, over a communication network. The large storage 2600, may be a home gateway reservoir or a set top box or a POI access point storage, etc. for this embodiment a desirable content to be presented at user device 100 may be preloaded onto large storage 2600 or small device storage 2601. Typically large storage 2600 will have more available storage and have a lower cost (or opportunity cost) per gigabyte. Typically small device storage 2601 will have less available storage and have a higher cost (or opportunity cost) per gigabyte. Therefore, in an embodiment the cost for consuming a preloaded content stored in large storage 2600 may be lower than the cost for consuming a preloaded content stored in small device storage 2601.

FIG. 27 is a table that includes a variable price of content preloaded offered to a user in accordance with some embodiments. In this example, the user is interacting with a smartphone attempting to consume preloaded content associated with the smartphone. The smartphone is associated with storage within the smartphone, storage at home gateway, and storage at a home set top box (listed under column "storage location"). In this example the smartphone is currently not in the coverage area of the home gateway or home set top box communication networks (shown as "N/A" entries in the table). Therefore movie Q and movie R are currently not available (listed as "N/A" under column "view now"). In this example movie P is available now in 2 formats over an expensive communication network (for example, cellular or roaming). The cost for consuming movie P will be lower if the user waits to go home before viewing, since the movie can be preloaded over a lower cost communication network (for example, home broadband access) or stored on a lower cost storage element. The cost for consuming movie P may be even lower if the user is willing to wait an additional day prior to consumption. In this case, the service provider may schedule a broadcast or multicast of the content for preloading (which may allow for sharing of communication network cost of preloading across multiple users), or preload content over a very low priority (for example, lowest QoS, best effort, etc.) data connection.

In some embodiments, the content may be offered at variable price based on one or more communication networks utilized to carry the content or based on the time, or the timeline, or the delay, or the stress on one or more of the communication networks utilized to carry the content, or based on one or more storage elements utilized to store the content prior to presentation. In some embodiments, in addition the variable price may include content parameters (for example, HD versus SD format), or user device parameters (for example, display size), or user parameters (for example, service plan), or content provider parameters (for example, price, specials), etc.

In some embodiments, a movie content provider may preload a first set of movies over a wired broadband access network to a home gateway storage element or reservoir, and may preload a second set of movies over a cellular access network onto a mobile user device local storage element, and may preload a third set of movies over a WiFi network onto a second mobile user device storage element. Each of these 3 sets of movies may incur different cost of the communication network, or the storage element, or the movie format, etc. These cost parameters may be used to offer each set at a variable price.

In some embodiments, the variable price associated to the content may affect the way the content elements are presented to a user. The variable price may be used to identify, select, cluster, rank, sort, classify, tier, etc. the content elements. Variable pricing may influence searching, browsing, etc. of the content located at the storage element. Variable pricing may influence notifications, displays, banners, pop-ups, etc. assisting in content consumption.

In some embodiments, if a user shows interest to consume a content with a given variable price, a notification is presented to the user for the same content available at a lower price, by utilizing more cost-effective storage elements or communication network to store and transport the content to the user.

In some embodiments, if a user shows interest to consume a content with a given variable price, a notification may be presented to the user for a comparable content available at a lower price (for example, a movie preloaded at the home gateway when user is at home), by utilizing more cost-effective storage elements or communication network to store and transport the content to the user.

In some embodiments, if a user shows interest to consume a content with a given variable price, a notification may be presented to the user for the same contenting a more desirable format for a comparable price, by utilizing more cost-effective storage elements or communication network to store and transport the content to the user.

In some embodiments, if a user shows interest to consume a content with a given variable price, a notification may be presented to the user for the same content for a lower price by delaying access to the content to a later time (for example, reduced stress on communication network performance) or a later location (for example, wait until the user gets home from work), by utilizing more cost-effective storage elements or communication network to store and transport the content to the user.

In some embodiments, variable pricing content may be used in value metric preloading selection. In some embodiments, value pricing parameters may be obtained or estimated or computed, etc., from pretest market or pretest groups.

In some embodiments, variable pricing of content may include sponsor services, promotions, coupons, etc. In some embodiments, information associated with consumption of content with variable pricing is collected, processed, etc. In some embodiments, information associated with consumption of content with variable pricing is shared with one or more entities (for example, content providers, content broker, POI managers, etc.).

Presenting Preloaded Ads on User Device

In some embodiments, a content preloaded onto a storage element is or includes an advertisement (ad).

It is to be understood that one or more of the embodiments described for distribution, preloading, managing, classifying of content can additional or alternatively be utilized for distribution, preloading, managing, classifying of ads. That is content and ads can be interchangeably used for the described embodiments. In one embodiment the content comprises and ad.

A service provider of ads may be called an ad service provider. A service provider of content is a content provider or a content broker, or include functionalities of both. Similarly an Ad Service provider is an ad provider or an ad broker, or include functionalities of both.

In some embodiments, the content includes an advertisement, and this embodiment further includes selecting the advertisement, and assisting in presentation of the advertisement at a user device. In some embodiments, the selecting of advertisement includes selecting from preloaded advertisements. In some embodiments, the selecting is based on one or more of user devices, a content being presented, a parameter of a user consuming the content.

There are many embodiments where presenting preloaded ads may be advantageous. In some embodiments, a preloaded ad may be presented while video streaming is filling up a user device cache without waiting for the ad to download. In some embodiments, a preloaded ad may be presented when the user device is off-line (for example, not in the coverage area of an ad provider communication network). In some embodiments a preloaded ad may be presented while other ads are being preloaded or downloaded in the background. In some embodiments, a preloaded ad may be presented while other ads targeted to a user are waiting for a more convenient or cost-effective or more valuable communication network to be available (for example, WiFi). In some embodiments presenting preloaded ads benefits a user by reducing/delaying/avoiding usage of valuable communication network bandwidth resources (for example, cellular data plan). In some embodiments, presenting of a preloaded ad may be more easily controlled (for example, by reducing fast forwarding) that if the ad was embedded in the content. In some embodiments, preloading ads on storage elements associated with the user device may improve the privacy of a user, for example, by reducing the amount of information associated with the user sent to the network for selecting an ad to be presented to the user.

Preloading Ads and Preloaded Ads

Typically the population of available ads is very large, and therefore selecting ads to be preloaded based on value metrics may be beneficial. Preloading selected ads may enable presenting ads that are better targeted to an end consumer. Preloading selected ads may enable presenting ads that are more dynamic than if fixed to associated content. Preloading selected ads may provide better control of the presentation to an end consumer. Preloading selected ads may enable presentation of higher quality ads, which otherwise may consume valuable communication network resources or may otherwise stall when streamed or may otherwise take too long to be presented, which may frustrate an end consumer.

The selection of the ads may be performed by one or more of the network side entities, for example, an ad provider, ad service provider, ad broker, or devices associated with a user or user appliances, for example, a storage element, a user device, etc. Selection of ads by the network entities may have the benefit of offloading hardware resources (for example, processor, battery, etc.) of devices associated to a user. Selection of ads by the devices associated to the user may improve privacy, for example, by reducing the amount of information associated to a user or user device with the network. Selection of ads by the storage element may reduce network chatter, for example, when the storage element is at a POI assisting several user devices or the selection is based on the aggregate of parameters associated with several user devices.

In some embodiments, the value metrics for selecting ads to be preloaded are based on value metric parameters associated with the ads. Examples of value metric parameters associated with the ads may include: size, type, required throughput, format, ad revenue/cost/profit per presentation, ad revenue/cost/profit per click, click rate, communication network requirements, user device hardware or software requirements, business rules, associations with content (for example, may or may not be allowed to be presented with specific content), etc. or any other ad parameter for helping ad selection.

In some embodiments, the value metrics for selecting ads to be preloaded are based on value metric parameters associated with one or more users. Examples of value metric parameters associated with a user include: user demographics (for example, age, sex, profession, marital status, etc.), user location (for example, home, work, POI, location trace, past/current/future location, etc.,), user history (for example, prior content interactions, prior ad interactions, etc.), user context (for example, talking, walking, driving, working, interacting with user device, etc.) user network (for example, virtual or real-life, families, friends, colleagues, etc.), etc. or any other user parameters for helping ad selection.

In some embodiments, one or more value metric parameters associated with a user are abstracted, or parametrized, or clustered, modeled, or classified, etc. from more detailed user parameters for privacy. In some embodiments some parameters of the user may not be shared with network entities or devices, ad provider, ad service provider, ad broker, etc., for privacy reasons and instead the user may be assigned into a classification for ad preloading that is used for value metric evaluation without revealing sensitive user parameters. In some embodiments, the age, sex, income, location, etc. user parameters may be remapped onto value metric parameters that is exchanged with network entities or devices for value metric evaluation for ads without sharing sensitive user information. In some embodiments a portion of the value metrics or value metric parameters are computed locally (for example, user device or storage element) and shared with the network entities.

In some embodiments, a value metric for selecting ads to be preloaded are based on value metric parameters associated with a user device. Examples of value metric parameters associated with the user device may include: type (for example, smart phones, tablets, notebooks, PC, etc.), mobility, hardware capability (for example, UI, display, processor, etc.), software capability (for example, operating system, applications, content decoders, etc.), or any other user device parameters for helping ad selection.

In some embodiments, the value metrics for selecting ads to be preloaded are based on value metric parameters associated with an ad provider. Examples of value metric parameters associated with an ad provider may include: ad revenue, ad campaigns, ad relationships, ad programs, business rules or relationships between the ad provider and content providers, business rules or relationships between the ad provider and the user device or the user, etc.

In some embodiments, the value metrics for selecting ads to be preloaded are based on value metric parameters associated a the communication network from an ad server to a storage element or the storage element to a user device. Examples of value metric parameters associated with the communication network may include: communication network cost (for example, cost per use, cost per time interval, unlimited use, cost over time, cost versus QoS, background/foreground cost, real-time versus background low bandwidth, etc.), communication network performance (for example, speed, bandwidth, latency, jitter, packet error rate, busy status, etc.), communication network availability (for example, past/current/future connectivity with a target user device for presenting the ad, etc.), etc. or any other communication network parameters for helping ad selection.

In some embodiments, the value metrics are used for selecting ads to be deleted from a first storage or moved to a second storage element.

In some embodiments, the value metrics for selecting ads to be preloaded are based on value metric parameters associated with a storage element for preloading the ads. Examples of value metric parameters associated with a storage element may include: size, available size, type, latency, throughput, access time, communication network capability, past/current/future connectivity with ad server or user device, etc. or any other storage element parameter for helping ad selection.

In some embodiments, an ad is preloaded as a separate entity (for example, a separate file) and may be decoupled from other content. In some embodiments, the ad is assigned a tag. This tag may be used to address/index/name/point to the ad when exchanging information with a network entity, cloud server, client device, a storage element, a user device, a presentation of the ad, etc.

In some embodiments, a value metric of a previously preloaded ad is monitored periodically. In some embodiments, the value metric of a previously preloaded ad is reevaluated if a value metric parameter changes.

In some embodiments, a previously preloaded ad may be deleted from a storage element or moved to a different storage element based on value metrics.

In some embodiments, the value metrics for selecting ads to be preloaded are based on value metric parameters associated with 2 or more storage elements associated with a user device for preloading the ads. The 2 or more storage elements may be classified or assigned a tier based on the storage capabilities relative to an ad or a user device, etc. Ads associated with a user device may be distributed over the 2 or more storage elements based on value metrics.

In some embodiments, the value metrics for selecting ads to be preloaded are based on value metric parameters associated with 2 or more communication networks associated with a user device or storage element for preloading the ads. The 2 or more communication networks may be classified based on the communication network parameters relative to an ad or the user device, etc. The ads associated with the user device may be distributed over the 2 or more communication networks based on value metrics.

In some embodiments an ad provider is assisted by an ad broker. The ad broker may provide infrastructure such as software or hardware for the network entities or software or hardware for the user device or storage elements for assisting or enabling ad selection or ad preloading or ad deleting or ad moving or ad presentation at a user device. The ad broker may obtain value metric information from users, users devices, storage elements, communication networks, etc., for value metric based selection or preloading or deleting or moving or presentation of ads. The ad broker may obtain and share value metric information or process or classify value parameters from the users, user devices, storage elements, communication networks, etc., with the ad provider. The ad broker may assist the selection of the ads for preloading, or assist on the preloading to storage elements, or assist in the insertion or presentation of the ads at the user device.

In some embodiments an ad broker assists a plurality of ad providers in one or more of obtaining value metrics, value metric parameters, value metric parameter relationships, selecting ads based on value metrics, preloading selected ads, presenting ads to users or inserting ads in content presented to users. This ad broker service may increase the value of ads to one or more of the providers, or to the users, etc. This ad broker service may simplify the development, management and maintenance of this ad delivery system to one or more providers or to one or more users. In some embodiments, network or storage element or user device software or hardware may be shared across 2 or more providers. This may result in improved privacy to a user, as sensitive user information may be managed by a single entity (for example, ad broker) instead of repeated over multiple providers. In some embodiments the ad broker receives compensation based on delivering information related to value metrics to the ad provider. In some embodiments the ad broker receives compensation based on selecting or preloading ads for the ad provider. In some embodiments the ad broker receives compensation based on interactions, or presentation, or consumptions of preloaded ads for the ad provider.

In some embodiments, a communication network provider sponsors/subsidizes an ad preloading service based on value metrics that offload data usage over the communication network or reduces congestion over the commutation network. In some embodiments, the user agrees to a service or provides compensation for an ad preloading service based on value metrics that may increase the relevance of the ads or the quality of the ads or reduce communication network cost or improve presentation of other content that would otherwise be degraded from real-time ad presentation.

In some embodiments the ad broker receives variable compensation (for example, offers variable price to ad provider) based on value metric parameters associated with the users (for example, user demographics, user location, user state, etc.), user devices, storage elements, etc., associated with the preloaded ads from the ad provider. In some embodiments the ad broker may receive variable compensation based on the user value metric parameter income, or age, or profession, or hobbies, etc. In some embodiments, the ad broker may receive variable compensation based on a storage element value metric parameter location: at home, at a store, in a hotel lobby, at a gas station, etc.

In some embodiments the value metric is proportional to likelihood of the ad being presented or viewed or clicked or consumed by a user. In some embodiments the value metric is proportional to a price or revenue or profit collected from the ad being viewed or clicked or consumed by a user.

In some embodiments, the value metric parameters or value metric parameter relationships used to obtain a value metric are selected from a user perspective or to favor the user. In some embodiments, selection and preloading of ads based on this value metric could result in increased user satisfaction, increased user clicks through, user compensation for consuming ads, reduce communication network cost, reduce storage element utilization, etc.

In some embodiments, the value metric parameters or value metric parameter relationships used to obtain a value metric are selected from an ad provider perspective or to favor the ad provider. In some embodiments, selection and preloading of ads based on this value metric could result in increased number of relevant ads presented to users, increased ad clicks through, increase purchase of product associated to ad, reduced costs, reduce storage element cost, etc.

In some embodiments, the value metric parameters or value metric parameter relationships used to obtain a value metric are selected from an ad broker perspective or to favor the ad broker. In some embodiments, selection and preloading of ads based on this value metric could result in increased revenue, increase revenue from one or more ad providers, profit, user satisfaction, number of ads presented to users, increased ad clicks through, reduced costs, increase revenue from content associated to ads, increased commission, increased customers/users, etc.

In some embodiments, the ad broker is selecting ads to be preloaded from a plurality of ad providers and value metrics are based on the plurality of ad providers. In some embodiments the ad providers are competing (for example, by ad bidding, ad bonuses, etc. to the ad broker) on the ad broker assisted system for ad selection, ad preloading or ad presentation, insertion, etc. at user devices. In some embodiments, the value metric parameters or the value metric parameter relationships included in the value metric for selection and preloading are selected by the ad broker to benefit the broker. In some embodiments, the value metric may select ads based on ad provider bid pricing, ad revenue, ad profit, ad commissions, ad coupons, ad quotas, etc. to benefit the ad broker.

In some embodiments, an ad selected for preloading onto a storage element is based on content available on the storage element or associated storage elements. In some embodiments some ads may have business rules that prevent them or encourage them to be presented jointly with specific content. In some embodiments, the likelihood of an ad being successful presented/inserted may be correlated with a content being presented. Therefore evaluating relationships of an ad with content, or preloaded content on a storage element or associated storage may be beneficial.

Many business relationships or compensation methods between one or more of a user, a user device, a POI, a POI device, a communication network provider, a content provider, a content broker, an ad provider, an ad broker, etc. may be beneficial. In some embodiments, an owner/user of a storage element is compensated for storing preloaded ads. In some embodiments, the ad provider sponsors/subsidizes a communication network use. In some embodiments, the ad provider sponsors/subsidizes content or preloaded content. In some embodiments, the ad provider requests an ad broker for services/assistance on the ad preloading system. In some embodiments, a user is compensated for interacting with an ad.

In some embodiments, a user or a user device or storage element may need to agree/consent/subscribe to the ad preloading service. In some embodiments, a hardware or software element may be added/installed at a user device or storage element to enable the ad preloading service. In some embodiments, a user may input relevant information to assist the preloading service (for example, information that influence value metrics, lists of users, user devices, storage elements, preferences, etc.).

Presenting Ads

In some embodiments, preloaded ads on storage elements associated with a user device are presented to a user of the user device. Preloaded ads may be of higher quality (for example, richer content) and may be presented almost immediately (reduced communication network delay) improving user satisfaction. Preloaded ads may be dynamically presented and targeted to a user, a user device, a user state, etc.

The preloaded ads may be presented in isolation (for example, on a separate window or on a separate application, etc.) or may be presented by inserting within other content or preloaded content (for example, embedded in a webpage, movie, etc.), etc. The presentation may be static or allow for user interaction (for example, click, select, browse, etc.). In some embodiments, an ad is selected from the plurality of preloaded ads for presentation to a user of a user device. In some embodiments the selection is performed by a network entity. In some embodiments, the selection is performed by a device associated with a user (for example, a user entity). In some embodiments, the preloaded ad selected for presentation is decoupled from a content presented at the user device. In some embodiments, the preloaded ad selected is correlated with a content presented at the user device. In some embodiments, preloaded ads may be presented to a user when the user device is fully off-line (for example, not connected over a communication network to the ad provider or ad service provider) or partially off-line (for example, connected to the ad service provider over a low quality or expensive communication network exchanging tags/pointers/acknowledgments).

In some embodiments, the ad selection for presenting is based on a value metric. The value metric may include one or more parameters related to the user, demographics of the user (for example, age, gender, profession, income, hobbies, etc.), state of the user (for example, working, driving, etc.), location of the user (for example, at home, at work, at coffee shop X, at department store Y, at hospital building Z, etc.), time of day relative to the user (for example, early morning, morning, lunch break, afternoon, evening, etc.), date relative to the user (for example, weekend, weekday, special holiday, etc.). The value metric may include one or more parameters related to the user device (for example, hardware capabilities, software capabilities, software presently installed in the device, etc.). In some embodiments, the value metric may include parameters related to a device entity processor, for example, decoding capability for presenting a compressed ad, or display resolution for presenting an ad, etc. The value metric may include one or more parameters related to storage elements (for example, available size, cost, mobility, access speed, etc.). The value metrics may include one or more parameters related to a communication network between the ad source and the ad destination for presentation of the ad (for example, bandwidth/speed, QoS, connectivity/availability status, cost, etc.).

In some embodiments a software required for presenting an ad may be preloaded. The preloading of this software required for ad presentation may be based on a value metric. The value metric for the preloading of the software required for ad presentation may comprise value metric information related to the ad and vice versa, the value metrics for the preloading of the ad requiring a software for presentation may comprise value metric information related to the software. The value metrics for the ad and the software required for presentation is evaluated jointly.

The value metric may include information about the past (for example, user ad or content consumption history or location history/trace) or may include information about the present (for example, a user current location, a current list of preloaded ads or content, a current list of storage elements available to a user device, etc.) or may include information about the future (for example, predicting future location based on location trace or location history, for example, predicting future location based on a calendar(s)chedule, etc.).

In some embodiments the ad selection includes deleting ads based on a value metric or moving ads based on value metric from a first storage element to a second storage element. In some embodiments, a rich content ad for a newly released movie may be moved from a smartphone to a home gateway on Monday morning if a user associated with the user device typically watches movies Friday/Sat night, and moved back to the smartphone of Thursday night. In some embodiments, the ad may be removed when the movie is no longer playing in theaters.

In some embodiments, the ad selection is based on a value metric comprising user parameters with sensitive user information (for example, age, income, location, etc.). In some embodiments, the user may not authorize user parameters containing sensitive user information to be shared outside the user device. In some embodiments, it may be preferred to perform ad selection at the user device or a user entity associated with the user. In some embodiments, ads may not be preloaded, and the ad selection based on value metric parameters containing sensitive user information may download selected ads dynamically.

In some embodiments, content present on storage elements associated with the user device is pre-scanned/preprocessed to facilitate the presentation of ads during the content consumption. In some embodiments, keywords in the content are searched and correlated with ad content. In some embodiments, the preloaded content pre-scanning is performed during user device idle time. In some embodiments, the preloaded content pre-scanning is scheduled for more efficient use of processor resources.

In some embodiments, preloaded ads are inserted into content to be consumed, wherein the content includes information or business rules to help insert the preloaded ads. In some embodiments, the content includes information or business rules to prevent/restrict insertion of specific preloaded ads (for example, parental control).

In some embodiments, a content includes default ads, and business rules that allow for exchanging of the default ads for a more desirable preloaded ad.

In some embodiments, preloaded ads that are presented at a user device may be reviewed or revisited, etc. at a later time by a user.

In some embodiments, presented ads are monitored or accounted or billed based on user interaction with the presented ads. In some embodiments, a user is compensated for interacting with presented ads.

In some embodiments, an ad is tagged for identification, and the tag information is shared with a network entity (for example, ad provider, ad broker, ad service provider, etc.) to reduce communication network chatter.

Figure 28:
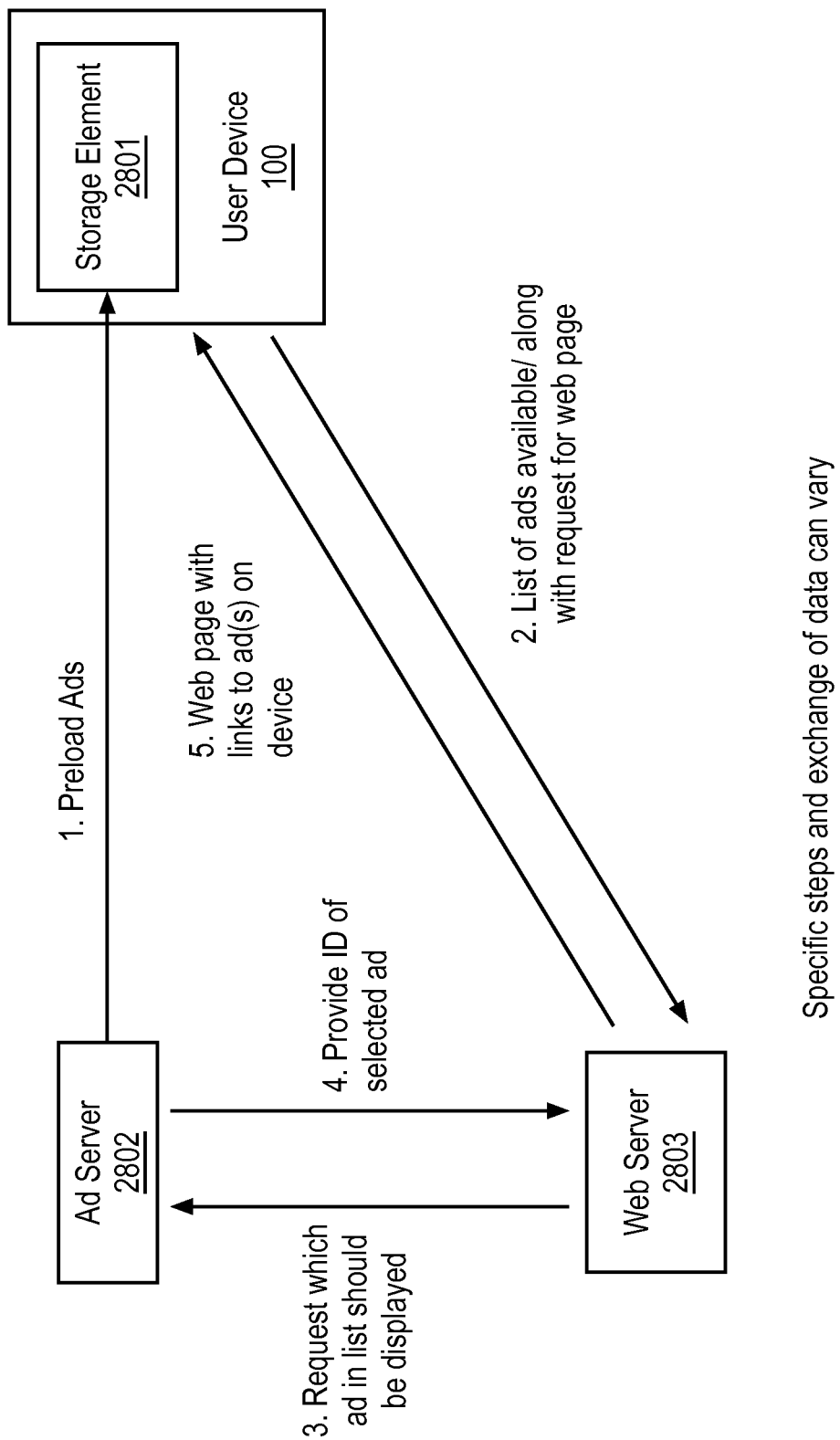
FIG. 28 shows an example for displaying a preloaded ad in a webpage in accordance with some embodiments.

FIG. 28 shows an example for displaying a preloaded ad in a webpage in accordance with some embodiments. FIG. 28 includes a user device 100, which includes a storage element 2801 (for example, the storage element 2801 maybe internal to user device 100 or external to user device 100), ad server 2802 which may be the source of ads or may assist in preloading ads or may assist in selecting ads to be presented; Web server 2803 may be a source of web content or may assist on merging Web content with ads. In the embodiment of FIG. 28, the first step is preloading ads from ad server 2802 onto storage element 2801, the second step is a request from user device 100 Web server 2803 for a webpage which includes a list of ads available to the user device, the third step is a request from Web server 2803 to ad server for a selection of an ad within the list of available ads to be displayed, the fourth step is a providing from ad server 2802 to web server 2803 an ID/tag for the selected ad, the fifth step is providing from web server 2803 to user device 100 a webpage with a link/ID/tag for the selected ad to be presented with the webpage.

In some embodiments the Web server 2803 is an app server, or a game server, or a movie server, or a music server, etc. In some embodiments the server could comprise a utility running on the user device 100. In some embodiments the ad server 2802 and the Web server 2803 may be co-located or may be the same server.

In some embodiments one or more of the five steps may be bypassed or combined or executed in a different order. In some embodiments steps 3 and 4 may not be necessary or may be performed within Web server 2803. In some embodiments additional steps may be added, for example, a value metric parameter may be exchanged between the user device 100 and the ad server 2802 to help selection of valuable preloaded ads. In some embodiments the ad server 2802 may delete/move previously preloaded ads.

Management of Objects Associated with Services, Applications, Content

As the number and types of services, applications, content, etc. on a mobile device increase, it becomes increasingly important to manage (for example, differentiate, highlight, market, discover, monetize, etc.) the (or objects associated to) services, applications, content from providers (for example, access providers, service providers, application developers/providers, content providers, content brokers, etc.) to users in a way that providers isnefit (by monetizing a purchase, sell, bid, use, access, etc.) and the user can easily understand, discover and launch the service, application, content, etc. for a successful experience.

FIG. 1a illustrates a management system 190 that supports object (for example, service launch object) discovery by a user and object placement on a device, in accordance with an embodiment of the present invention. In some embodiments, the management system 190 includes a network 110 (wherein the network 110 is one or more of: a access or communication network, a wireless or wired network or broadband or LAN or WAN, etc.) coupled to one or more network service 120, an application (or content) download server 140, a device management system 170, and a device 130 (for example, a wireless device—smartphone, tablet, etc.). In some embodiments device 130 includes a UI location manager 132, a UI agent 134, a UI 136 and device services 138. In some embodiments the device management system 170 includes a UI location management server 150, a UI location management console 160 and an accounting database 180.

In some embodiments, the management system 190 includes additional or fewer functions. For example, in some embodiments management system 190 does not include network service 120. In some embodiments management system 190 does not include an application download server 140. In some embodiments a device management system 170 does not include an accounting database. In some embodiments a device management system 170 functionality is split across two entities, for example, a service provider and a third party. In some embodiments the application download server 140 and the device management system 170 functions are combined. In some embodiments the application download server 140 and the network service 120 functionality is managed by the same entity. In some embodiments the device 130 does not include device services 138 or does not include UI agent 134. In some embodiments, functionality in FIG. 1a is combined into a single function, for example, UI agent 134 and UI location manager 132.

In some embodiments, the device management system 170 defines the location in a device UI 136 where a service launch object is placed to aid in managing the manner in which a user discovers the network service 120 or device service 138 (for example, an application or a data service plan or preloaded content or streaming content) and launches it. In some embodiments, the UI location manager 132 uses information associated with a service launch object (for example, metadata) to instruct the UI agent 134 where to locate the service launch object in the device UI 136.

In some embodiments, a UI location management service provider entity utilizes the apparatus shown in FIG. 1a to increase (for example, optimize) the discovery level for one or more service launch objects on a device or a group of devices with UI location (for example, placement) and notification messaging functions managed by a device based UI location manager 132. In some embodiments a device based UI location manager 132 is further managed by the device management system 170. In some embodiments the UI location management service provider is a carrier (for example, network access carrier) of access services who has control of the UI location management system. In some embodiments the carrier of access services may be a network access carrier (for example, a wireless network carrier such as Vodafone, Verizon or AT&T, or a cable network carrier such as Comcast, etc.). In some embodiments, the UI location management service provider might be a third party who provides the location management (for example, an application store or marketplace provider such as Apple or Android/Google, a search services entity such as Google or Bing, or a third party UI location management entity, etc.). In some embodiments the third party who provides the location management does not control or own the network access assets (for example, an application store or marketplace provider such as Apple or Android/Google, a search services entity such as Google or Bing, or a third party UI location management entity, etc.). In some embodiments it is advantageous for a carrier or application store/marketplace provider to be the UI location management service provider. In some embodiments an entity that controls the UI location management system shown in FIG. 1a controls the UI location management service and therefore controls the discovery level for one or more service launch objects on one or more device 130. In some embodiments device 130 is part of a device group.

In some embodiments, service launch object is an object on a device UI 136 that a user of device 130 or a network entity (for example, device management 170, service provider, carrier, etc.) can select (for example, "click on," "open," "launch," etc.) to initiate a network service 120 or device service 138. In some embodiments, the network service 120 or device service 138 is a service or an application. In some embodiments, the network service 120 or device service 138 is a service or an application that launch the download of a content or enable a presentation or consumption of a pre-loaded content. In some embodiments initiating network service 120 or device service 138 provides (for example, by launching or initiating or streaming or playing or presenting or displaying or purchasing or downloading or preloading) a content (for example, a preloaded video or preloaded movie or a streaming audio), or a software, or a software download, or software update. In some embodiments, service launch object is an object on a device UI 136 that a user of device 130 or a network entity (for example, device management 170, service provider, carrier, etc.) can select (for example, "click on," "open," "launch," etc.) to provide a content. In some embodiments, service launch object is an object on a device UI 136 that a user of device 130 or a network entity (for example, device management 170, service provider, carrier, etc.) can select (for example, "click on," "open," "launch," etc.) to provide a content preloaded on device 130. In some embodiments, service launch object is an object on a device UI 136 that a user of device 130 or a network entity (for example, device management 170, service provider, carrier, etc.) can select (for example, "click on," "open," "launch," etc.) to provide a content preloaded on a storage element associated to device 130 (for example, over a communication network—such as a user device streaming a content from a home gateway). In some embodiments, selection of the service launch object initiates the network service 120 or device service 138 by launching an application that is associated with the service launch object, or directing an application (for example, as a browser or portal application) to a particular network destination that is associated with the service launch object, or opening a folder with one or more additional service launch object choices for the user to select from, or providing the user with a notification regarding service status or service plan permissions for this service, or providing the user with payment or service account configuration options to enable the service. In some embodiments, selection of the service launch object initiates the network service 120 or device service 138 by launching a purchase experience or a purchasing environment. In some embodiments, selection of the service launch object initiates providing a user of device 130 with means to download an application from the application download server 140 and launch the network service 120 or device service 138. In some embodiments the service launch object is an "APK" (application package) comprising an application and additional associated information, for example, information about an icon (for example, graphic or location) associated with service or application. In some embodiments, a service launch object icon is one or more of a graphic, a text string, a UI user entry field or any other means for the user to choose to activate a service launch object.

In some embodiments, service launch object discovery level refers to the level of priority a service launch object receives relative to gaining the device user's attention in order to encourage selection or launch a service or application associated with the service launch object. In some embodiments a high discovery level is a premium UI location for the service launch object (for example, prominent UI service launch partition, home screen or permanent launcher bar). In some embodiments a high discovery level also includes one or more of highlighted service launch object icon features (wherein icon features includes on or more of size, orientation, color, texture, persistence, transparency, foreground/background, skin, wallpaper, etc.) or prominent or frequent service launch object notification messages. In some embodiments a low discovery level includes one or more of less prominent service launch object UI location or less prominent service launch object notification messaging. In some embodiments a low discovery level includes one or more of service launch object location in the device application stable or service launch object on an application store/marketplace location, or service launch object without notification messaging or a one time notification message the first time the service launch object icon is displayed to the user.

In some embodiments, the management system provides for remote management of location and modification of appearance for a service launch object icon. In some embodiments a service launch object icon is the graphic shown on the device UI screen that represents the service or application (which may include a content or purchase experience) associated with the service launch object. In some embodiments, the service launch object icon is positioned on a touch screen in the location that launches the service or application associated with the service launch object when the user touches it.

In some embodiments, the management system provides for remote management or modification of a service launch object notification message. In some embodiments a service launch object notification message is a targeted user notification message that a user can observe (for example, see or hear) as associated with (or integral to) a particular actionable service launch object because the service launch object notification message is placed in, on, touching or in close proximity to the service launch object icon. In some embodiments this kind of integral service launch object notification message requires management of how or when or where the notification message is displayed in the device UI. In some embodiments the service launch object display location is based on (for example, targeted for, or optimized for) each service launch object or must be mapped for each service launch object and service launch object message pair. In some embodiments association of a notification message with an actionable (for example, "clickable") service launch object icon on the device allows for targeted or specific user messaging about various aspects of an available service or application in a manner that does not require the user to search for an icon to act on, nor does the user need to do further research on what an actionable icon offers the user experience. In some embodiments an advantage of the management system 190 is the remote management of service launch object notification messages that are (easily) recognized or acted on by the user by virtue of the association of the notification message and the actionable service launch object icon. In some embodiments an additional advantage of the management system 190 is that multiple notification messages for multiple actionable service launch objects may be sent to the device (for presentation to a user) preventing the user from becoming confused about which service launch object notification message goes with which service launch object.

In some embodiments, different types of service launch objects are placed in a common device UI service launch partition in the device UI 136 to aid the user in understanding that one or more service launch object associated with network service 120 or device service 138 represented in that UI service launch partitions are related or of similar type. In some embodiments, the placement of the service launch object within the UI service launch partitions is specified in the device management system 170. In some embodiments, the device management system 170 provides a UI location where a service launch object is desired to be placed, and the UI location manager 132 translates that location into device UI 136 configuration to position the service launch object icon in the desired UI location.

In some embodiments, multiple device UI service launch partitions are used to identify multiple groups of service launch objects. In some embodiments, the management system 170 specifies the one or more UI service launch partitions in which a service launch object is to be displayed.

In some embodiments, the management system 170 specifies that a service launch object is to be placed in a location on a device UI 136, with the location being one or more of a UI service launch partition, a device main screen, a device secondary screen, a device permanent launch area, a device application stable, a device file system location, an application download server, or other division.

In some embodiments, a network service 120 is sponsored on a user's service plan, and it is difficult or inconvenient for the user to remember the website and enter it. In some embodiments, the ability to dynamically configure a device application (such as a browser; a portal application; a dedicated application such as a social network application, search application; maps or location application, voice or chat application, media streaming application, music application, content viewing or purchase application, shopping application, driving directions application, service plan selection or configuration application, service usage reporting application, a gaming application, a weather application, an email application, etc.; a widget; or another service related application) with the proper destination, associate this configured application with a service launch object icon representing the sponsored network service 120, and place the service launch object icon in a convenient location on the device UI 136, provides the user with means to more easily "discover" or "launch" the sponsored network service 120. In some embodiments, a sponsored device service 138 is difficult of inconvenient for the user to remember and the management system performs one or more of the following: dynamically configure a device application with the proper destination, associate this configured application with a service launch object icon representing the sponsored device service 138, place the service launch object icon in a convenient location on the device UI 136, provide the user with means to more easily "discover" or "launch" the sponsored device service 138.

In some embodiments, the service provider (such as a wireless carrier) may have a new service plan that the carrier desires the user to "discover" by trying. In some embodiments, the service provider could configure a "try before buy" service plan wherein a "sample service" with shorter time span is provided or wherein the cost for service is less expensive for a period of time. The service provider can then configure or place a service launch object in a location on the device UI 136 where the user is likely to discover it.

In some embodiments, the service provider (for example, a wireless service provider, application store or application marketplace service provider, etc.) may provide means to specify where a given service launch object is placed on a device UI 136, and charge the application provider or service provider for the UI placement in accordance to the value of the placement. In some embodiments, placement in the application store or marketplace may be free. In some embodiments placement in the on-device application stable might have lower cost, placement on one of the secondary device screens might be more expensive, placement in a UI service launch partition might cost even more, placement on the device main screen might be yet more expensive, and placement in the permanent launch area might be most expensive of all. It should be understood that the actual hierarchy of pricing may be configured by the service provider. In some embodiments the hierarchy of pricing is be configured by the service provider or the device management system 170.

In some embodiments, the device management system 170 includes an accounting database 180 to associate the placement of a service launch object on a device UI 136 with a billing rate for the application provider or service provider or sponsor associated with the service launch object.

Figure 35:
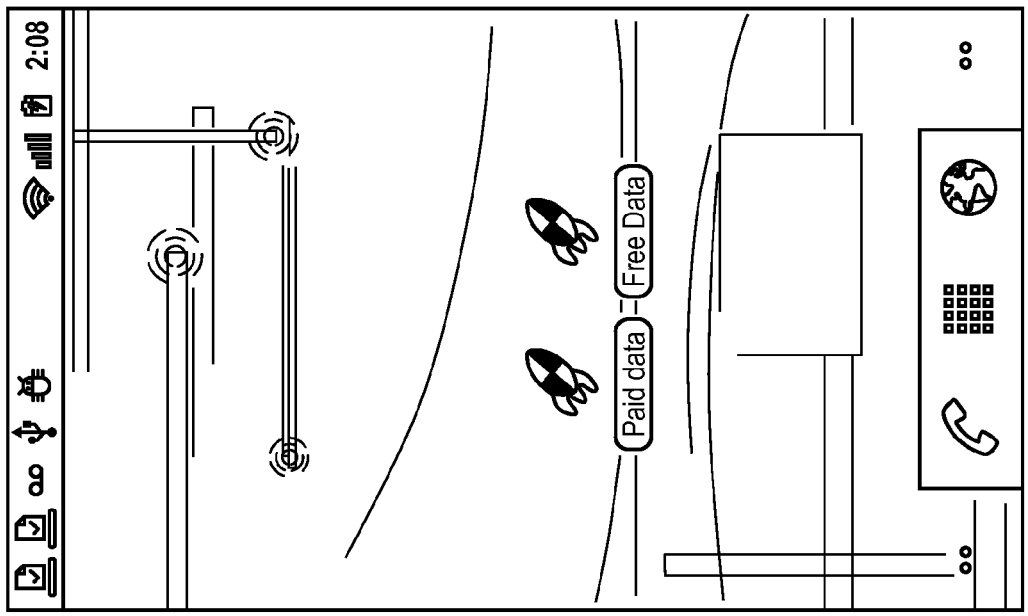
FIG. 35 shows a service launch objects shown on a device main screen in accordance with some embodiments.
Figure 37:
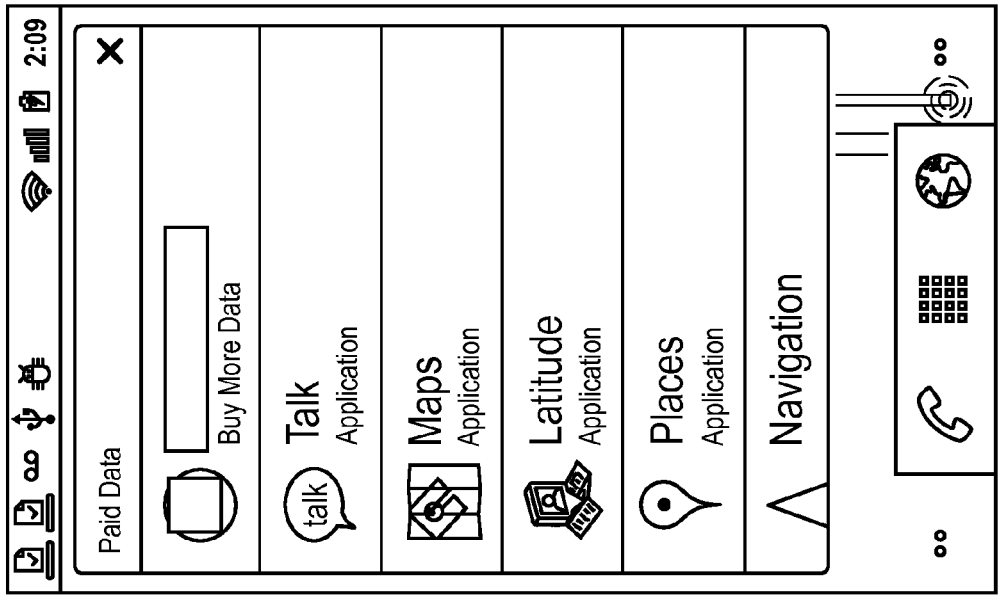
FIG. 37 shows an expanded view of paid data services single partition UI service launch partition shown in FIG. 34 according to some embodiments.
Figure 36:
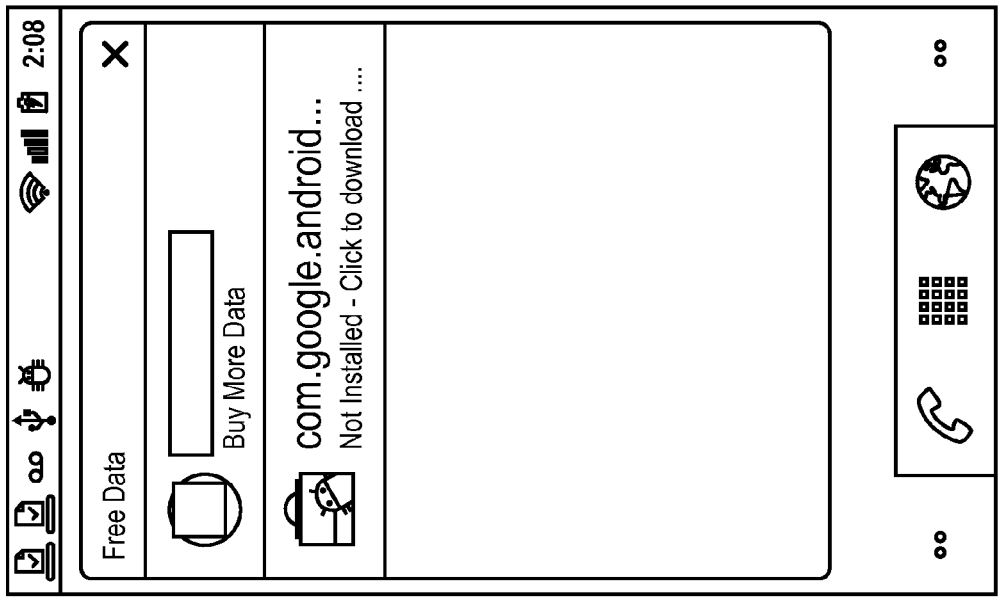
FIG. 36 shows an expanded view of free data services single partition UI service launch partition shown in FIG. 34 according to some embodiments.
Figure 38B:
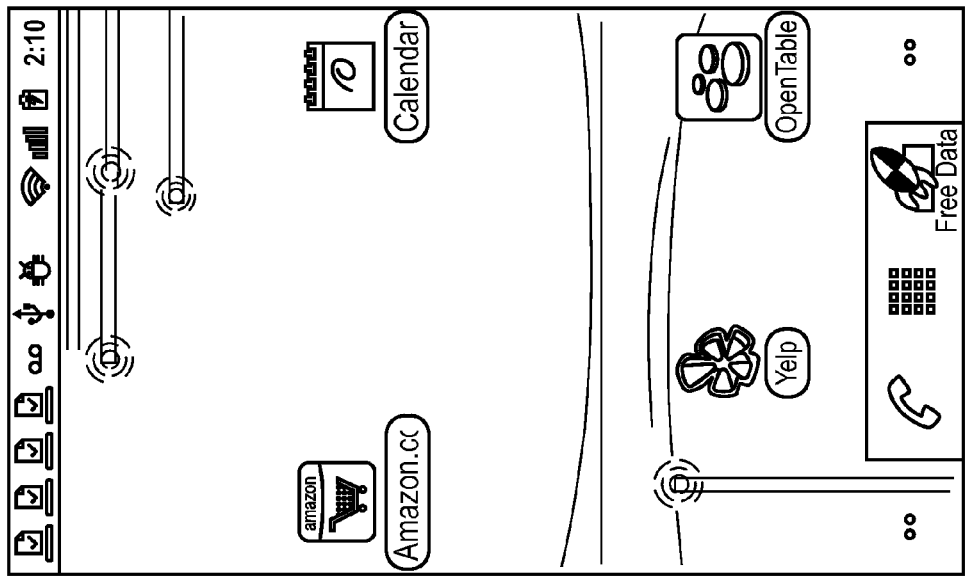
FIG. 38b shows a service launch object icon appearance modification (in this example case to indicate paid access vs. sponsored access services) in accordance with some embodiments.
Figure 38A:
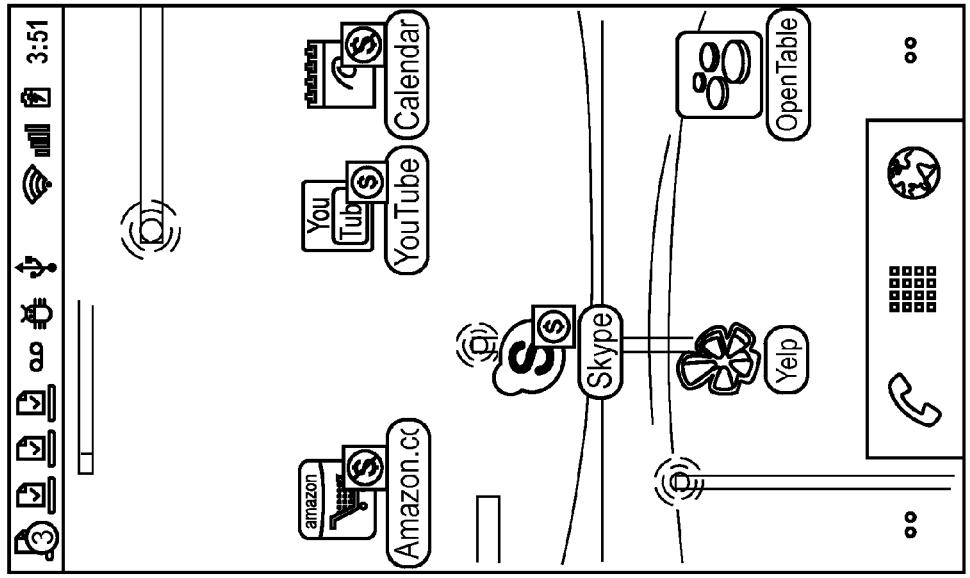
FIG. 38a shows a service launch object shown in permanent launch UI area according to some embodiments.
Figure 39:
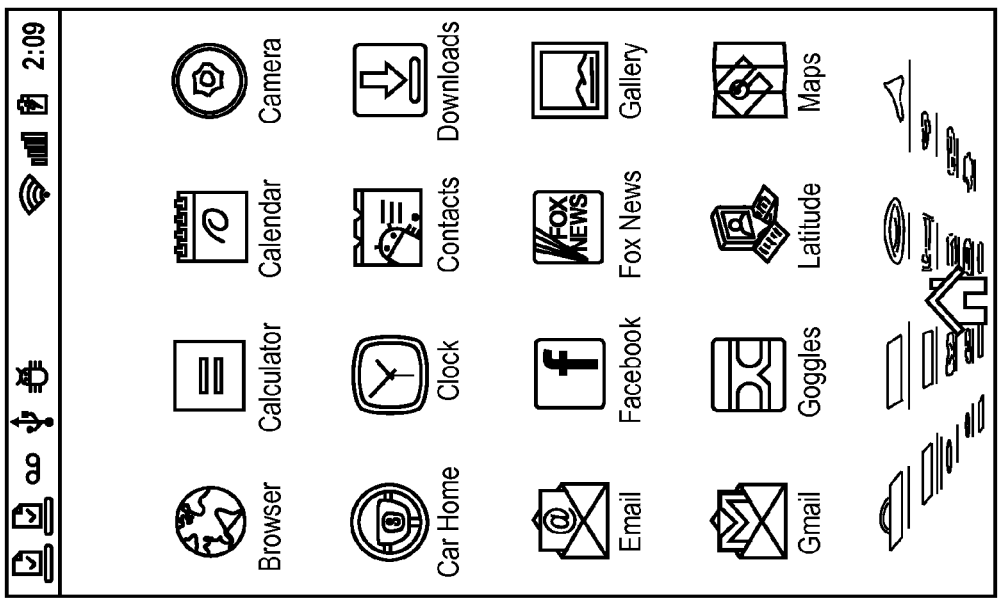
FIG. 39 shows a service launch object shown in application stable according to some embodiments.

In some embodiments, device UI discovery location is the portion of the device UI 136 that a service launch object reside in. Examples include a service object launcher UI portion such as a single UI service launch partition (or folder or organization) with service launch objects within it; a multiple partition UI service launch partition where two or more types of services each have a UI service launch partition that makes it clear to the user which type of service a given service launch object resides in (for example, see FIG. 34 below); main device screen or a secondary device screen (for example, see FIG. 35, FIG. 36, FIG. 37 below); device "quick launch" or "permanent launch" UI area (for example, see FIG. 38*a* showing service launch object in permanent launch UI area); device application stable (for example, see FIG. 39 below); and or device marketplace, application store, website or network server. In some embodiments the portion of the device UI reserved for service launch object is identified by a differentiating characteristic. In some embodiments the differentiating characteristic to identify the portion of the UI is defined by one or more of: a color, a wallpaper, a transparency, a wall, a window, a texture, a border. In some embodiments the portion is classified into tiers (or alternatively classes or levels, etc.) and each of the sub-portions is differentiated with variations of one or more of: color, wallpaper, transparency, walls, windows, textures, borders, or a plurality of screens.

Figure 34:
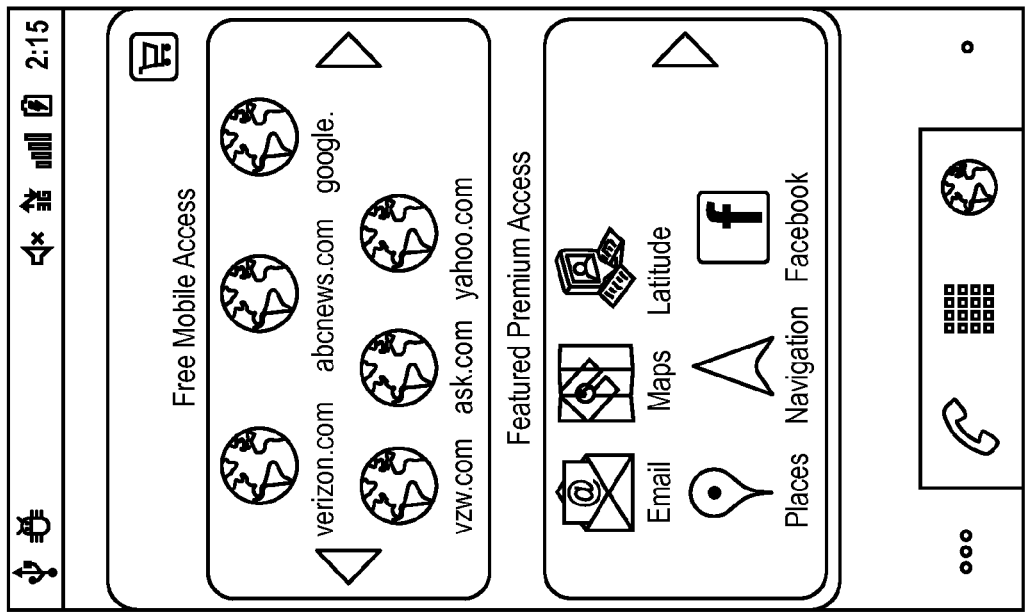
FIG. 34 shows a two-partition UI service launch partition shown on a secondary device screen in accordance with some embodiments.

In some embodiments, the partitioned UI service launch partition portion provides for two or more UI service launch partitions that indicate to the user that the service launch objects in a given service launch partition are members of a type of service. In some embodiments a service launch partition includes displaying user options for service launch objects for "default" sponsored network services, websites, applications or content. In some embodiments default sponsored network services, websites, applications or content are subsidized by a service provider or third party. The term "default" refers to services that are pre-configured by a service provider, device OEM, OS provider or third party. In some embodiments, a service launch partition includes displaying user options for service launch objects for "user selected sponsored services", wherein the user selects from available sponsored service options and once the service option is selected by the user then the service launch object appears in the service launch partition. In some embodiments, the user is enabled to select a certain number of sponsored service options out of a larger list of sponsored service user options. In some embodiments, a service launch partition includes displaying user options for service launch objects for paid services that the user has elected to sign up for. In some embodiments, a service launch partition includes displaying user options for service launch objects for services, sponsored or paid, that the user has not yet elected to sign up for but are available to the user. In some embodiments, each of the two or more service launch partitions in the multi-partition UI service launch partition application (or widget) have text or graphics indicating to the user the type of service for one of more of the multi-partition. In some embodiments the device UI discovery location is a UI location within the partitioned service object launcher, and the service launch object UI location also specifies the partition or the location within the partition. FIG. 34 shows a 2-partition UI service launch partition shown on a secondary device screen in accordance with some embodiments. In FIG. 34 service launch object UI location specifies the partition or the location within the partition of several service launch object icons.

In some embodiments a service plan or a service component is specified in a service design environment (wherein the term service design environment may be exchanged for service design center or service design platform or service design management, etc.). In some embodiments the service design environment comprises associating the network service 120 or device service 138 with one or more of service launch object. In some embodiments the service design environment comprises associating an application or content from application (or content) download (or preload) server 140 with a service launch object (for example, associated with a preloaded content).

In some embodiments the service launch object includes one or more of icon (graphic), software application, folder or collection of additional service launch objects, network destination, notification message sequences or information, service selection options. In some embodiments the service design environment comprises choosing the device discovery UI location for the network service 120 or device service 138. In some embodiments the device discovery UI location is one or more of service launcher application UI, partitioned service object launcher application UI, main device screen or a secondary device screen, quick launch area, permanent launch area, device application stable, device marketplace, application store, website or network server. In some embodiments specify where to preload an application if the application is not already loaded on the device 130 so that the application may be available the first time the user selects the network service 120 or device service 138. In some embodiments the specification is formatted into a set of instructions for a network server that communicates with the UI location manager 132 on the device 130. In some embodiments the set of instructions provides a service launch object with configuration or placement or message information that instructs the UI location manager 132 on the device 130 where to locate the service launch object in the device UI 136 or how to provision the service launch object so that it properly launches or instructs the user when the user selects the launch object. In some embodiments, the service launch object configuration or placement or message information can specify a network server destination where UI location manager 132 on the device 134 is to fetch one or more of the required service launch object parameters.

In some embodiments device 130 receives a service launch object configuration or placement or message information from a network server. In some embodiments device 130 identifies the portion of the service launch object configuration or placement or message information that specifies the device UI 136 location for the service launch object. In some embodiments device 130 installs the service launch object icon in the device UI 136 location. In some embodiments device 130 associates the service launch object icon with the service launch object that will initiate the network service 120 or device service 138 when the user selects the service launch object icon.

In some embodiments the service launch object requires an application to launch the network service 120 or device service 138. In some embodiments the device 130 is configured to search the available applications on the device 130, detect that a required application is not present on the device 130 and preload it prior to the user selecting to launch the network service 120 or device service 138 associated with the service launch object. In some embodiments the device 130 is configured to detect that the required application is not present and then automatically download the application when the user first selects the service associated with the service launch object. In some embodiments the device 130 is configured to detect that the required application is not present on the device 130 and offer the user the option to download the application when the user first selects the network service 120 or device service 138 associated with the service launch object. In some embodiments wherein device 130 downloads or preloads application, the device 130 can either download the application from a pre-defined application download server 140 or can download it from a location specified in the service launch object placement instruction message.

In some embodiments, the service launch object is further configured to include notification messages that are displayed to the user when the user selects or first selects the service launch object icon. In some embodiments, the notification message includes information on how much the service costs or what the service allowances are. In some embodiments, the notification message involves service plan selection options that allow the user to elect to pay for a service, or allow the user to select a sponsored service. In some embodiments notification messages may be handled by a UI agent 134.

In some embodiments, the UI location manager 132 automatically populates one or more of the service launch object, service launch object associated application, network destination specification or service launch object icon in the proper location in the device UI when user selects the network service 120 or device service 138.

In some embodiments, device network state information is used to define the state of one or more network 110 that the device 130 is connected to. Network state information includes one or more of the type of access connection to the network (for example, 4G wireless, 3G wireless, 2G wireless, WiFi, cable, DSL, hot spot service provider, home LAN, corporate LAN, etc.), the list of available networks (for example, WiFi and 3G, or 4G and corporate LAN, etc.), time of day, home vs. roaming carrier service provider status, network access cost (for example, service plan details and status), network congestion state, network QoS state, device data rate, or device signal quality.

Device usage state information (wherein information could comprise one or more of parameters, or logs or history, etc.) provides information on the manner in which the device is used (for example, in the past, present or predicted future) by the device user. In some embodiments device usage state information includes one or more of: the current or past state of service usage for one or more services, current or recent states of application usage for one or more selected applications, current or recent geographic locations, current or recent location searches, current or recent network destination history (websites, services, content, search terms, etc.), one or more applications currently being interacted with by the user, the current or recent network state, how long it has been since the user pressed one or more UI feedback elements on the device. In some embodiments the device can collect device usage state information (for example, collected by the UI location manager 132, or some other device agent). In some embodiments the device usage state includes device cognitive state, wherein the device cognitive state includes information the device gathers from the environment based on the device sensors. In some embodiments the device uses one or more of a camera, a microphone, a GPS, a motion sensor, a gyroscope, a accelerometer, a temp sensor, a touch sensor, a humidity sensor, to determine the device state relative to the environment or the user of the device. In some embodiments the service launch object management (for placement, discovery level, notification message, bidding, etc.) is dynamic based on one or more of: device orientation (landscape vs. portrait vs. flat on a horizontal surface) or device distance or relative position to a user (near the head, in one or two hands, on a table, on the seat of a moving car, in the pocket of the user, indoors/outdoors, etc.) or ambient light/noise levels or components. In some embodiments the device cognitive state is used to decide between a visual or audio or vibration notification or a specialized target bid population or to bill for a service launch object placement or associated service or application usage. In some embodiments the service launch object management is based in part on the power state of the device, for example, powered up, active, screen saver, hibernate, sleep or powered down mode. In some embodiments the service launch object management changes the power state (for example, from screen saver to active) to increase awareness of an associated service or application to a user. In some embodiments the user may disable the power state change mode. In some embodiments the service launch object management is based on the power mode (AC or battery powered) or the state (percentage or time remaining) of the battery charge.

In some embodiments, device based usage information is communicated with a network element for further processing or analysis to determine how to enhance (wherein enhance may be one or more of improve, increase, optimize, etc.) discovery level for one or more service launch objects. In some embodiments, device usage state information is collected by network elements and aggregated in the device management system 170 databases for further processing or analysis to determine how to enhance discovery level for one or more service launch objects. In some embodiments device usage state information consists of a combination of information collected by the device and information collected by the network for further processing or analysis to determine how to enhance discovery level for one or more service launch objects.

In some embodiments, the availability of a network service 120 or device service 138 is dependent on the network state of the device 130. In some embodiments, if the network service 120 or device service 138 is available for a current network state the service launch object icon is displayed in the specified UI location. In some embodiments, if the network service 120 or device service 138 is not available for the current network state the icon is not displayed. In some embodiments, the service launch object configuration or placement or message information contains information that is a function of network state. In some embodiments and the UI location manager 132 uses the service launch object configuration or placement or message information and network state information to instruct the UI agent 134 to display the service launch object icon in a given location in the device UI 136 in a first network state and instructs the UI agent 134 to not display the service launch object icon in a second network state.

In some embodiments, a UI location management console 160 provides a network manager a user interface environment comprising one or more of composing the network state policies describing when one or more services are available, associating availability description whether or not to present a service launch object (for example, display a service launch object icon), or whether or not to provide network state notification information on one or more service launch object icons. FIG. 53 shows a UI location management console 160 UI template for a network manager to define a policy event notification to notify users (for example, one or more details of a service plan status: MB used, percent of plan cycle, plan expiration, etc.) in accordance with some embodiments.

In some embodiments, the availability of a network service 120 or device service 138 is dependent on the network state of the device 130, and if the network service 120 or device service 138 is available for a current network state then the service launch object icon is displayed with normal (or typical or standard) graphics features in the specified UI location, and if the network service 120 or device service 138 is not available for the current network state then the icon is displayed with graphics features that indicate the service is not available in the current network state. In some embodiments, instead of or in addition of modifying the service launch object icon graphics features to indicate the network service 120 or device service 138 is not available in the current network state, a notification message may be overlaid on the service launch object icon, with the message providing information indicating that the network service 120 or device service 138 is not available in the current network state.

In some embodiments, the service launch object configuration or placement or message information contains one or more of icon versions, icon placements, or network state messages, that are a function of network state, and the UI location manager 132 provides the appropriate one or more icon version, icon placement, network message to the UI agent 134 to modify the associated service launch object icon as the network state changes.

In some embodiments, a network service 120 or device service 138 is sponsored in a first network state and paid in a second network state. In some embodiments, a network service 120 or device service 138 is sponsored in a first network state and paid in a second network state and in the first network state the service launch object icon appears in a UI service launch partition for sponsored services, and in the second network state the service launch object icon appears in a UI service launch partition for paid services. In some embodiments, the service launch object configuration or placement or message information contains placement information that is a function of network state, and the UI location manager 132 uses this placement information to instruct the UI agent 134 to display the service launch object icon in a sponsored service location in the device UI 136 when the device 130 is in the first network state and instructs the UI agent 134 to display the service launch object icon in a paid service location in the device UI 136 when the device 130 is in the second network state.

In some embodiments it is advantageous to show whether a service or application is free or paid by a feature differentiation directly on the service launch object icon. An example embodiment of this is shown in FIG. 38*b* where the dollar sign represents paid services (for this example YouTube and Skype are paid services) and the dollar sign with a circle and line through it represents free (or sponsored) (for this example Amazon and Calendar are free).

In some embodiments there is a permanent UI service launch partition that the user is not allowed to modify or remove from the device. In some embodiments, the permanent UI service launch partition enables a UI location management service provider to enhance service launch object UI location, or service launch object icon appearance or service launch object notification messages for one or more service launch objects. In some embodiments, the UI location management service provider of the permanent UI service launch partition allows the user to manage the applications, folder and/or service launch objects that are located in other portions of the UI controlled by the user. In some embodiments, the user can control (for example, modify or alter or enhance) some parameters (for example, the ordering, or sorting, or formatting) of service launch objects within a UI service launch partition that is at least partially controlled by a UI location management service provider. In some embodiments the user can add or delete service launch objects from a UI service launch partition that is at least partially controlled by a UI location management service provider. In some embodiments the user is not allowed to add or delete or control (for example, modify or alter or enhance) service launch objects contained in a UI service launch partition that is controlled by a UI location management service provider.

In some embodiments, the UI location manager 132 is instructed (or follows a policy) to locate a service launch object in the UI based on the current time (wherein current time is based time of day, or day of week, or work/holiday, etc.).

In some embodiments, a policy is implemented on the UI location manager 132 to specify that a service launch object is located in one area of the UI at a certain time of day or day of the week, and the service launch object is re-located at another time of day or day of the week. As another example embodiment, rather than storing the time based location policy on the device 130, the network (for example, the device management system 170) can instruct the UI location manager 132 to locate one or more service launch objects in the UI based on time. In related embodiments, other features of one or more service launch objects are altered as a function of time including service launch object appearance or features or service launch object notification messages.

In some embodiments, the UI location manager 132 is instructed (or follows a policy) to locate a service launch object in the UI based on the current network state. In some embodiments, a policy is implemented on the UI location manager 132 to specify that a service launch object is located in one area of the UI for certain network states and service launch object is re-located to another area of the UI for other network states. In some embodiments the service launch object is located on the home screen or in a prominent location in a UI service launch partition when the device is connected to WiFi, 4G, uncongested or high QoS. In some embodiments, the service launch object is re-located to a less prominent UI location, such as a secondary device screen, a less prominent location in the UI service launch partition, the application stable, or is not displayed at all when network state changes to 3G, 2G, congested or low QoS or roaming network.

As another example embodiment, rather than storing the network state based location policy on the device, the network (for example, the device management system 170) instructs the UI location manager 132 to locate one or more service launch objects in the UI based on network state. In related embodiments, other features of one or more service launch objects are altered as a function of network state including service launch object appearance or features or service launch object notification messages.

In some embodiments, the UI location manager 132 is instructed (or follows a policy) to locate a service launch object in the UI based on the device usage state information (for example, based on current, or past, or predicted, or history, or logs of, device usage state information). For example, a policy might be implemented on the UI location manager 132 to specify that a service launch object is located in one area of the UI for certain device usage state, and the service launch object location is moved for other device usage state. In some embodiments locate the service launch object on the home screen or in a prominent location in a UI service launch partition when the device usage state information (for example, based on application usage history or user current activity) indicates (for example, based on estimates, or predictions, or cost, etc.) that a given service offer is likely to be or interest to the user.

In some embodiments locate the service launch object on the home screen or in a prominent location in a UI service launch partition when the device usage state information recognizes a geographic area where a service or retail opportunity is highly valuable such as a near by purchase opportunity, In some embodiments the service launch object is re-located to a less prominent location in the UI service launch partition, the application stable, or is not displayed at all when device usage state indicates that the current device usage information (for example, based on associated application history) is not related to the service launch object or indicates (for example, based on estimates, or predictions, or cost, etc.) that a given service launch object is not likely to be or interest to the user.

In some embodiments the service launch object is re-located to a less prominent location in the UI service launch partition, the application stable, or is not displayed at all when device usage state indicates that the current geographic location is not close to a retail purchase opportunity associated with the service launch object.

As another example embodiment, rather than storing the device usage state based location policy on the device, the network (for example, the device management system 170) instructs the UI location manager 132 to locate one or more service launch objects in the UI based on device usage state. In related embodiments, other features of one or more service launch objects are altered as a function of device usage state including service launch object appearance or features or service launch object notification messages. In some embodiments, a service launch object notification message can alert the user when the service, content, purchase opportunity or application associated with the service launch object is likely to be of interest to the user. In some embodiments, (which may be of interest to wireless access service providers), by using one or more of a service launch object notification messages, a service launch object UI location change or a service launch object icon change (for example, a feature, size, orientation, persistence, etc.), the user of device 130 is made aware of additional access services available for trial or purchase. In some embodiments, (which may be of interest to wireless access service providers), by using one or more of a service launch object notification messages, a service launch object UI location change or a service launch object icon change (for example, a feature, size, orientation, persistence, etc.), the user of device 130 is made aware of additional access services available for trial or purchase based on the device usage state information (for example, history or logs) indicating that the user has been using access services.

In some embodiments, by using one or more of a service launch object notification messages, a service launch object UI location change or a service launch object icon change (for example, a feature, size, orientation, persistence, etc.), the user of device 130 is made aware of additional access services available for trial or purchased based on the device usage state information (for example, history or logs) indicating that the user has been using access services in a manner that suggests the user may desire to try or buy additional access services at the present or future time.

In some embodiments, additional service launch object notification messages are provided for services, applications or content marketing, wherein the notification message is placed in, on, touching or in close proximity to a service launch object icon (an icon proximity message), or wherein the notification message is located in a location in a UI display in which the service launch object icon is contained (an icon container message). In some embodiments the notification messages include one or more of the following objectives: informative, draw attention to a service launch object, market special offers for a service launch object, provide service usage information for a launch object, or indicate to a user that a service activation or service purchase is required to use a service associated with a service launch object.

In some embodiments, marketing messages for an access service, an application, a content purchase, on-line shopping service, or another service is placed directly on a service launch object icon, or closely adjacent to a service launch object icon, or in a location in a UI display in which the service launch object icon is contained (for example, in service object launcher or a UI service launch partition), for the purpose of providing a convenient way for the device user to learn that the service or application associated with the service launch object icon is available or is available with special advantageous conditions or economics.

In some embodiments, the appearance of a service launch object icon is modified to enhance or downgrade the discovery level. In some embodiments enhancing or downgrading the discovery level is accomplished by one or more of changing the service launch object icon features, changing the icon graphic, overlaying the service launch object icon graphic with a second icon or graphic, or merging the icon graphic with a second icon graphic. In some embodiments the icon features or the color scheme are changed in accordance with service launch object icon UI management policy or instructions from the network. In some embodiments the service launch object icon is made to alternate in appearance (for example, flash or change colors periodically or "bounce" or "wobble" etc.) according to service launch object icon UI management policy or instructions from the network.

In some embodiments, additional service launch object notification messages as described above are managed by the device management system 170. In some embodiments, additional service launch object notification messages as described above are managed by the device management system 170, wherein a service launch object and one or more of associated application, network destination or other policy information, are associated with a service launch object notification message. In some embodiments, additional service launch object notification messages as described above are managed by the device management system 170, wherein a service launch object and one or more of associated application, network destination or other policy information, are associated with a service launch object notification message and the device management system 170 then communicates the service launch object notification message along with the other service launch object information as described herein to the UI location manager 132; and the UI location manager 132 then displays the message in the appropriate UI location.

In some embodiments, the device management system 170 specifies the type of service launch object notification message or service launch object UI location; the type of message or UI location information is communicated to the UI location manager 132; and the UI location manager 132 displays the message in the proper format in the specified UI location. In some embodiments, the device management system 170 specifies the type of message or UI location of the service, application or content marketing message; the type of message or UI location information is communicated to the UI location manager 132 along with the other UI location manager 132 information described above; and the UI location manager 132 then displays the message in the proper format in the specified UI location.

Figure 40:
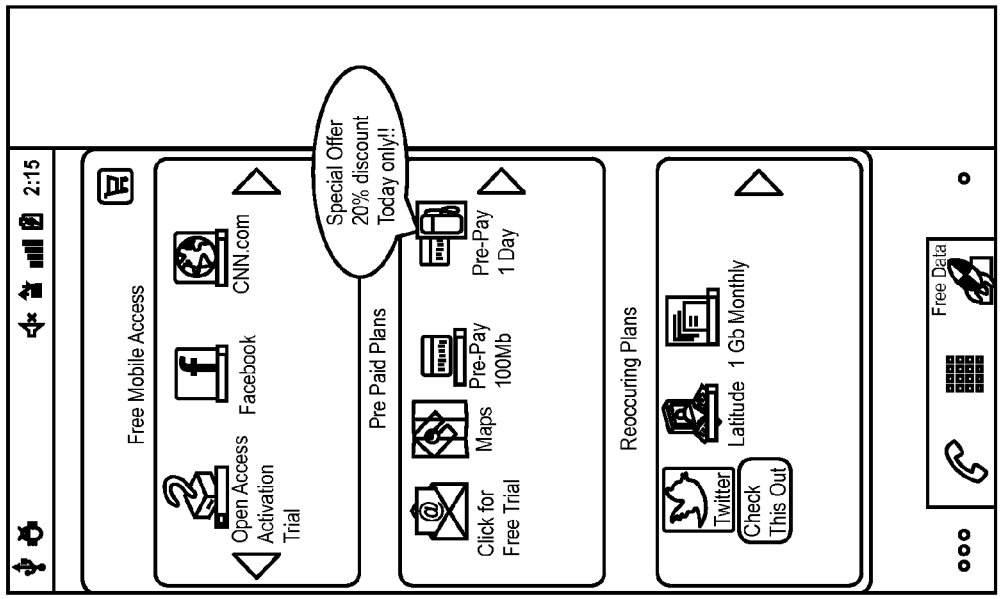
FIG. 40 shows various proximity messages according to some embodiments.

FIG. 40 provides three examples of proximity messages in accordance with some embodiments. In FIG. 40 is an example of a multi-partition UI service launch partition with three service launch partitions. A first service launch partition is for sponsored (in this case free to the user) services and applications. A second service launch partition is for pre-paid services and applications. A third service launch partition is for post-paid (for example, recurring) services and applications. A first example of a proximity message type is the bubble message on the pre-pay 1 day service launch object icon that indicates: "Special Offer, 20 percent discount, Today only!!!". A second example of a proximity message is the "Click for Free Trial" icon title message below the service launch object icon for pre-paid email. A third example of a proximity message is the "Check This Out" message under the post paid (recurring) Twitter service launch object icon.

Figure 41:
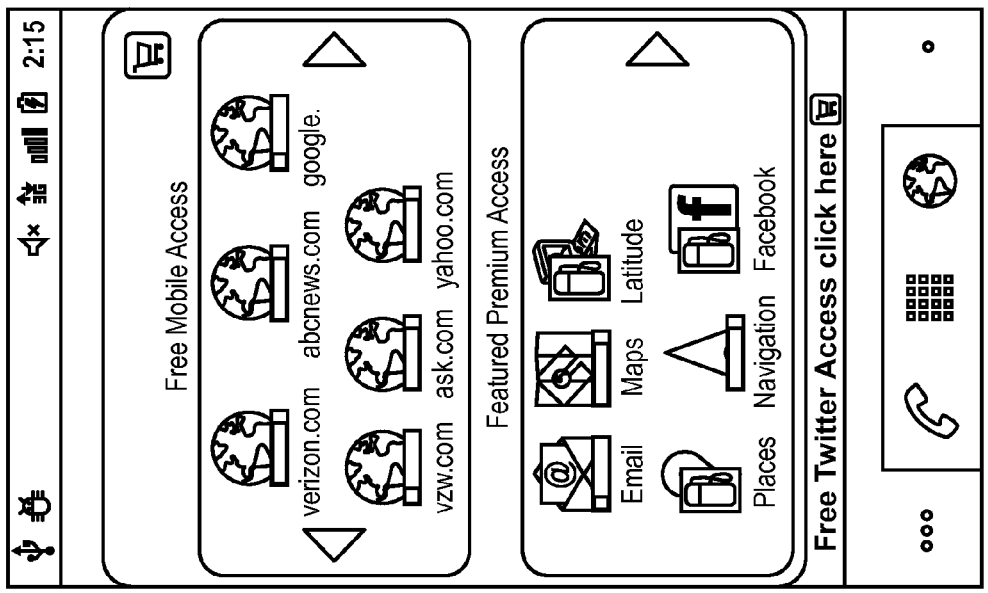
FIG. 41 shows a two-Partition UI service launch partition with service object notification message according to some embodiments.

In some embodiments, a service launch object notification message is placed on or in a UI service launch partition UI area that has the capability of displaying one or more service launch object notification messages for one or more service launch objects that are or will be located in tone of the UI service launch partitions. An example embodiment for this aspect of the invention is shown in FIG. 41 where the free Twitter access message and actionable icon is displayed on the UI service launch partition itself. In some embodiments the Twitter service launch object will automatically populate in the free mobile access partition.

Figure 42:
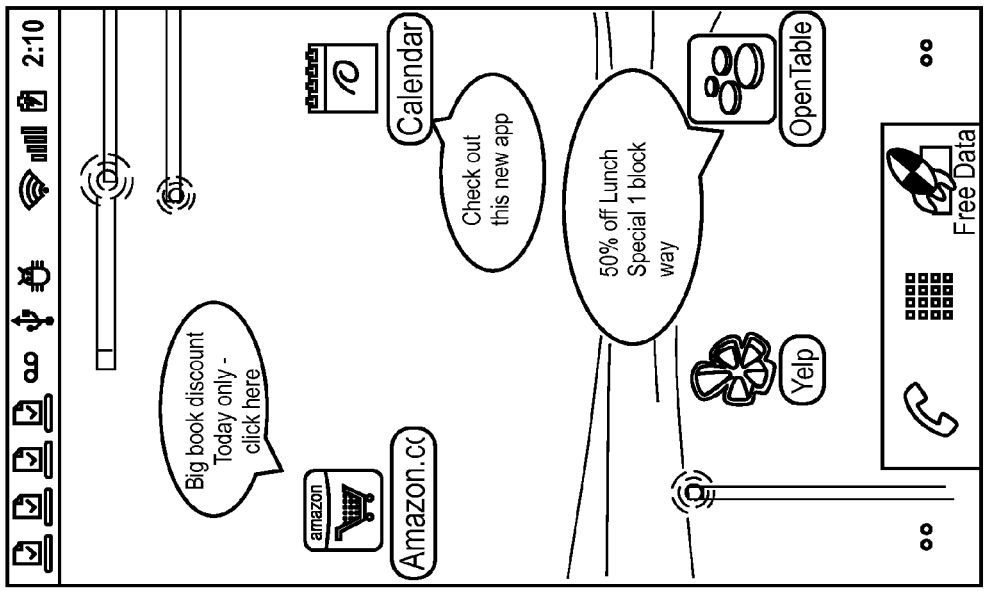
FIG. 42 shows a service and application marketing messages on service launch object icons located in main device screen and permanent launch bar according to some embodiments.

FIG. 42 shows example embodiments for elevating service or application discovery level with service launch object notification messages that are conditioned on time (Amazon discount today only), geography (OpenTable 50 percent lunch discount within one block) and a service launch object notification that is not conditioned on time or geography (calendar connected application service—check out this new application). In some embodiments one or more of the service launch objects in FIG. 42 have been placed by the UI location manager 132 on the main device home screen as instructed by the device management system 170. In some embodiments one or more of the service launch object in FIG. 42 are placed by the user, and the UI location manager locates where the user has placed the service launch object on the user device UI and then places the service launch object notification message in association with the proper UI location. In yet another embodiment where the user has control of service launch object placement in the UI, the UI location manager locates where the user has placed the service launch object on the user device UI and then modifies the appearance of the service launch object icon as described herein.

Figure 43:
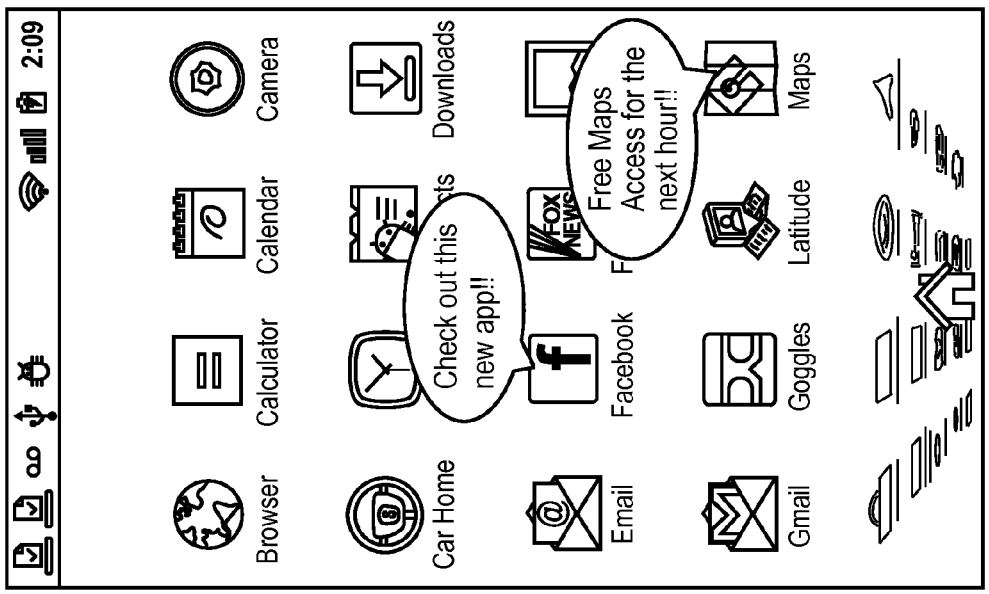
FIG. 43 shows a service and application marketing messages on service launch object icons located in application stable according to some embodiments.

FIG. 43 shows an embodiment wherein the service launch objects are located in the device application stable, and the UI location manager 132 locates service launch object and places the associated service launch object notification message on each service launch object as directed by the device management system 170. In the example of FIG. 43, the notification messages are, "check out this app" for Facebook and "free maps for the next hour" for Google maps.

In some embodiments, a UI location management console 160 provides a network manager a user interface environment for performing the one or more functions for composing service, application or content marketing or informative messages, associating the composed message with a service launch object, or initiating the communication of the message content to the device UI location manager 132.

In some embodiments, the UI location manager console 160 further provides a user interface for specifying when the composed message is to be displayed on the device. In some embodiments, the UI location manager console 160 further provides a user interface for specifying under what network state conditions the composed message is to be displayed on the device. In some embodiments, the UI location manager console 160 further provides a user interface for specifying under what device usage state conditions the composed message is to be displayed on the device.

Figure 54:
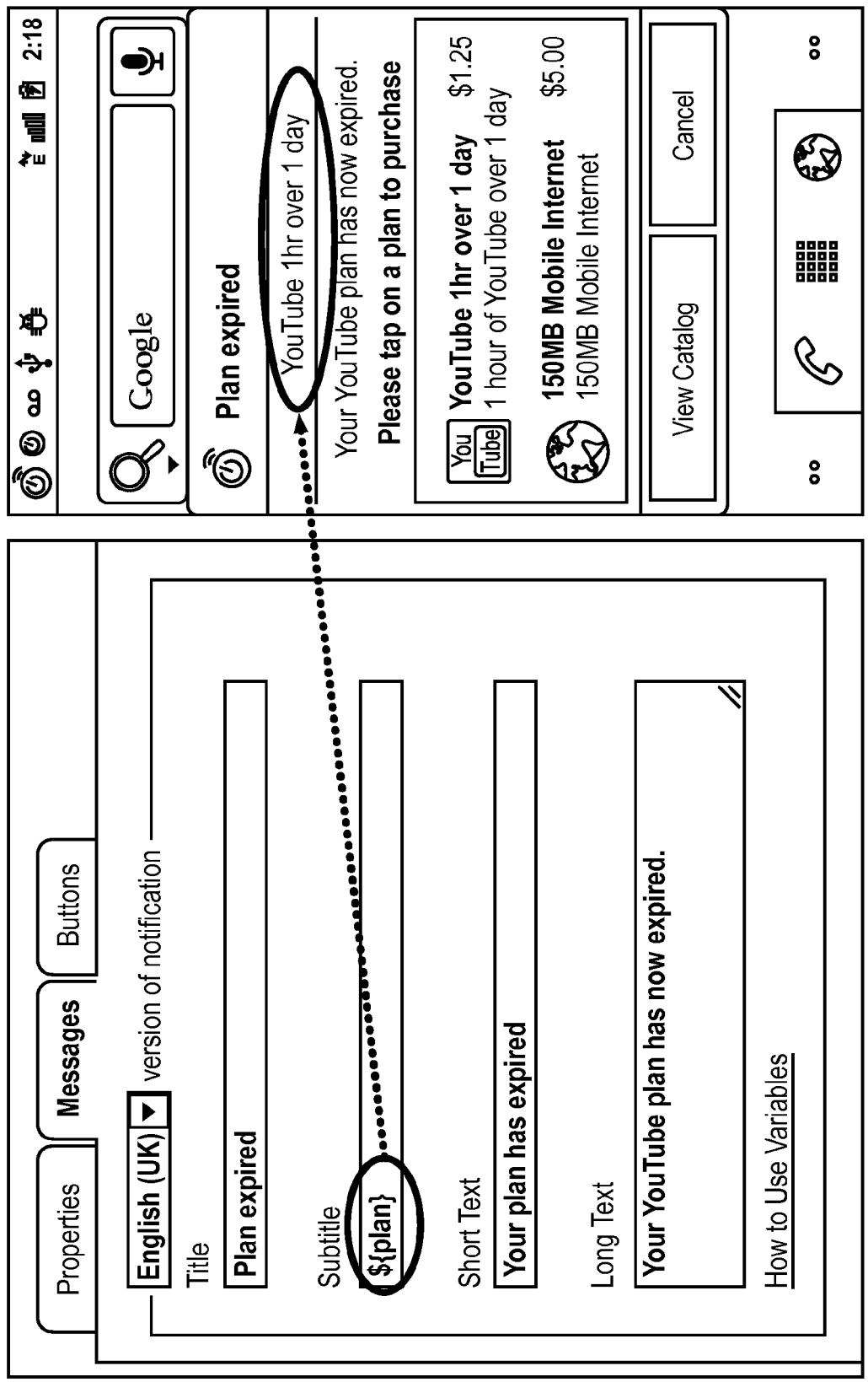
FIG. 54 shows the use of a variable to automatically customize the notification for the associated event in accordance with some embodiments.

In some embodiments a variable is used to define notification messages in a notification template to automatically customize the notification for the associated event. FIG. 54 shows the use of a variable (for example, ${plan} to indicate a Name of service plan) to define notification messages in a notification template (and associated device view) to automatically customize the notification for the associated event in accordance with some embodiments.

Figure 55:
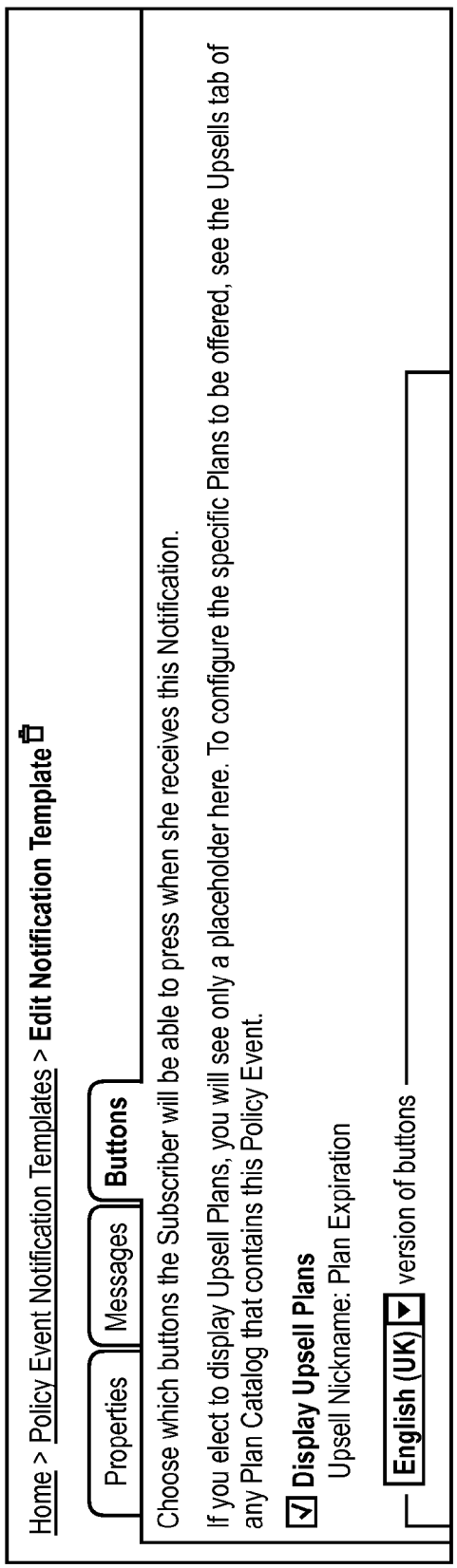
FIG. 55 shows a network manger UI environment for displaying upsell plans in accordance with some embodiments.
Figure 56:
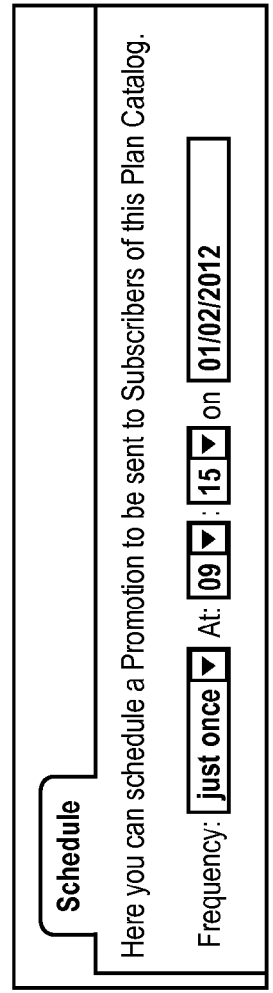
FIG. 56 shows a network manager UI environment for displaying promotional notification plan in accordance with some embodiments.

In some embodiments a management console 160 UI provides a network manager a UI environment for displaying upsell plans. FIG. 55 shows a network manger UI environment for displaying upsell plans in accordance with some embodiments. In some embodiments a management console 160 UI provides a network manager a UI environment for displaying promotional plans. In some embodiments a management console 160 UI provides a network manager a UI environment for displaying promotional service or application as a function of time (for example, daily, weekly or based on a network or device or user state). FIG. 56 shows a network manager UI environment for displaying promotional notification plan in accordance with some embodiments.

Figure 57:
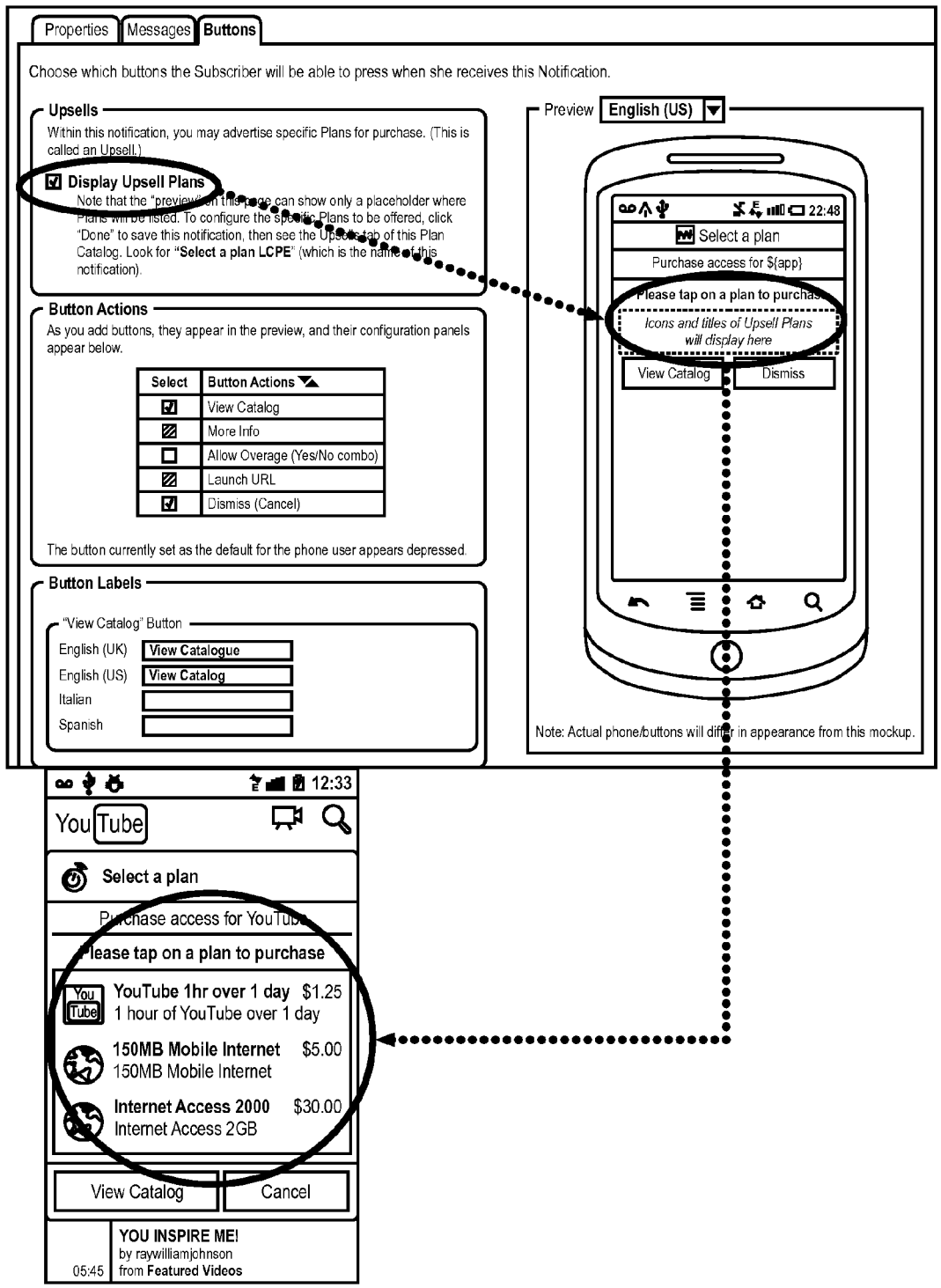
FIG. 57 shows a network manager UI environment for displaying notification templates (and associated device views) for defining a lack of capable plan (which may be combined with a offer for a upsell plan) for a desired service or application in accordance with some embodiments.

In some embodiments a management console 160 UI provides a network manager a UI environment for displaying notification templates for defining a lack of capable plan (for example, lack of data service plan, or lack of access to an application or content—for example, requiring a service or application purchase) notification message for a desired service or application. FIG. 57 shows a network manager UI environment for displaying notification templates (and associated device views) for defining a lack of capable plan (which may be combined with a offer for a upsell plan) for a desired service or application in accordance with some embodiments.

In some embodiments a management console 160 UI provides a network manager a UI environment for displaying notification templates for defining featured service or application (for example) notification message for a desired service or application.

Figure 58:
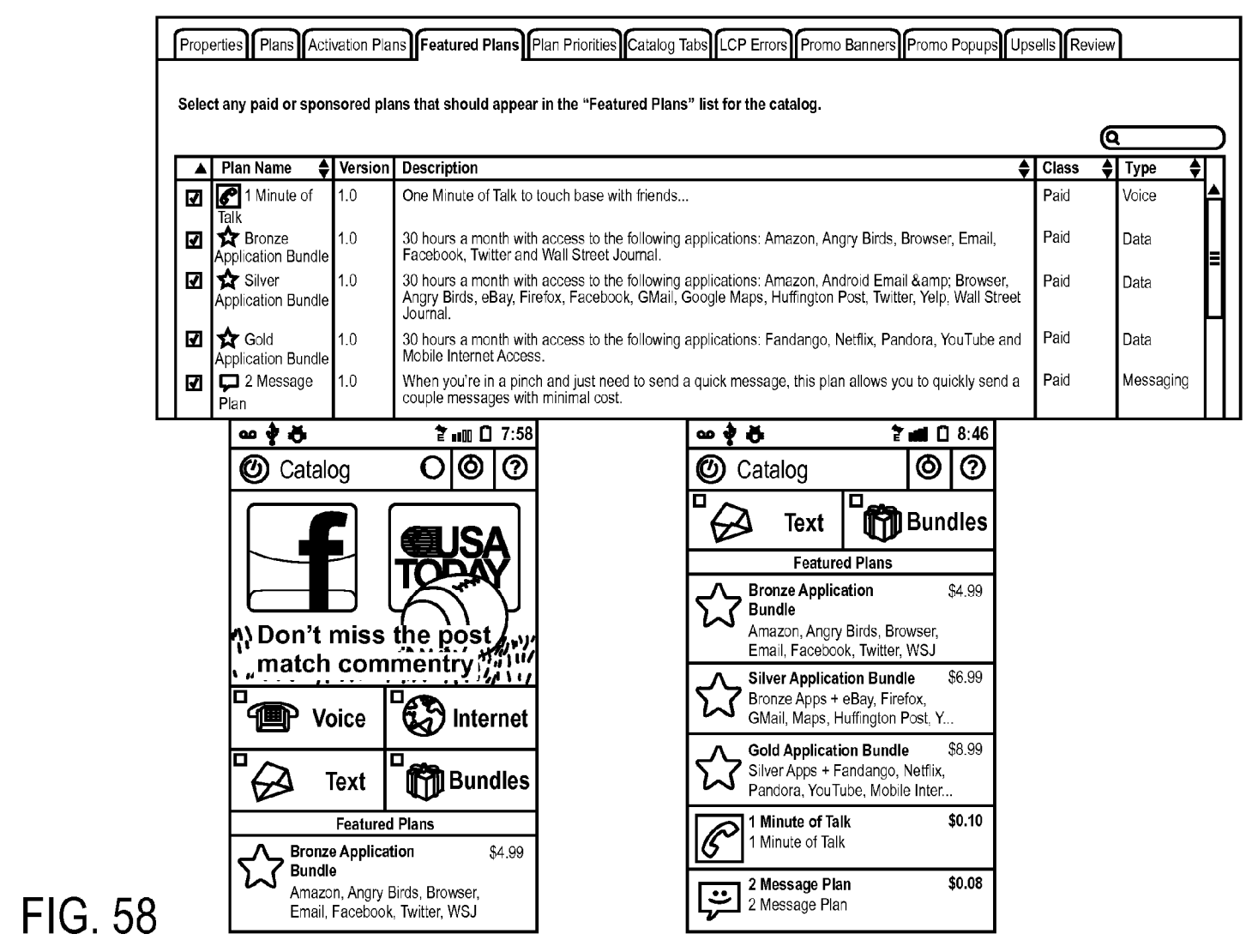

FIG. 58 shows a network manager UI environment for displaying notification templates (and associated device views) for defining a featured service or application (in accordance with some embodiments.

Figure 59:
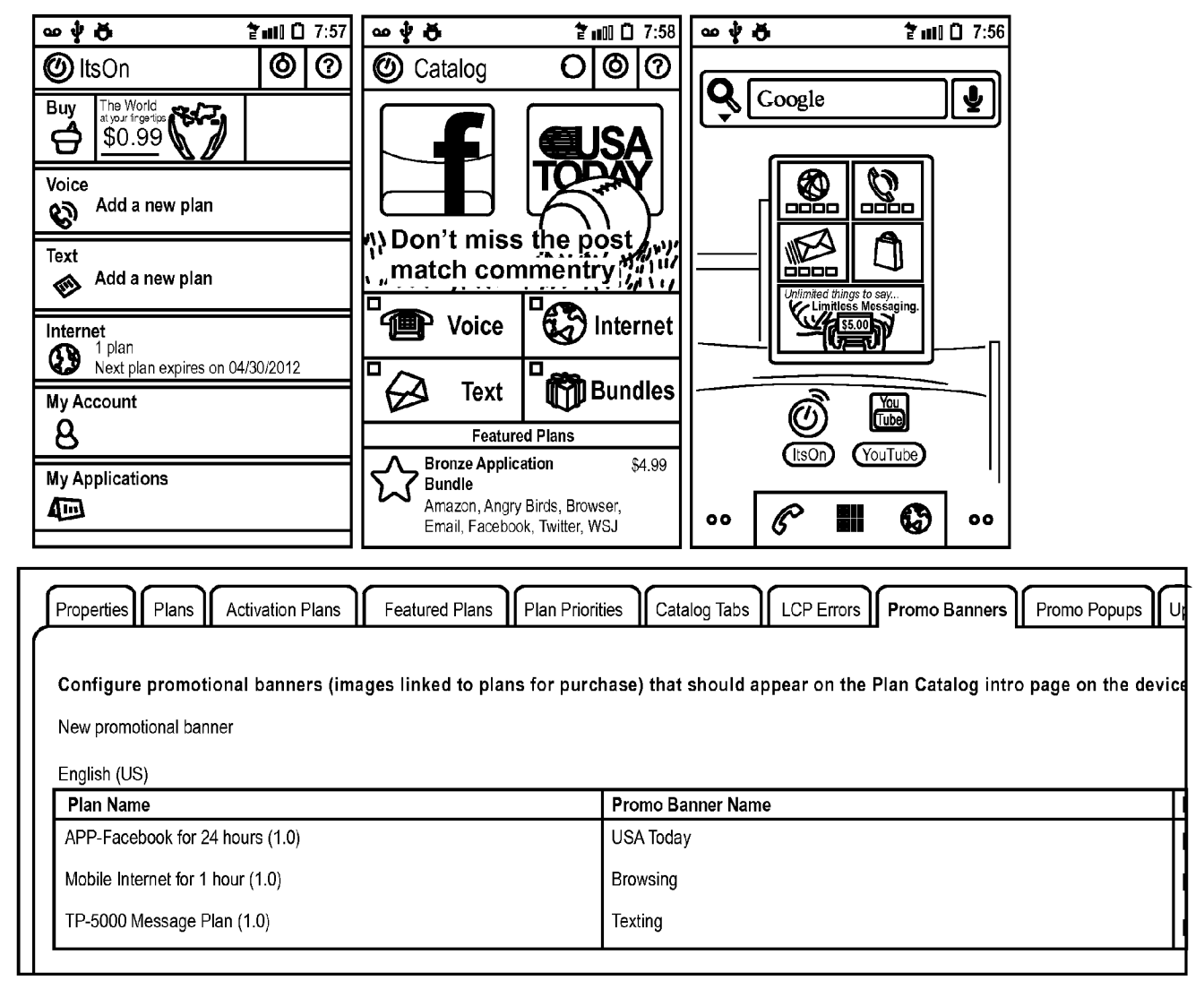

In some embodiments a management console 160 UI provides a network manager a UI environment for displaying notification templates for defining a promotional banner (or banner ad) for (or to promote or market) a service or application or a promotional banner for a service launch object (or icon) associated with a service or application. In some embodiments the promotional banners notification templates include one or more of a language, image, or associated plans. FIG. 59 shows a network manager UI environment for displaying notification templates (and associated device views) for defining a featured service or application in accordance with some embodiments.

In some embodiments a management console 160 UI comprises a service design center showing device UI launcher view. In some embodiments the service design center includes drag and drop icons. In some embodiments selection of icons provides menus to components or plan view or settings.

Figure 44:
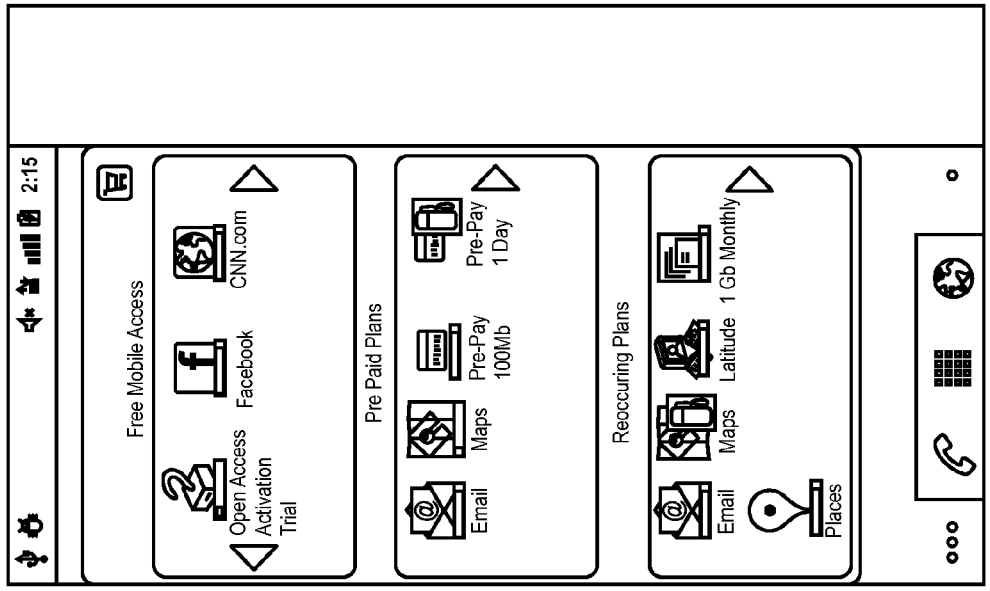
FIG. 44 shows a usage indication and purchase feature on service launch objects according to some embodiments.

In some embodiments, the service launch object icon appearance is modified to indicate the status of service usage for a service plan. The status of service usage can be a graphic (such as a bar or gauge or hourglass or pie chart located on or near the service launch object icon) or a numeric value signifying amount used, amount remaining, percent used or percent remaining, etc. (for example, relative to a monthly quota or cap). FIG. 44 provides several useful examples of such embodiments. The service launch object icons in FIG. 44 are contained in the UI in a 3-partition UI service launch partition, with one partition for service launch objects associated with sponsored services and connected applications, one partition for service launch objects associated with pre-paid services and connected applications, and one partition for service launch objects associated with post-paid (or recurring) services and connected applications. For example, a service launch object can represent a specific wireless access service according to a set of service classification rules and the service launch object icon itself can display an amount (or percent or fraction) of service allowance consumed, or an amount of service allowance remaining. As a more detailed example embodiment, a pre-pay wireless service plan may allow for a certain amount of open internet data usage (often specified in megabytes or gigabytes), and a usage indication is provided on a service launch object to indicate graphically how much usage is remaining or how much is consumed. An example is provided in FIG. 44 on the pre-pay 100 MB service plan service launch object icon, with the icon showing that roughly 85 percent of the service plan limit is remaining and 15 percent has been consumed. Another pre-pay example is shown in FIG. 44 where the Maps service launch object icon shows only approximately 10 percent of the service limit remaining with 90 percent consumed, and a additional feature of this example embodiment is that the usage bar has turned red to indicate that the remaining service plan is low and encourage the user to purchase additional service soon (before the current service runs out). These example embodiments include different service plan usage classifications— one for wide open internet and the other specifically for maps. This is a good example of certain advantages in the user experience for the embodiments described herein. If the two usage meters were provided only in a UI screen format unrelated to the service launch object icons, then the user would need to open that UI screen, observe the usage status for each of the user's active services, and then remember the usage status later on when the user intended to act on one of the service launch object icons by selecting in. In some embodiments, usage information is provided on the same screen that the user uses to act on the available services and applications. In some embodiments, usage information is provided on the same screen that the user uses to act on the available service launch object.

Further example embodiments for usage information displayed directly in association with a service launch object icon are provided in FIG. 44. For example, in FIG. 44 there is a limit to the amount of service usage available to the user in a given period of time for the sponsored (free in this case) services, and a user can easily see that the sponsored trial access is almost used up while there is still plenty of usage remaining for the Facebook and CNN services. In some embodiments, one or more sponsored services have limited usage. In some embodiments one or more sponsored services (or any other service) have unlimited usage when that is the policy set by the network apparatus (for example, the device management system 170 or another network element). There are other paid recurring service examples provided in the paid recurring services partition in FIG. 44, with various service plan usage classifications and usage allowances, with allowances being based on a limit to the usage amount under the service plan classification or time based limits.

FIG. 44 also displays another embodiment for changing the appearance of a service launch object icon to indicate that service has not been purchased or that additional service must be purchased before the service or application may be used. For the embodiment in FIG. 44, the service launch object icon appearance modification to indicate that the service has not been purchased (or that additional service must be purchased before the service or application may be used) is indicated by the gas pump icon shown on the pre-paid 1 day service and the post-pay (recurring) maps service. In some embodiments, the service application associated with the service launch object has not been downloaded yet when the user first clicks on it (as is the case when the fuel pump icon feature is displayed), then the application is automatically downloaded, or the user is given an option to download the application.

In some embodiments service launch object icon modification make it easier for a user to identify one or more subsets of their one or more services or applications with plenty of service allowance remaining, or near the end of their service allowance, or requiring an initial or additional service purchase to use the service or application.

In some embodiments, usage information displayed on the service launch object icon is obtained by the UI location manager 132 (or an some other device agent), and the UI location manager 132 updates (for example, dynamically based on network state or device usage state) the service launch object icon as described in detail herein by changing the icon, overlaying another graphic, merging with another graphic or overlaying a notification message.

In some embodiments, usage information for a given service launch object is sent by a network element to the UI location manager 132 and formatted by the UI location manager 132 for display on the service launch object icon. In some embodiments usage information is collected on the device 130 by the UI location manager 132 and formatted by the UI location manager 132 for display on the service launch object icon. In some embodiments usage information collected on the device 130 by the UI location manager 132 is synchronized with usage information from network element, then displayed on the service launch object icon. In some embodiments the usage information is displayed on the service launch object icon for a one or more network states. In some embodiments the usage information is displayed on the service launch object icon when connected to a paid network (for example, 4G/3G/2G) but not displayed for a free network (home WiFi). In some embodiments the usage information is displayed on the service launch object icon when usage is above a threshold. In some embodiments the usage information is updated when network state changes (for example, different usage limits and/or usage levels for 4G, 3G/2G, WiFi, home/roaming, etc.).

Figure 45:
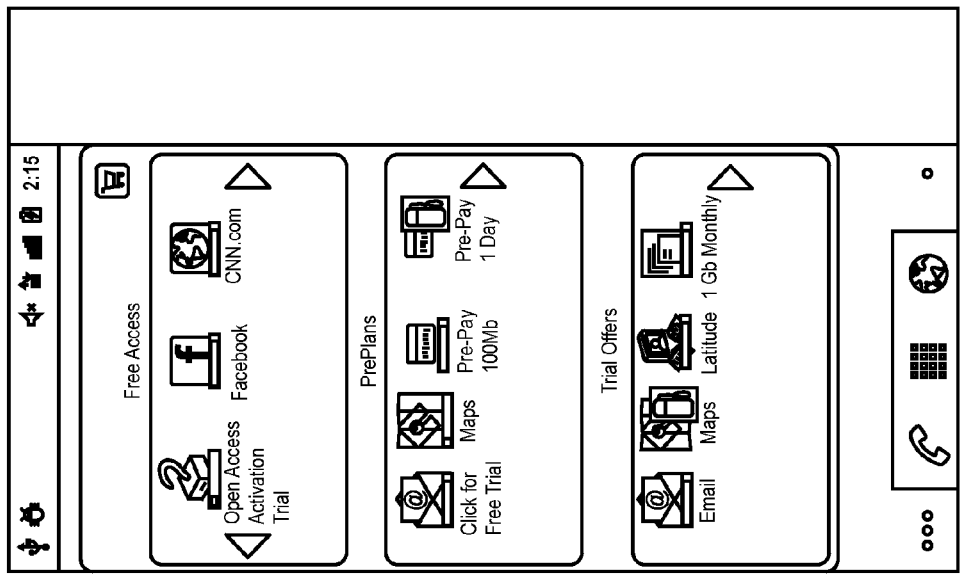
FIG. 45 shows a three-partition UI service launch partition that includes sponsored or free services, paid services and trial offer services according to some embodiments.
Figure 48:
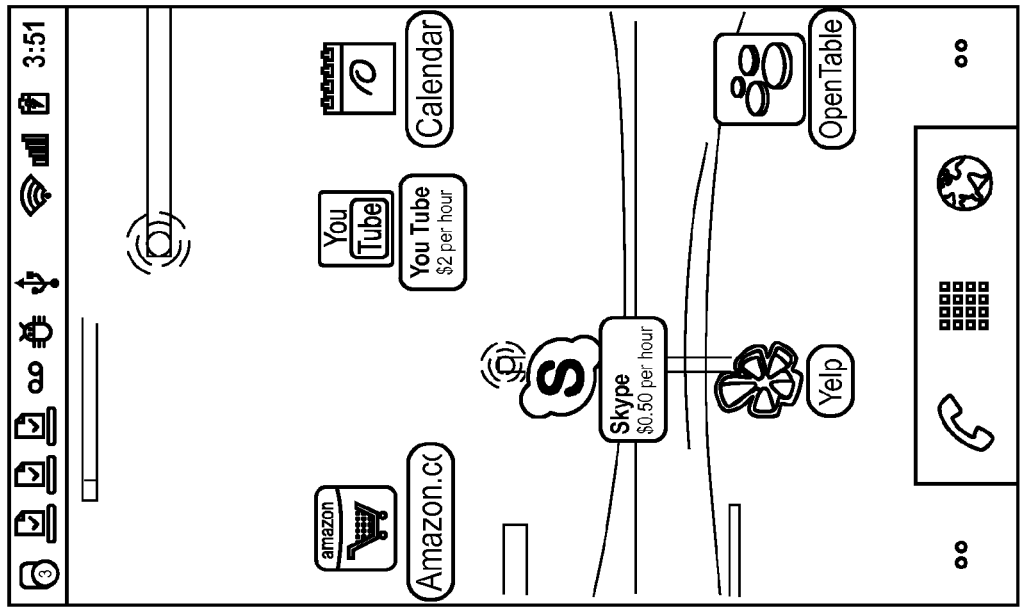
FIG. 48 shows a service launch object notification message with access service pricing according to embodiments.

FIG. 45 displays a 3-partition UI service launch partition according to some embodiments. The embodiment in FIG. 45 includes a service launch partition for trial offers (for example, plans).

In some embodiments trial offers (wherein trial offers may be limited—for example, time of data limited—offers) contain service launch objects associated with services or applications that are available on a trial basis. In some embodiments trial offers comprise limited trial offers. In some embodiments limited trial offers contain service launch objects associated with services or applications that are available on a trial basis including one or more of the following limitations: for a period of time (for example, limited time trial offers) or for a subset of geographies (for example, limited geography trial offers) or for a subset of networks (for example, limited network trial offers). In some embodiments limited trial offers contain service launch objects associated with services or applications that are available on a trial basis based on a limitation and are dynamically removed or swapped for other offers by the UI location manager 132. In some embodiments limited trial offers contain service launch objects associated with services or applications that are available on a trial basis based on a limitation and are dynamically removed or swapped for other offers by the UI location manager 132 controlled by the device management system 170 (for example, a UI location management service provider). This is another embodiment for prominent discovery of services or applications that a UI location management service provider desires to present to a device user.

Figure 46:
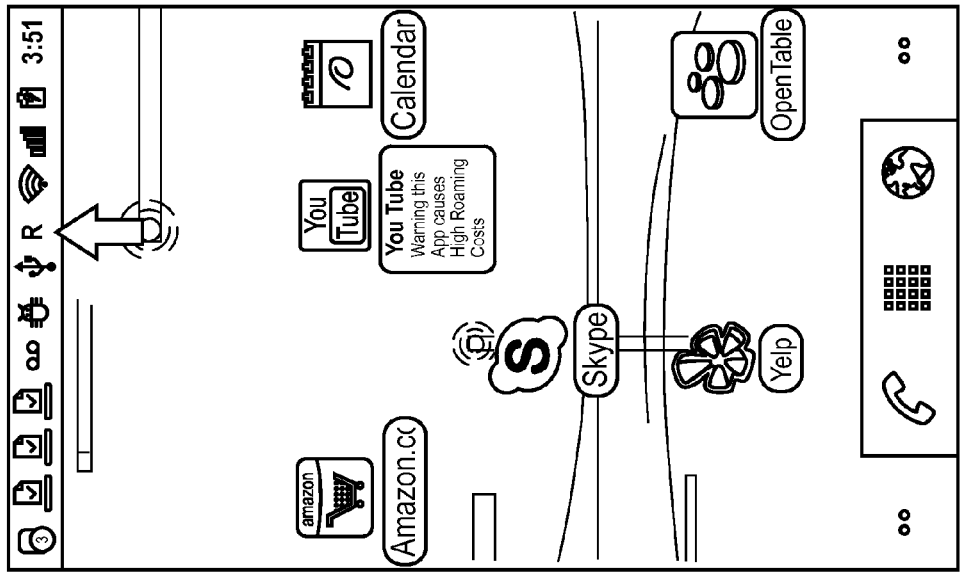
FIG. 46 shows a service launch object notification message with service launch object specific warning on service cost in present network state (in this case a roaming usage warning for a high data usage application and a highlight UI icon to emphasize roaming state) according to embodiments.

In some embodiments, one or more of the service launch object icon appearance, service launch object location or service launch object notification message change as a function of network state. FIG. 46 shows an example embodiment where the device has entered the roaming state and a service launch object notification message is displayed for a video streaming service that would be very expensive during roaming conditions. In some embodiments a service launch object graphic feature is added according to the UI location manager policy or network instruction to highlight the roaming indicator on the device display (for example, the red-arrow in FIG. 45). In some embodiments applications and services have varying degrees of roaming warnings (for example, no warning at all) based on usage (for example, fewer or less obvious roaming warnings for low data usage or sponsored services or applications) during roaming conditions. In some embodiments sponsored service or application coverage by the sponsored service provider does not include roaming, and the user is notified. In some embodiments sponsored service or application coverage by the sponsored service provider does not include roaming, and the user is notified they will receive roaming fees. In some embodiments sponsored service or application coverage by the sponsored service provider does not include roaming, and the user is notified of a request for a response from the user (for example, by clicking or touching to select the service launch object) to use the service they will be charged for roaming fees.

In some embodiments, the service launch object icon changes appearance or color or animate to indicate a change in network state or service charges.

Figure 47:
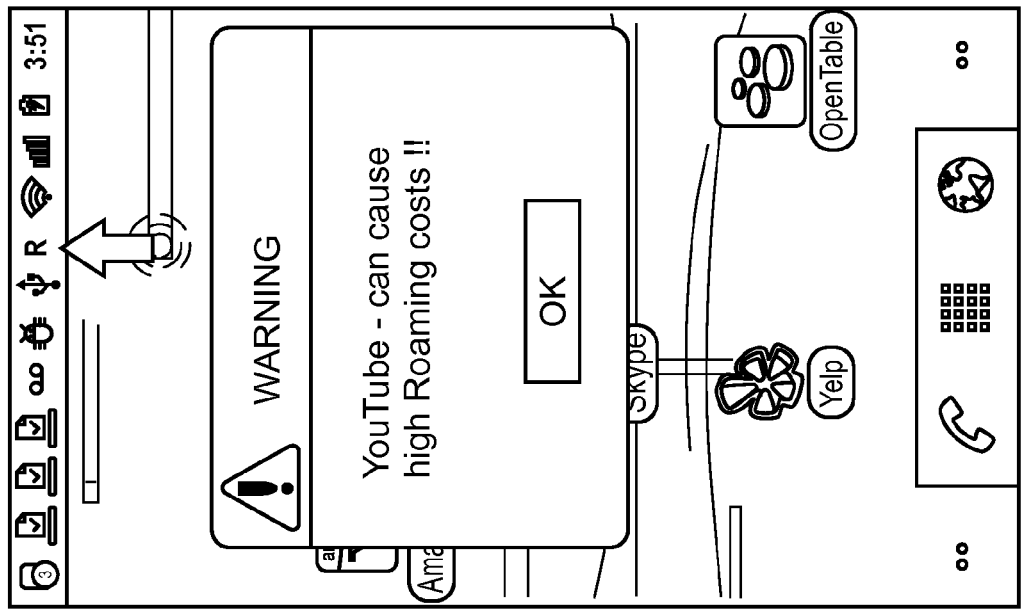
FIG. 47 shows a service launch object secondary notification message displayed after user chooses to launch the service or application (in this case a secondary roaming usage warning for a high data usage service or application) according to embodiments.

FIG. 47 shows a secondary notification message according to some embodiments. In some embodiments a secondary notification message (for example, a warning) is configured to be presented when a user chooses to activate a service launch object under specific network state conditions (for example, expensive network, or low performance network, or low QoS, etc.). In some embodiments, the secondary notification message (for example, warning) of the notification policy is managed by the remote device management system 170 and the device UI location manager 132 and after the user selects (for example, clicks) the service launch object a second notification message is provided. In some embodiments, the secondary notification message requires the user to (optionally) dismiss or accept for service launch object activation. In some embodiments, the secondary notification message persists for a set period of time or until the network state changes.

In some embodiments, the notification message is provided in a manner that does not interrupt service or application launch. In some embodiments, the service or application launch is held (for example, stalled or paused) until the user dismisses the message.

Figure 49:
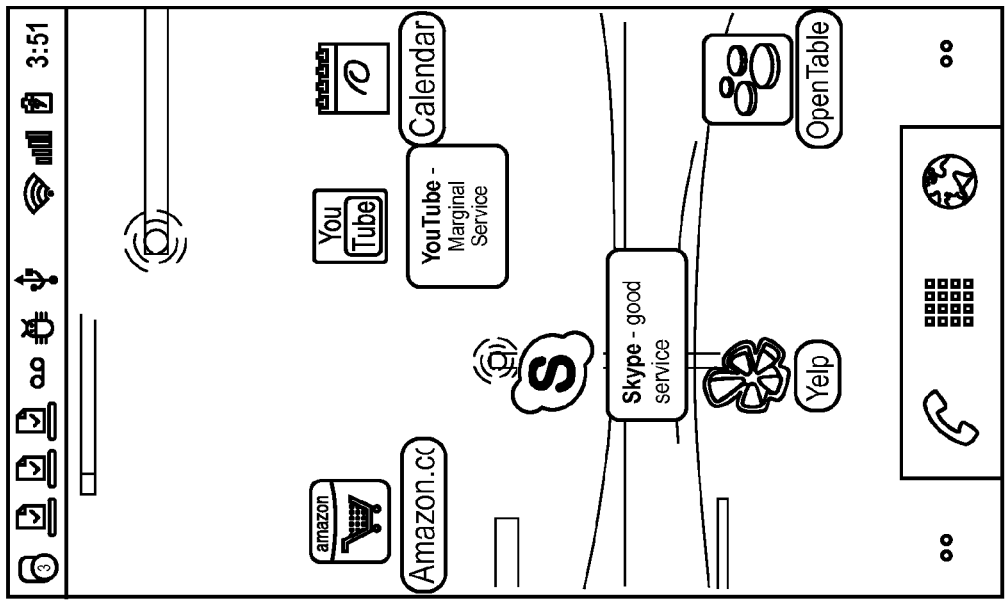
FIG. 49 shows a service launch object notification messages showing good QoS for a voice service and marginal QoS for a video service according to embodiments.

In some embodiments the service launch object icon appearance, or service launch object location is modified, or a service launch object notification message is presented based on a network state (for example, network QoS, network congestion, network performance, network bandwidth, network data rate or network signal quality). For the example embodiment in FIG. 49 the network QoS has been assessed (by a device agent or the network) to meet a quality criteria (or alternatively to satisfy congestion criteria below a threshold or satisfy a data rate above a threshold or have high signal quality above a threshold) to support streaming VOIP services. For the example embodiment in FIG. 49 the network state (for example, QoS, etc.) does not meet the criteria to provide good video service quality. In some embodiments, (for example, the embodiment in FIG. 49) the UI location manager 132 determines the network state level of quality (or receives service launch object network state messages from the network) and provides targeted service launch notification messages to one or more service launch object.

In some embodiments, (for example, the embodiment in FIG. 49) the UI location manager 132 determines the network state level of quality (or receives service launch object QoS messages from the network) and provides targeted service launch notification messages to the VOIP service launch object (Skype—good service) and the streaming video service launch object (YouTube—marginal service).

Figure 50:
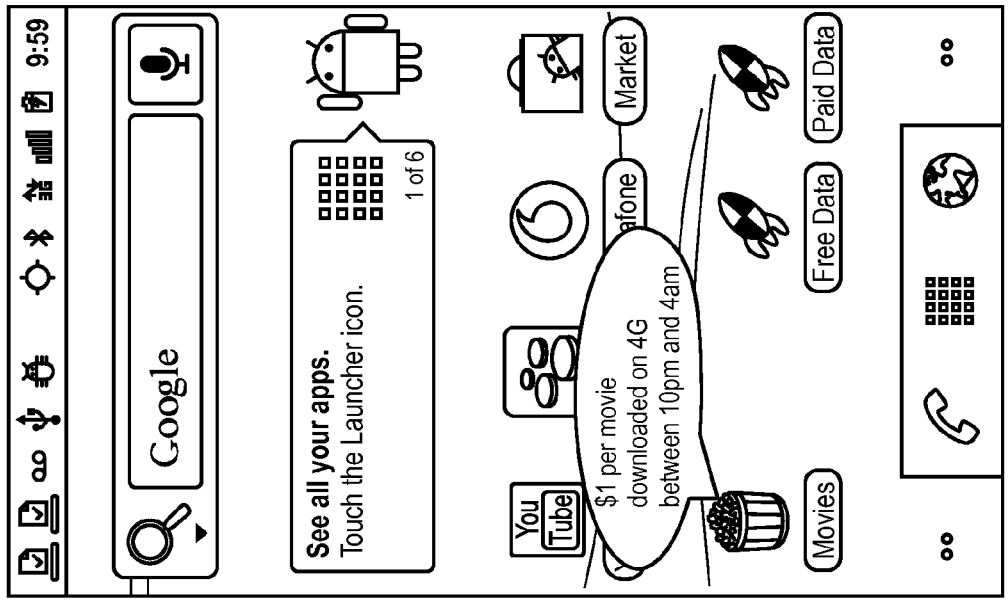
FIG. 50 shows a service launch object notification message with special pricing offer message (in this example a time of day based special pricing message) according to embodiments.

In some embodiments, service or application discovery level is elevated by providing a service launch object notification message for an offer. In some embodiments the offer is a limited offer. In some embodiments the limited offer is a limited offer, wherein the limited offer is offered over one or more of a limited time, limited geography, limited network, limited devices, limited users. In some embodiments the service launch object associated with the offer may be in a UI service launch partition or some other location on the device including a main or home UI screen, or a secondary UI screen or some other UI area. FIG. 50 shows an embodiment where the connected movie application (for example, Netflix or iTunes) is displaying a service launch object notification message indicating that movie download is available at a special price during a limited time that the network is not typically busy. In some embodiments, the notification message is based on a network state that has sufficient capacity to allow less expensive downloads (for example, WiFi, 4G, etc.).

Figure 51:
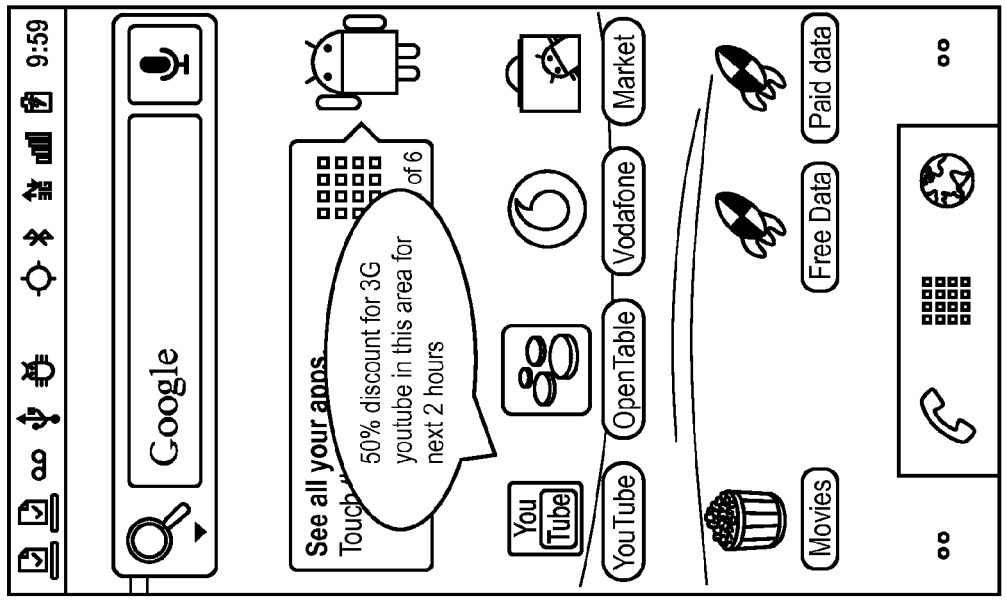
FIG. 51 shows a service launch object notification message with geography and time based limited offer message (in this case 50 percent off YouTube in the current geographic area for the next two hours) according to embodiments.

FIG. 51 shows another example embodiment where the streaming video application service launch object is indicating to the user a special price in the specific geographic location is in, with a time limit in case the network becomes busy again later. In some embodiments a service launch object notification message to increase discovery level with a notification message is conditional on multiple limitations (for example, states or parameters). In some embodiments a service launch object notification message to increase discovery level with a notification message is conditional on multiple limitations comprises one or more of network state (for example, 3G in FIG. 51) and device usage state (for example, time of day and geographic location—'next 2 hours' and 'this area' in FIG. 51).

It will now be clear to one of ordinary skill in the art that other combinations of network state and device usage state parameters may be used to condition the occurrence and content of one or more service launch object notification messages.

Figure 52:
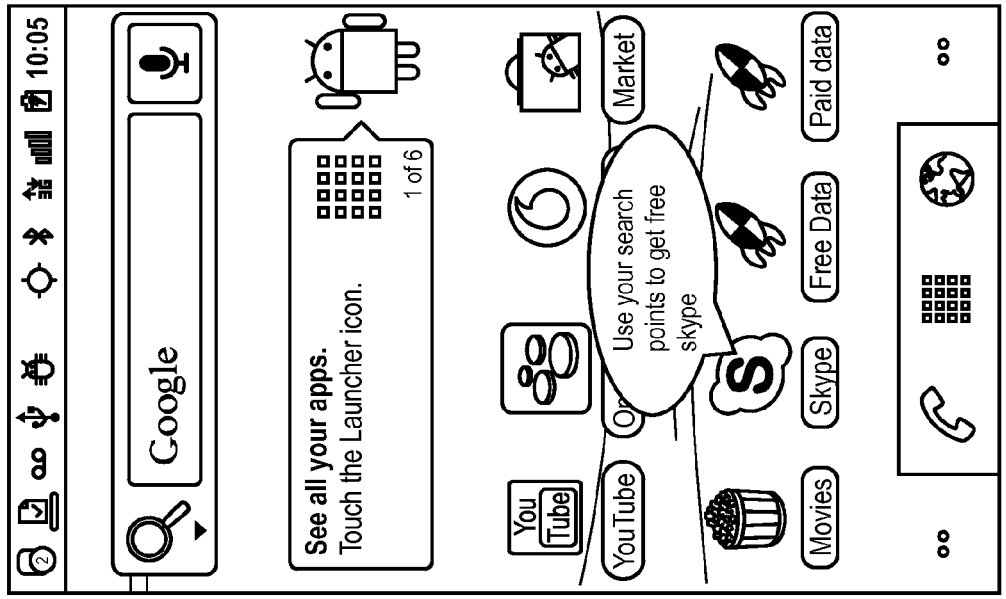
FIG. 52 shows a service launch object notification message with special offer to trade service usage points for discounted access services (in this case free Skype in exchange for usage points on browser search where search provider generates ad revenue when user uses the service) according to embodiments.

In some embodiments a device user obtains service launch object usage (for example, network access service) allowance (for example, virtual cash, points, megabytes, etc.) by using services on the device which generate revenue for the UI location management service provider or a customer of the UI location management service provider. In some embodiments a device user obtains service usage allowance (for example, virtual cash, points, megabytes, etc.) by using services on the device which generate revenue for the UI location management service provider or a customer of the UI location management service provider. FIG. 52 is an example embodiment wherein a device user can gain access service usage allowance by using services on the device which generate revenue for the UI location management service provider or a customer of the UI location management service provider. For example, in FIG. 52 the user is being informed by a service launch object notification message that they can now get free Skype service as a result of the usage points they have generated by using search services on the device.

In some embodiments the UI location management service provider or UI location management service provider customer manages (for example, monitors or keeps track of) usage, visits, views, ad views, clicks, ad clicks, or user purchase revenue generated by the device user's use of service or on-device purchases, and manages (for example, monitors or keeps track of) of how many usage points (for example, point, virtual cash, megabytes, etc.) such events have generated for the user's account, and allows the user to convert the usage points into service or application usage (for example, access service) allowance for one or more services or services plans. In some embodiments management system 190 counts service launch object interactions or banner ad views, coupon clicks, etc. and gives credit for service or application, discount account, reward points or cash.

There are a number of ways the UI location manager 132 can be designed to accept the various information elements such as service launch object information, application information, destination information, service launch object notification messages, network state policies and usage state policies as described herein, and use the network state information and/or usage state information and/or notification messages from the device management system 170 to re-locate service launch objects (or icons) in the device UI, or to change the features or graphics on the service launch objects, or to display different messages in, on, touching or in proximity of the service launch objects. Several detailed embodiments are provided herein. An exhaustive list of all possible embodiments for these functions is not practical and is of limited value to one of ordinary skill in the art once the various embodiments herein are understood. Armed with the teaching provided herein it will be obvious to one of ordinary skill in the art how to create other design embodiments to accomplish the same functions.

It is also understood that the following embodiments for moving service launch objects, modifying service launch objects, and providing service launch object notification messages as a function of network state, device usage state or service launch object UI placement instructions from the device management system 170 are taught individually, it is understood that these embodiments may be combined. For example, the embodiments for moving the service launch object icon to different UI locations as a function of network state, device usage state or service launch object UI placement instructions from the device management system 170 can be combined with one or more of the embodiments for changing the appearance of the service launch object icon or providing a service launch object notification message. Similarly, embodiments for changing service launch object appearance can be combined with embodiments for changing service launch object notification messages, and so on.

In some embodiments, wherein the UI location of the service launch object are changed as a function of various network states, the various UI locations corresponding with the various network states are stored in a table managed by the UI location manager 132 which indexes the table according to changes in the network state, when the network state change is detected and the proper UI location is looked up with the network state index, and the service launch object is moved to new UI location by the UI location manager 132.

In some embodiments, wherein the features of the service launch object icon are changed as a function of network state, the various icon features (for example, graphics files) and the current service launch object UI location are stored in a table managed by the UI location manager 132 which indexes the table according to changes in the network state, when the network state changes is detected and the proper icon features is looked up with the network state index, and the newly featured service launch object icon is placed by the UI location manager 132 on the device UI in accordance with the current service launch object UI location stored in the table.

In some embodiments, wherein the features of the service launch object icon are changed as a function of network state, the various icon features (for example, graphics files) for a network state overlay feature (wherein the term overlay is used to include overlay, or superposition, or merge, or combine) and the current service launch object UI location are stored in a table managed by the UI location manager 132, and the table is indexed by network state, and when the network state change is detected and the proper overlay icon graphic is used to overlay with a basic icon graphic on the device UI in accordance with the current service launch object UI location stored in the table. In some embodiments, the overlay feature may be obtained from a network element (such as the device management system 170) by the device (such as the UI location manager 132) as described above. In some embodiments, the overlay feature may be obtained jointly by a network element (such as the device management system 170) and by the device (such as the UI location manager 132) as described above.

In some embodiments, the overlay is accomplished by the device (such as the UI location manger 132), wherein the device 130 processes a basic (for example, standard) application icon or service launch object icon to perform the overlay of the basic icon with the overlay feature to build a new composite icon on the device. In some embodiments, the overlay is accomplished by presenting the overlay graphics in, on or in close proximity to the location in the UI containing the application or service launch object icon, with the current service launch object location being derived from the current service launch object UI position in the aforementioned table.

In some embodiments, a service launch object icon (for example, including overlay feature) that changes as a function of network state is obtained from a network element (such as the UI location management server 150), after the UI location manager 132 detects the network state change and receives the new corresponding icon from the network element, the UI location manager 132 places the new icon in the proper service launch object UI location.

In some embodiments, wherein a service launch object notification message is changed as a function of network state, the various service launch object notification messages that vary with network state and the current service launch object UI location are stored in a table managed by the UI location manager 132 which indexes the table according to changes in the network state. In further embodiments, after the network state change is detected and the proper service launch object notification message is looked up with the network state index, the new service launch object notification message is used to replace the service launch object notification message that was used in a prior network state, and the new service launch object notification message is placed in, on, touching or in proximity to the service launch object icon in accordance with the current service launch object UI location stored in the table.

In some embodiments, a service launch object notification message that changes as a function of network state is obtained from a network element (such as the UI location management server 150), after the UI location manager 132 detects the network state change and receives the new corresponding service launch object notification message from the network element, the UI location manager 132 places the notification message in, on, touching or in proximity to the service launch object icon, with the new service launch object notification message being placed in the proper service launch object UI location by the UI location manager 132.

In some embodiments, wherein a service launch object notification message is changed as a function of device usage state, the various service launch object notification messages that vary with device usage state and the current service launch object UI location are stored in a table managed by the UI location manager 132 which indexes the table according to changes in the device usage state.

In some embodiments the device usage state change is detected and the proper service launch object notification message is looked up with the device usage state index, and the new service launch object notification message is used to replace the service launch object notification message that was used in a prior device usage state. In some embodiments the device usage state change is detected and the new service launch object notification message is placed in, on, touching or in proximity to the service launch object icon in accordance with the current service launch object UI location stored in the table.

In some embodiments, an updated (for example, dynamic) service launch object (for example, by changing one or more of service launch object location, or service launch object icon, or service launch object overlay feature, or service launch object notification message, or UI service launch partition message) that changes as a function of device usage state is obtained from a network entity (such as the device management system 170), when the UI location manager 132 detects the device usage state change and requests an updated service launch object from the network element, and then the UI location manager 132 places the new service launch object at the appropriate UI location. In some embodiments the device 130 keeps a device usage state log and provides to a network element (such as the device management system 170) one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; the device 130 receives from the network entity a new updated service launch object (or index) to replaced the previous service launch object and is placed by the UI location manager 132 in the UI location corresponding to the new updated service launch object. In some embodiments, at least a part of the usage state information is collected by the network entity. In some embodiments at least a part of the usage state information collected by the device 130 is augmented by network entity usage state information. In some embodiments; the device management system 170 receives the device usage state information from the device 130, including one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; and the device management system 170 performs one or more of the following tasks: process the usage state information to select services or applications most advantageous to highlight to the user, or provide special use offers to the user, or create service launch object notification messages for a services or application, or re-locating a service launch object or updating (one or more of location, features, overlay, etc.) a service launch object icon, or create a new set of service launch object UI location instructions or placement policies for the device (for example, for the UI location manager 132); and send the new set of service launch object UI location, updates, instructions or placement policies to the device (for example, the UI location manager 132).

In some embodiments; the device management system 170 receives from the device the device usage state information from multiple devices in a device group (for example, multiple devices associated to a user or multiple devices from a family plan), including one or more of: the current state of service usage for one or more selected services, current or recent states of application usage for one or more selected applications, current or recent geographic locations, current or recent network destination history, current or recent applications being interacted with by the user, current or recent network state, how long it has been since the user interacted on a UI feedback element on the device; and the device management system 170 performs one or more of the following tasks: process the usage state information to select services or applications most advantageous to highlight to one or more users of the device group, or provide special use offers to one or more users of the device group, or create service launch object notification messages for a services or application to one or more users of the device group, or re-locating a service launch object to one or more users of the device group or updating (one or more of location, features, overlay, etc.) a service launch object icon to one or more users of the device group, or create a new set of service launch object UI location instructions or placement policies for the one or more devices of the device group (for example, for the UI location manager 132); and send the new set of service launch object UI location, updates, instructions or placement policies to the one or more devices of the device group (for example, the UI location manager 132).

In some embodiments, an updated (for example, dynamic) service launch object (for example, by changing one or more of service launch object location, or service launch object icon, or service launch object overlay feature, or service launch object notification message, or UI service launch partition message) is changed with a new service launch object UI policy instruction received by the device UI location manager 132 from a network element (such as the device management system 170).

In some embodiments, the UI location manager 132 or the device management system 170 update a service launch object (for example, by changing one or more of service launch object location, or service launch object icon, or service launch object overlay feature, or service launch object notification message, or UI service launch partition message) in order to change the level of user information or user attention gathering for one or more service launch objects.

In some embodiments updating a service launch object in order to change the level of user information or user attention is desired because a UI location management service provider desires to change the user discovery or marketing messages associated with one or more service launch objects associated with one or more services or applications. In some embodiments updating a service launch object in order to change the level of user information or user attention is the result of payments received by the UI location management service provider from service providers or application developers whose services or applications are being highlighted in the new service launch object UI locations, messages and discovery positioning. In some embodiments updating a service launch object in order to change the level of user information or user attention is the result of the UI location management service provider benefiting directly from enhanced service or application usage by the user. In some embodiments updating a service launch object in order to change the level of user information or user attention is encourages the user to try new services or applications that the user has not used before.

In some embodiments, updating (for example, dynamic) a service launch object (for example, by changing one or more of service launch object location, or service launch object icon, or service launch object overlay feature, or service launch object notification message, or UI service launch partition message) by the device management system 170 is applied on one device at a time from a device group.

In some embodiments, updating (for example, dynamic) one or more service launch objects (for example, by changing one or more of service launch object location, or service launch object icon, or service launch object overlay feature, or service launch object notification message, or UI service launch partition message) by the device management system 170 is applied on one device at a time in order to enhance the user discovery of one or more services or applications are put in effect for one device at a time in accordance to a desired improvement in service launch object discovery for that device. In some embodiments for updating service launch objects for device groups, payments received by a UI location management service provider are for the device group and not just individual devices. In some embodiments for updating service launch objects for device groups, payments received by a UI location management service provider are for the device group and not just individual devices, and the payments are adjusted as a function of how closely the device group information (for example, information derived from device usage state—history, logs, demographic, geographic, etc.) matches the desired device group information for the entity that is paying for enhanced service launch object discovery (or selection, or use, or clicks, etc.).

In some embodiments, the UI location management console 160 provides a web portal (for example, an automated or secure web portal) for application developers to log in to set up sponsored services or device discovery levels for their applications or services. In some embodiments, the web portal provides a variety of options in various embodiments, including but not limited to service launch object discovery pricing that varies with one or more of: time per day or per week or per month spent on a given discovery level; UI location; notification message type; notification message length, extent or content; notification message frequency; network state; device usage state. In some embodiments, the web portal provides one or more of: icon upload for user designed icons, upload of user application or application specification for application store or marketplace download; network destination (for example, URL, domain, website, IP address, port, etc.) for a browser based service; etc.

In some embodiments, updating (for example, dynamic) one or more service launch objects (for example, by changing one or more of service launch object location, or service launch object icon, or service launch object overlay feature, or service launch object notification message, or UI service launch partition message) by the device management system 170 in order to enhance the user discovery of one or more services or applications are put in effect in accordance to a desired improvement in service launch object discovery for multiple devices that are part of a device group. In such embodiments involving modifications to service launch object UI discovery management for device groups, payments received by a UI location management service provider are for the device group and not just individual devices, and the payments may be adjusted as a function of how closely the device group demographic information (for example, information derived from device usage state history) matches the desired demographics for the entity that is paying for enhanced service launch object discovery.

In some embodiments, the device management system 170 provides a bidding function for enhanced discovery of services or applications, wherein service providers (for example, shopping service providers, location based advertising providers, on-line sellers of merchandise, content providers, access service providers, streaming service providers, social network service providers, internet search service providers, etc.) or application developers (developers of applications who whish their applications to be highlighted to device users) are provided with a bidding mechanism to bid on service launch object UI location placement, features and/or service launch object notification messages. In some embodiments, the device management system 170 provides a bidding function for enhanced discovery of services or applications, wherein service providers or application developers are provided with a bidding mechanism to bid on service launch object UI location placement, features and/or service launch object notification messages, wherein the highest bidder receives the service discovery position being bid upon.

In some embodiments, the device management system 170 provides a bidding function for enhanced discovery of services or applications, wherein service providers or application developers are provided with a bidding mechanism to bid on one or more service launch object properties: placement, icon features, icon overlay, icon format, notification messages. In some embodiments, the device management system 170 provides a bidding function for enhanced discovery of services or applications, wherein service providers or application developers are provided with a bidding mechanism to bid on one or more service launch object properties: placement, icon features, icon overlay, icon format, notification messages as a function of one or more of: network state, device usage state, user state. In some embodiments, the device management system 170 provides a bidding function for enhanced discovery of services or applications, wherein service providers or application developers are provided with a bidding mechanism to bid on one or more service launch object properties: placement, icon features, icon overlay, icon format, notification messages as a function of one or more of: network state, device usage state, user state, wherein the highest bidder receives the service discovery position being bid upon. In some embodiments service launch object are classified based on UI location, icon features or service launch object notification messages into "service or application discovery levels," wherein the premium levels of service discovery in general earn higher bids. Some embodiments involve classifying the service launch object UI location, icon features or service launch object notification messages into "service or application discovery levels," wherein the premium levels of service discovery in general earn higher bids. In some embodiments a higher discovery level typically gains more attention from the user by having one or more of: more prominent service launch object UI location placement, more frequent specific information regarding the service launch object, more prominent service launch object notification messages. In some embodiments, a premium discovery level has the service launch object icon placed in one or more of the following attributes: in first position in a permanent or prominent UI service launch partition, the device main screen, or a permanent launcher bar on the device, frequent service launch object notification, frequent service launch object notification involving device usage state dependent analysis for when to provide the notification messages. In some embodiments a lower discovery level would typically cost a bidder less, involves placement in the application stable of the device with little or no service launch object notification messaging. In some embodiments an in between (or intermediate or typical or standard) discovery level might include one or more of the following attributes: non-permanent placement (for example, the user can modify the placement or can remove the service launch object icon from all but the application stable) in a UI service launch partition or a secondary device screen, notification messaging taking place only at certain times of day or certain geographic locations.

In some embodiments device management system 170 (or alternatively a service design center or UI location management console 160) presents device UI view of discovery position on bidding interface. In some embodiments device management system 170 presents device UI view of icon animation on bidding interface. In some embodiments device management system 170 presents device UI view of coupon issue from bidding interface. In some embodiments device management system 170 presents device UI view of notification from bidding interface. In some embodiments device management system 170 presents device UI view of notification animation or coupon animation from bidding interface.

In some embodiments, the device management system 170 supports static purchase of device UI discovery level via an automated secure portal interface. In some embodiments the UI location management console 160 is configured as a secure web interface for remote terminals. In some embodiments a remote terminal user can log into a user sign up system where the users credentials and credit are established.

In some embodiments the user of the device management system 170 (for example, service provider or application developer) purchases pre-configured discovery levels at pre-configured pricing for pre-configured device groups.

In some embodiments the device group information (for example, demographics, device parameters, device user parameters) are displayed to the user of the device management system 170 to help in determining the relative value of the various levels of discovery available. In some embodiments the user of device management system 170 purchases one or more of: a discovery level for a pre-determined period of time, or for a pre-determined number of user service launch object views, service launch object notification message views, or service launch object clicks.

In some embodiments, the device management system 170 supports dynamic bidding and purchase of device UI discovery level via an automated secure portal interface. In some embodiments the UI location management console 160 is configured as a secure web interface for remote terminals. In some embodiments a remote terminal user can log into a user sign up system where the users credentials and credit are established. In some embodiments the user of the device management system 170 bids upon various device group discovery levels, with the winning bidder purchasing that discovery level. In some embodiments the user of the device management system 170 bids upon various device group discovery levels, with the winning bidder purchasing that discovery level for one or more of: a pre-determined period of time, a pre-determined number of user service launch object views, service launch object notification message views, or service launch object clicks.

In some embodiments, the number of views or clicks or selections or usage are tracked by the device (for example, the UI location manager 132) and reported to the device management system 170. In some embodiments, the number of views or clicks or selections or usage are tracked or estimated by the device management system 170, by either estimating the number of views as a function of time or by observing network traffic, or by a combination of both.

In some embodiments, the device management system 170 is configured to allow a portion of the device UI (for example, a partition in a UI service launch partition) to be controlled by a third party, such as an application store or application marketplace service provider, or a search provider, or a location based services provider or a mobile device advertising provider. In some embodiments, the device management system 170 is configured to allow a portion of the device UI (for example, one or more partitions in a UI service launch partition) to be controlled by a third party, such as an application store or application marketplace service provider, or a search provider, or a location based services provider or a mobile device advertising provider for placement of service launch objects, for example, prioritized, ranked, displayed, tiered to enhance discovery of associated service or applications.

There are numerous other detailed embodiment examples for selling UI discovery levels to service providers, a third party, third party service providers, content providers, merchandise retailers or application developers, either with discovery levels that are pre-negotiated and fixed for a period of time or geography or device or user population, or discovery levels that are bid upon in real time, that one of ordinary skill in the art will now understand. The teachings here show how to devise embodiments that enhance the ability to advertise services or applications by associating the marketing messages directly with the location, appearance and notification information directly associated with a service launch object or service launch object icon.

In some embodiments the UI location manager 132 (or some other device agent), or the device management system 170 evaluates a user's use of services in order to determine a new service plan or an alternate service plan that the user might benefit from or be willing to purchase (an "alternate service"). In some embodiments, a user is currently using a pre-paid hourly internet access plan, and the user is using several hours per day, and there is a less expensive post-paid recurring service plan, then the post-paid recurring service plan is identified as an alternate service by service analysis algorithms in the UI location manager 132 (or some another device agent), or the device management system 170. In some embodiments, a user is subscribed to a first service and the UI location manager 132 or the device management system 170 identify a service launch object notification message that is associated with a service launch object for the alternate service, and the service launch object message is communicated to the UI location manager 132 (or might be pre-cached on the device for retrieval by the UI location manager 132), and the UI location manager 132 places the service launch object notification message advertising an alternate service on, in, touching or near the service launch object corresponding to the alternate service.

In some embodiments, a user is subscribed to a first service and the UI location manager 132 or the device management system 170 identify a service launch object notification message that is associated with a service launch object for the alternate service, and the UI location manager 132 places the service launch object notification message advertising an alternate service on, in, touching or near the first service launch object.

In some embodiments the UI location manager 132 manages the UI locations contained in a UI service launch partition with one or more launch partitions for organizing or displaying service launch objects. In some embodiments, the UI service launch partition displays a controlled version of a service launch object icon that is similar to a standard (wherein standard is replaced with generic or typical or normal) service or application icon (for example, the standard application icon that comes with an application delivered by conventional means such as application store or marketplace, internet download or device user load) that is available in other UI locations on the device controlled by the user.

In some embodiments, the UI service launch partition displays a controlled version of a service launch object icon that is similar to a standard service or application icon (for example, that may be available in other UI locations on the device controlled by the user) wherein the controlled service launch object icon that exists within the one or more service launch partitions in the UI service launch partition has an appearance within the UI service launch partition that is modifiable, a location within the UI service launch partition that is modifiable, or has service launch object notification messages applied within the UI service launch partition as described herein.

In some embodiments the service launch object icon appearance modifications, location modifications or service launch object notification messages that are managed or applied within the UI service launch partition are under the control of the UI location management service provider by means of the device management system 170 and the UI location manager 132 while the standard service or application icon that is located outside the UI service launch partition is not modifiable by the device management system 170. This has certain advantages as described in the two paragraphs that follow immediately below.

In some embodiments the UI service launch partition is an application, widget, OS library function or other software module that is installed in the OS or added to the OS (the "UI discovery management module") installed on the device. In some embodiments the UI service launch partition is an application, widget, OS library function or other software module that is installed in the OS or added to the OS (the "UI discovery management module") installed on the device for the purpose of modularizing the software required to perform the device computing operations, communication operations, UI display operations and other operations required to implement the UI location manager 132. In some embodiments the UI location manager 132 is integral to or contained within the UI discovery management module that manages which service launch objects are displayed to the user, the organization (wherein organizing is used to include ordering, prioritizing, ranking, sorting, classifying, etc.) of the service launch object icons within the UI service launch partition (including which partition a given service launch object is displayed in, the service launch object order within the partition, whether or not the service launch object is in the first display screen or the user has to scroll to see it, etc.).

In some embodiments the UI discovery management module has pre-assigned UI location or UI graphic areas within the one or more service launch partitions for displaying service launch objects. In some embodiments, in order to simplify the process of communicating service launch object notification messages or placing them with the correct service launch object, each pre-assigned UI location or UI graphics area has the ability to display one or more service launch object notification message types in pre-configured locations or message formats, with the UI location manager 132 maintaining a table (for example, an array, a matrix, a look up table) or other means to identify which UI location or UI graphics area a given service launch object is located in so that when the service launch object notification message needs to be displayed it is placed in the correct UI location or UI graphics area. In some embodiments, placing service launch object in pre-assigned UI location or UI graphics area reduces the complexity of the modification, placement or notification messaging applied to one or more service launch objects is simplified or the complexity of the UI location and notification messaging management instructions that are communicated from the device management system 170 to the UI location manager 132.

In some embodiments service provider controlled UI launcher UI partition has a background that is different from the device screen background. In some embodiments service provider controlled UI launcher UI partition has a background that is different from the device screen background, wherein different is one or more of color, texture, font, transparency, intensity, gray scale, etc. In some embodiments service provider controlled UI launcher UI partition has it's own background or is "opaque" to device screen background. In some embodiments application or widget is "opaque" to screen background.

In some embodiments, service provider controlled UI launcher UI partition is partially visible relative (for example, translucent) to the background of the device screen.

In some embodiments, service provider controlled UI launcher UI partition is not visible (for example, transparent or see through) and takes on the same background of the device screen. In some embodiments the UI launcher UI partition takes on the background of a live wallpaper or other animated screen type.

In some embodiments application or widget is "transparent" to screen background. In some embodiments transparent application or widget to screen background is accomplished with a UI partition graphic that is transparent. In some embodiments transparent application or widget to screen background is accomplished with a UI partition graphic that determines the screen background and uses it as the UI partition background. In some embodiments transparent application or widget to screen background is accomplished with a UI partition that consists of several individual launcher icons rather than an entire screen area.

In some embodiments where the UI discovery management module is a OS library function or other software module that is installed in the OS or added to the OS for a group of devices the advantageous aspects of the invention are included directly in the device OS. In some embodiments wherein the UI discovery management module is a software application or widget it may be downloaded (for example, "over the air" or "over the internet") by a user, or installed by a user, or installed by a device OEM, or installed by a service provider or installed by a device distribution agent without the need to include it in the device OS. In some embodiments, wherein the UI discovery management module is a software application or widget not included in the device OS, a download of the UI discovery management module provides the ability to control the service launch object icon appearance (for example, features, overlay etc.), location or notification messages in a controlled manner within the UI discovery management module. In some embodiments, wherein the UI discovery management module is a software application or widget independent (for example, optional or not integral or erasable without affecting OS other operations) of the device OS, a download of the UI discovery management module provides the ability to control the service launch object icon appearance (for example, features, overlay etc.), location or notification messages in a controlled manner within the UI discovery management module. In some embodiments, wherein the UI discovery management module is a software application or widget not included in the device OS, a download of the UI discovery management module provides the ability to control the service launch object icon appearance (for example, features, overlay etc.), location or notification messages in a controlled manner within the UI discovery management module without the need to control other (including for example, similar) application icons on the rest of the device that are controlled by the user. In some embodiments, a UI location management service provider manages the discovery of service launch objects with little or no need to undertake the complexities of device software integration or OS software integration.

In some embodiments, a UI location management service provider, wherein the UI discovery management module is a software application or widget that may be downloaded the complexities of OS software integration are reduced (for example, avoided).

In some embodiments an organization screen is provided in the UI service launch partition to provide the user with a list of UI service launch partitions that the user can to choose from for displaying one or more categorized (wherein categorized may also be classified, ranked, organized) service launch objects within one or more partitions within the UI service launch partition. In some embodiments the organization screen provides a user the option to select from a one or more display screens that each consist of one or more UI service launch partition that organizes a categorization of service launch objects. In some embodiments the organization screen provides a user the option to select from a one or more display screens that each consist of one or more UI service launch partition that organizes a categorization of service launch objects and upon selection the user is provided with a categorization screen. In some embodiments the categorization screen comprises display screens that organize service launch objects for one or more of: service plan types (have been purchased, available but have not been purchased, sponsored, free, paid, pre-paid, post-paid, recurring, time based, usage based, trial offers, special offers, family plan services, multi-device services, enterprise or work services, consumer services, etc.), services categorized by application type (for example, music & video, news, browsing, voice and video communications, shopping, location services, live event services, one time special event services, etc.), demographic based categorization (for example, work vs. play services, teen demographic services, pre-teen services, family services, etc.), etc.

In some embodiments the organization screen displaying multiple categorizations of service launch objects is the first screen the user sees (the UI discovery module "default" screen). In some embodiments the organization screen is accessed by the user via a user action (for example, a voice command, keep pad input, selecting the screen or clicking a UI button). In some embodiments a organization screen may be provided wherein the user may select from a set of options to display one or more UI service launch partition categories on the default user partition display in the UI service launch partition. In some embodiments, a user may select to display one or more service launch partitions from: free services, pre-paid services and trial services partitions (or any other available service launch object categories) within the UI service launch partition. In some embodiments, a user may elect not to display one or more of post-paid or recurring services (or any other available service categorization). In some embodiments a subset of the service launch partitions are user selectable. In some embodiments a subset of the service launch partitions are not user selectable. In some embodiments a subset of the service launch partitions are exclusively controlled by the device management system 170 via the UI location manager 132. In some embodiments a some of the service launch partitions are user selectable while others are controlled by the device management system 170 via the UI location manager 132. In some embodiments if too many service launch partitions are available within the UI service launch partition for simultaneous display to the user, then the UI service launch partition can provide for scrolling through the available service launch partitions.

In some embodiments the UI discovery management module provides for an alternative display of service usage for one or more service launch objects wherein one or more service launch object identifiers (for example, service launch object icon) are displayed along with a usage indication for the one or more service launch objects. In some embodiments the UI discovery management module provides for an alternative display of service usage, wherein the service usage is categorized. In some embodiments service usage is categorized by service launch object. In some embodiments service usage is categorized by (or further broken by) application, network destination, application type, service type, network type, home vs. roaming, geography or service class.

In some embodiments service or application discovery level (for example, discovery position) revolve through UI partition according to a service launch object priority. In some embodiments one of more of: a discovery level position or a discovery position range, a time in discovery position, a percent of time in discovery position, number of views or clicks, etc. are specified. In some embodiments notification messaging is specified as a percent of service launch object icon interactions (for example, views, clicks, touches, voice commands, etc.).

In some embodiments UI160 manages at least a part of the device UI 136 presentation. In some embodiments UI160 manages at least a part of the device UI 136 presentation wherein presentation comprises one or more of view, display, format, number of screens. In some embodiments UI160 manages at least a part of the device UI 136 view for one or more of service launch object UI location, service launch object notification messages, service launch partition, service object launcher, UI discovery, service launch object icon. In some embodiments UI160 manages at least a part of the device UI 136 view for one or more of service launch object UI location, service launch object notification messages, service launch partition, service object launcher, UI discovery, service launch object icon based on user input (for example, user profile or preferences) or user behavior (for example, usage history or logs).

In some embodiments UI160 includes a console UI with view of device UI 136 one or more screens. In some embodiments UI160 includes a console UI with view of device UI 136 service launch partition. In some embodiments UI160 includes a console UI with view of device UI 136 for arranging configurations for service launch partitions. In some embodiments UI160 includes a console UI with view of device UI 136 for arranging configurations of one or more of skins, branding, color scheme, buttons and button arrangements. In some embodiments UI160 includes a console UI with view of device UI 136 to drag and drop (wherein for all instances drag and drop may be exchanged for drag or drop or move up or move down) of service launch object onto desired location in UI location management console 160 device UI launcher view for accomplishing correct positioning of service launch object on device. In some embodiments UI160 includes a console UI to associate service launch object icons with service launch object configuration elements.

In some embodiments UI160 enables drag and drop of service launch object onto desired location in UI160 device UI launcher view to provision device with service launch object parameters. In some embodiments UI160 associate service launch object icons with service policy elements in UI location management console 160.

In some embodiments UI160 enables drag and drop of service launch object onto desired location in UI160 device UI launcher view to define service plan or service plan component policies for the service launch object.

Figure 60:
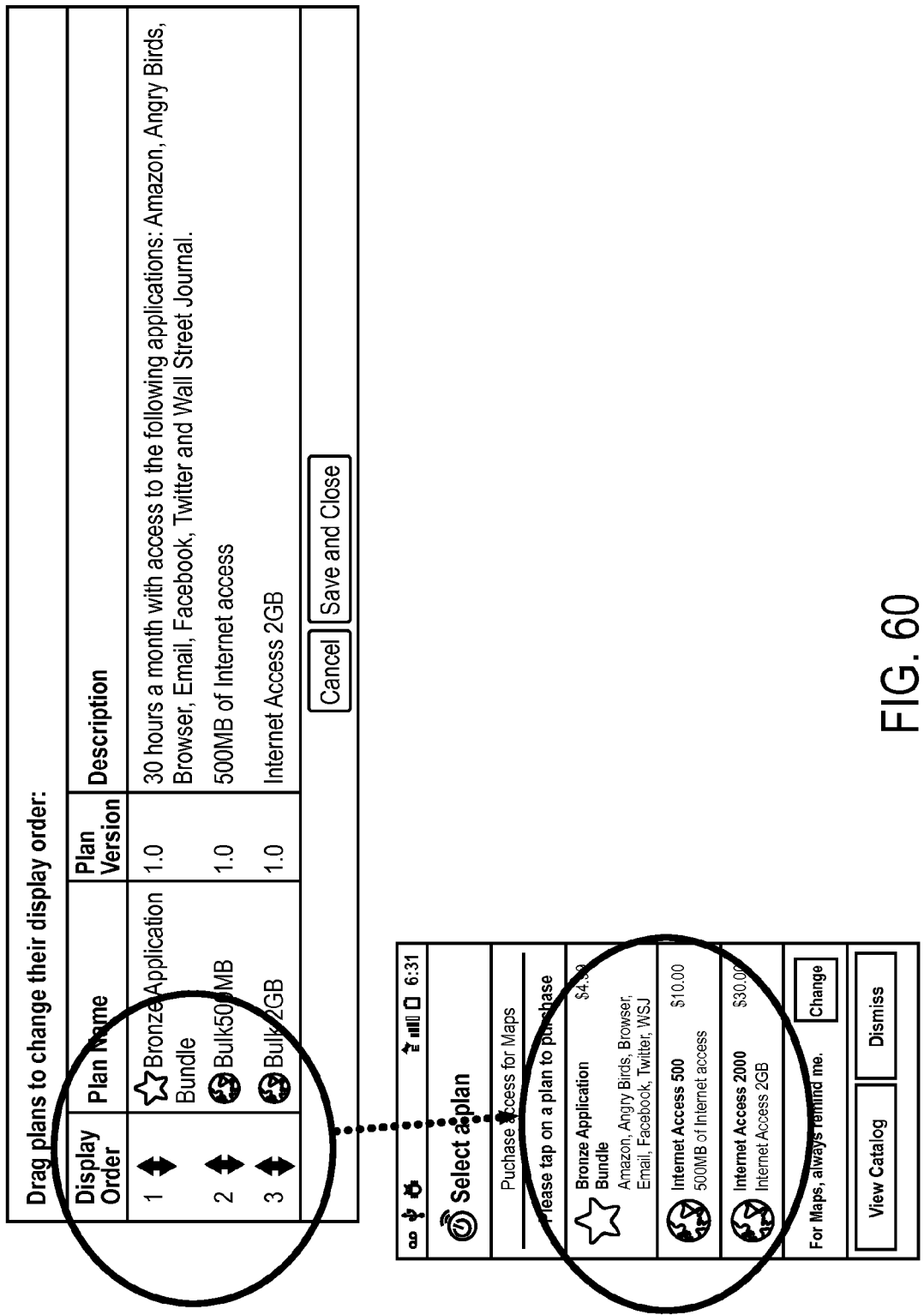
FIG. 60 shows a network manager UI environment for displaying notification templates (and associated device views) to drag service or application up or down for presentation order (for example, priority, discovery level, etc.) in a device in accordance with some embodiments.

FIG. 60 shows a network manager UI environment for displaying notification templates (and associated device views) to drag service or application up or down for presentation order (for example, priority, discover level, etc.) in a device in accordance with some embodiments.

In some embodiments UI160 enables managing one or more of service launch object UI location, service launch object notification messages, service launch partition, service object launcher, UI discovery, service launch object icon as a function (or based on) network state or device usage state.

In some embodiments UI160 defines a dynamic service launch object icon as a function of state, wherein the dynamic icon feature include one or more of icon service launch object appearance, overlay, placement, notification messages.

In some embodiments UI160 defines a dynamic service launch object icon as a function of state, wherein the state include one or more of network state, device usage state, user state.

In some embodiments UI160 defines icon appearance as a function of network state or device usage state by selecting an icon and a secondary network state or device usage state screen to enter secondary appearance graphics (for example, one or more of: a new icon, an icon overlay, icon superposition). In some embodiments UI160 defines icon notification messages as a function of network state or device usage state by selecting an icon and a secondary network state or device usage state to enter secondary notification messages (for example, one or more of: type notification message text, select format, select graphics, select background, select a message from a table, etc.). In some embodiments UI160 defines icon notification message type as a function of network state or device usage state by selecting an icon and a secondary network state or device usage state to enter secondary notification messages. In some embodiments UI160 defines icon notification message type as a function of network state or device usage state by selecting an icon and a secondary network state or device usage state to enter secondary notification messages from one or more of: select notification message graphics background from drag and drop list, or enter new graphics, or type in notification message or choose from pre-specified list.

In some embodiments UI160 defines UI device views as a function of OS versions or device type. In some embodiments UI160 defines UI device views for a device group. In some embodiments UI160 defines UI device views for a device group sharing notification messages or icon appearance. In some embodiments UI160 defines UI device views for a device group includes one or more of: a configuration of launch objects, UI partitions, skins, branding, messages, etc. In some embodiments UI160 defines UI device views for a device group includes selecting notification messages or icon appearance from a common list.

In some embodiments UI160 includes a console UI sandbox for developers to manage (for example, design, modify, update, select, pick) a service plan. In some embodiments UI160 management of a service plan comprises defining discovery position or time in discovery position.

In some embodiments UI160 management of a service plan comprises specifying time in discovery position based on a revolving percentage of time. In some embodiments UI160 management of a service plan comprises defining time in discovery position based on a screen view percentage.

In some embodiments UI160 management of a service plan comprises a developer entering credit credentials. In some embodiments UI160 management of a service plan comprises a developer billing based on more of more of: discovery position, discovery time in position, discovery percentage of time, number of views, number of clicks, notification messages (for example, one or more of frequency, period, duty cycle, dwell time, view refreshes, percentage, relationship with other notification messages), purchase revenue share, analytics generated messaging. In some embodiments UI160 management of a service plan comprises a developer billing based on revenue share. In some embodiments UI160 management of a service plan comprises a developer obtaining analytics generated messaging.

In some embodiments management system 190 includes auto-download of associated service or application after UI launcher receives service launch object.

In some embodiments management system 190 includes auto-download of application when UI launcher receives service launch object so that user does not have to do this through marketplace. In some embodiments the developer pays (or is billed) for auto-download of application or service capability.

In some embodiments if a service or application or website is blocked, a notification message (for example, a text string with the blocked message) is presented that no plan was available for the service or application or website. In some embodiments a button is provided to dismiss the message. In some embodiments a button is provided to manage (for example, stop or stall or background or kill) the service or application or website. In some embodiments a button is provided to launch the user into an application management screen to manage (for example, stop or stall or background or kill) the service or application or website.

In some embodiments the UI location management system is associated (for example, coupled) to application store or marketplace. In some embodiments when or after application developer uploads applications, application developer receives an offer to bid on one or more of more of: discovery position, discovery time in position, discovery percentage of time, number of views, number of clicks, notification messages (for example, one or more of frequency, period, duty cycle, dwell time, view refreshes, percentage, relationship with other notification messages), purchase revenue share, analytics generated messaging. In some embodiments when or after application developer uploads applications, application developer receives an offer based on revenue share. In some embodiments when or after application developer uploads applications, application developer receives analytics generated messaging.

In some embodiments when or after application developer uploads applications, application developer receives an offer to bid on one or more of more of: discovery position, views, time in position with percent, clicks, messaging frequency (time, view refreshes, percent), icon animation, icon feature change, purchase revenue share, analytics generated messaging.

In some embodiments the management system 190 recognizes the service or application plans a user (or device) have and the launcher has a buy up (or upsell) selection (for example, a button) that offers upgrades. In some embodiments the management system 190 recognizes the service or application plans a user (or device) have and the UI 136 has a buy up button that offers upgrades.

In some embodiments an offer to buy-down (or downsell) is buried in a lower discovery screen.

In some embodiments an offer to buy-down is buried in a lower discovery screen that has a larger number (including all) of service launch object choices and that the user has to discover through a multi-screen navigation.

In some embodiments management system 190 includes a web API and application to implement a service object launcher widget. In some embodiments management system 190 includes a website to implement service object launcher widget.

In some embodiments service launch object are organized into categories set by the UI location management server 150 In some embodiments service launch object are organized into categories set by the device management system 170 as controlled by a service provider.

In some embodiments the UI 136 is partitioned in areas of carrier (or service provider) control only or user control only or shared carrier and user control.

In some embodiments service launch object assists or becomes a discovery mechanism comprising one or more of the following: changing appearance of the service launch object based on carrier (wherein carrier is a service provider or third party) control, placing notification messages on, in or near service launch object under carrier control, duplicating (for example, with derivate or modified or enhanced) icons of standard application icons, where duplicate icons are under carrier control and initiate other processes on the device (in addition to or instead of launching the service or application), automatic appearance or addition or removal of launch objects in a category, changing launch object categories, offering a marketing vehicle for application developers to market their services or applications.

In some embodiments a service or application developer makes a widget (to replace the standard service or application icon) that the service or application developer controls and uses it to market a service or application.

In some embodiments a plurality of service or application developer make a widget to market a service or application and becomes very onerous on network.

In some embodiments a plurality of service or application developer share a widget by a third party to market a service or application. In some embodiments a carrier or service provider or OEM desire to control network load or user attention (for example, so called "eyeballs"). In some embodiments a carrier or service provider or OEM desire to control network load or user attention by a shared widget to market services or applications. In some embodiments management system 190 provides a platform for a many (for example, a plurality of service or application providers)—to one (shared device management system or application store or widget)—to many (for example, a plurality of devices or users) marketing platform for one or more of: place notification messages (for example, promotions) on service launch object icons, move/add/delete service launch object icons, manage appearance of icons. In some embodiments management system 190 provides a marketplace for service or application developers or service providers to promote their service or application with a service launch object icon. In some embodiments management system 190 provides a marketplace for service or application developers or service providers to highlight their icons in the device discovery process.

In some embodiments management system 190 provides service or application developer levels (where levels is equivalent to classes, categories, ranking, etc.). In some embodiments management system 190 provides service or application developers one or more levels, with each level including one or more of the following features: place service or application in market place, monetize service or application use (for example, charge by view, click, time, update rate, bandwidth, etc. or for example, separate category for all application related traffic), positioning, amount of time/views/clicks in service discovery launcher, priority positioning, priority amount of time/views/clicks in service discovery launcher. In some embodiments management system 190 offers service or application developers charge by view or click at a given developer or discovery level.

In some embodiments a service launch object ad is the presence of the service launch object icon in a managed system that controls the device service launch object icon service discovery level. In some embodiments ads are for a service or application on the device. In some embodiments ads are associated to a plurality of applications. In some embodiments an ad management system determines a service or application on device 132 and provides an ad based on controlling the service launch object.

In some embodiments the ad management system determines a subset of service or applications on device 132 and manages ads to multiple applications at the same time. In some embodiments the ad management system advertising functionality comprises downloading the service or application, and highlighting the application on the UI.

In some embodiments the ad management system presents the service launch object icon as if the service or application had been selected, and initiates other processes in addition to launching the service or application when the service launch object icon is selected. In some embodiments the ad management system presents the service launch object icon as if the service or application had been selected, and initiates other processes comprising recording the selection for one or more of: analytics, usage statistics, charging, providing service sign up notification or usage notification (for example, here are your options for service to use this application or roaming warning), download the applications, etc.

In some embodiments ads are associated to a launch partition in, on, or near the service launch object being advertised. In some embodiments an ad is placed directly on or next to the service launch object icon. In some embodiments an ad is placed in a banner (for example, a ticker tape). In some embodiments the device UI portion reserved for ads includes several classified (or tiered or ranked) partitions for ads (for example, a plurality of tiered banners). In some embodiments the device UI portion reserved for ads includes several classified (or tiered or ranked) partitions for ads (for example, a plurality of tiered banners) and the ad management system places ads into each classified partition based on one or more of network, device usage, device or user state and desired discovery level. In some embodiments the device UI portion reserved for ads includes several classified (or tiered or ranked) partitions for ads (for example, a plurality of tiered banners) and the ad management system places (alternatively prioritizes) ads into each classified partition based on one or more of network, device usage, device or user state and desired discovery level and bids from one or more ad providers.

In some embodiments service launch object icon features are varied to increase or decrease service discovery (for example, highlight one or more apps, grey-down one or more apps). In some embodiments ads associated to service launch object have icon features other (for example, different) than the icon features on the service launch object itself.

In some embodiments service launch object icons are made available according to a priority policy. In some embodiments a user controls service launch object presence or placement in certain device UI areas, and service provider controls presence and placement in other UI areas. In some embodiments the device 130 has a permanent UI placement area that user cannot remove or modify service launch object. In some embodiments the ads are placed in a service provider controlled device UI area, and dynamically change placement (for example, rotate or round-robin based on a random or ranked method) for presentation to a user.

In some embodiments management system 190 creates a service launch object icon similar to or identical to the standard service or application icon. In some embodiments management system 190 places the service launch object icon in a UI discovery location or applies notification messaging on, in or near the standard service or application icon or modifies the service launch object icon appearance according to a service discovery priority policy for that service launch object.

In some embodiments, selecting the service launch object icon registers the selection for one or more of the following functions: usage history log, click charging, intercepting the service or application launch and providing service notifications, downloading the associated service or application, launching the service or application.

In some embodiments a list of device service or application are obtained (for example, a search by UI location manager 132) for on device screen or in application stable. In some embodiments management system 190 indicates that the service or application is on device to a marketing message management system. In some embodiments the marketing message management system places service launch object icon for service or application in UI launcher. In some embodiments the marketing message management system checks a device or user service plan status (for example, state) and if appropriate provides a marketing message to the user for services associated with that service or application. For example, the marketing message management system notices the device has the YouTube application installed but does not have a special media streaming plan in place, and generates the marketing message: "would you like to learn more about a special media streaming plan service option?"

In some embodiments the marketing message management system checks a device or user service plan status (for example, state) and generates a marketing message to the user for services associated with that service or application and the marketing message management system sends marketing messages related to the service or application. In some embodiments the marketing message management system enters information of the device receiving the marketing message into a differentiated demographics value database indicating that marketing messages for that service or application are more valuable when sent to that device. In some embodiments the marketing database charges more for sending marketing messages for that application to that device.

In some embodiments interactions (responses, views, etc.) of a user with marketing messages are entered into a demographics value database for analysis (for example, regression, model fitting, classification, etc.). In some embodiments the marketing message management system charges more for sending marketing messages for service or application to devices associated (for example, correlated) with analysis database information. In some embodiments UI location manager 132 receives (for example, accepts) marketing message, finds service or application, places message on, in or near service or application.

In some embodiments configuration or management of UI launch area or other discovery management functions is performed by a device management agent, for improved user experience response time (for example, as user controls UIs).

In some embodiments configuration or management of UI launch area or other discovery management functions is performed by a device management agent, resulting in more device software that is specific to a given OS. In some embodiments the device management agent (for example, UI location management 132) accepts policies from a policy server (for example, UI location management server 150) to define one or more of UI launcher: launch partition, service launch object classification, configuration, branding, device placement, icons, icon placement, icon features, icon overlay, icon messaging, icon rotation, highlighting, messaging policies, icon launch processes.

In some embodiments the device management agent (for example, UI location management 132) performs periodic update of service launch object (for example, one or more of service launch object icon, placement, notification messages, classification), or update of service launch object when user first clicks on portal widget. In some embodiments the device management agent (for example, UI location management 132) downloads service or application (for example, if not available on device) via portal or portal instruction to download from application store or marketplace. In some embodiments the device management agent (for example, UI location management 132) comprises device UI management policy instructions tied to UI location management console 160 which configures all of above. In some embodiments UI location management console 160 accepts manager input and provisions device UI management policy instructions.

In some embodiments the device management agent is assisted by a portal application and portal server API to define a part of policy on portal server rather than managing all on device (In-between option for computation complexity sharing and device response time to user).

In some embodiments the device management agent being assisted by a portal to define a part of policy on portal server results (in advantage) is less OS specific software on device or (disadvantage) longer UI response. In some embodiments the device management agent being assisted by a portal to define a part of policy on portal server results in (disadvantage) is considerable OS specific software and slowed device responsiveness.

In some embodiments the device management agent being assisted by a portal to define a part of policy on portal server (for example, UI location management server 150) to define one or more of UI launcher: launch partition, service launch object classification, configuration, branding, device placement, icons, icon placement, icon features, icon overlay, icon messaging, icon rotation, highlighting, messaging policies, icon launch processes.

In some embodiments the device management agent (for example, UI location management 132) being assisted by a portal to define a part of policy on portal server (for example, UI location management server 150) performs periodic update of service launch object (for example, one or more of service launch object icon, placement, notification messages, classification), or update of service launch object when user first clicks on portal widget. In some embodiments the device management agent (for example, UI location management 132) being assisted by a portal to define a part of policy on portal server (for example, UI location management server 150) downloads service or application (for example, if not available on device) via portal or portal instruction to download from application store or marketplace. In some embodiments the device management agent (for example, UI location management 132) being assisted by a portal to define a part of policy on portal server (for example, UI location management server 150) comprises device UI management policy instructions tied to UI location management console 160 which configures all of above. In some embodiments UI location management console 160 accepts manager input and provisions application programming interface (API) information.

In some embodiments the management system 190 is website based and results (in advantage) in minimal OS specific software on device or (disadvantage) longest UI response. Website based approach provides least OS specific device software, but has longest UI response.

In some embodiments the website based management system 190 manages one or more of UI launcher functionality: launch partition, service launch object classification, configuration, branding, device placement, icons, icon placement, icon features, icon overlay, icon messaging, icon rotation, highlighting, messaging policies, icon launch processes.

In some embodiments the website based management system 190 performs periodic update of service launch object (for example, one or more of service launch object icon, placement, notification messages, classification), or update of service launch object when user first clicks on portal widget. In some embodiments the website based management system 190 downloads from application store or marketplace. In some embodiments the website based management system 190 comprises device UI management policy instructions tied to UI location management console 160 which configures all of above. In some embodiments UI location management console 160 accepts manager input and provisions device UI management policy instructions.

In some embodiments, UI location management console 160 displays device view for manager (for example, carrier, service provider, third party, service or application developer) to drag and drop icons or to drag and drop icons into discovery priority bin for one or more of the following management location options: device management agent based with policy download, portal based with API server log in, or website based. In some embodiments, UI location management console 160 displays device view for manager to specify messaging, or messaging taken from sponsor sandbox or for manager to drags and drops icons into messaging frequency policy bin for one or more of the management location options: device management agent based with policy download, portal based with API server log in, or website based.

In some embodiments, a policy to control (for example, one or more of: allow, block, warn, throttle, background, etc.) a service or application is combined with the policy to present (for example, display) of service launch object (for example, through service launch object icon).

In some embodiments, after a service or application that is attempted is identified, the application is offered as a service launch object in the "unpaid services", "paid services" or "free trial" offers. In some embodiments, when a user selects an unpaid service or application, a serve up service offer notification message is presented to the user. In some embodiments the service launch object icon is used to get the user to try or buy services. In some embodiments the device shares with a server that a service or application was attempted under a plan that did not cover the service or application. In some embodiments, after the device shares with a server that a service or application was attempted under a plan that did not cover the service or application, the server creates an offer notification message and instructs device to offer service or application in free trial area of service UI. In some embodiments, after the device shares with a server that a service or application was attempted under a plan that did not cover the service or application, a service launch object icon associated with the service or application is included in launcher.

In some embodiments statistics are collected on one or more top applications tried but not paid for. In some embodiments a user enters new trial plan by hand.

In some embodiments the device management system 170 highlights (for example, with notification messaging) to devices where users have tried to install. In some embodiments the device management system 170 or UI location manager 132 perform automated association of application with application specific policies and notification for free trial. In some embodiments the device management system 170 or UI location manager 132 perform automated association of application notification for a bulk bucket free trial ("click here for a free trial of a service plan that will allow 'textstringxyz' app").

In some embodiments user friendly service or application increase revenues by expanding data users or expanding data devices. In some embodiments user friendly service or application increase value (proposition) for one or more of service providers, access carriers, OEMs, third party over the top service or application providers, chip set providers and OS providers.

Basic motivation: over the air (OTA) bits are not free. Right now carrier has to charge all users to make up for excessive usage users because the carrier has no way to provide bite size service plans that are user friendly and intuitive for mass market users. Many users pay more than they need to because the average user pays for and the 5 percent of excessive data users that are money loser for carriers. The vast majority of the world's population can not afford data access under these current constraints on carrier capability. The carriers need a way to provide one or more of a rich user experience that is self explanatory and provides self-discovery for mass market service plans. In some embodiments carrier provide one or more of bite size bulk data plans, application specific data plans and sponsored data plans (for example, plans that are free to the end user because they are paid for by third party sponsors who make money when users use their over the top service or application).

In some embodiments a device is configured for select or trial or sponsored data access prior to delivery to a user. In some embodiments a device is configured for select or trial or sponsored data access prior to delivery to a user, and the user does not need to configure or pay for partial service access. In some embodiments basic device access is sponsored right out of the box and the user does not need to do anything to activate service. In some embodiments, from this sponsored out of the box condition, the user has certain "free" services that are sponsored by the service provider or third party. In some embodiments the sponsored right out of the box devices include one or more of: sponsored website and application connection services, access to the carrier store, a limited amount of application specific services and bulk internet access services that are provided on a trial (or limited or capped) basis. In some embodiments the consumer is provided with an intuitive service or application user interface (for example, a permanent services discovery area on the device UI) where the user can instantly select from any number of service plans that are configured by the service provider.

In some embodiments the arrangement of the permanent services discovery area on the device UI is OTA configurable by the device management system 170 controlled by the carrier. In some embodiments the enforcement of the required network control, charging or notification policies required to support service offerings, including one or more of sponsored and paid service offerings, is OTA configurable by the device management system 170 controlled by the carrier. This policy enforcement and configuration capability is far beyond anything else in the market or on the drawing boards in the carrier network equipment world.

In some embodiments over the top service or application are monetized by managing application or service discovery placement and advertising. In some embodiments a over the top service or application for a device group is sponsored, where the over the top service provider or application developer bids on earning a service discovery position for their service or application.

In some embodiments a portion of the device home screen or other portions of the device UI are remotely configured or re-configured as a permanent carrier controlled service or application discovery UI environment. In some embodiments a portion of the device home screen or other portions of the device UI are remotely configured or re-configured as a permanent carrier controlled service or application discovery UI environment (for example, dynamically or periodically or state based) by an over-the-air (OTA) device management system 170. In some embodiments an OTA device management system 170 configuration controls what the user can modify and what they cannot.

In some embodiments the service or application icons displayed in the permanent discovery area are used to display a service or application launch opportunity the carrier wishes to provide the user.

In some embodiments, when the user selects a service launch object icon in the discovery area, the device inserts notification messages prior to, concurrently or after launching the service or application. In some embodiments the notification messages include service plan offers customized to the service or application, service usage warnings (for example, service or application uses a lot of data, or service or application causes high roaming costs, etc.), offers for a related service or application, etc. In some embodiments notification messages associated with a service launch object icon launch are OTA configured.

In some embodiments a network entity of management system 190 provides updates to the service launch object management (for example, UI discovery, placement, notification message, etc.). In some embodiments a network entity of management system 190 provides a partial (or full) software upgrade for managing a service launch object. In some embodiments a network entity of management system 190 provides updates to the policy or policy software or policy parameters associated with a service launch object. In some embodiments a network entity of management system 190 provides a policy software updates to device 130. In some embodiments a network entity of management system 190 provides service launch object management (for example, UI discovery policy) software updates to device 130. In some embodiments a network entity of management system 190 provides a partial of full software upgrade (including new device software) to enable or update service launch object management (for example, UI discovery policy) to device 130.

In some embodiments the service or application icons are re-arranged (for example, dynamically re-classified, re-ranked, re-prioritized, re-sorted) according to a discovery priority policy set by the device management system 170. In some embodiments the re-arrangement is static between discovery policy updates between the device management system 170 and the device. In some embodiments the re-arrangement is dynamic between policy updates between the device management system 170 and the device, wherein the arrangement of the service or application is modified periodically. In some embodiments the re-arrangement is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc. In some embodiments each service launch object icon has a discovery placement priority policy so that some service launch object are always displayed in a high discovery location, some service launch object are often displayed in a high discovery location, and some service launch object are rarely or never displayed in a high discovery location.

In some embodiments a subset of service launch object icon within the launch area have a marketing message placed on it according to a service discovery policy. In some embodiments the marketing message is defined by the service provider or entered into the service provider system by the service or application sponsor.

In some embodiments each service launch object icon has a messaging priority policy so that some service launch object have frequent discovery messages, some service launch object have less frequent service discovery messages, and some service launch object rarely or never get service discovery messages. In some embodiments the frequency of service launch object discovery messages is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc.

In some embodiments management system 190 manages one or more of: which or how many service discovery message the service provider wants displayed on service launch object icon at a given time (for example, number of simultaneous messages, dwell intervals, time spacing, etc.), how many service discovery messages should be displayed as a function of time, service discovery messages as a function of one or more: TOD, geography, network state, device cognitive state, user state, user interaction with the device, etc.

In some embodiments the management system 190 locates a service launch object that has been downloaded to the device by the user and places service launch object icons in the launch area. In some embodiments placing user-downloaded service launch object icons in the launch area is advantageous when the carrier offers services associated with the service or application that the carrier desires to promote. In some embodiments this is advantageous if the service or application sponsor is willing to pay the carrier for increased discovery priority when the user has downloaded the service or application.

In some embodiments the management system 190 locates a user service or application that has been downloaded to the device, identifies the location in the UI where the service launch object icon has been placed by the user, and provide service or application marketing messages in, on, or near the service launch object icon. In some embodiments a marketing message is defined by the service provider or entered into the service provider system (for example, a service design center) by the service or application sponsor.

In some embodiments each service launch object icon defined by the service provider or entered into the service provider system has a messaging priority policy so that some service launch object have frequent discovery messages, some service launch object have less frequent service discovery messages, and some service launch object rarely or never get service discovery messages.

In some embodiments the frequency of service launch object discovery messages is defined by the service provider or entered into the service provider system and is based on one or more of: interactions (for example, how many views, clicks, selections, voice commands) of the user with the UI launch area, whether or not the service launch object icon has been selected or a number of selections, how much time has elapsed, the geography the device is in, the network the device is connected to, network state, the time of day, the applications the user has recently been using, the websites the user has recently been using, cognitive state of the device, device parameters, user parameters (for example, profile, preferences), etc. In some embodiments the service provider (or entered into the service provider system) manages one or more of: which or how many service discovery message the service provider wants displayed on service launch object icon at a given time (for example, number of simultaneous messages, dwell intervals, time spacing, etc.), how many service discovery messages should be displayed as a function of time, service discovery messages as a function of one or more: TOD, geography, network state, device cognitive state, user state, user interaction with the device, etc.

In some embodiments the management system 190 locates a user service or application that has been downloaded to the device, identifies the location in the UI where the service launch object icon has been placed by the user, and overlays graphics or text or sounds (for example, a modified icon) in, on, or near the service launch object icon to provide one or more of: highlight the discovery level of the service launch object (or associated service or application) to the user, indicate whether the service or application can access the network (for example, WWAN) given the services available to the user (for example, services the user has elected to pay for), indicate whether the service or application is free or is charged to a user bucket, indicate whether the service or application currently has access to the network (for example, WWAN or WiFi) or not (for example, roaming policies can be set up according to applications, network policies can be set up according to application [4G, 3G, 2G, WiFi, etc.], QoS or congestion policies can be set up according to applications, etc.).

In some embodiments the management system 190 described above are configured with a device management secure back end portal controlled by the carrier.

In some embodiments the management system 190 device management secure back end portal has a sandbox capability that allows service or application sponsors (or developers) to log in and pay for, or bid on one or more of the service or application discovery services described above. In some embodiments the system provides for bidding on discovery location, message frequency, views, clicks, etc.

In some embodiments the user gets more control of the device UI when the user pays more (for example, buys up or purchases an upsell service). In some embodiments the user gets less control of the device UI in exchange for a service plan discount from the service provider. In some embodiments higher levels of service plan (for example, more expensive plans, or by accumulating rewards from service or application usage) provide higher levels of UI customization. In some embodiments the user gets a discount or a sponsored service (for example, subsidized service or application access) in exchange for allowing the service provider (or some other network entity—such as application provider) to control the device UI. In some embodiments the user receives a discount on device service to turn over a UI portion or partition of the device.

In some embodiments two or more network entities (for example, carrier and application developer) share the revenue for an over the top service. In some embodiments two or more network entities (for example, carrier and application developer) share the revenue for an over the top service (for example, a service launch object associated to a service or application or content), where one entity provides the service, application or content and the other entity provides the access.

In some embodiments the device UI changes as user changes service plan. In some embodiments the device UI shows free service or application until the user tries the service or application. In some embodiments after the user tries the service or application, the service launch object shows entry level paid service or application. In some embodiments after the user tries the entry level paid service or application, the service launch object shows upgrade service or application (for example, upsells). In some embodiments, if the usage of service or application (or revenue) falls back, the service launch object shows a lower cost alternative (for example, free service or application again). In some embodiments the management system 190 change offered service launch object (or associated service or application) based on the available service launch object on the device.

In some embodiments service plans are sorted from lowest to highest cost data plans based on (or normalized) a per unit time basis based on a number of previous weeks of usage. In some embodiments only upsell (or buy up) service plans are shown in the sorted list.

In some embodiments a user or network entity has several options for sponsored data and an auction (or bidding engine) selects the winning service.

In some embodiments a service or application provider bids for UI discovery or placement (based on priority, user demographics, network state, device usage state, device cognitive state) over one or more geographies (for example, one or more area codes or cities) or over one or more geography tiers (nationwide, statewide, regional, sub-regional, address plus radius). In some embodiments higher geography tiers receive a bid discount (for example, nationwide has a lower normalized cost than statewide).

In some embodiments the service launch object provides control of the service or application. In some embodiments the service launch object intercepts and controls the service or application. In some embodiments the service provider (or OEM) takes over the service or application by installing a service launch object associated to the service or application. In some embodiments the service launch object is associate to multiple service or application and has a table of service or application with policy entries for one or more of the associated service or application. In some embodiments the policies comprise one or more of: hold launch, notify (user or network entity) of launch, acknowledge selection of service or application, launch service or application and log acknowledgement in customer care, notify in parallel to launch, block launch, block launch and notify user or network entity, notify, acknowledge (for example, log selection).

In some embodiments the notification associated to the service or application associated to the service launch object comprise one or more of the following types of notification: need a service plan, selected application is expensive on this network, selected application is expensive when roaming, an advertisement associated to service or application (typically in parallel, but is in series), offering alternate applications, offering related applications, offering related activity, offering related merchandise, combine with location, state, etc. information. In some embodiments the notification associated to the service or application associated to the service launch object comprise informing a user of fraud. In some embodiments the service is discontinued or discounted or service use is accelerated based on fraud. In some embodiments the notification ranks service or applications according to what is about to run out. In some embodiments the notification ranks service or applications according to what is about to run out and give an option to click down.

In some embodiments the service provider manages location management service or application (for example, access services).

In some embodiments the service launch object icon is the standard (wherein standard could refer to the generic, normal or typical) icon, and the management system 190 provides one or more of UI placement, location discovery (for example, including selecting portions in one or more UI partitions or tiers or classification) and network entity based policies (or directly managed by network entity) for the standard application icon.

In some embodiments, a service or application is launched when a network state change occurs, an entity of management system 190 obtains usage counts to determine that a service or application is in use, searches through table (for example, for policy instructions associated to service or application) associated to service or application in use, and enforces policy (for example, shut down service or application or keep service or application operating and notify user in parallel). In some embodiments, a network state changes after a service or application is launched, a subset of the service or application included in the active table are forced to quit and to re-launch on new network state.

In some embodiments for bidding on UI location (placement, discovery level, etc.) of service or application associated to service launch object comprises a bid table. In some embodiments the bid table includes one or more entries for: spots, graphics, text, animation per entry. In some embodiments bid table entries have time service launch objects. In some embodiments bid table entries have a minimum time window. In some embodiments bid table entries change with time of day. In some embodiments bid table entries have entries change with device usage state. In some embodiments bid table entries have entries change with geo. In some embodiments bid table entries include one or more of: bid on one or more spots, bid on one or more time service launch objects, bid on one or more time of day, bid on one or more geos. In some embodiments the service launch object are swapped based on one or more of: changes is geo, network state, device usage state, etc.

In some embodiments the bid is for a pre-configured geo. In some embodiments the bid is on geographic location (city, state, etc.) or zip with radius. In some embodiments the user of bidding platform pays for one or more of: per display, per unit time, or per click. In some embodiments the base pay is for a unit time. In some embodiments payment increased per view (for example, with a limit). In some embodiments additional payment per click (for example, with a limit or cap). In some embodiments pay increases for animation, etc.

In some embodiments bulk buys (for example, discounts, rebates, coupons, etc.) are provider for large geographic areas (for example, nationwide). In some embodiments bidder pays more for geographic specific bids. In some embodiments bids have time-of-day policies. In some embodiments bids have device usage (or network) state policies. In some embodiments table entry in a given geographic and time of day goes to highest bidder. In some embodiments the bid includes a minimum time window.

In some embodiments bid winner algorithms as based on geographic level (for example, population or area size or level) selection relative to bid offer. In some embodiments bidder screen provides selection of geographic areas to bid on and high bidder wins. In some embodiments the highest nationwide bidder (for example, regardless of regional or local bidders). In some embodiments regional highest bidder is considered if higher than a nationwide bidder by a target amount (for example, percentage or threshold, etc.). In some embodiments location specific bidder is considered if higher than a regional (or nationwide) bidder by a desired target amount. In some embodiments a device usage (or network or device or user) state specific bidder is considered if higher than larger geographic bidders by a target amount. In some embodiments a previous bid winner is shuffle down if knocked down by higher bid (or higher by a give percentage or threshold) for higher position. In some embodiments the bid winner algorithm is based on maximizing the revenue from bid pool or devices.

In some embodiments bidding includes one or more spots including: spot for search, spot for featured sponsored, spot for ads, spots for coupons, spot for maps, etc. In some embodiments the bidding includes bid types, for example, bid on specialized spots or bid on general purpose spots (for example, based on target user, or device, or geographic location, or network state parameters). In some embodiments select targeted time or geography or state rules for special spots (vs. general purpose spots). In some embodiments the bidding platform includes an area (or portion of device UI) for OEM customization. In some embodiments the bidding platform includes an area (or portion of device UI) for user customization. In some embodiments the area for OEM or user customization may be viewed on a service design center (SDC) screen.

In some embodiments the portion of the device UI reserved for the launcher is configurable (for example, left, center right, small, medium, large, upper, middle, lower). In some embodiments the portion of the device UI reserved for the launcher is configurable in a SDC or OTA configurable. In some embodiments the device is configured to include a UI menu for configurable discovery management display or launcher. In some embodiments the device includes a default launcher, for example, for (first) power up, and then user can subsequently change. In some embodiments the default launcher comes back every power cycle or comes back after a set time or comes back after sleep. In some embodiments the return to default launcher is SDC or OTA configurable. In some embodiments the launcher configuration is viewable in SDC screen.

In some embodiment place a special identifier near the launcher (for example, make a shim below launcher) so that launcher area is permanent. In some embodiments the UI portion includes an enhanced launcher that recognizes permanent areas and gives user control of all other areas when they download the enhanced launcher.

In some embodiments a user or network entity can drag icons from launcher to standard UI display (or screen). In some embodiments the icons is converted (or reverted) between real icons or special launcher icons. In some embodiments the icons is converted (or reverted) between real icons or special launcher icons when the icons are dragged between the launcher and the standard UI display.

Although specific embodiments have been described and illustrated, the described embodiments are not to be limited to the specific forms or arrangements of parts so described and illustrated. The embodiments are limited only by the appended claims.

The invention claimed is:

1. A method performed by a network system, the method comprising:
managing a plurality of content stored on at least one content distribution server, the plurality of content including a particular content;
assisting in preloading, via a first communication network, at least a first portion of the particular content to a home content reservoir associated with a user, the particular content selected for preload based on a value metric associated with prior user activity and prior to any potential user request to download the particular content;
obtaining information to assist in identifying a portion of a user interface of a wireless device associated with the user and the home content reservoir, the wireless device communicatively coupled to the network system over a wireless access network;
obtaining a service launch object associated with the particular content for placement in the identified portion of the user interface, the service launch object, when activated by a user of the wireless device when the device is in range of a home network, causing the wireless device to communicate with the home content reservoir over a home network connection to obtain at least part of the first portion of the particular content over the home network connection; and
sending configuration information to the wireless device over the wireless access network, the configuration information configured to assist the wireless device in placing the service launch object in the identified portion of the user interface.

2. The method of claim 1, further comprising:
determining a differentiating attribute of the identified portion of the user interface; and
determining the configuration information based on the differentiating attribute.

3. The method of claim 1, wherein the wireless access network is a cellular network.

4. The method of claim 1, wherein the particular content comprises one or more of video content, audio content, software, and an application.

5. The method of claim 1, wherein assisting in preloading comprises preloading the at least a first portion of the particular content to the home content reservoir in a secure format.

6. The method of claim 1, wherein the service launch object, when selected by a user of the wireless device, launches the particular content on the wireless device.

7. The method of claim 1, further comprising allowing a user to access a second portion of the particular content, wherein the second portion of the content in conjunction with the at least a first portion of the content allows the user to consume the content.

8. The method of claim 1, wherein the identified portion of the user interface comprises a particular partition of a plurality of partitions of the user interface.

9. The method of claim 8, further comprising:
classifying at least one of the plurality of partitions based on ease of discovery to a user of the wireless device, and
based on the result of classifying the at least one of the plurality of partitions, identifying the particular partition for placement of the service launch object.

10. The method of claim 1, wherein the configuration information is further configured to assist the wireless device in one or more of:
enabling or launching the particular content when a user selects the service launch object, and
providing additional management functions associated with the particular content when the user selects the service launch object.

11. The method of claim 1, further comprising providing a view of the user interface to a network system manager.

12. A network system comprising:
means for managing a plurality of content stored on at least one content distribution server, the plurality of content including a particular content;
means for assisting in preloading, via a first communication network, at least a first portion of the particular content to a home content reservoir associated with a user, the particular content selected for preload based on a value metric associated with prior user activity and prior to any potential user request to download the particular content;
means for obtaining information to assist in identifying a portion of a user interface of a wireless device associated with the user and the home content reservoir, the wireless device communicatively coupled to the network system over a wireless access network;
means for obtaining a service launch object associated with the particular content for placement in the identified portion of the user interface, the service launch object, when activated by a user of the wireless device when the device is in range of a home network, causing the wireless device to communicate with the home content reservoir over a home network connection to obtain at least part of the first portion of the particular content over the home network connection; and means for sending configuration information to the wireless device over the wireless access network, the configuration information configured to assist the wireless device in placing the service launch object in the identified portion of the user interface.

13. The network system recited in claim 12, wherein the means for managing the plurality of content include a server.

14. The network system recited in claim 13, wherein at least one of the communication network and the wireless access network is a cellular network.

15. The network system recited in claim 12, wherein the particular content comprises one or more of video content, audio content, software, and an application.

16. The network system recited in claim 12, wherein the service launch object is an icon for launching the particular content.

17. A network system comprising:
a communications interface for enabling the network system to communicate with a wireless device over a wireless access network, the wireless device associated with a user and a home content reservoir communicatively coupled to the network system by a communication network; and
one or more network elements configured to:
manage a plurality of content stored on at least one content distribution server, the plurality of content including a particular content,
assist in preloading at least a first portion of the particular content to the home content reservoir via the communication network, the particular content selected for preload based on a value metric associated with prior user activity and prior to any potential user request to download the particular content,
obtain information to assist in identifying a portion of a user interface of the wireless device,
obtain a service launch object associated with the particular content for placement in the identified portion of the user interface, the service launch object, when activated by a user of the wireless device when the device is in range of a home network, causing the wireless device to communicate with the home content reservoir over a home network connection to obtain at least part of the first portion of the particular content over the home network connection, and
send configuration information to the wireless device over the wireless access network, the configuration information configured to assist the wireless device in placing the service launch object in the identified portion of the user interface.

18. The network system recited in claim 17, wherein at least one of the communication network and the wireless access network is a cellular network.

19. The network system recited in claim 17, wherein the particular content comprises one or more of video content, audio content, software, and an application.

20. The network system recited in claim 17, wherein the service launch object is an icon for launching the particular content.

* * * * *